(12) United States Patent
Standke

(10) Patent No.: US 11,412,722 B1
(45) Date of Patent: Aug. 16, 2022

(54) FISHING LURE DEVICE AND METHODS THEREOF

(71) Applicant: Ryan Michael Standke, Oshkosh, WI (US)

(72) Inventor: Ryan Michael Standke, Oshkosh, WI (US)

( * ) Notice: Subject to any disclaimer, the term of this patent is extended or adjusted under 35 U.S.C. 154(b) by 356 days.

(21) Appl. No.: 16/396,661

(22) Filed: Apr. 27, 2019

Related U.S. Application Data

(60) Provisional application No. 62/664,258, filed on Apr. 29, 2018.

(51) Int. Cl.
| | | |
|---|---|---|
| *A01K 85/02* | (2006.01) | |
| *A01K 85/10* | (2006.01) | |
| *A01K 91/04* | (2006.01) | |
| *A01K 85/14* | (2006.01) | |
| *A01K 83/06* | (2006.01) | |
| *B29C 41/04* | (2006.01) | |
| *B22D 19/00* | (2006.01) | |
| *B22D 13/10* | (2006.01) | |
| *B29C 41/38* | (2006.01) | |
| *B29C 41/20* | (2006.01) | |
| *B29K 63/00* | (2006.01) | |
| *B29L 31/00* | (2006.01) | |

(52) U.S. Cl.
CPC .............. *A01K 85/02* (2013.01); *A01K 83/06* (2013.01); *A01K 85/10* (2013.01); *A01K 85/14* (2013.01); *B22D 13/101* (2013.01); *B22D 19/00* (2013.01); *B29C 41/04* (2013.01); *B29C 41/20* (2013.01); *B29C 41/38* (2013.01); *B29K 2063/00* (2013.01); *B29L 2031/7002* (2013.01)

(58) Field of Classification Search
CPC .. A01K 85/00; A01K 91/04; B29L 2031/7002
USPC .............................................. 43/42.36, 42.08
See application file for complete search history.

(56) References Cited

U.S. PATENT DOCUMENTS

| | | | |
|---|---|---|---|
| 2,828,571 A | 4/1958 | Caplan | |
| 3,010,243 A * | 11/1961 | Dickinson | .............. A01K 85/00 |
| | | | 43/42.09 |
| 3,483,651 A | 12/1969 | Borger | |
| 3,590,514 A | 7/1971 | Begley | |
| 3,693,275 A | 9/1972 | Craig | |
| 3,922,811 A | 12/1975 | Ellingson | |
| 4,037,345 A | 7/1977 | Dubois | |
| 4,642,933 A | 2/1987 | Brown | |
| 4,660,318 A | 4/1987 | Mieno | |

(Continued)

FOREIGN PATENT DOCUMENTS

| | | | |
|---|---|---|---|
| CA | 2712124 A1 * | 7/2009 | ............... B32B 5/16 |
| EP | 1523886 A1 | 10/2004 | |

(Continued)

*Primary Examiner* — Christopher P Ellis
(74) *Attorney, Agent, or Firm* — Bryan R. Rosiejka

(57) ABSTRACT

A fishing lure of the present invention includes a body component and a hook component, wherein one end of the hook component is integral with the body component and extends therefrom. In addition, the fishing lure includes an inventive through-line element wherein a fishing line can be threaded through the through-line element and attached directly to the hook component. In preferred embodiments, the inventive fishing lure can eliminate the need for an eyelet when securing a fishing line to the fishing lure.

20 Claims, 80 Drawing Sheets

(56) References Cited

U.S. PATENT DOCUMENTS

| | | | |
|---|---|---|---|
| 4,777,756 A | 10/1988 | Mattison | |
| 4,819,366 A | 4/1989 | Manno | |
| 4,845,884 A * | 7/1989 | Pacitti | A01K 93/00 43/44.88 |
| 4,879,835 A | 11/1989 | Sprayberry | |
| 4,891,900 A | 1/1990 | Snyder | |
| 4,920,688 A * | 5/1990 | Devereaux | A01K 85/00 43/42.28 |
| 5,142,811 A | 9/1992 | Freeman | |
| 5,175,955 A * | 1/1993 | Wilson | A01K 85/00 43/42.36 |
| 5,216,830 A | 6/1993 | Brott, II | |
| 5,231,786 A * | 8/1993 | Hughes | A01K 85/00 43/42.39 |
| 5,245,783 A | 9/1993 | Cumiskey | |
| 5,339,559 A * | 8/1994 | Strobbe | A01K 85/00 43/42.28 |
| 5,367,817 A * | 11/1994 | Clark | A01K 85/00 43/42.02 |
| 5,394,636 A * | 3/1995 | Rabideau | A01K 85/00 43/42.13 |
| 5,560,142 A * | 10/1996 | Dickens | A01K 85/08 43/42.25 |
| 5,564,220 A | 10/1996 | Blicha | |
| 5,956,886 A * | 9/1999 | Choate | A01K 85/00 43/42.13 |
| 6,006,465 A * | 12/1999 | Brown | A01K 85/00 43/42.36 |
| 6,772,553 B2 * | 8/2004 | Phillips | A01K 85/02 43/42.11 |
| 6,813,857 B2 | 11/2004 | Payer | |
| 7,010,881 B2 | 3/2006 | Altman | |
| 7,694,453 B1 * | 4/2010 | Arrico | A01K 85/02 43/42.13 |
| 7,866,084 B1 | 1/2011 | Nelson et al. | |
| 7,874,095 B2 | 1/2011 | Rodels | |
| 8,079,173 B2 * | 12/2011 | Corbitt, III | A01K 85/00 43/42.36 |
| 8,230,639 B2 | 7/2012 | Langer et al. | |
| 8,898,951 B2 | 12/2014 | Hughes | |
| 8,910,415 B2 * | 12/2014 | Farr, Jr. | A01K 85/00 43/42.28 |
| 8,919,032 B1 | 12/2014 | Paino | |
| 9,877,468 B1 * | 1/2018 | Brown | A01K 95/00 |
| 2003/0093940 A1 | 5/2003 | Walker et al. | |
| 2004/0031187 A1 | 2/2004 | Phillips et al. | |
| 2004/0055205 A1 | 3/2004 | Pack | |
| 2004/0154212 A1 * | 8/2004 | Harrell | A01K 85/00 43/42.39 |
| 2004/0216359 A1 * | 11/2004 | Mitchell | A01K 85/00 43/42.36 |
| 2005/0183323 A1 * | 8/2005 | Harrell | A01K 85/00 43/42.39 |
| 2005/0229473 A1 * | 10/2005 | Altman | A01K 85/00 43/42.13 |
| 2006/0156611 A1 * | 7/2006 | Harrell | A01K 91/04 43/42.36 |
| 2006/0260178 A1 * | 11/2006 | Jones | A01K 91/04 43/42.36 |
| 2006/0260179 A1 * | 11/2006 | Guigo | A01K 85/00 43/42.36 |
| 2007/0214709 A1 | 9/2007 | Shelton et al. | |
| 2007/0240359 A1 * | 10/2007 | Jalbert | A01K 85/16 43/42.22 |
| 2007/0289198 A1 * | 12/2007 | Rodels | A01K 91/04 43/42.36 |
| 2008/0072472 A1 | 3/2008 | Hogan | |
| 2008/0148623 A1 * | 6/2008 | Uhrig | A01K 85/02 43/42.39 |
| 2008/0196293 A1 * | 8/2008 | Milanowski | A01K 83/06 43/42.36 |
| 2008/0250693 A1 * | 10/2008 | Krueger | A01K 85/00 43/42.39 |
| 2009/0119971 A1 | 5/2009 | Miyasato et al. | |
| 2009/0211144 A1 | 8/2009 | Murphy | |
| 2009/0260275 A1 | 10/2009 | Kemp | |
| 2010/0050497 A1 | 3/2010 | Brown | |
| 2010/0146837 A1 | 6/2010 | Zernov | |
| 2010/0154285 A1 * | 6/2010 | Greenfield | A01K 85/00 43/42.24 |
| 2010/0223833 A1 | 9/2010 | Rigney | |
| 2010/0325937 A1 * | 12/2010 | Webb | A01K 85/02 43/42.36 |
| 2011/0047857 A1 * | 3/2011 | Miller | A01K 95/00 43/44.97 |
| 2011/0162254 A1 * | 7/2011 | Smits | A01K 85/18 43/42.36 |
| 2012/0096757 A1 | 4/2012 | Langer et al. | |
| 2012/0137568 A1 | 6/2012 | Walsh et al. | |
| 2013/0081320 A1 | 4/2013 | Robertson | |
| 2013/0199081 A1 | 8/2013 | Hepp et al. | |
| 2013/0269236 A1 * | 10/2013 | Oblonskij | A01K 85/00 43/42.36 |
| 2013/0318856 A1 | 12/2013 | Rice | |
| 2014/0173968 A1 * | 6/2014 | Comeaux | A01K 85/00 43/42.32 |
| 2014/0259869 A1 | 9/2014 | Scholfield | |
| 2016/0205908 A1 * | 7/2016 | Stanford | A01K 83/00 |
| 2017/0303519 A1 * | 10/2017 | Wedam | A01K 85/00 |
| 2019/0357513 A1 * | 11/2019 | Brockhouse | A01K 97/24 |
| 2020/0315152 A1 * | 10/2020 | Garrison | A01K 85/00 |

FOREIGN PATENT DOCUMENTS

| | | | |
|---|---|---|---|
| GB | 751673 A | 7/1956 | |
| GB | 2516653 A | 2/2015 | |
| JP | 2021010351 A * | 2/2021 | |
| KR | 20100067646 A * | 6/2010 | A01K 97/06 |
| KR | 1020160109812 A | 9/2016 | |
| WO | WO-2010075513 A1 * | 7/2010 | A01K 85/16 |
| WO | 2012106241 A1 | 8/2012 | |

* cited by examiner

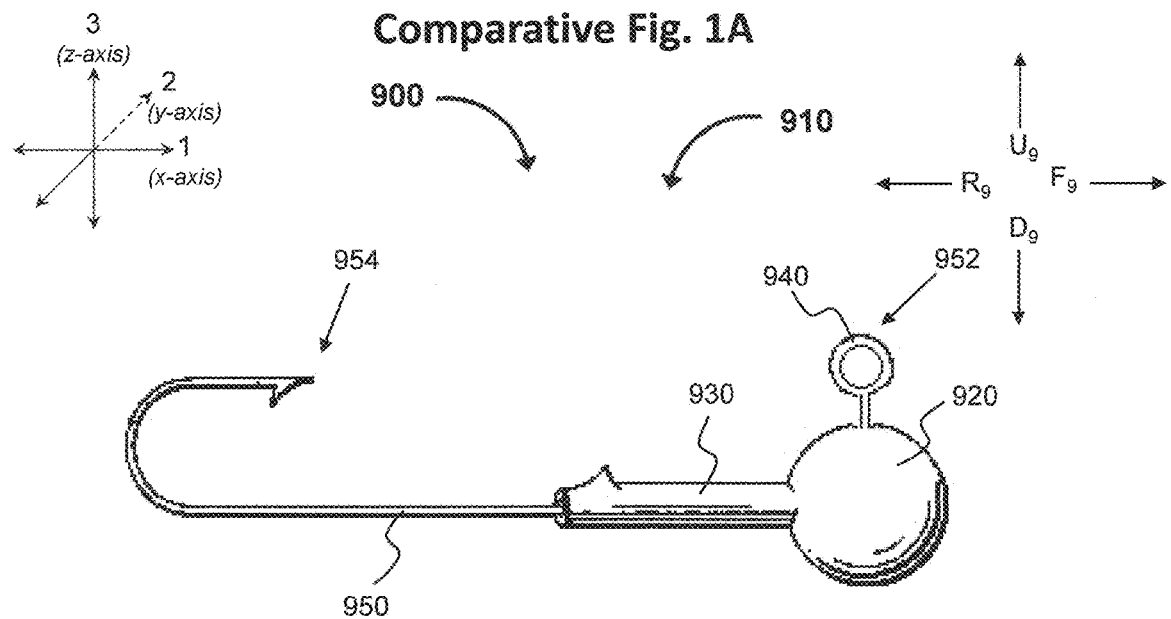
Comparative Fig. 1A
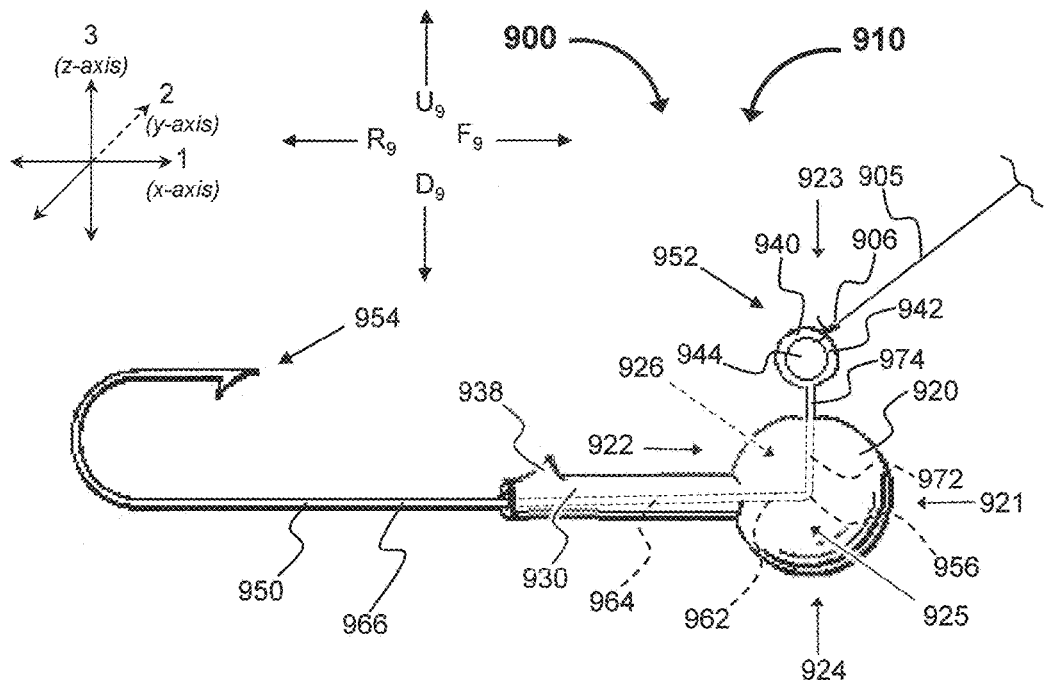
Comparative Fig. 1B

Comparative Fig. 1C
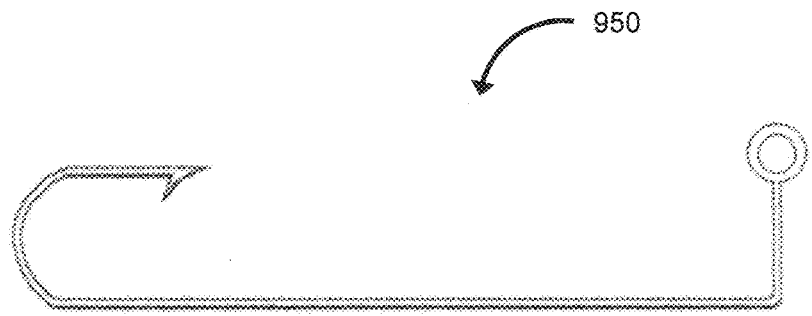
Comparative Fig. 1D
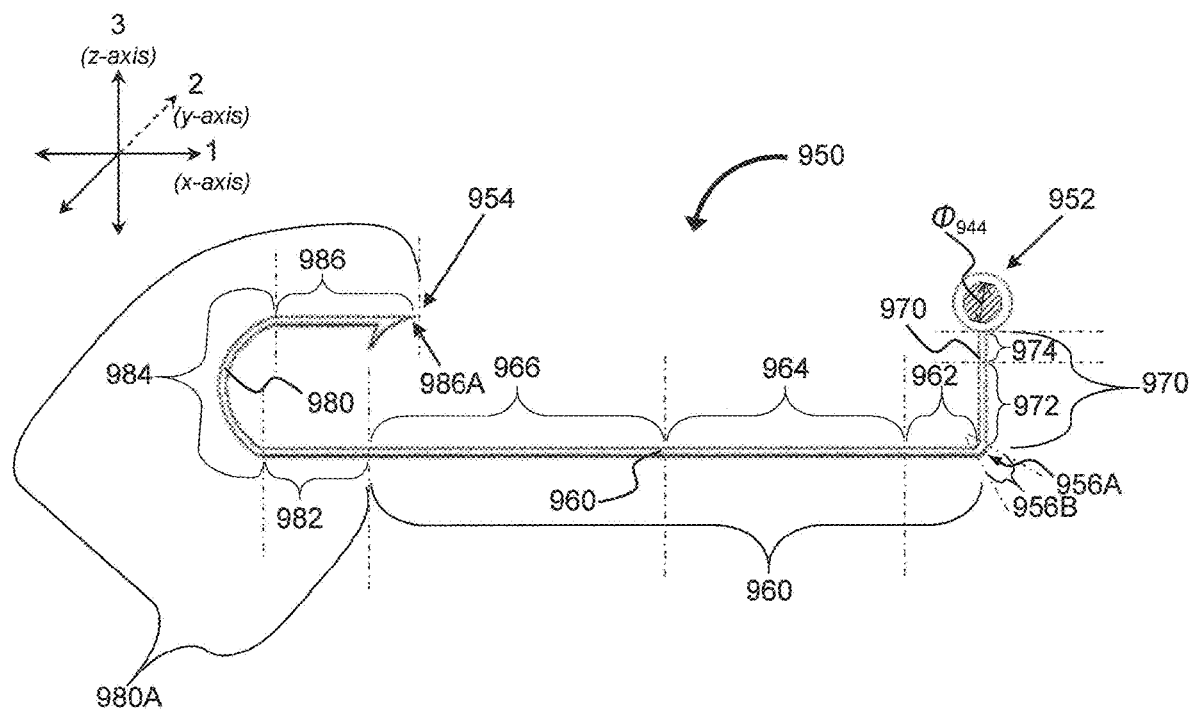

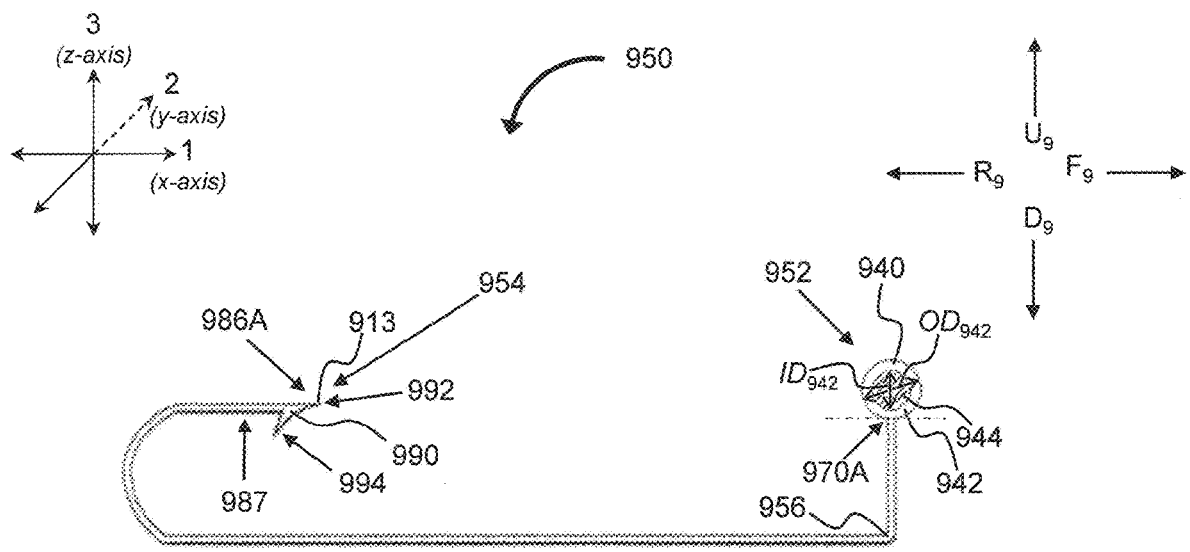
Comparative Fig. 1E
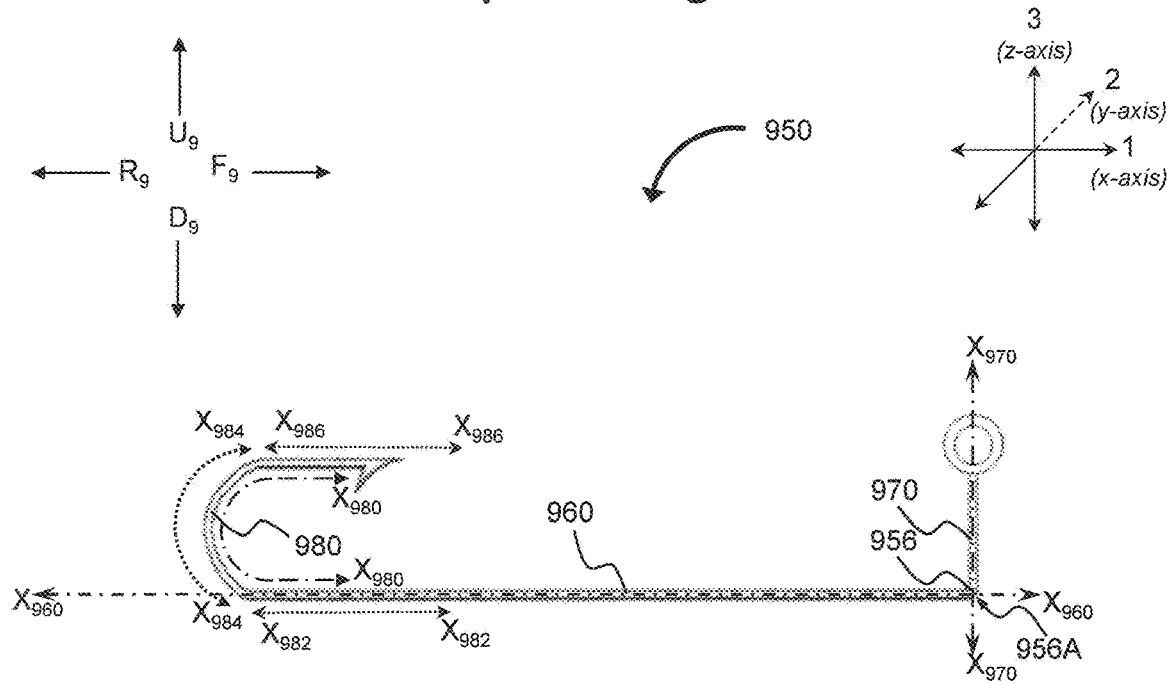
Comparative Fig. 1F

Comparative Fig. 1G
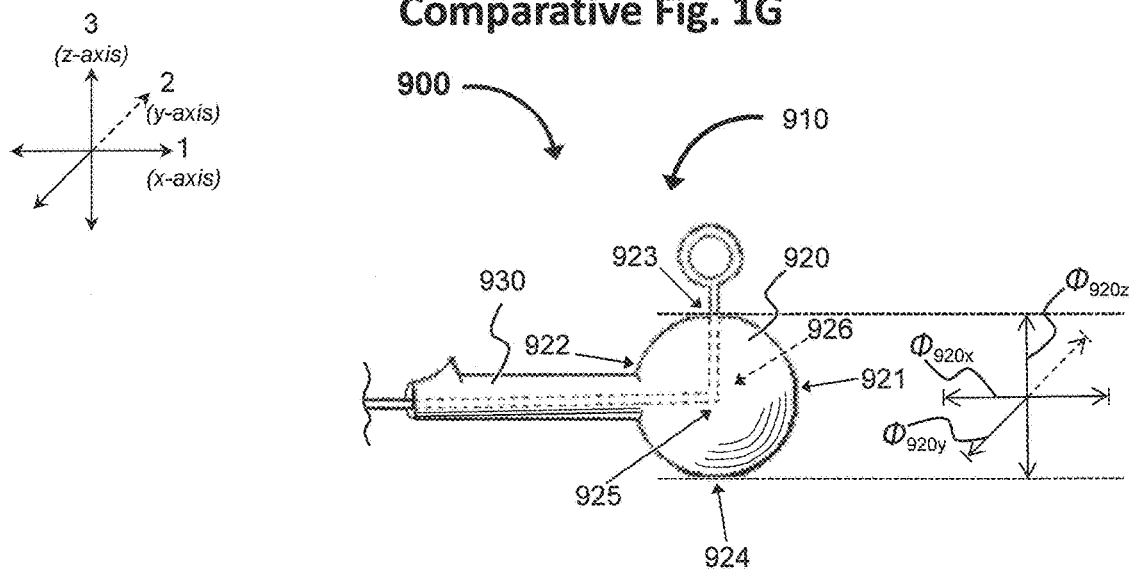
Comparative Fig. 1H
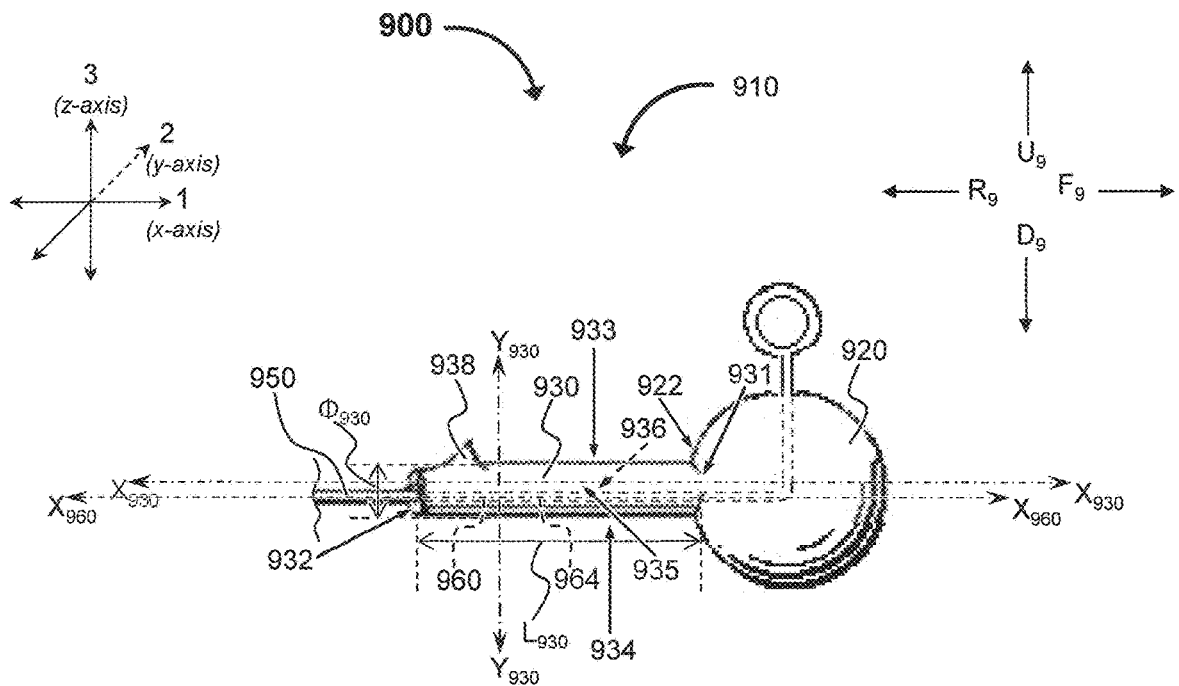

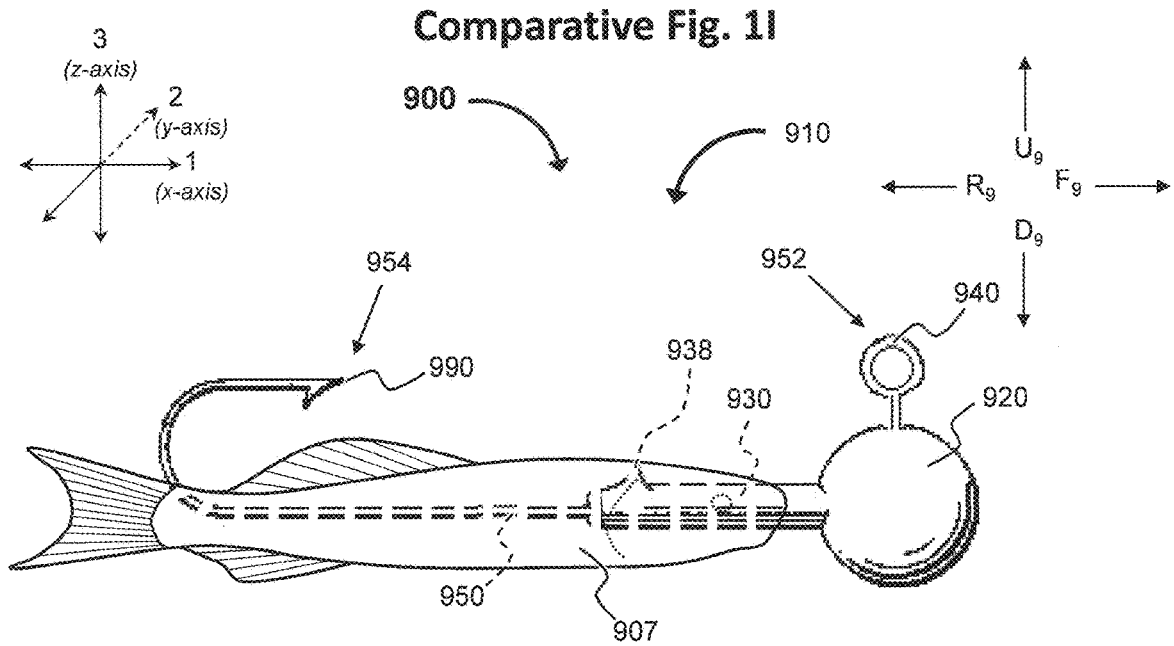
Comparative Fig. 1I
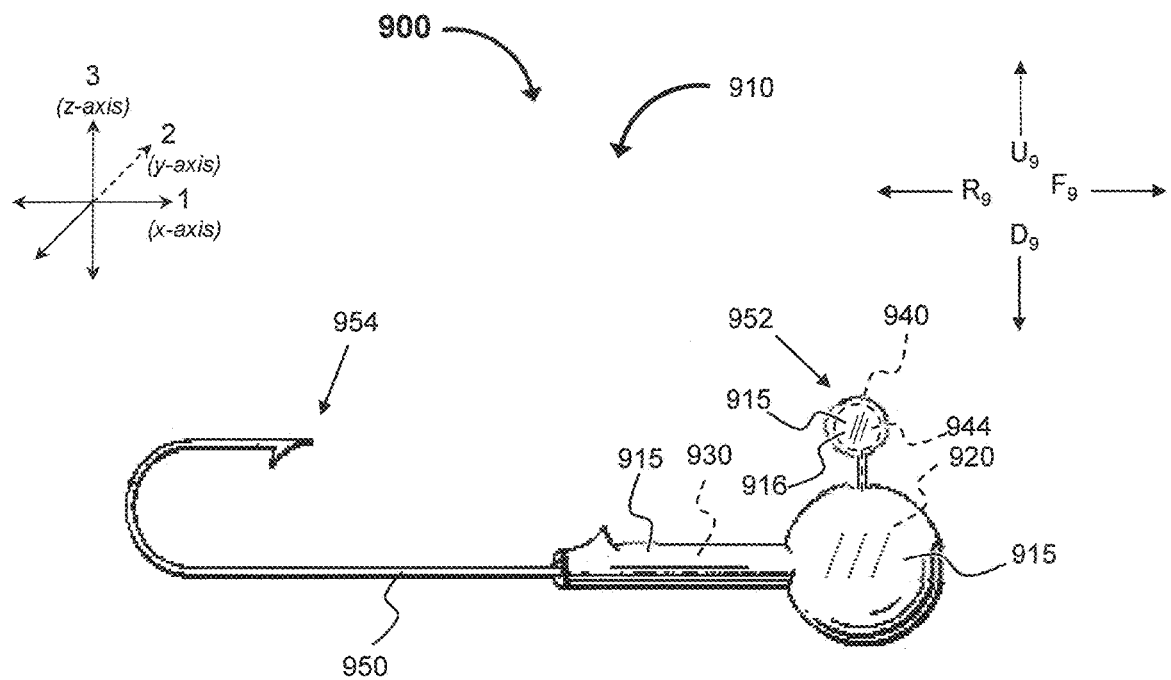
Comparative Fig. 1J

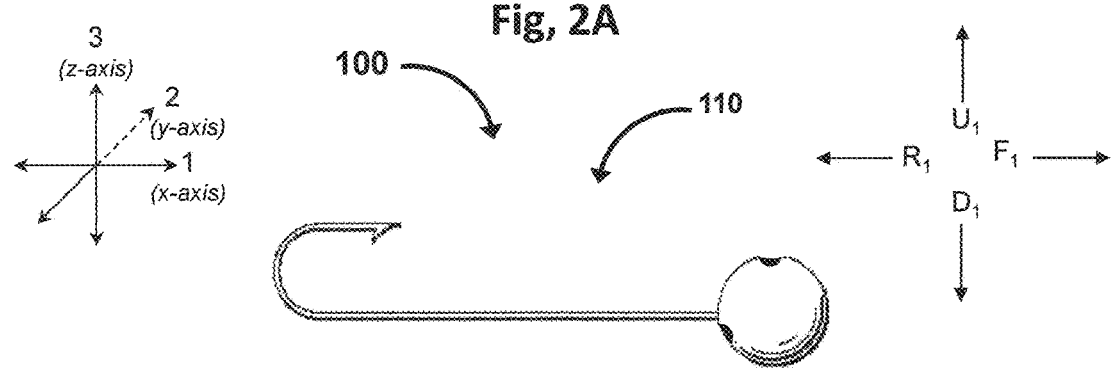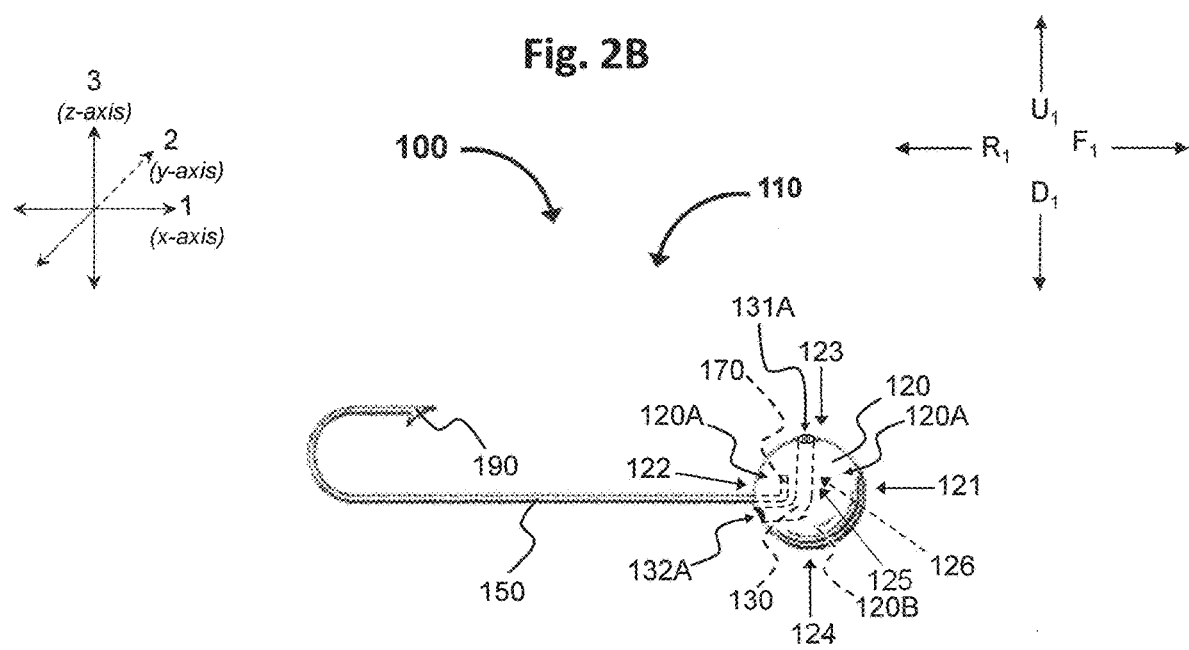

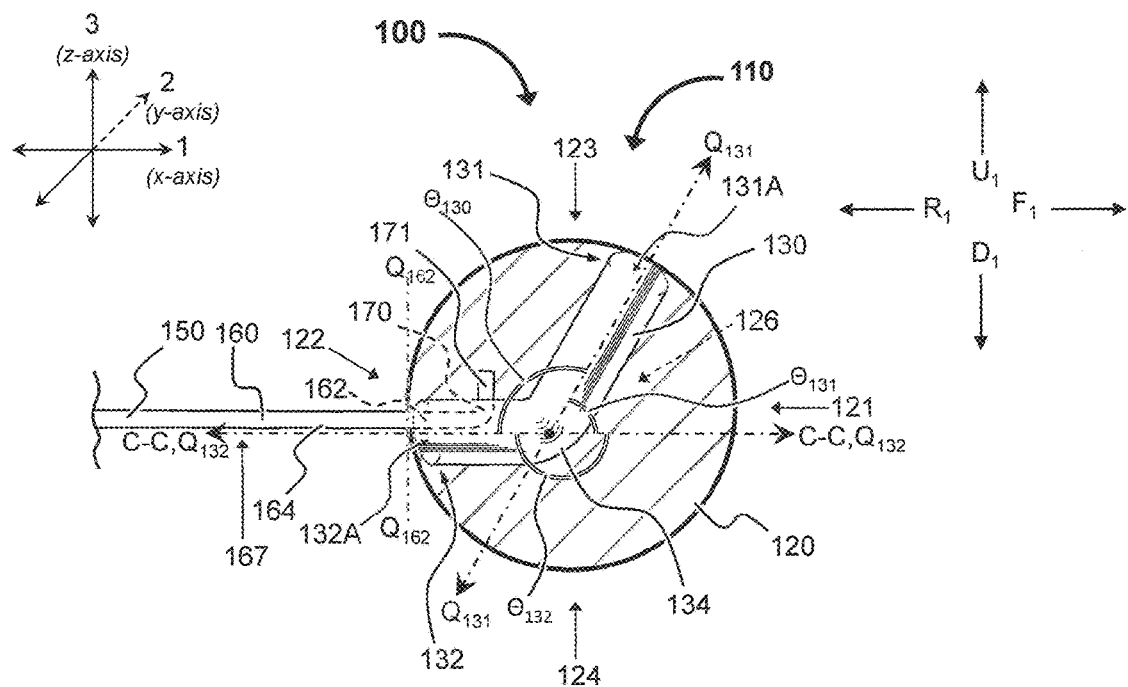
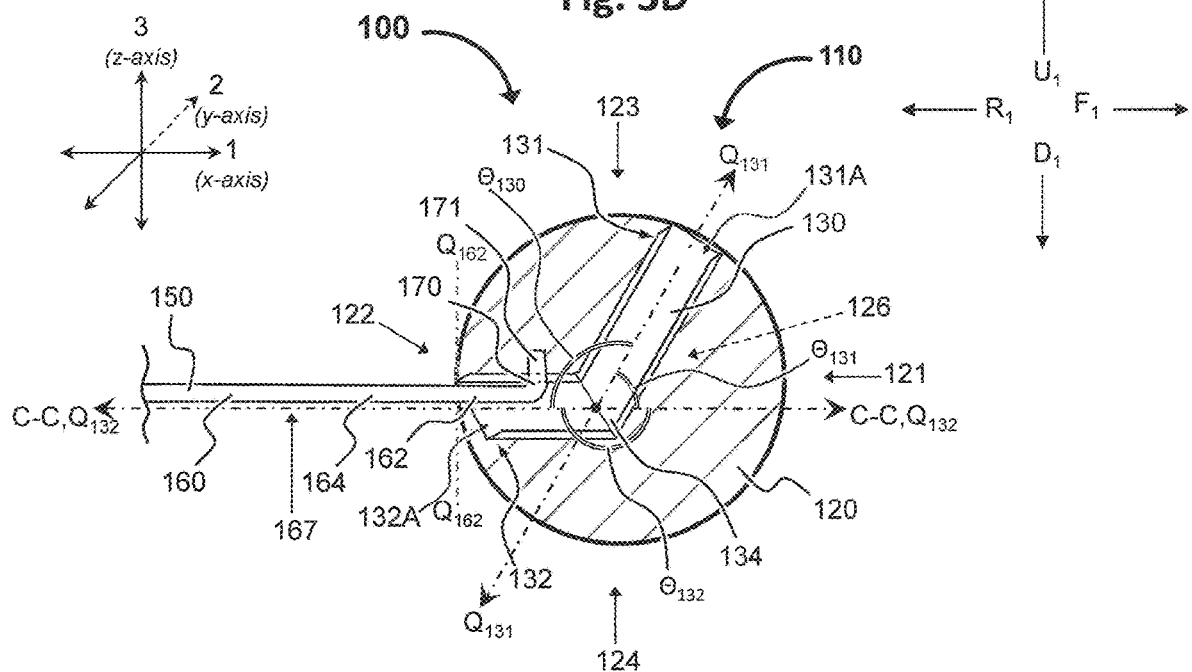

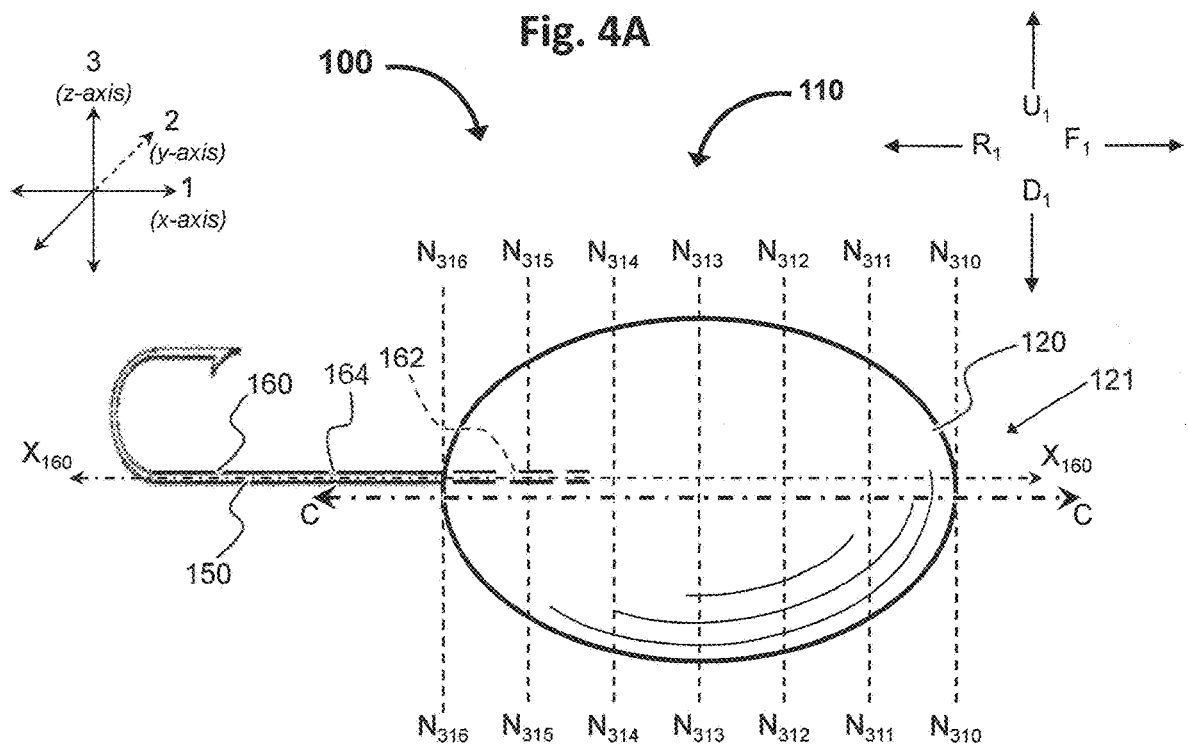
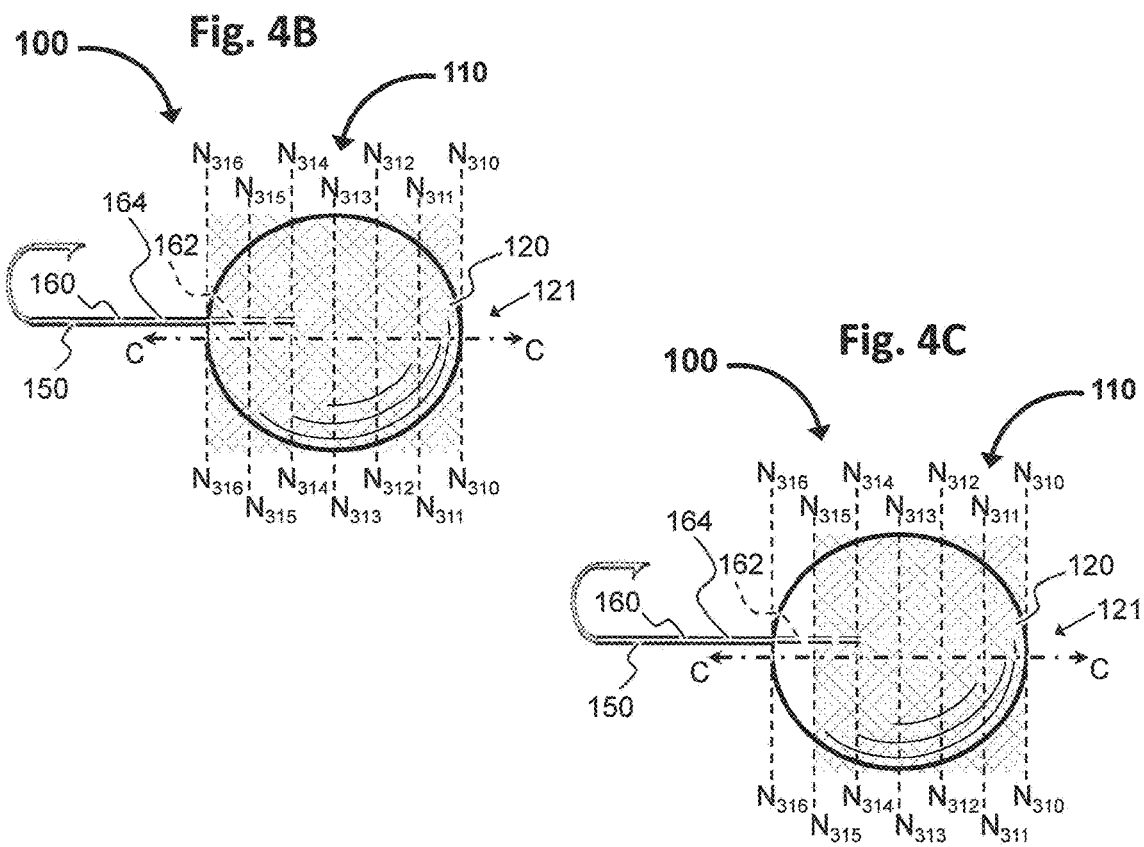

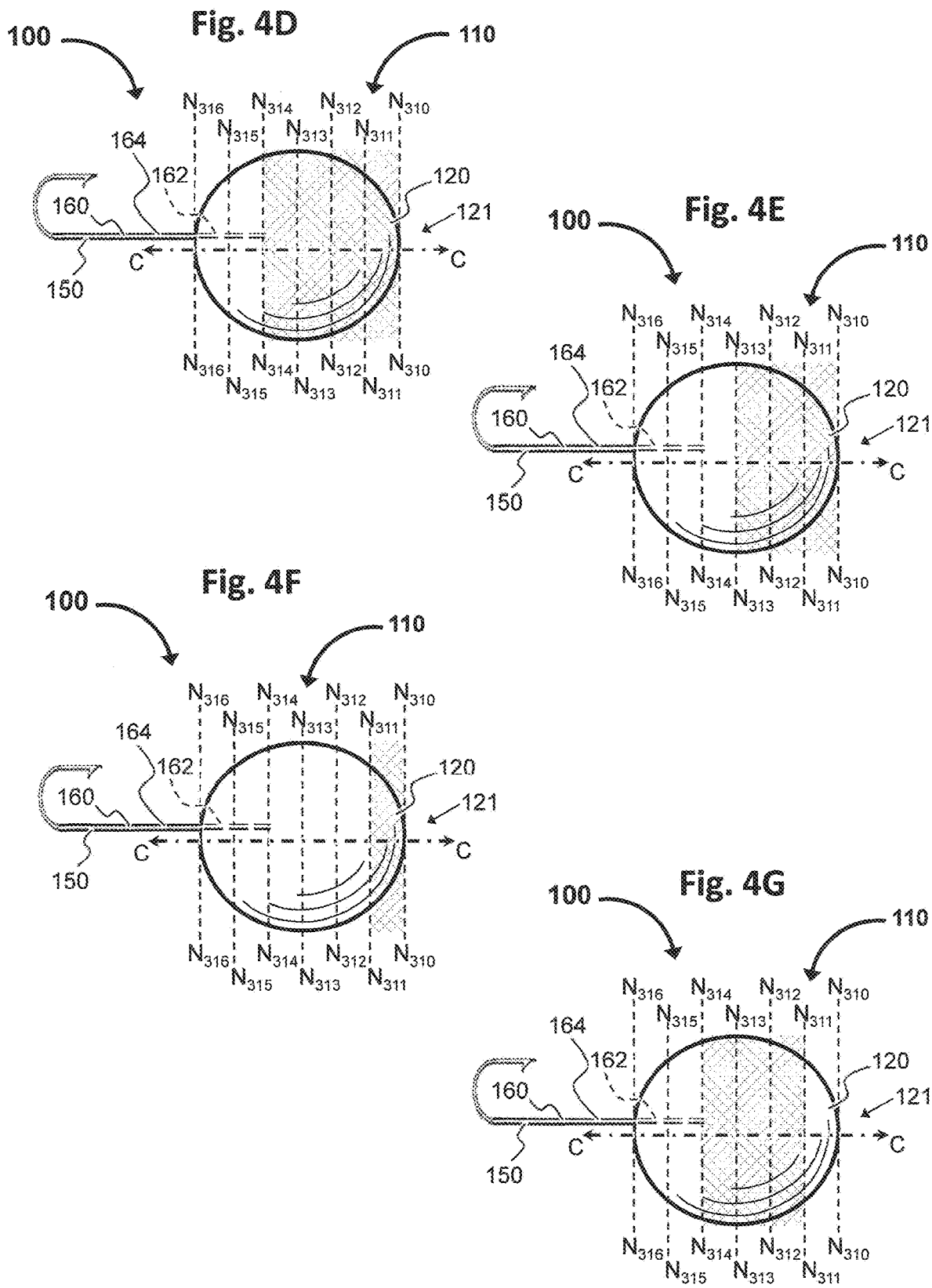

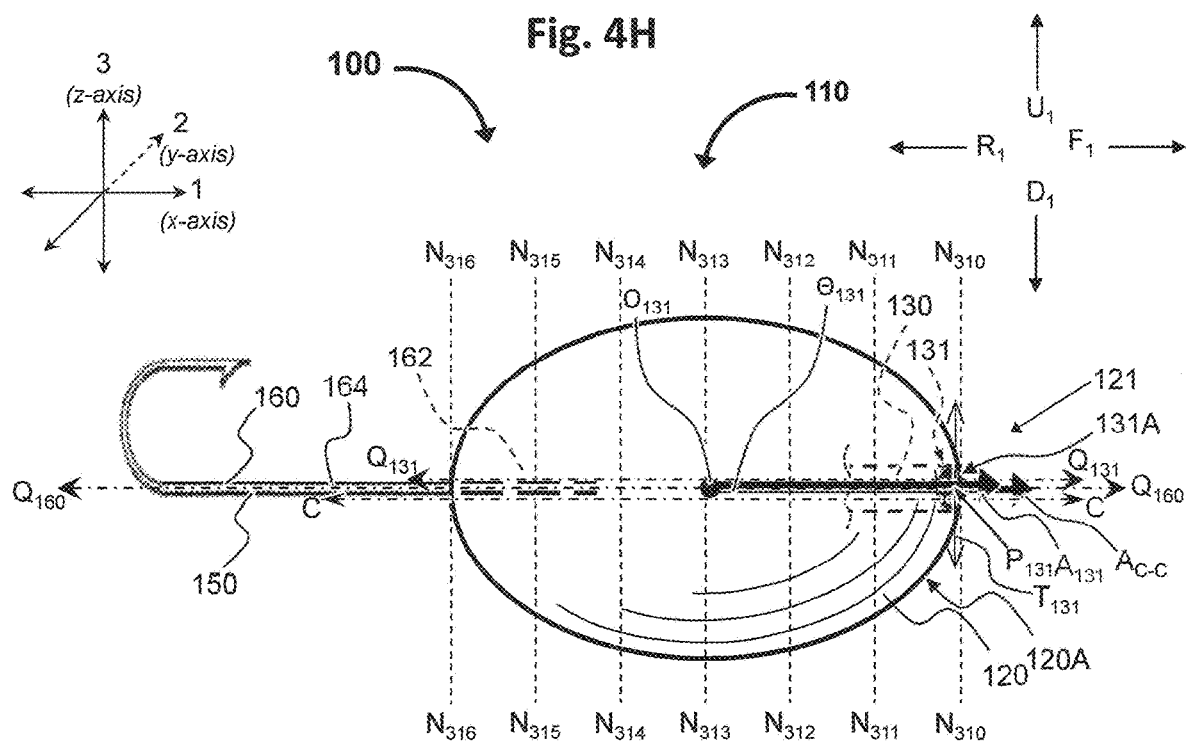
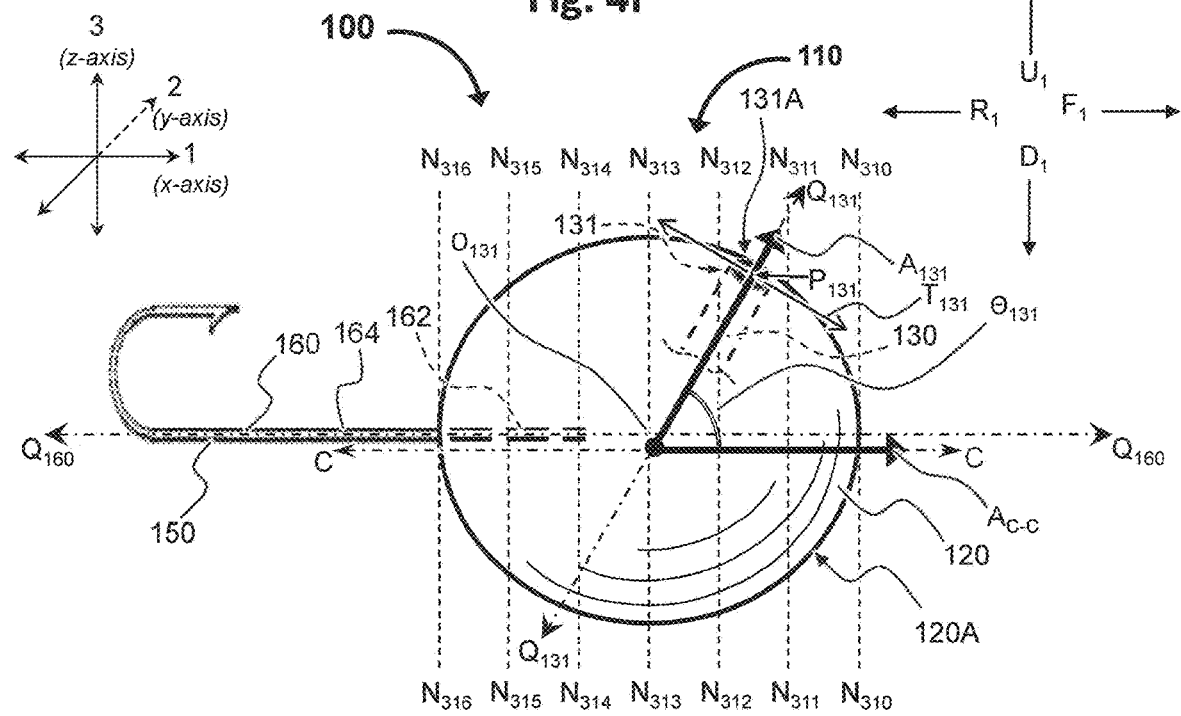

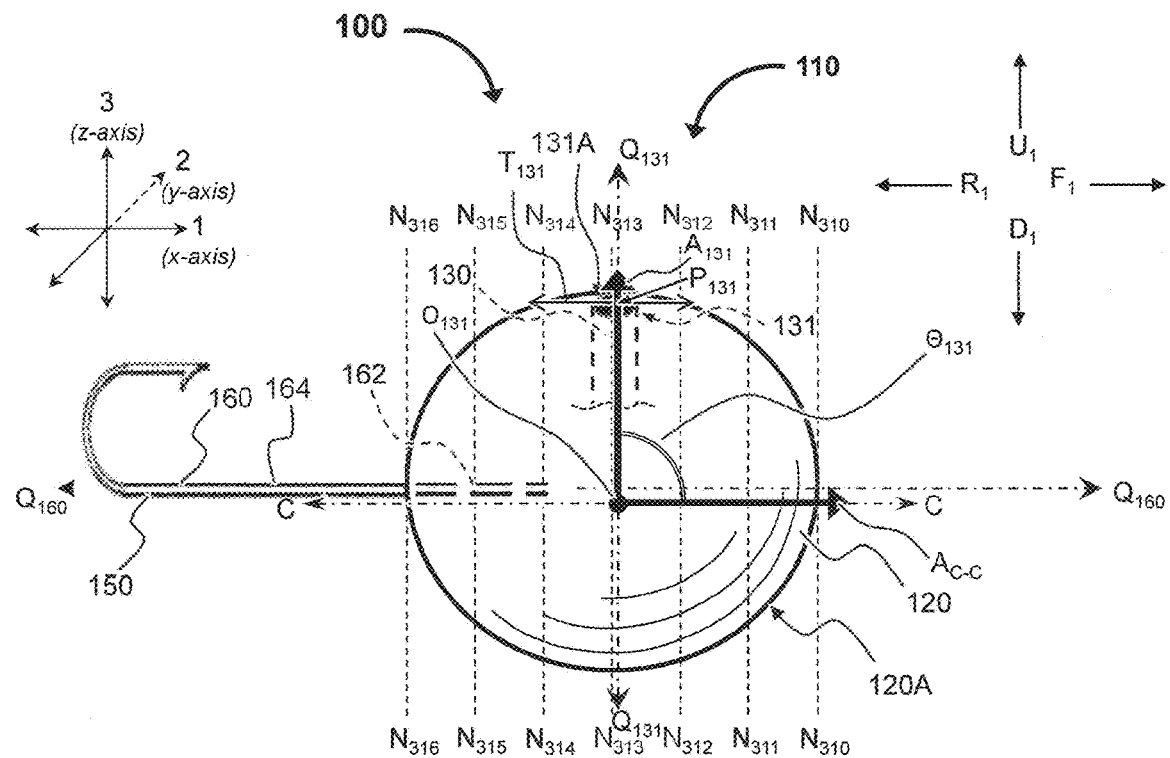
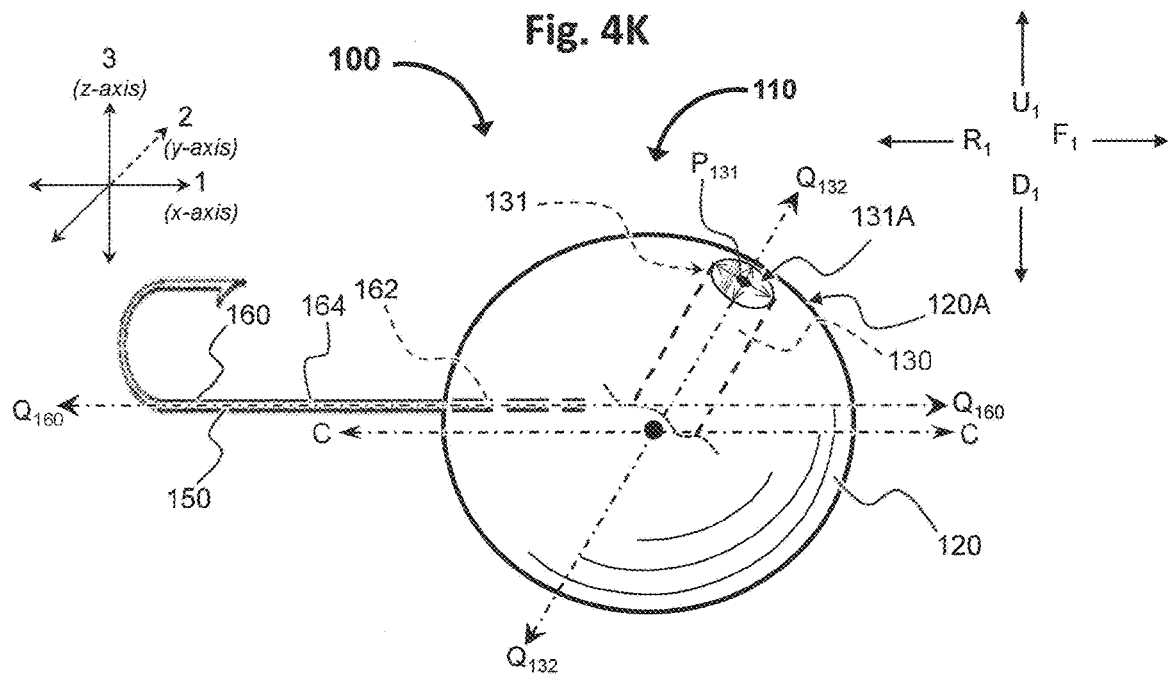

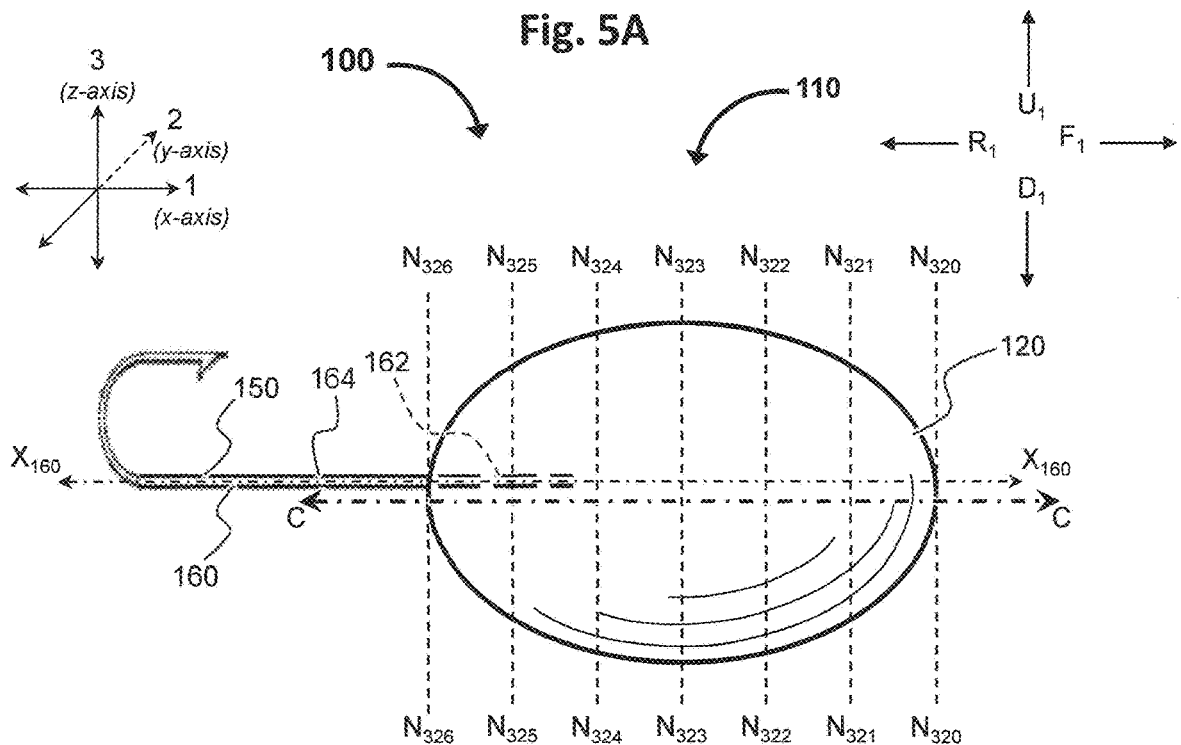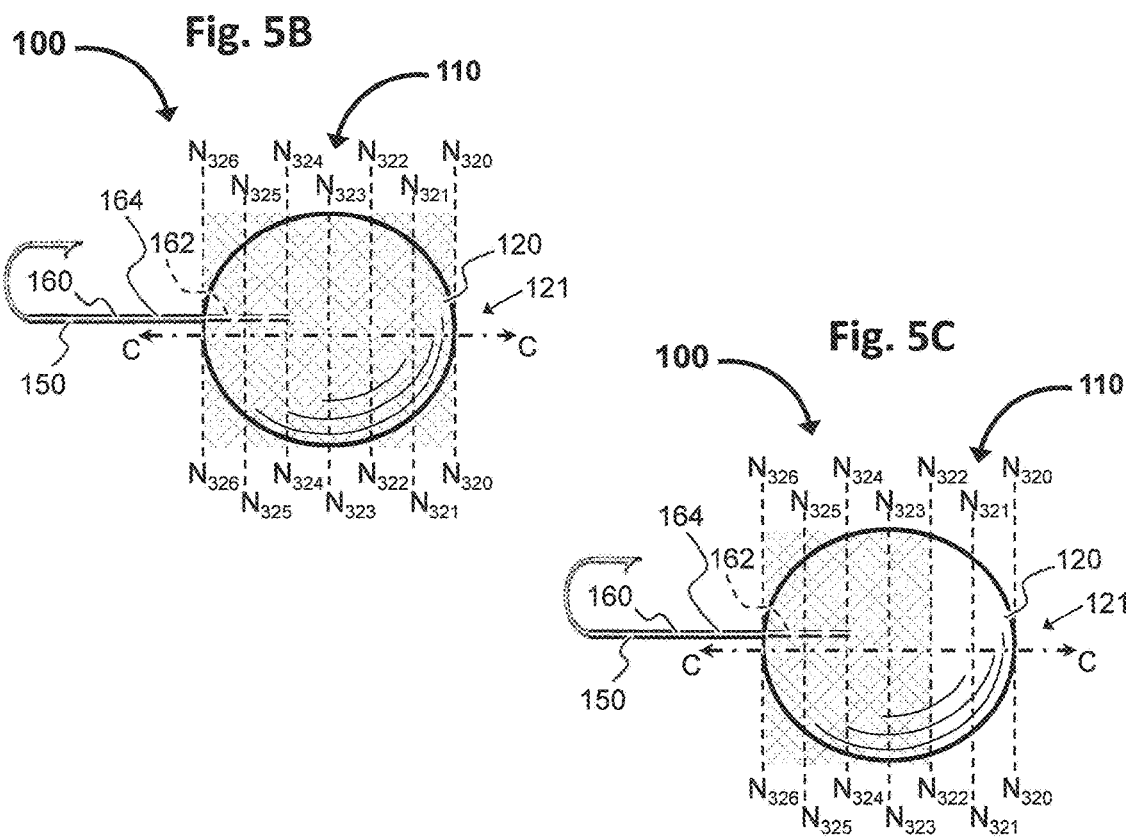

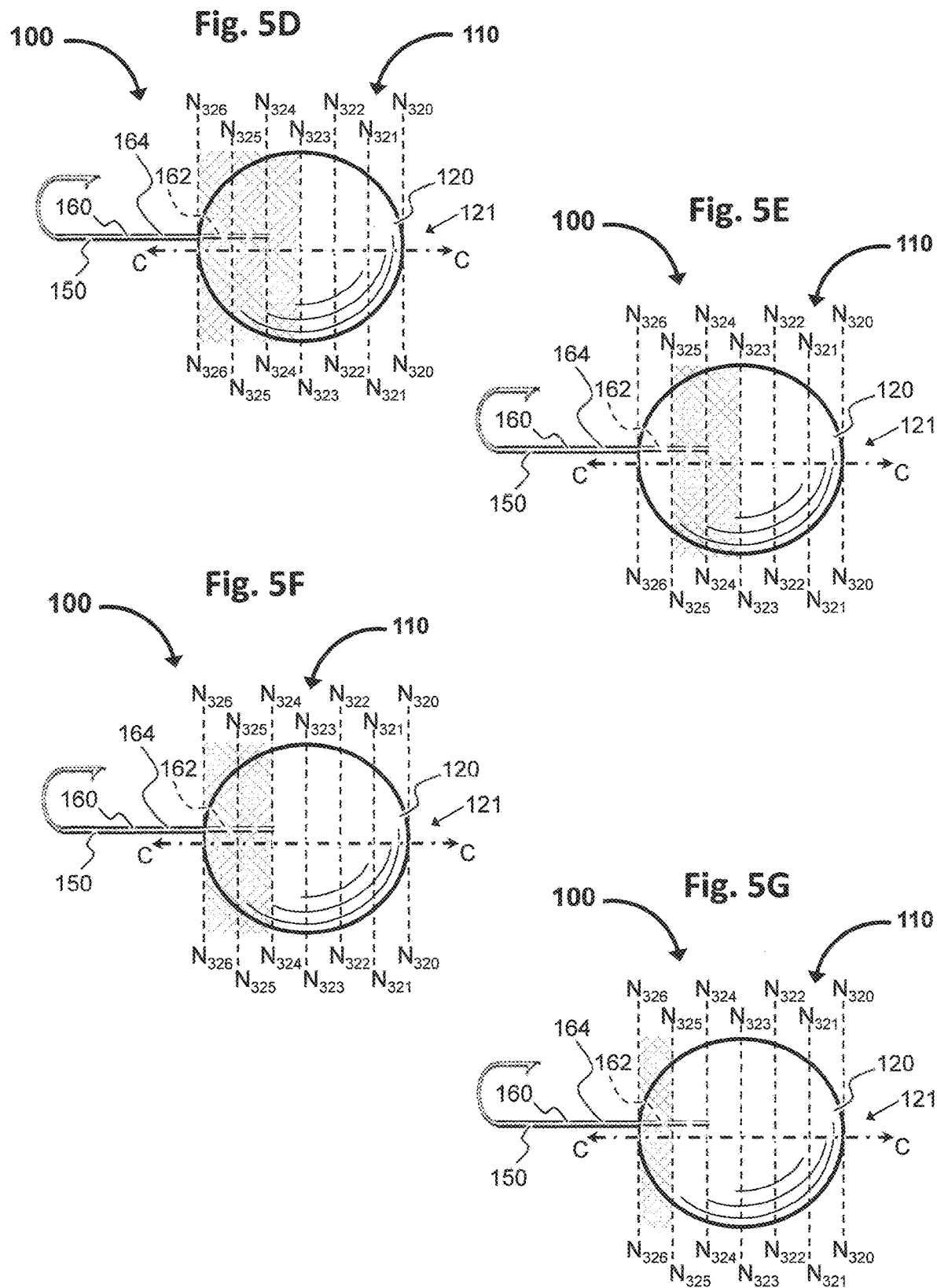

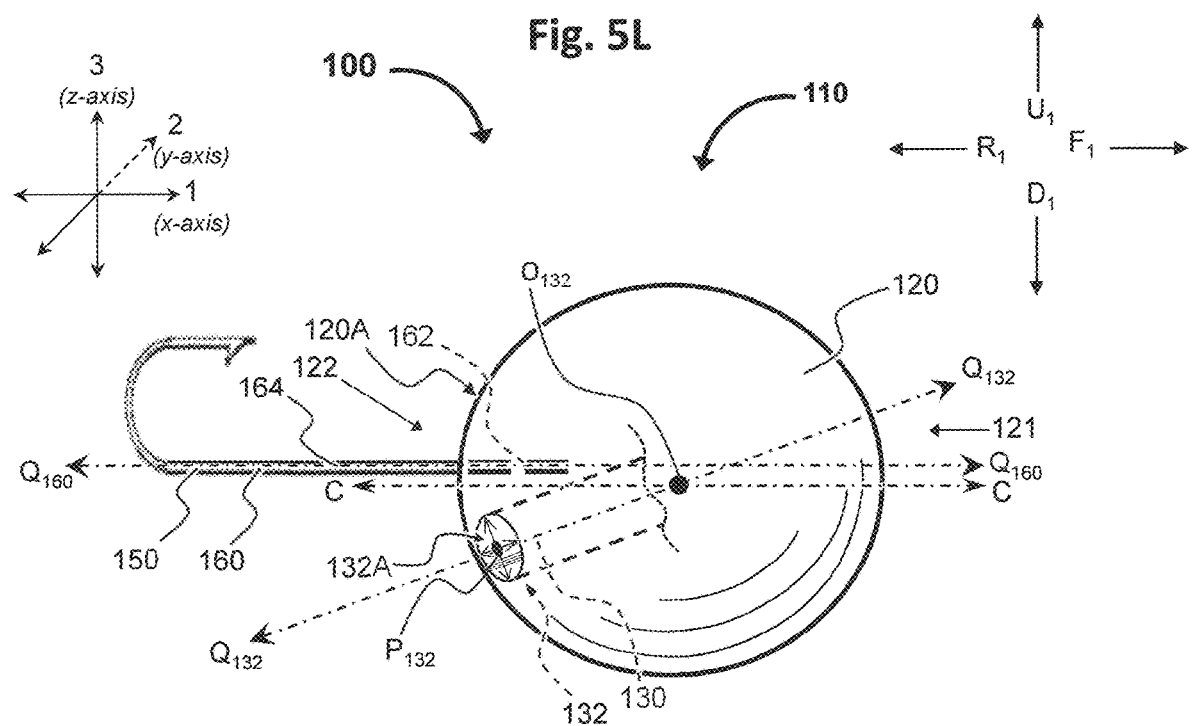

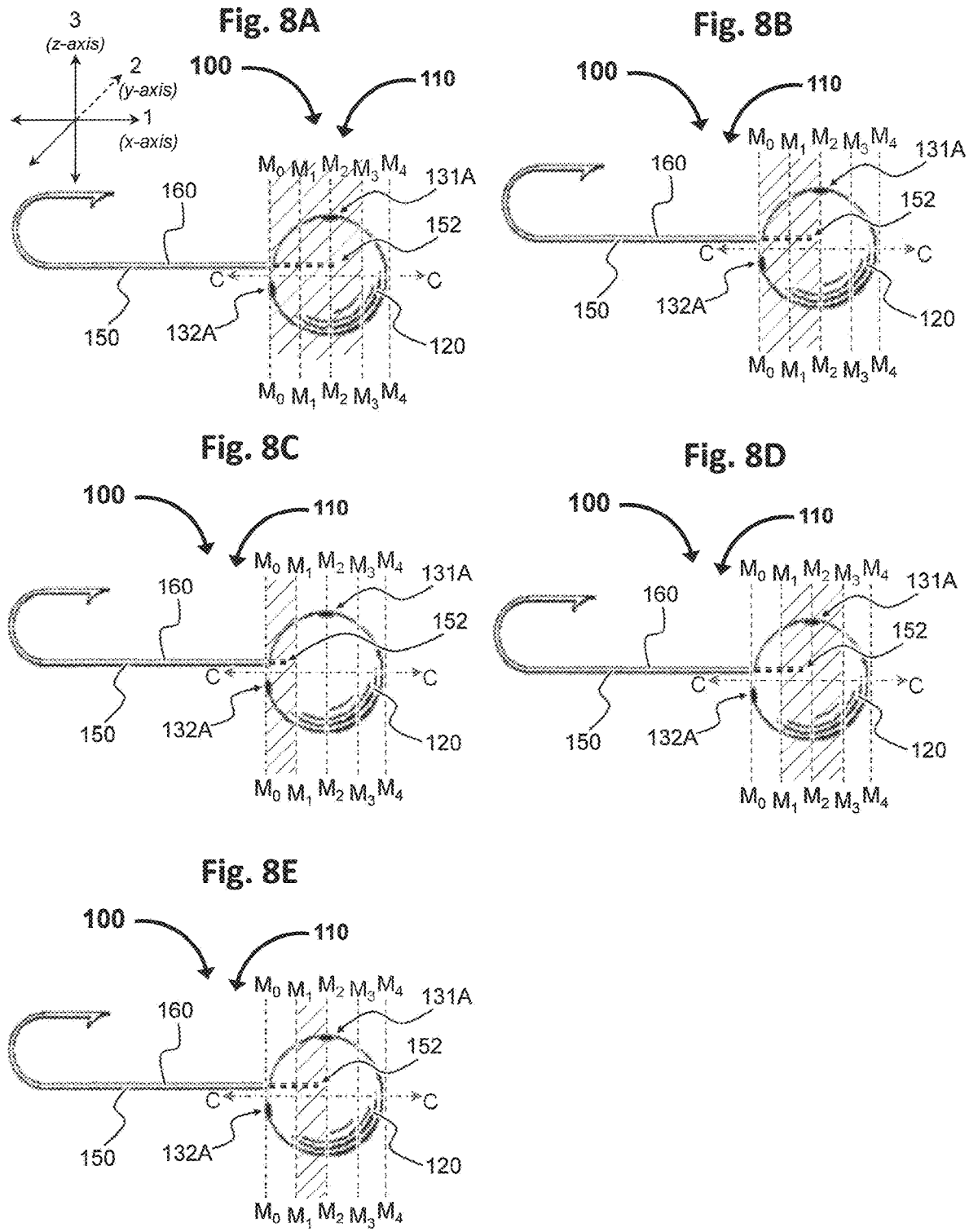

Fig. 9C
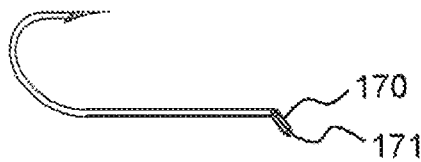
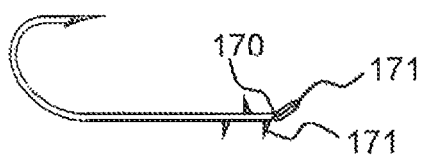
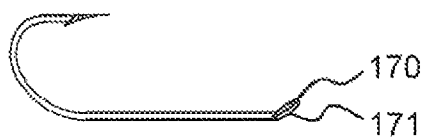
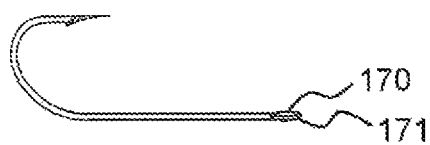
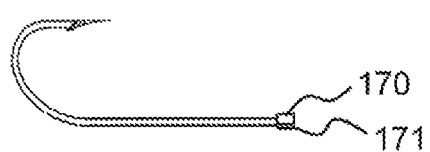

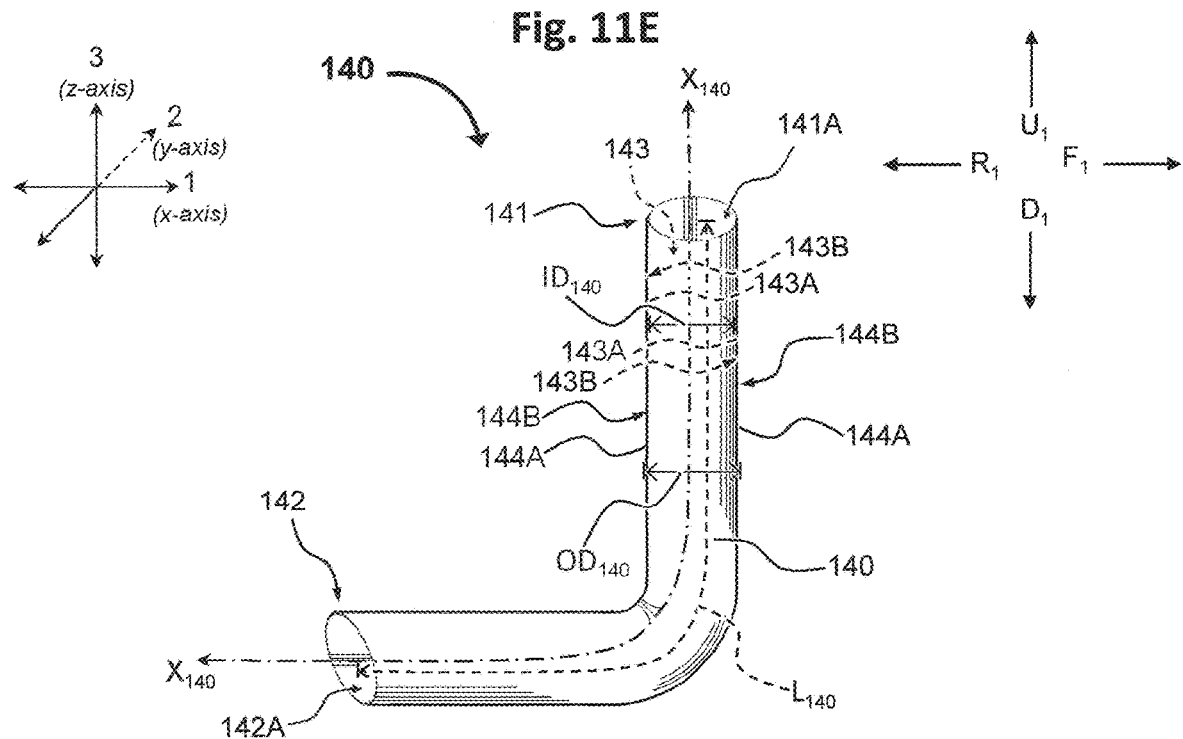
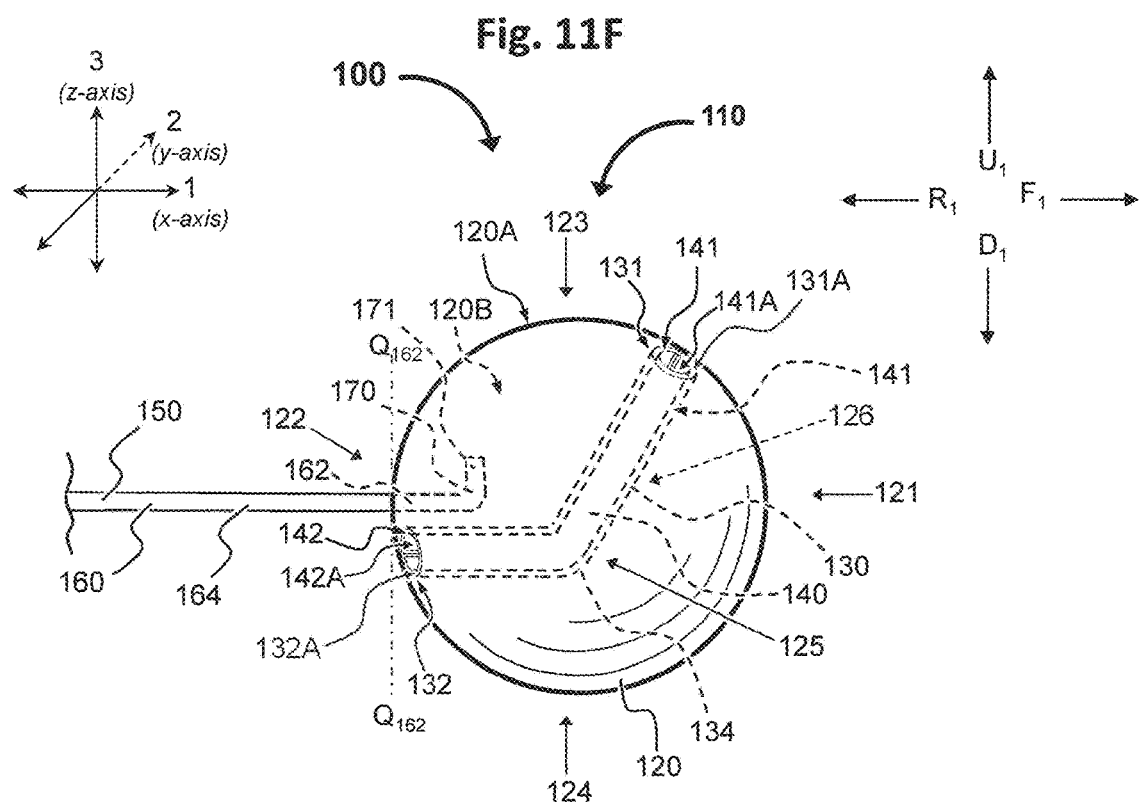

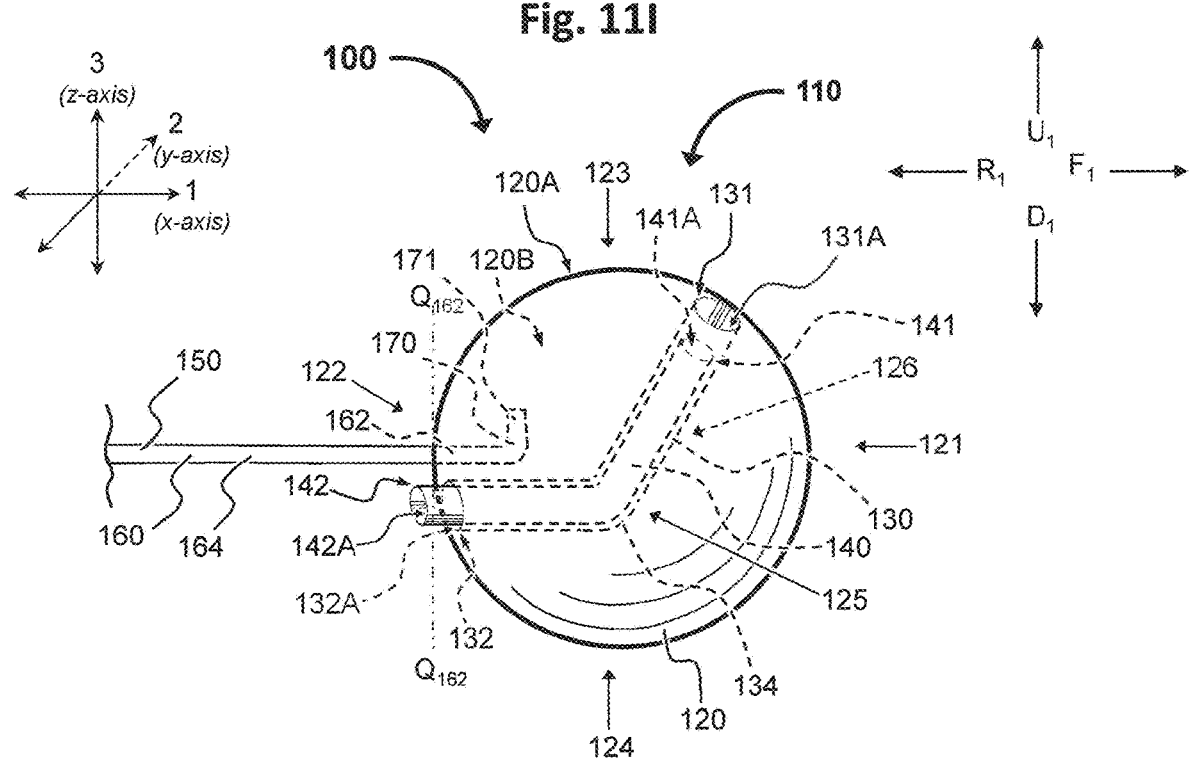

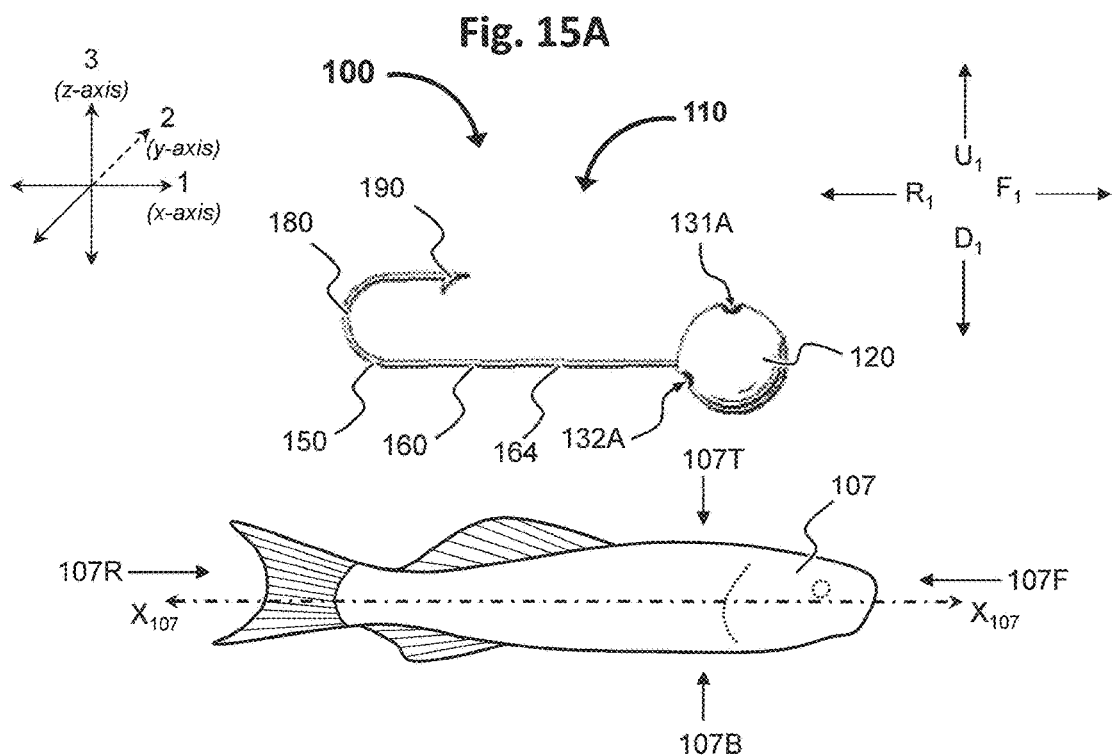
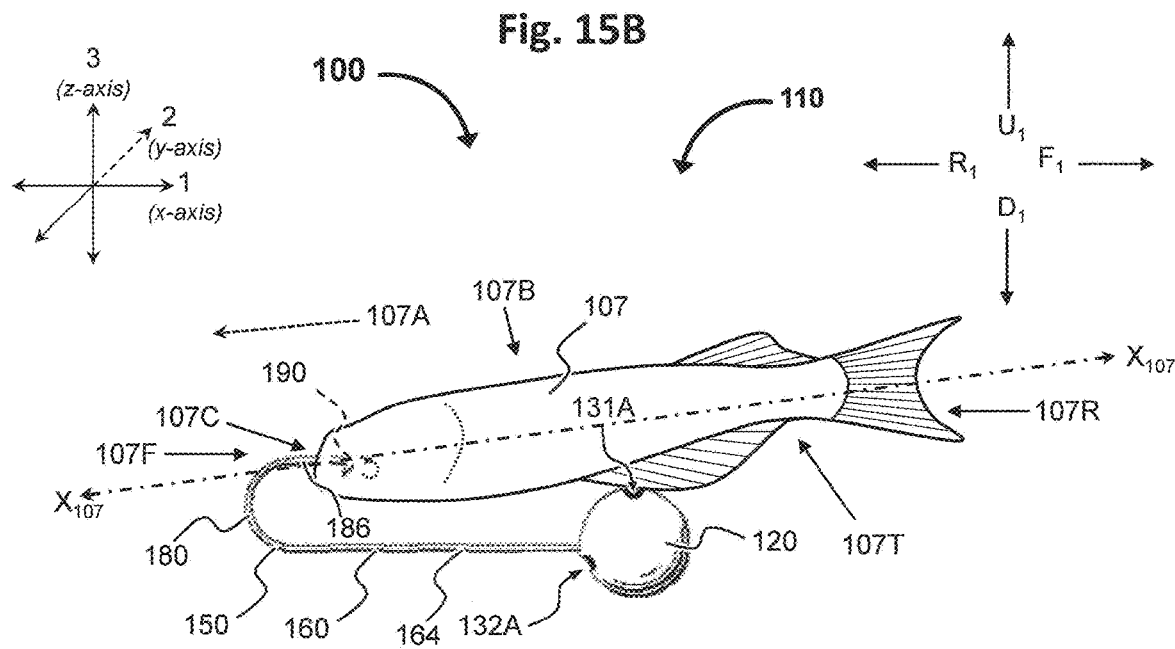

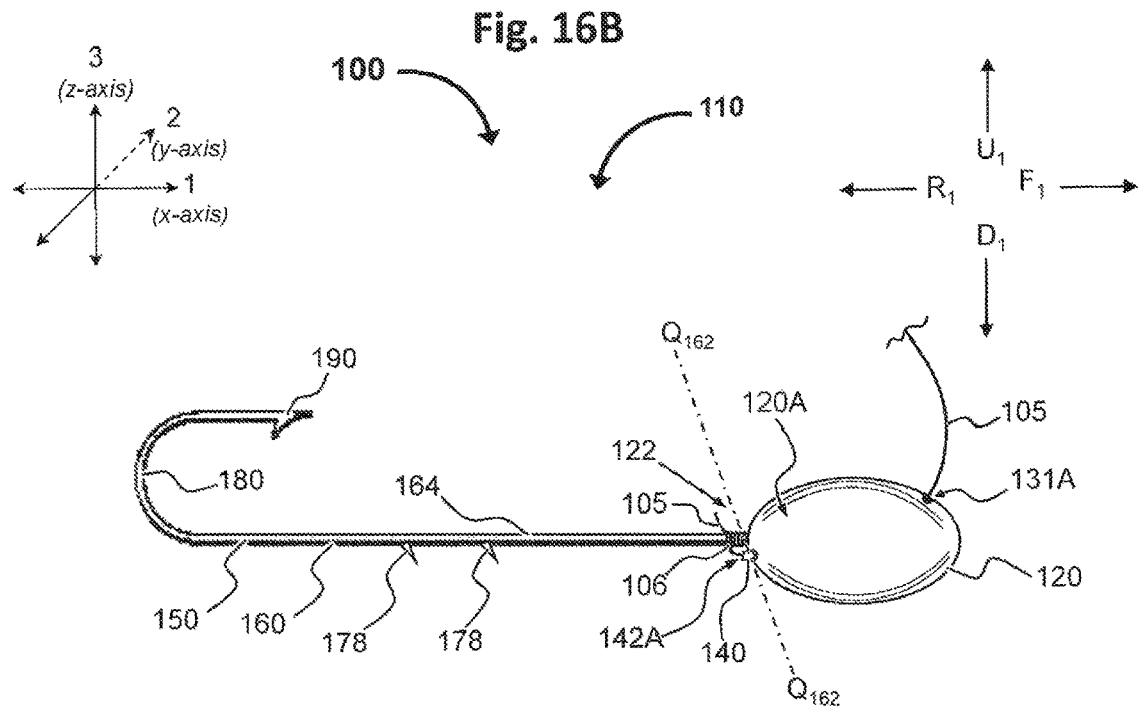
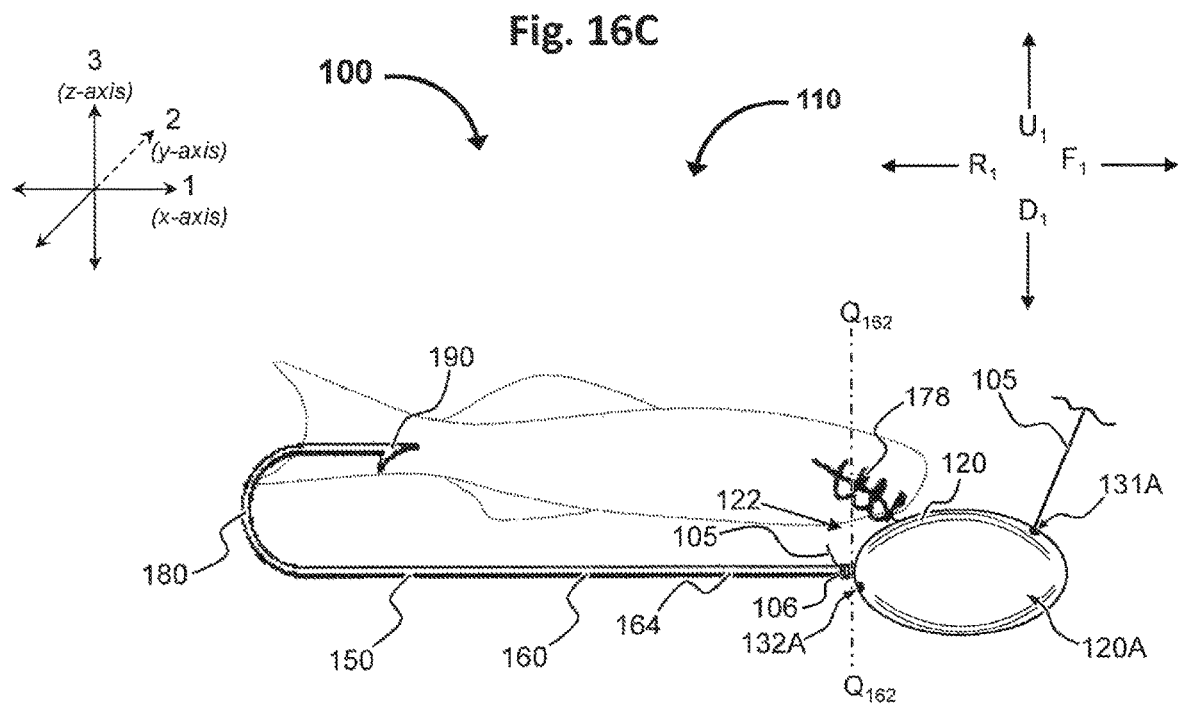

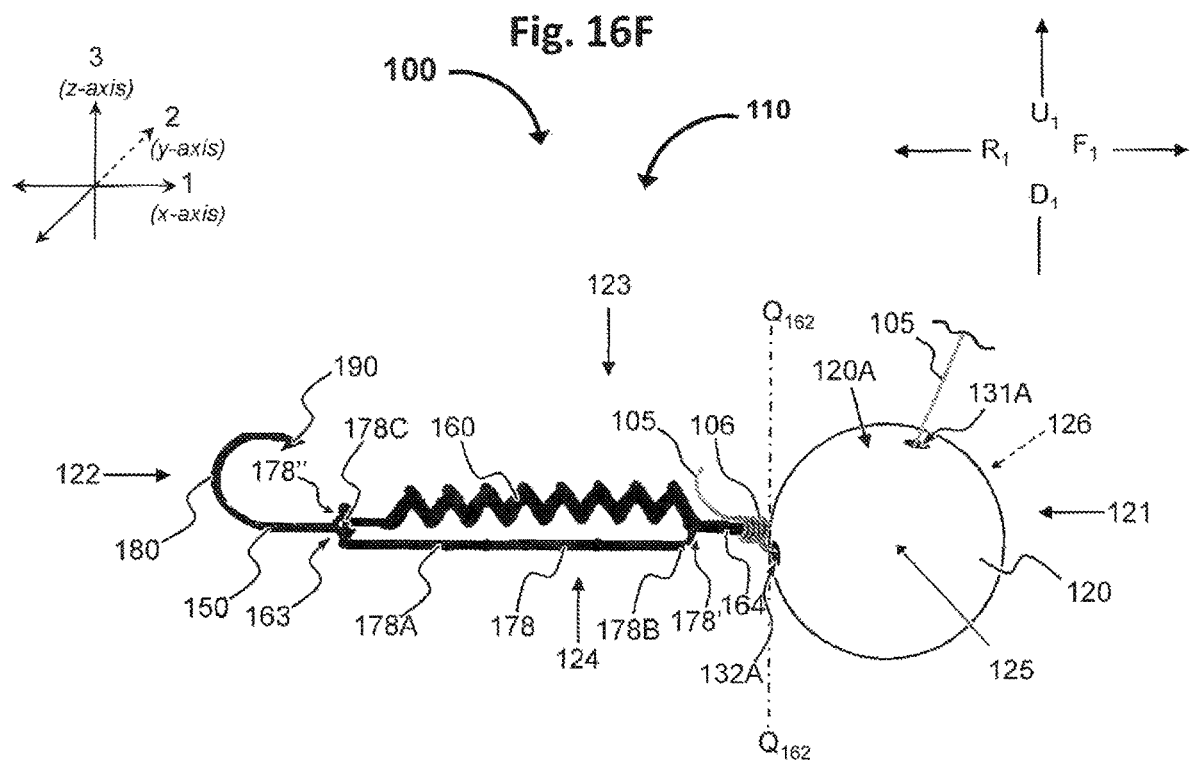
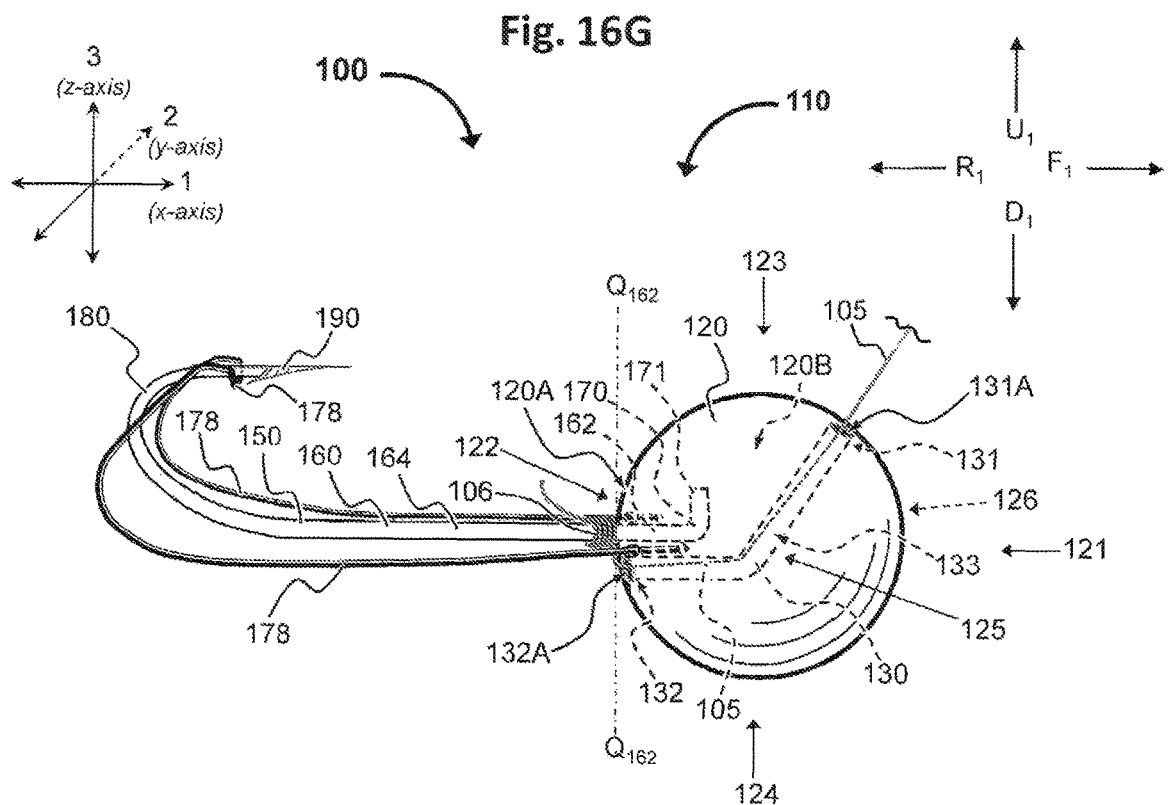

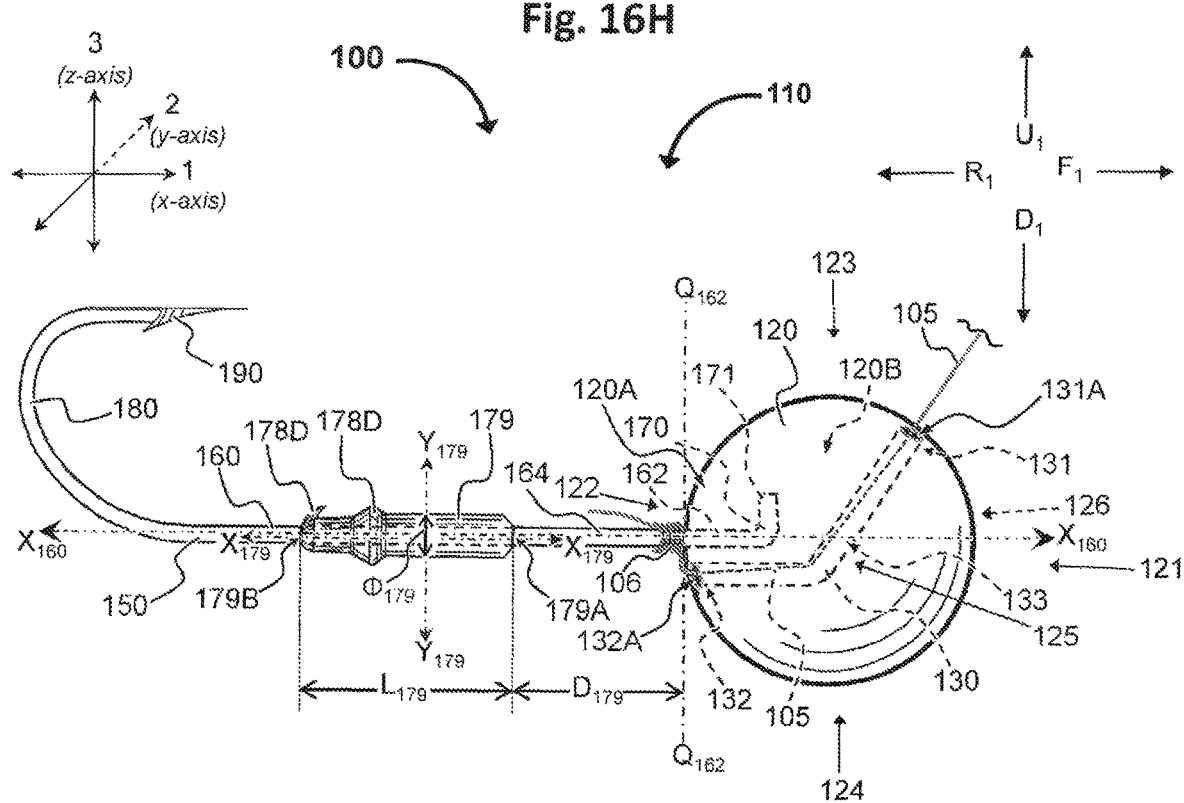
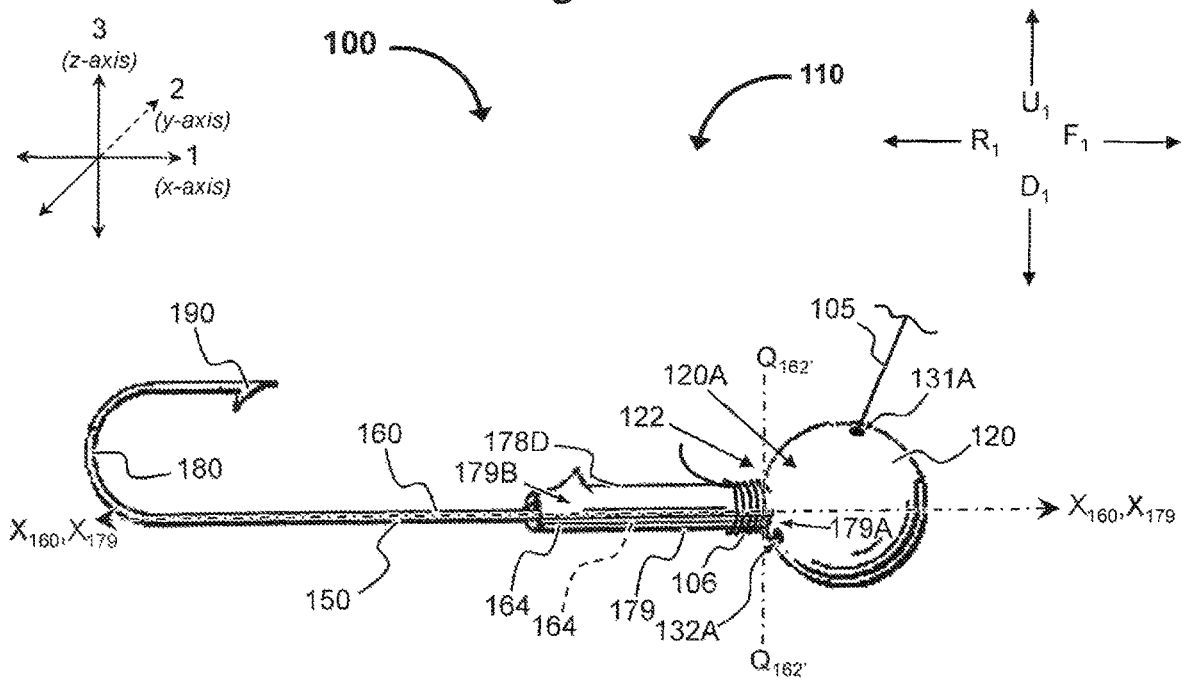

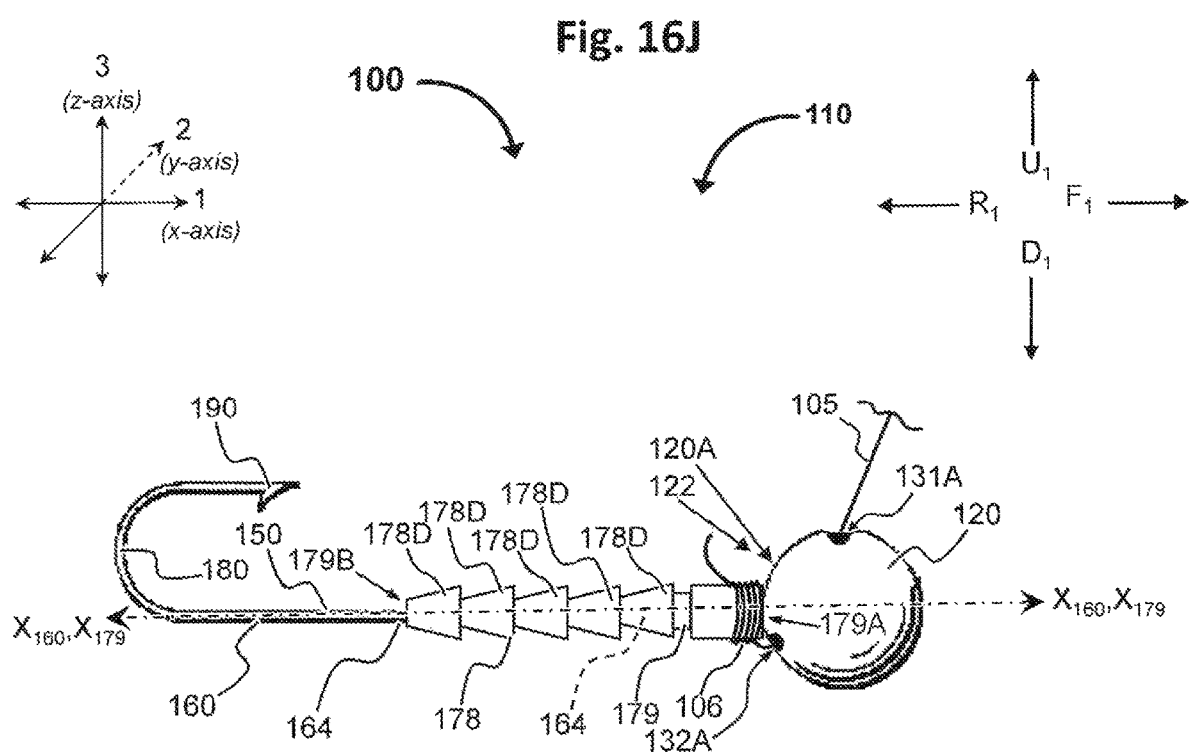

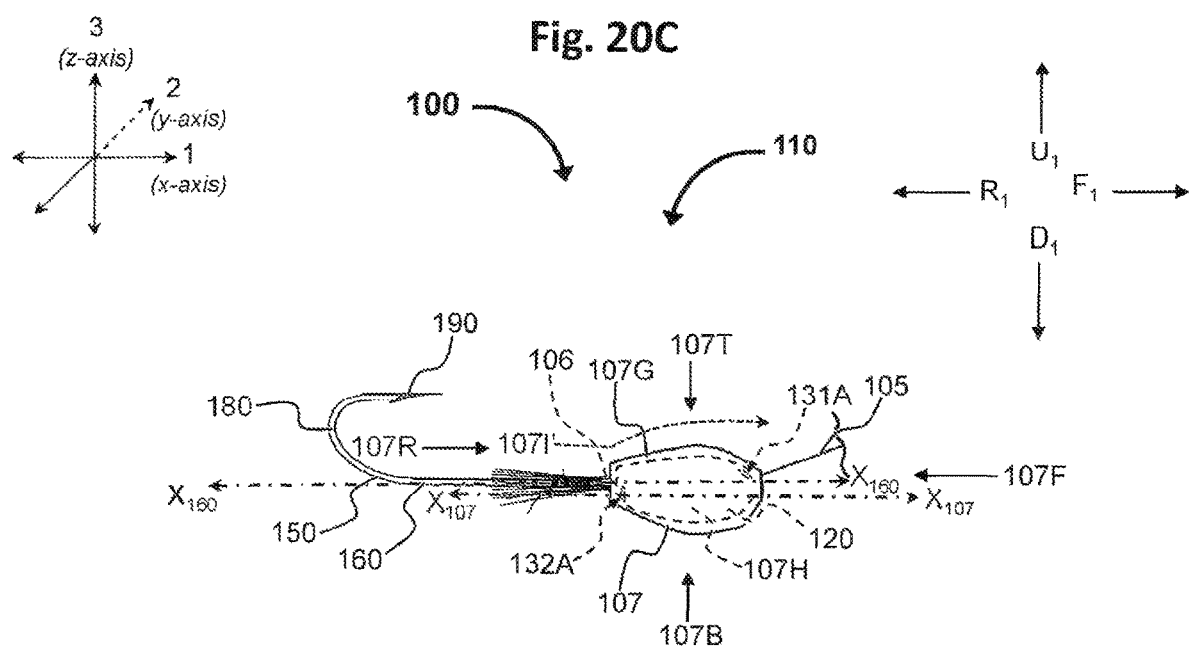

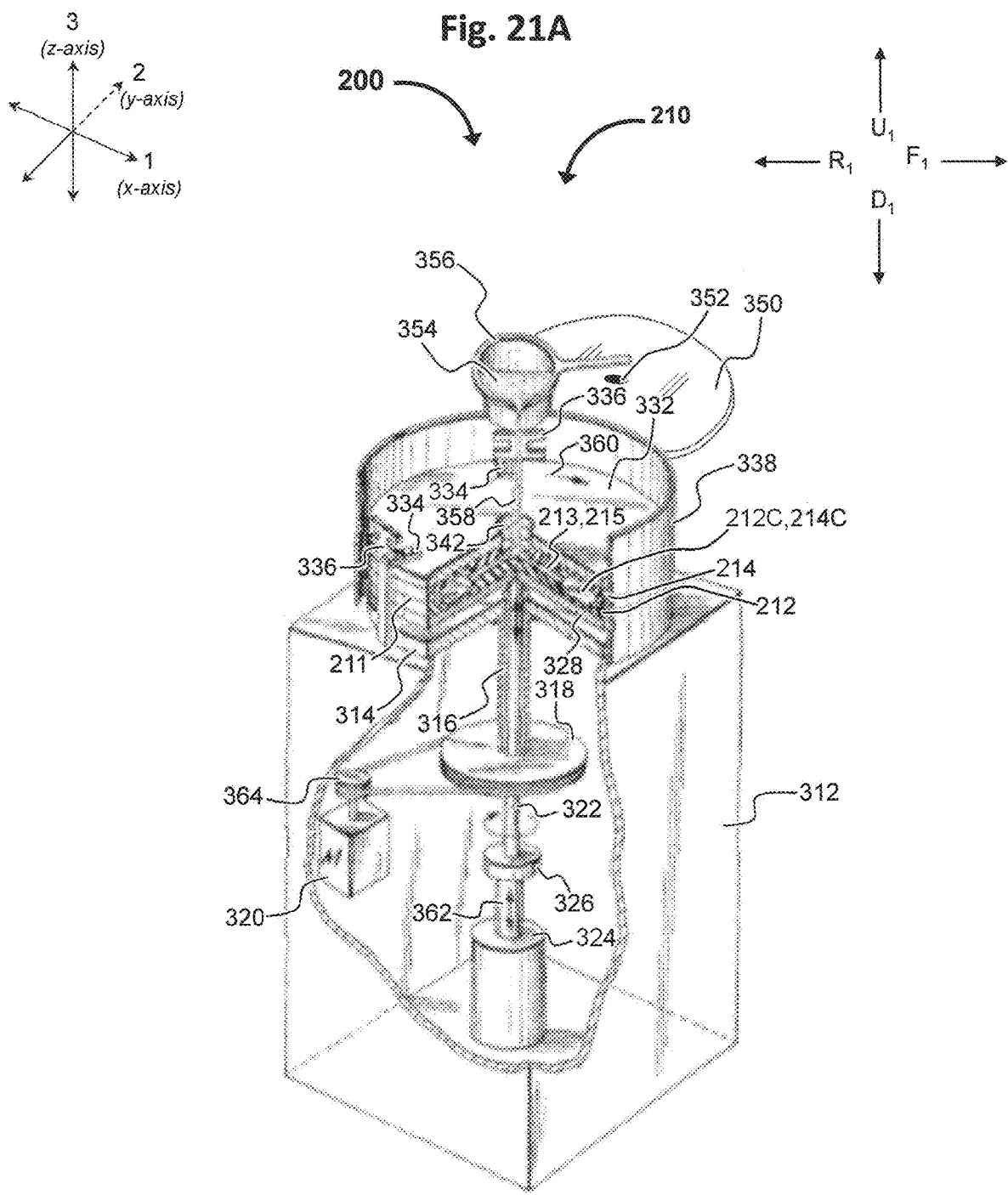

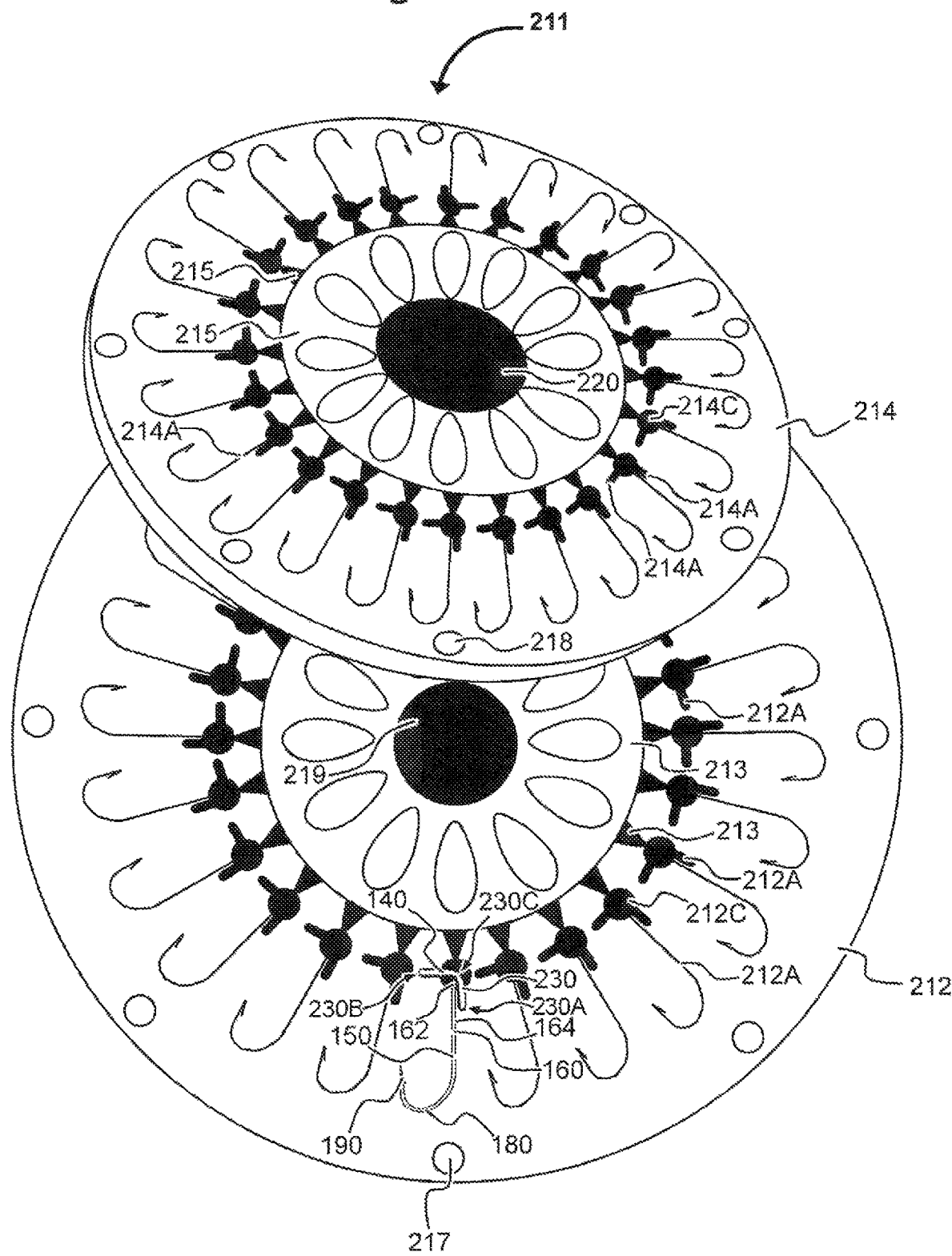

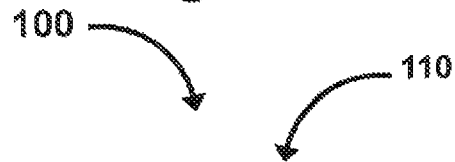
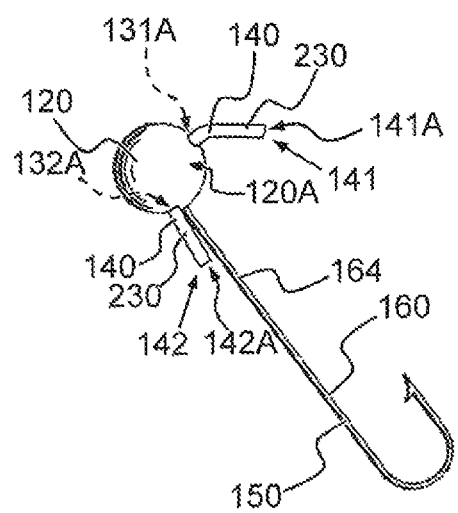
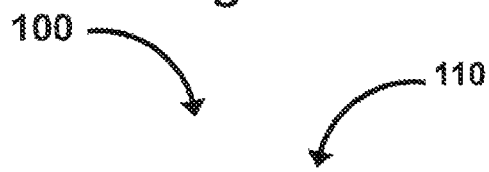
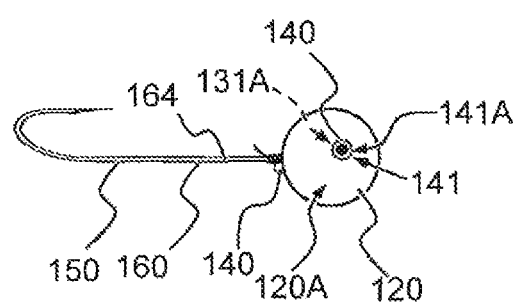

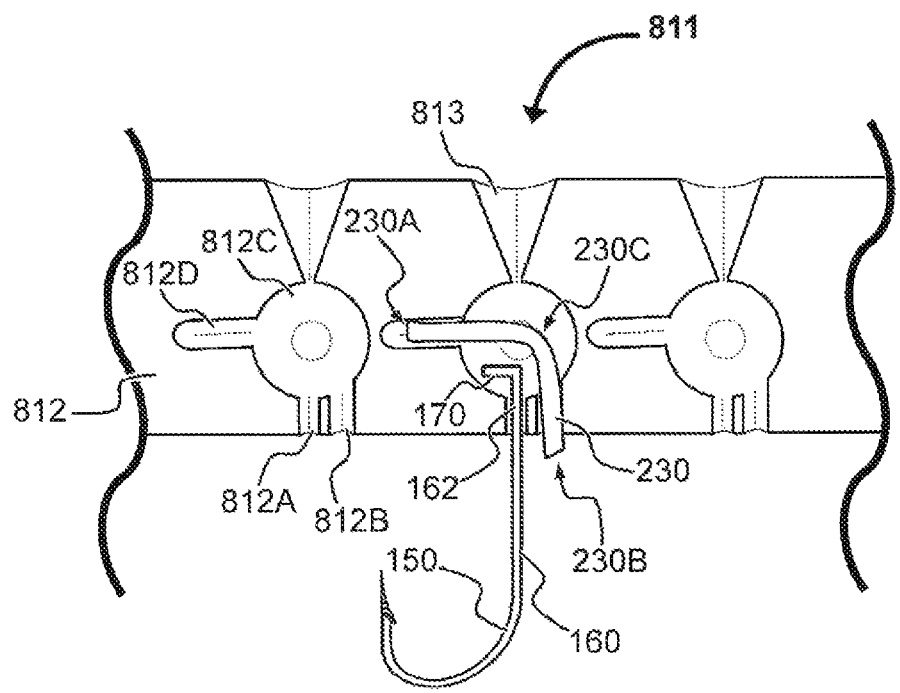
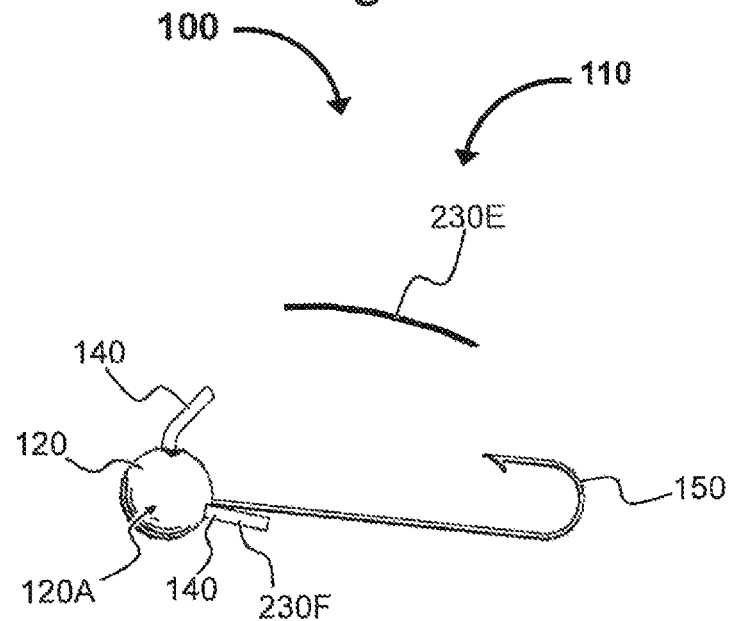

FISHING LURE DEVICE AND METHODS THEREOF

CROSS-REFERENCE TO RELATED APPLICATION

This application claims the benefit of U.S. Provisional Application No. 62/664,258 filed Apr. 29, 2018, and incorporates by reference herein the provisional application in its entirety.

FIELD OF INVENTION

The present disclosure relates generally to the field of equipment utilized for fishing. More particularly, the present disclosure relates to an improved fishing device and methods thereof.

BACKGROUND

A wide variety of fishing lures are presently available in the market. The concept of use generally involves a hook which can be baited with live bait (or parts thereof) and/or artificial bait, and which is furthermore tied to a thin, flexible fishing line that typically extends from a control device (e.g., a fishing pole) operated by a user who utilizes various fishing techniques (e.g., casting, movements, retrieval, etc.) to maneuver the lure. A lure's effectiveness for catching fish is an important factor when selecting the type of lure to be used. Thus, it is desirable for a lure to have a high degree of effectiveness for its intended purpose (e.g., catching fish).

One particular style of fishing involves fishing lure devices characterized in a class-type referred to as "jigs." In general, conventional jigs are fishing lure devices having a primary shaft structure with a body formed at one end of the shaft and a hook arranged at the opposing end of the shaft. More particularly, conventional jigs include a hooking component disposed within a body component. The body component has a bulbous, typically spherical-shaped, structure that is often weighted. Extending from a first location on the body component is a J-shaped hook portion of the hooking component having a shaft portion on one end, and a barbed element on its distal end intended for piercing the flesh of a fish to thereby secure it. In addition, a portion of the shaft is typically encased by a collar component, typically having a raised projection element for securing a bait. Extending from a second location on the body component is a closed-loop eyelet extending orthogonally with respect to the shaft to which one end of a fishing line can be tied via a knot. Finally, the opposing distal end of the fishing line is connected to a control device, typically a fishing pole, which allows a user to cast, move and retrieve the fishing line, thus imparting various motions to conventional jigs during use. The desired intent is that when a fish strikes (i.e., attacks, bites, swallows, etc.) a conventional jig, the user can set the hook within the flesh of a fish and then reel it in, thereby catching the fish.

In general, jigs are often considered to be a relatively versatile fishing lure, as they casted horizontally, trolled in mid-depth waters, or dropped vertically into deep waters, thus allowing for usage at various depths ranging from the very bottom of a water body to floating on top of the water body. In addition, jigs are available in a variety of weights, sizes and colors, and can accommodate a variety of both live bait and artificial bait, thus making jigs suitable for catching multiple species of fish.

Unfortunately, although jigs offer several advantages over other types of lures, and are often regarded as marginally effective fishing tackle for many types of fish, the structure and operation of conventional jigs also have various shortcomings. For example, users often fish among submerged objects (e.g., weeds, brush, wood, rocks, etc.) because fish typically seek cover and food in such environments. However, due to the protruding eyelet, as well as the resulting motion characteristics, conventional jigs are susceptible to damage and loss from scraping or snagging on such submerged objects, which reduces their effectiveness for catching fish. For example, the eyelet of conventional jigs often catches on a submerged object or causes a snag, which can result in damage to the lure. Furthermore, the protruding eyelet of conventional jigs exposes the fishing line, particularly at the knot location disposed upon the eyelet, resulting in weakening and/or breakage of the fishing line (i.e., from abrasion or other such damage), which likewise reduces their effectiveness for catching fish.

Thus, there is a need for a fishing lure device and methods thereof that have an improved effectiveness for catching fish, as compared to conventional jigs under the same or similar conditions. There is also a need for an improved fishing lure device and methods thereof that eliminates the eyelet component of conventional jigs. There is also a need for an improved fishing lure device and methods thereof that can reduce the susceptibility of fishing lures to damage during use, as compared to conventional jigs under the same or similar conditions. There is also a need for an improved fishing lure device and methods thereof that can reduce the loss of fishing lures during use, as compared to conventional jigs under the same or similar conditions. There is also a need for an improved fishing lure device and methods thereof that can reduce exposure of the fishing line, as compared to conventional jigs under the same or similar conditions. There is also a need for an improved fishing lure device and methods thereof that can reduce the susceptibility of fishing lines to abrasion or other such damage during use, as compared to conventional jigs under the same or similar conditions. There is also a need for an improved fishing lure device and methods thereof that can reduce the incidence of fishing line breakage during use, as compared to standard jigs under the same or similar conditions. There is a further need for an improved fishing lure device and methods thereof that can improve strength properties of fishing line during use, as compared to standard jigs under the same or similar conditions. There is also a need for an improved fishing lure device and methods thereof that can improve the protection of fishing line during use, as compared to conventional jigs under the same or similar conditions.

According to research conducted herein, it has been discovered that conventional jigs also have additional problems. The findings include, but are not limited to, undesirable interactions between the protruding eyelet of conventional jigs and the fishing line; a susceptibility of conventional jigs to line twist; movement of the knot along the perimeter of the eyelet of conventional jigs; the fishing line knot being located above the center of gravity of conventional jigs; failure of conventional jigs to suitably mimic the movements of feeder fish or other aquatic food sources for fish; other restricted movements of conventional jigs; limitations on the degree of wiggle of artificial baits attached to conventional jigs; inconsistent and unpredictable vertical presentation of conventional jigs; inconsistent and unpredictable horizontal presentation of conventional jigs; and the like.

Thus, there is a further need for an improved fishing lure device and methods thereof that can eliminate undesirable interactions between the protruding eyelet of conventional jigs and the fishing line during use. There is also a need for an improved fishing lure device and methods thereof that can reduce or eliminate the susceptibility to, and undesirable effects of, line twist during use, as compared to conventional jigs under the same or similar conditions. There is also a need for an improved fishing lure device and methods thereof that can eliminate the movement of the fishing line knot along the perimeter of the eyelet of conventional jigs, and the undesirable effects resulting therefrom. There is also a need for an improved fishing lure device and methods thereof that can improve the location of the fishing line knot closer to the center of gravity of the lures (such as nearer to the shaft portion of the hook component, for example), as compared to conventional jigs. There is also a need for an improved fishing lure device and methods thereof that can improve the mimicking of feeder fish or other aquatic food sources during use, as compared to conventional jigs under the same or similar conditions. There is also a need for an improved fishing lure device and methods thereof that can overcome the limitations of conventional jigs with respect to the degree of movement intended for attracting fish during use. There is also a need for an improved fishing lure device and methods thereof that can improve the consistency and predictability of vertical presentation, as compared to conventional jigs under the same or similar conditions. There is also a need for an improved fishing lure device and methods thereof that can improve the consistency and/or predictability of horizontal presentation, as compared to conventional jigs under the same or similar conditions.

SUMMARY

In response to the needs discussed above, presented herein is an inventive fishing lure device and methods thereof that meet at least one or more of such needs.

One object of the invention includes devices and methods for attracting a greater number of fish to a fishing lure, as compared to conventional devices and methods under the same or similar conditions. Another object of the invention includes devices and methods for triggering a greater number fish strikes upon a fishing lure, as compared to conventional devices and methods under the same or similar conditions. Another object of the invention includes devices and methods for catching a greater number of fish, as compared to conventional devices and methods under the same or similar conditions. Another object of the invention includes providing inventive fishing lure devices and methods thereof having a unique feature and/or advantage, as compared to conventional fishing lures under the same or similar conditions. Another object of the invention includes methods for making the inventive fishing lure devices of the present disclosure.

In some aspects, an inventive fishing lure comprises a hook component and a through-line element, where the hook component comprises a first end and a second end, where the hook component further comprises a barbed element disposed at the second end, where the through-line element comprises a tubular structure having a first end, a second end distal to the first end, a length defined by the first end and the second end, an interior wall surface, an interior volume, a first opening disposed at the first end, and a second opening disposed at the second end; and where the second opening of the through-line element is disposed proximate to the first end of the hook component, such as less than 5 mm, or less than 3 mm, or less than 2 mm, or less than 1 mm from the first end of the hook component. In further aspects, the inventive fishing lure comprises a body component, where the first end of the hook component is integral with the body component and the hook component extends outwardly therefrom. In still further aspects, the through-line element is disposed within the body component and extends therethrough. In other aspects, the inventive fishing lure comprises a protective member, where the protective member is at least partially disposed within the through-line element. In still other aspects, the inventive fishing lure comprises at least one selected from a collar component, a bait, a bait retention element, a snag guard member, an insertion element, a coating or an additional attachment. In yet other aspects, the fishing lure is selected from the group consisting of crank baits, spoons, spinning baits, casting plugs and jigs.

In some aspects, an inventive fishing jig comprises a body component and a hook component, where the hook component comprises a first end and a second end, where the first end of the hook component is disposed within the body component and the hook component extends outwardly therefrom, and where the body component comprises a through-line element disposed therethrough. In further aspects, the through-line element comprises a first end, a second end distal to the first end, a length defined by the first end and the second end, an interior wall surface, an interior volume, a first opening disposed at the first end, and a second opening disposed at the second end. In other aspects, the through-line element comprises a tubular structure having a first end, and a second end distal to the first end, where the second end is disposed proximate to the hook component, such as less than 5 mm, or less than 3 mm, or less than 2 mm, or less than 1 mm from the hook component. In further aspects, the body component comprises a front side, a rear side, and a horizontal central axis disposed therebetween, where the first end of the through-line element is disposed at an angle between about 0° and about 120° with respect to the horizontal central axis of the body component, as measured from the front side of the body component. In still other aspects, the inventive fishing jig further comprises a protective member at least partially disposed within the through-line element. In yet other aspects, the hook component comprises a shank portion extending from the first end towards the second end, where the shank portion comprises a first region integral with the first end of the hook component and extending therefrom, where the shank portion comprises a second region extending from the first region of the shank portion towards the second end of the hook component, and where the first region of the shank portion is disposed within the body component. In further aspects, the hook component further comprises an interlocking member disposed at the first end, where the interlocking member is disposed within the body component. In other aspects, the through-line element comprises a tubular structure having a first end, and a second end distal to the first end, where the second end is disposed proximate to the second region of the shank portion, such as less than 5 mm, or less than 3 mm, or less than 2 mm, or less than 1 mm from the second region of the shank portion. In still other further aspects, the inventive fishing jig further comprises a fishing line disposed through the through-line element, where the fishing line is attached to the second region of the shank portion via a static knot. In further aspects, the static knot is located proximate to an interface formed between an exterior surface of the body component and the second region of the shank portion of the hook component. In other aspects, the inventive fishing jig comprises at least one selected from a collar component, a bait, a bait retention element, a snag guard member, and insertion element, a coating or an additional attachment. In still other aspects, the inventive fishing jig further comprises a fishing line disposed through the through-line element, where the fishing line is attached to the hook component via a static knot.

In some aspects, a method for making an inventive fishing jig comprises:

A. providing a mold having a first portion and a second portion, where the first portion and the second portion each comprise slotted segments, a body component forming cavity, flow channels and alignment elements;

B. providing a hook component comprising a shank, where the shank comprises a first region and a second region;

C. positioning the hook component into an accommodating slotted segment of the first portion of the mold such that the first region of the hook component is disposed within the body component forming cavity;

D. providing a through-line element formation member having a first end, a second end distal to the first end, and a middle portion disposed therebetween;

E. positioning the through-line element formation member proximate to the first region of the hook component such that the middle portion of the through-line element formation member is disposed within the body component forming cavity of the first portion of the mold, and the first end and the second end of the through-line element formation member are each disposed into an accommodating slotted segment external to the body component forming cavity;

F. aligning the alignment elements and mating the second portion of the mold to the first portion of the mold to form a mated mold;

G. providing a molding device comprising a molten material injection component, a pressure component and a rotation component;

H. placing the mated mold into the molding device;

I. clamping the mated mold into a secured position;

J. exposing the mated mold to a desired pressure via the pressure component;

K. rotating the mated mold to a desired speed via the rotation component;

L. providing a semi-molten or molten material which hardens into a solid component at ambient temperature;

M. injecting the semi-molten or molten material into the mated mold via the molten material injection component;

N. allowing the molten material to suitably disperse into the body component forming cavities of the mated mold via the flow channels;

O. halting the rotation of the mated mold;

P. allowing the semi-molten or molten material to solidify inside the mated mold;

Q. relieving the pressure upon the mated mold;

R. unclamping the mated mold;

S. removing the mated mold from the molding device;

T. separating the second portion of the mold from the first portion of the mold; and U. removing the molded product from the first portion of the mold to provide an inventive fishing jig comprising a body component, a hook component extending from the body component, and a through-line element disposed within the body component. In further aspects, the method further comprises removing at least a portion of the through-line element formation member from the inventive fishing jig. In other further aspects, the molding device is a spin casting molding device.

Numerous other features and advantages of the present invention will appear from the following description. In the description, reference is made to exemplary embodiments of the invention. Such embodiments do not represent the full scope of the invention. Reference should therefore be made to the claims herein for interpreting the full scope of the invention. Titles may be used for convenience and should in no way limit the scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

FIGURES

The foregoing and other features, aspects and advantages of the present invention will become better understood with regard to the following description, appended claims and accompanying drawings where:

Comparative FIG. 1A is a side perspective view showing a conventional lure in the form of a jig;

Comparative FIG. 1B is a side perspective view showing a conventional jig having a fishing line attached thereto;

Comparative FIG. 1C is a side view showing a hooking component of a conventional jig;

Comparative FIG. 1D is a side view showing a hooking component of a conventional jig;

Comparative FIG. 1E is a side view showing a hooking component of a conventional jig;

Comparative FIG. 1F is a side view showing a hooking component of a conventional jig;

Comparative FIG. 1G is a partial side view showing a conventional jig having a collar component;

Comparative FIG. 1H is a partial side view showing a conventional jig having a collar component;

Comparative FIG. 1I is a side perspective view showing a conventional jig having an artificial bait attached thereon;

Comparative FIG. 1J is a side perspective view showing a conventional jig having a coating covering the eyelet to form a coating plug;

FIG. 2A is a side perspective view showing one aspect of an inventive fishing lure of the present invention in the form of a jig;

FIG. 2B is a side perspective view showing one aspect of an inventive fishing lure of the present invention in the form of a jig;

FIG. 3C is a cross-sectional view similar to FIG. 3A except showing a through-line element having a bend angle of approximately 60°;

FIG. 3D is a cross-sectional view similar to FIG. 3A except showing a through-line element having a bend angle of approximately 60°;

FIG. 4A is a side perspective view showing one aspect of an inventive fishing lure of the present invention in the form of a jig wherein the body component is divided into sections;

FIG. 4B is a side perspective view showing one aspect of an inventive fishing lure of the present invention in the form of a jig wherein the body component is divided into sections;

FIG. 4C is a side perspective view showing one aspect of an inventive fishing lure of the present invention in the form of a jig wherein the body component is divided into sections;

FIG. 4D is a side perspective view showing one aspect of an inventive fishing lure of the present invention in the form of a jig wherein the body component is divided into sections;

FIG. 4E is a side perspective view showing one aspect of an inventive fishing lure of the present invention in the form of a jig wherein the body component is divided into sections;

FIG. 4F is a side perspective view showing one aspect of an inventive fishing lure of the present invention in the form of a jig wherein the body component is divided into sections;

FIG. 4G is a side perspective view showing one aspect of an inventive fishing lure of the present invention in the form of a jig wherein the body component is divided into sections;

FIG. 4H is a side perspective view showing one aspect of an inventive fishing lure of the present invention in the form of a jig comprising a through-line element having a first end angle of approximately 0°;

FIG. 4I is a side perspective view showing one aspect of an inventive fishing lure of the present invention in the form of a jig comprising a through-line element having a first end angle of approximately 60°;

FIG. 4J is a side perspective view showing one aspect of an inventive fishing lure of the present invention in the form of a jig comprising a through-line element having a first end angle of approximately 90°;

FIG. 4K is a side perspective view showing one aspect of an inventive fishing lure of the present invention in the form of a jig;

FIG. 5A is a side perspective view showing one aspect of an inventive fishing lure of the present invention in the form of a jig wherein the body component is divided into sections;

FIG. 5B is a side perspective view showing one aspect of an inventive fishing lure of the present invention in the form of a jig wherein the body component is divided into sections;

FIG. 5C is a side perspective view showing one aspect of an inventive fishing lure of the present invention in the form of a jig wherein the body component is divided into sections;

FIG. 5D is a side perspective view showing one aspect of an inventive fishing lure of the present invention in the form of a jig wherein the body component is divided into sections;

FIG. 5E is a side perspective view showing one aspect of an inventive fishing lure of the present invention in the form of a jig wherein the body component is divided into sections;

FIG. 5F is a side perspective view showing one aspect of an inventive fishing lure of the present invention in the form of a jig wherein the body component is divided into sections;

FIG. 5G is a side perspective view showing one aspect of an inventive fishing lure of the present invention in the form of a jig wherein the body component is divided into sections;

FIG. 5J is a side perspective view showing one aspect of an inventive fishing lure of the present invention in the form of a jig comprising a through-line element having a second end angle of approximately 150°;

FIG. 5K is a side perspective view showing one aspect of an inventive fishing lure of the present invention in the form of a jig comprising a through-line element having a second end angle of approximately 120°;

FIG. 5L is a side perspective view showing one aspect of an inventive fishing lure of the present invention in the form of a jig;

FIG. 8A is a side perspective view showing one aspect of an inventive fishing lure of the present invention in the form of a jig wherein the body component is divided into sections;

FIG. 8B is a side perspective view showing one aspect of an inventive fishing lure of the present invention in the form of a jig wherein the body component is divided into sections;

FIG. 8C is a side perspective view showing one aspect of an inventive fishing lure of the present invention in the form of a jig wherein the body component is divided into sections;

FIG. 8D is a side perspective view showing one aspect of an inventive fishing lure of the present invention in the form of a jig wherein the body component is divided into sections;

FIG. 8E is a side perspective view showing one aspect of an inventive fishing lure of the present invention in the form of a jig wherein the body component is divided into sections;

FIG. 9C is a perspective view showing a plurality of hook components comprising optional interlocking members suitable for an inventive fishing lure of the present invention;

FIG. 11E is a sectional view showing the optional protective member of FIG. 11D;

FIG. 11F is a cross-sectional view similar to FIG. 11D except showing a through-line element having a first end bend angle of approximately 60°;

FIG. 11I is a cross-sectional view similar to FIG. 11D except showing a through-line element having a first end bend angle of approximately 60°;

FIG. 15A is a side perspective view showing one aspect of an inventive fishing lure of the present invention in the form of a jig and a bait;

FIG. 15B is a side perspective view showing the jig and bait of FIG. 15A wherein the bait partially attached to the jig;

FIG. 16B is a side perspective view showing one aspect of an inventive fishing lure of the present invention in the form of a jig having an optional bait retention member;

FIG. 16C is a side perspective view showing one aspect of an inventive fishing lure of the present invention in the form of a jig having an optional bait retention member;

FIG. 16F is a side perspective view showing one aspect of an inventive fishing lure of the present invention in the form of a jig having an optional bait retention member;

FIG. 16G is a side perspective view showing one aspect of an inventive fishing lure of the present invention in the form of a jig having an optional bait retention member;

FIG. 16H is a side perspective view showing one aspect of an inventive fishing lure of the present invention in the form of a jig having an optional collar component and an optional bait retention member;

FIG. 16I is a side perspective view showing one aspect of an inventive fishing lure of the present invention in the form of a jig having an optional collar component and an optional bait retention member;

FIG. 16J is a side perspective view showing one aspect of an inventive fishing lure of the present invention in the form of a jig having an optional collar component and a plurality of optional bait retention members;

FIG. 20C is a side perspective view showing the jig and sheathing bait of FIG. 20A wherein the sheathing bait is fully attached thereto and covering the body component of the jig;

FIG. 21A is a perspective and partial cross-sectional view of a molding device in the form of a spin-casting machine;

FIG. 21C is a perspective view of a first portion and a second portion of a mold suitable for making an inventive fishing lure in the form of a jig, and further showing a hook component and a through-line element formation member located within the slotted segments and through-line element formation cavity of the of the first portion of the mold;

FIG. 21E is a side perspective view of an inventive fishing lure of the present disclosure in the form of a jig showing portions of a through-line element formation member extending from the body component;

FIG. 21F is a partial perspective view of an inventive fishing lure of the present disclosure in the form of a jig comprising an optional protective member;

Figure 24A:
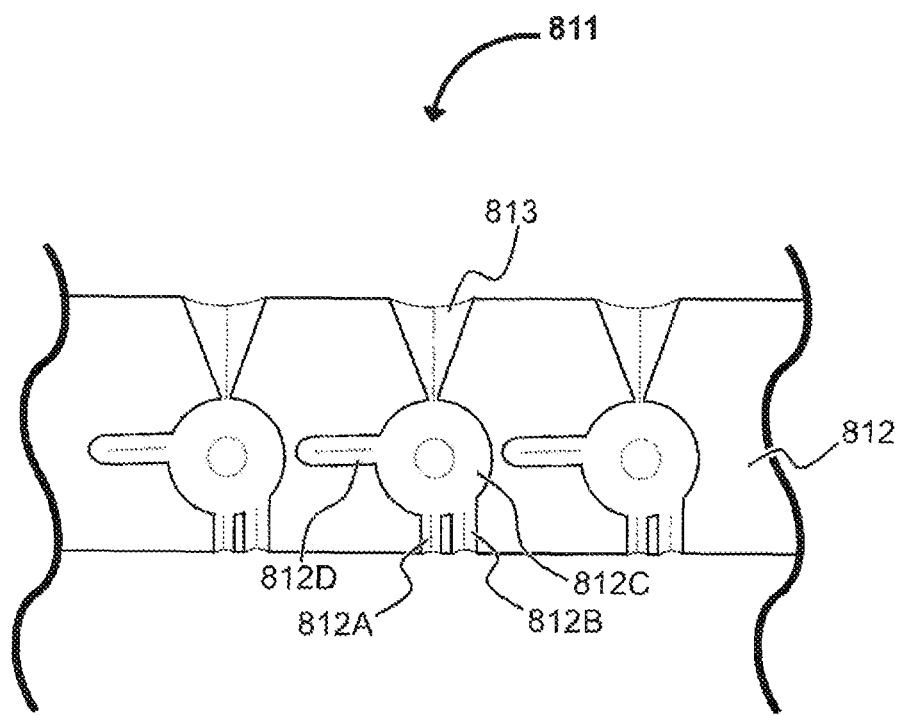
FIG. 24A is a partial perspective view of a block mold for making inventive jigs.
Figure 24B:
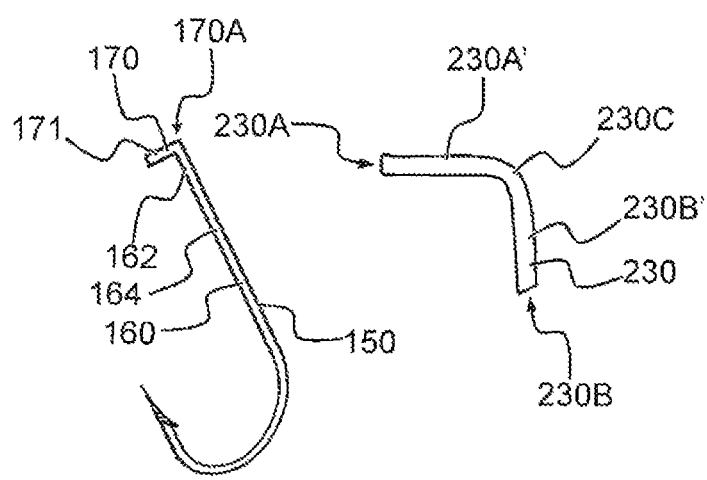
FIG. 24B is a side perspective view of a hook component and a through-line element formation member of the present invention.
Figure 24E:
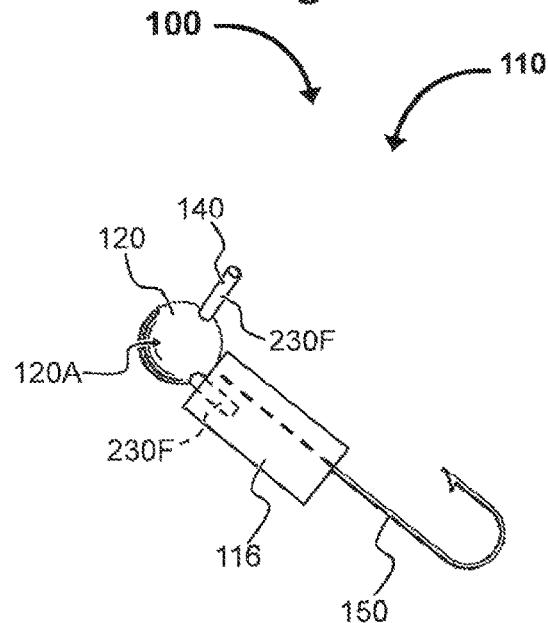
FIG. 24C is a partial magnified perspective view of a block mold having a hook component and a through-line element formation member of the present invention disposed therein.
FIG. 24D is a side perspective view of an inventive fishing lure of the present disclosure in the form of a jig showing portions of a protective member extending from the body component, and further showing a portion of a through-line element formation member that has been removed therefrom.
Figure 24F:
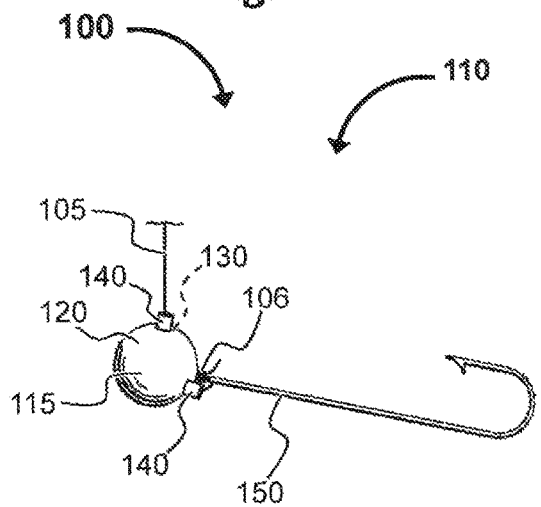

FIG. 24E is a side perspective view of an inventive fishing lure of the present disclosure in the form of a jig showing an upper portion of a through-line element formation member extending from the body component and comprising masking component; and FIG. 24F is a side perspective view of an inventive fishing lure of the present disclosure in the form of a jig comprising an optional protective member, and further comprising an optional coating.

Repeated use of reference characters in the present specification and drawings is intended to represent the same or analogous features or elements of the present invention.

Definitions

It should be noted that, when employed in the present disclosure, the terms "a" and "an" are intended to mean "at least one" of any stated features, elements, integers, steps, components, or groups and are not intended to be limited to only one of such features, elements, integers, steps, components, or groups thereof, except where specifically stated as such. In addition, use of the phrase "at least one" is not intended to render other uses of the terms "a" or "an" to be limited to only one of a feature, element, integer, step, component, or group.

It should also be noted that, when employed in the present disclosure, the terms "comprises," "comprising" and other derivatives thereof are intended to be open-ended terms that specify the presence of any stated features, elements, integers, steps, components, or groups, and are not intended to preclude the presence or addition of one or more other features, elements, integers, steps, components, or groups thereof.

As used herein with respect to a fishing line attached to a fishing lure, the term "abrasion" refers to damage such as abrading, scratching, scuffing, cutting, or wearing-away of a fishing line, including but not limited to, breakage of mechanical and/or chemical bonds within a fishing line, removal of portions of a fishing line, and the like.

As used herein, the term "adjacent" is intended to mean "next to" or "against." In comparison, the term "proximate" is intended more broadly to mean "near."

Referring for example to FIGS. 4H-4J, as used herein with respect to the first end 131 and/or first opening 131A of the through-line element 130, the term "angle" refers to the angle $\theta_{131}$ at which the first end 131 of the through-line element 130 is disposed within the body component 120, wherein:

i.) angle $\theta_{131}$ is formed by horizontal central axis C-C and axis $Q_{131}$, shown by arrows $A_{C-C}$ and $A_{131}$, respectively:

ii.) arrow $A_{C-C}$ extends from the origin $O_{131}$ (i.e., the intersection of axis C-C and axis $Q_{131}$) through the body component 120 along axis C-C in a substantially frontward direction $F_1$, and through the exterior surface 120A of the body component 120, generally (though not necessarily) within the front side 121 region of the body component 120;

iii.) arrow $A_{131}$ extends from the origin $O_{131}$ through the body component 120 along axis $Q_{131}$ and through the exterior surface 120A of the body component 120 at the center point $P_{131}$ of the first end 131 of the through-line element 130 (wherein the center point $P_{131}$ is spatially located along the exterior surface 120A of the body component 120), and in a direction wherein axis $Q_{131}$ and arrow $A_{131}$ are generally orthogonal to the tangent $T_{131}$ of center point $P_{131}$; and iv.) arrow $A_{C-C}$ is generally spatially located frontward $F_1$ of arrow $A_{131}$.

Accordingly, all possible values of angle $\theta_{131}$ are intended herein to be measured as values that fall between 0-degrees and 180-degrees (i.e., the maximum angle possible formed by arrow $A_{131}$ with respect to axis $A_{C-C}$ is constrained to 180° regardless of spatial orientation around central axis C-C).

Referring for example to FIGS. 5H-5K, as used herein with respect to the second end 132 and/or second opening 132A of the through-line element 130, the term "angle" refers to the angle $\theta_{132}$ at which the second end 132 of the through-line element 130 is disposed within the body component 120, wherein:

i.) angle $\theta_{132}$ is formed by horizontal central axis C-C and axis $Q_{132}$, shown by arrows $A_{C-C}$ and $A_{132}$, respectively;

ii.) arrow $A_{C-C}$ extends from the origin $O_{132}$ (i.e., the intersection of axis C-C and axis $Q_{132}$) through the body component 120 along axis C-C in a substantially frontward direction $F_1$, and through the exterior surface 120A of the body component 120, generally (though not necessarily) within the front side 121 region of the body component 120;

iii.) arrow $A_{132}$ extends from the origin $O_{132}$ through the body component 120 along axis $Q_{132}$ and through the exterior surface 120A of the body component 120 at the center point $P_{132}$ of the second end 132 of the through-line element 130 (wherein the center point $P_{132}$ is spatially located along the exterior surface 120A of the body component 120), and in a direction wherein axis $Q_{132}$ and arrow $A_{132}$ are generally orthogonal to the tangent $T_{132}$ of center point $P_{132}$; and iv.) arrow $A_{C-C}$ is spatially located frontward $F_1$ of arrow $A_{132}$.

Accordingly, all possible values of angle $\theta_{132}$ are intended herein to be measured as values that are between 0-degrees and 180-degrees (i.e., the maximum angle possible formed by arrow $A_{132}$ with respect to arrow $A_{C-C}$ is constrained to 180° regardless of spatial orientation around axis C-C).

Figure 9A:
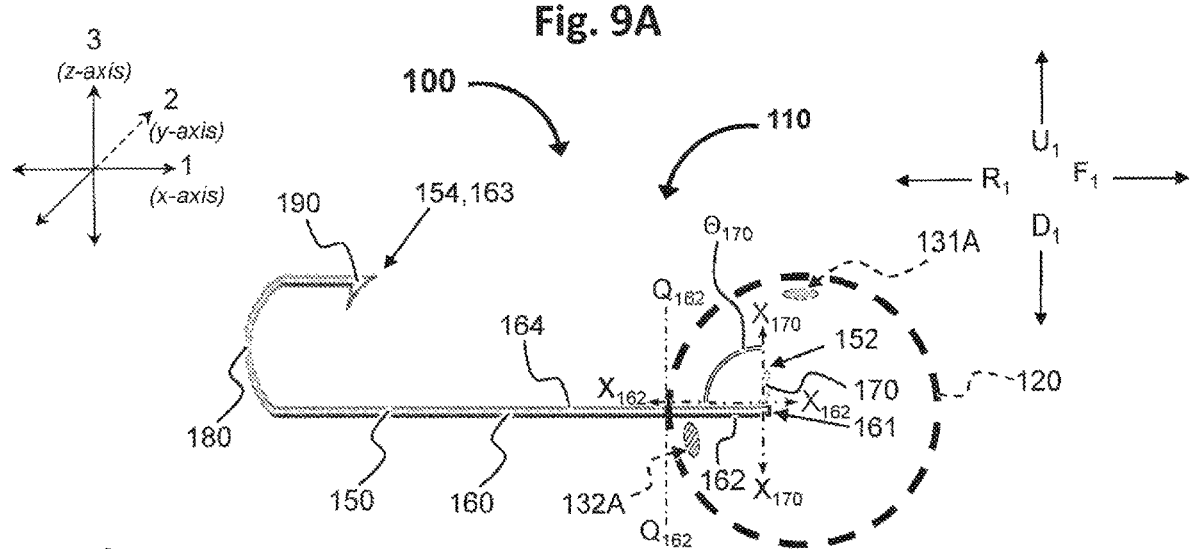
FIG. 9A is a side view showing one aspect of an inventive fishing lure of the present invention in the form of a jig comprising an optional interlocking member.
Figure 9B:
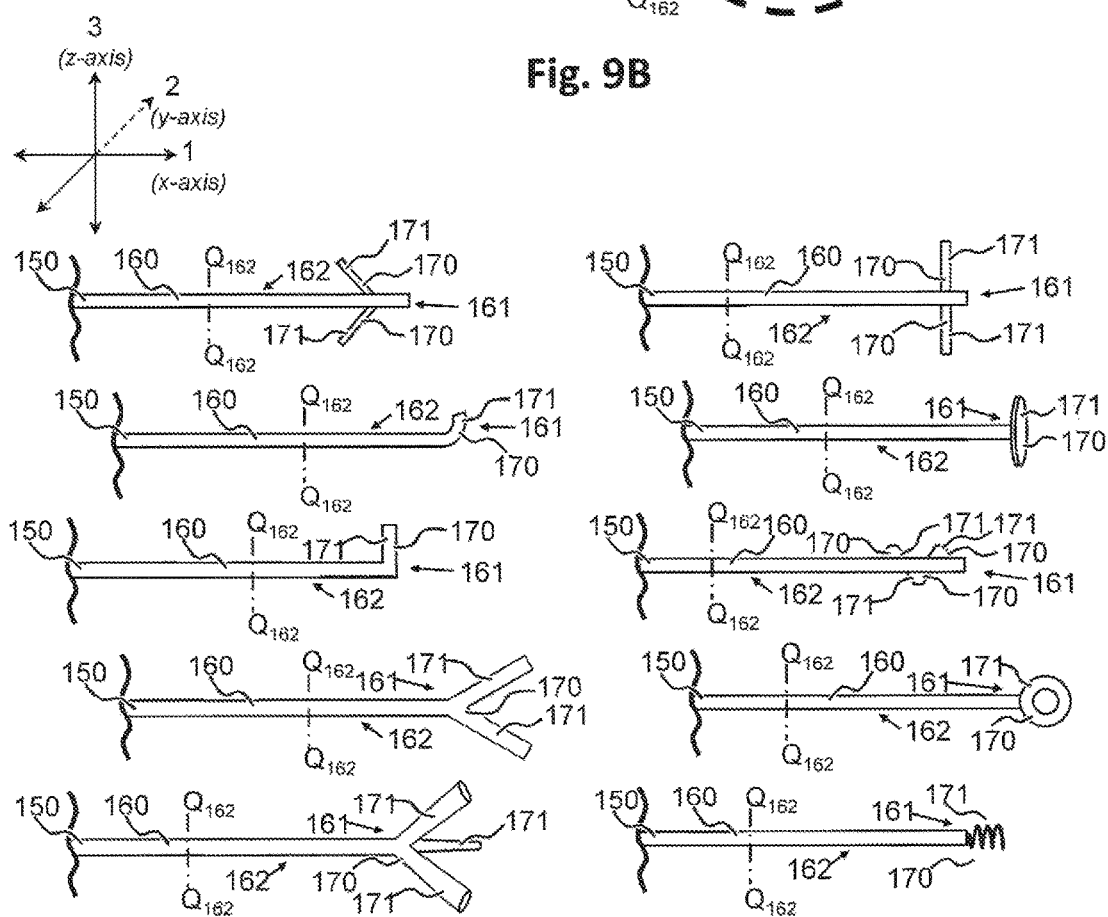
FIG. 9B is a partial perspective view showing a plurality of hook components comprising optional interlocking members suitable for an inventive fishing lure of the present invention.
Figure 9D:
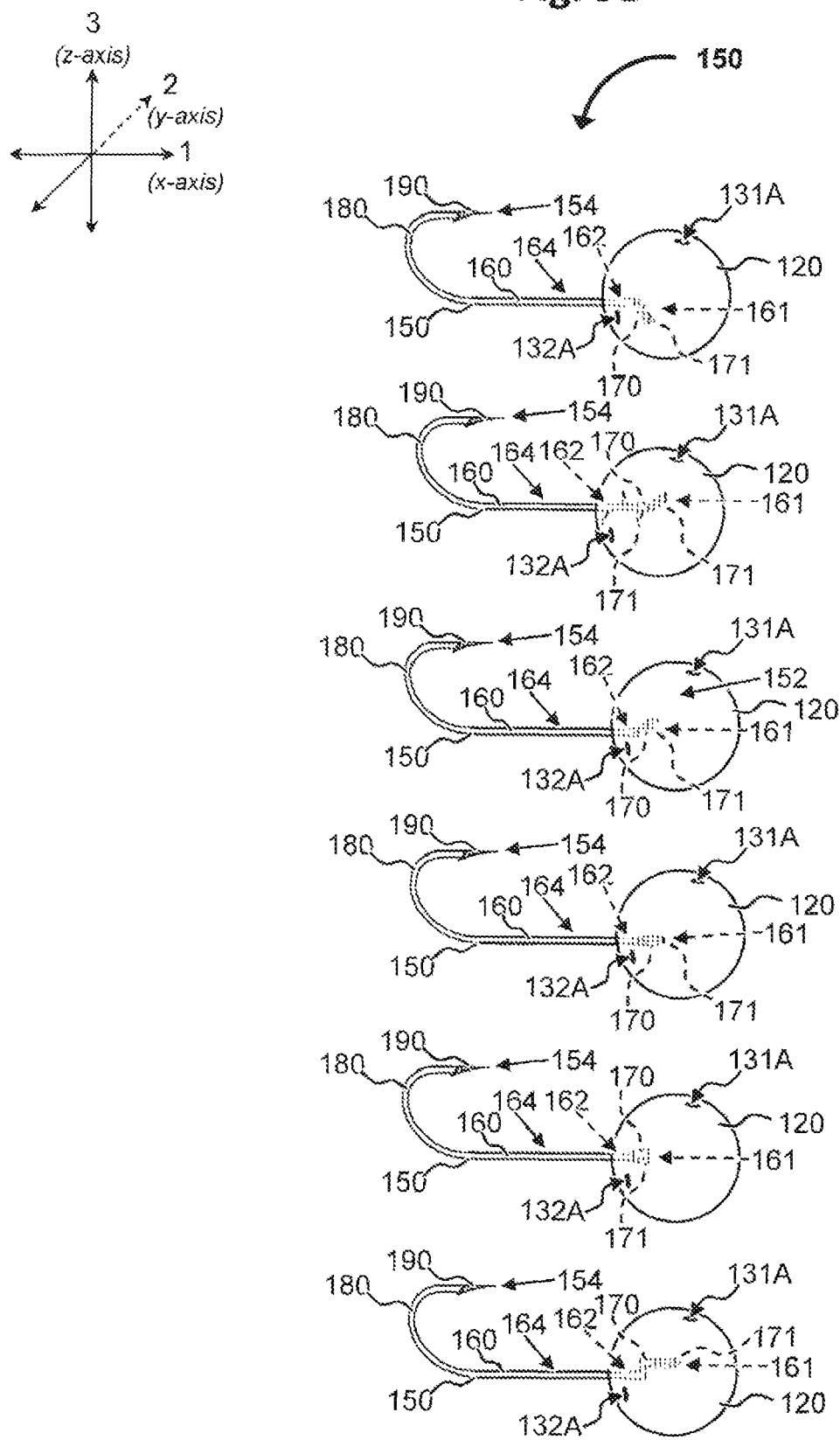
FIG. 9D is a perspective view showing a plurality of hook components comprising optional interlocking members suitable for an inventive fishing lure of the present invention.
Figure 9E:
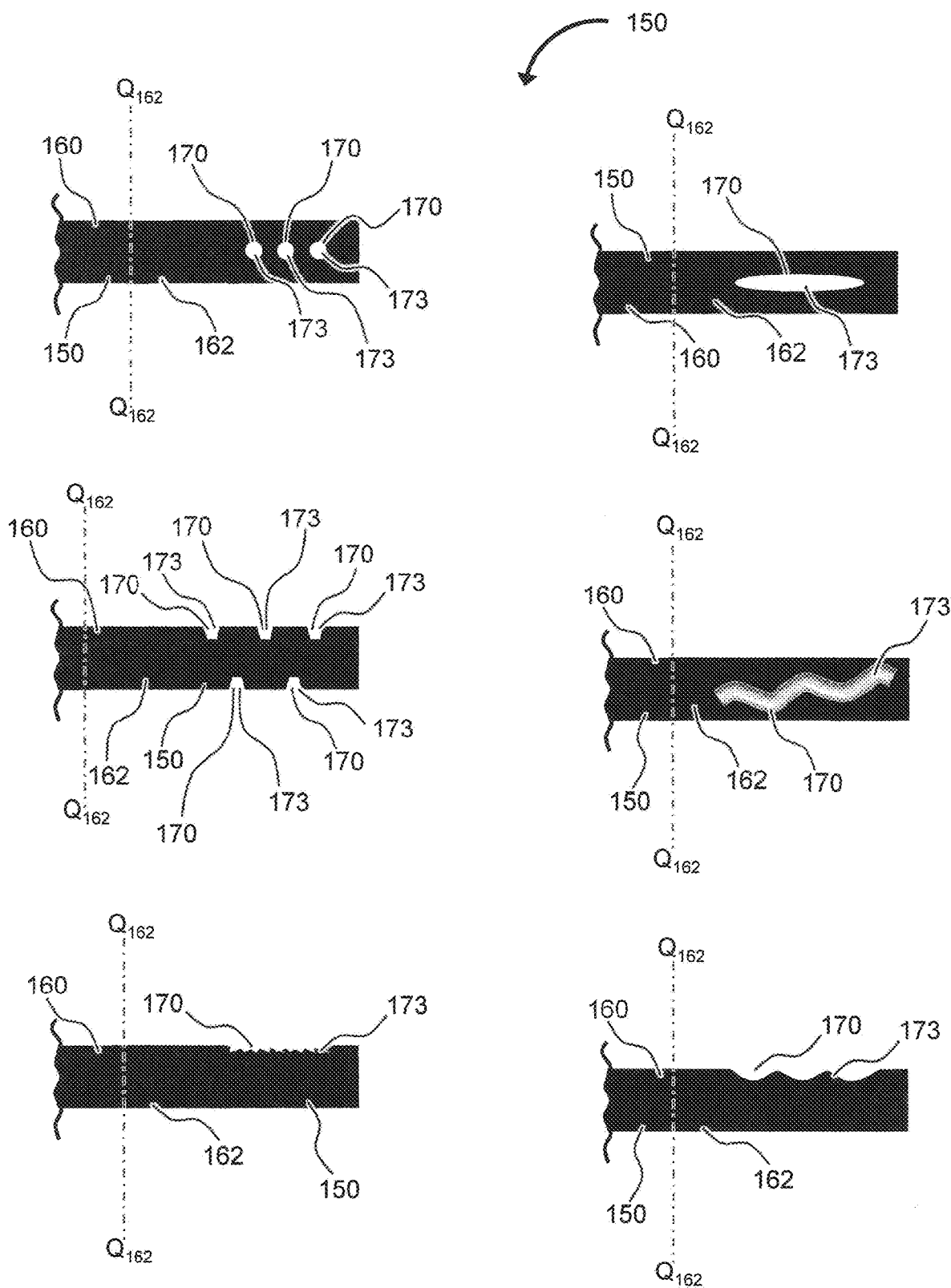
FIG. 9E is an enlarged partial side view showing a plurality of hook components comprising optional interlocking members suitable for an inventive fishing lure of the present invention.

As used herein with respect to an optional interlocking member 170 of the invention (see e.g., FIG. 9A), the term "angle" refers to the angle $\theta_{170}$ formed between the longitudinal axis $X_{170}$ of the interlocking member 170 and the longitudinal axis $X_{162}$ of the first region 162 of the shank 160, which extends generally along the x-axis 1 in a substantially frontward direction $F_1$.

Figure 16A:
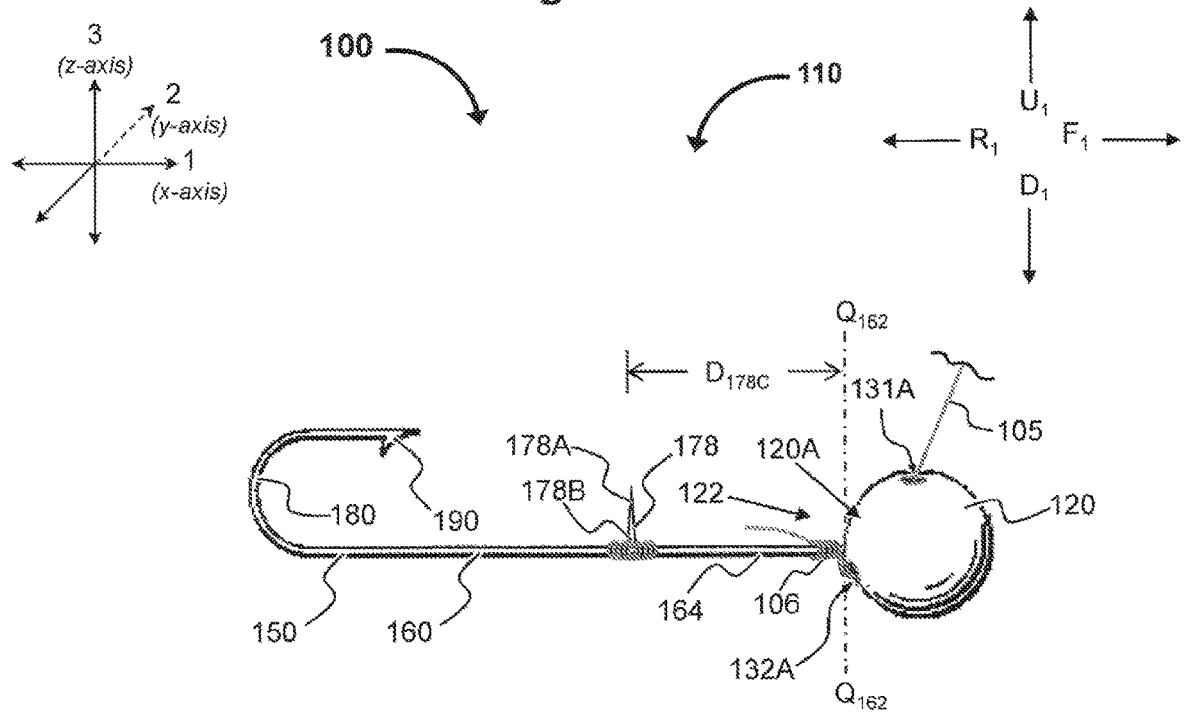
FIG. 16A is a side perspective view showing one aspect of an inventive fishing lure of the present invention in the form of a jig having an optional bait retention member.
Figure 16D:
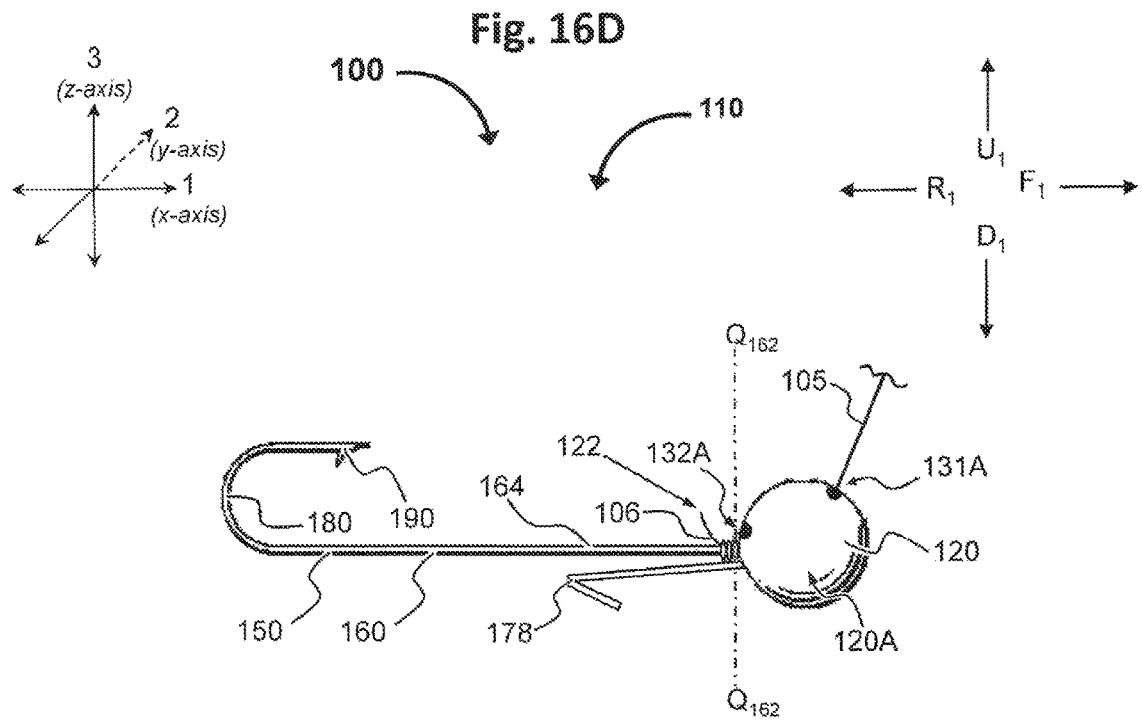
FIG. 16D is a side perspective view showing one aspect of an inventive fishing lure of the present invention in the form of a jig having an optional bait retention member.
Figure 16E:
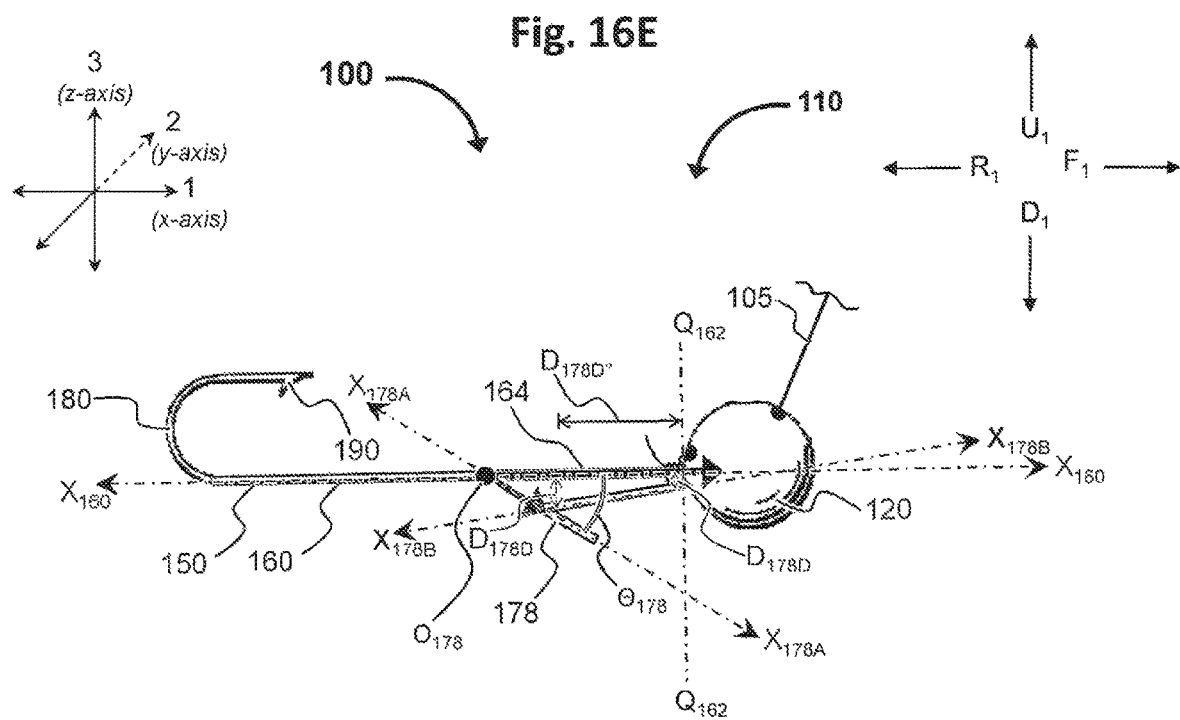
FIG. 16E is a side perspective view showing one aspect of an inventive fishing lure of the present invention in the form of a jig having an optional bait retention member.

Referring for example to FIG. 16E, as used herein with respect to an optional bait retention member 178, the term "angle" refers to the angle $\theta_{178}$ formed between the longitudinal axis $X_{178A}$ of the bait retention member 178 and the longitudinal axis $X_{160}$ of the shank 160, which extends generally along the x-axis 1 in a substantially frontward direction $F_1$.

As used herein, the term "attract" and derivatives thereof refers to drawing the attention of targets of the present invention, such as fish, for example.

As used herein with respect to an optional interlocking member 170 of the invention, the terms "augmentation" and "augmentative" refer to an addition to, or increase, extension, or reshaping, of the first region 162 of the shank 160.

As used herein with respect to a body component, the term "axial center" refers to a generally horizontal axis along the x-axis 1 which intersects the approximate center of mass of the body component, wherein the "center of mass" is generally in an opposing inward location to the exterior surfaces of the body component.

As used herein, the term "bait" refers to a product for attracting fish which is distinct from a lure, and is generally disposed onto at least a portion of a hook component or hooking component of a lure.

As used herein, the term "bait fish" or "feeder fish" refers to a food source of a fish, typically in the form of a smaller size fish.

As used herein with respect to a fish, the term "catch" and derivatives thereof refers to obtaining possession of an item, such as a fish, for example.

As used herein, the term "cinch" and derivatives thereof refers to the tightening and positioning of a fishing line knot (formed upon attaching a fishing line to a fishing lure), typically by pulling on the respective fishing line.

As used herein, the term "congruent" is intended to mean corresponding in character, kind, or when superimposed.

As used herein, the term "conventional jig" refers to typical, traditional or standard fishing jigs that, when viewed externally, appear to comprise three (3) primary features: a body component (sometimes also referred to as a "head component" or "jig head"), a hooking component (sometimes also referred to as a "hook element" or more simply as a "hook") and an eyelet element (sometimes also referred to more simply as an "eyelet" or an "eye").

As used herein, the term "coplanar" refers to lying in the same plane.

As used herein, the term "dynamic knot" refers to the typical slidable (i.e., moveable) knot formed onto conventional fishing lures when a fishing line disposed through the opening of an eyelet has been tied to the loop element of the eyelet and subsequently cinched, wherein the orientation and position of the knot relative to the eyelet are susceptible to change along the entirety of the loop element, and thus is undesirably inconsistent and unpredictable throughout the conventional fishing lure's use while said knot is present, as a result of the inferior design/configuration of conventional fishing lures (as compared to the inventive fishing lures of the present disclosure).

As used herein, the term "fish" refers broadly to one or more aquatic organisms that a user desires to catch with a fishing lure of the present disclosure, and is not intended to be limited solely to aquatic vertebrates having scales and breathing through gills.

As used herein, the term "fishing pole" refers to a control device, such as a fishing rod, a fish rigging, a fishing rod and reel combination, and the like, which utilizes a fishing lure of the present disclosure for catching a fish, and is not intended to be limited solely to a device used to extend fishing line.

As used herein, the term "interface" refers to a location or surface forming a common boundary between at least two things (e.g., objects, substrates, components, elements, portions, regions, etc.).

As used herein, the terms "invention" and "inventive" refer to an invention of the present disclosure, as well as equivalents thereof, provided however that any of such equivalents is not prohibitive thereto with respect to patentability, nor to the scope thereof.

As used herein, the term "jig" refers to a specific type of fishing lure comprising a body component, a hooking or hook component comprising a horizontal shaft having a first end and a second end. In typical configurations, the body component is disposed proximate to the first end of the shaft and a barbed element is integral with the second end of the shaft, such that a majority of the mass of the fishing lure is disposed at or near the first end of the shaft. In typical conventional jig arrangements, the fishing lure further comprises an eyelet which protrudes vertically outward from the body component for securing a fishing line thereto.

As used herein, the term "jigging" refers to the act of quickly tensing and relaxing (e.g., via jerking, short tugging, etc.) a fishing line during use to which a fishing lure has been attached.

As used herein, the term "linear" refers to of, in, along or relating to a line, involving a single dimension.

As used herein, the term "live bait" is intended to include those bait organisms that are alive at the time of use, or that were previously alive, as well as parts thereof including, inter alia, parts attached thereto (e.g., appendages, cutbaits, etc.), derived therefrom (e.g., eggs, spawn sacks, etc.), and the like.

As used herein, the term "plastisol" refers to a suspension of PVC particles in a plasticizer which flows as a liquid at ambient temperature and can be poured into an artificial bait mold. When the mold is heated to around 177° C., the PVC particles and plasticizer of the plastisol mutually dissolve each other. Upon cooling the mold to below 60° C., a flexible, permanently plasticized product results.

As used herein, the terms "reel," "reel-in" and derivatives thereof, when used in reference to catching a fish on a fishing lure, refer to pulling a fishing line in the general direction towards a user (typically accomplished by a user winding the line onto a fishing reel).

As used herein when referring to catching a fish on a fishing lure, the term "set" and derivatives thereof refers to embedding the barbed element of the lure into the flesh of a fish (most typically accomplished by a user applying a jerking action to an attached fishing pole, which in turn transfers the action to the fishing line, and ultimately to the fishing lure itself).

As used herein, the term "snag" and derivatives thereof refers to a blockage or obstacle to the line of travel of a fishing lure when in use, typically via interaction between the fishing lure and an external object (e.g., stone, wood, weed, etc.).

As used herein with respect to an interlock feature, the terms "subtraction" and "subtractive" refer to the removal of material from the first region of the shank, preferably without reducing the longitudinal length of the shank.

As used herein, the term "static knot" refers to a knot (formed upon attaching a fishing line to a fishing lure) that remains substantially in-place (i.e., at the location upon which it was cinched) throughout the use of a respective fishing lure.

As used herein, the term "trigger" and derivatives thereof refers to enticing targets (such as fish, for example) to physically strike, attack, swallow, or otherwise draw-in at least a portion of a fishing lure.

These terms may be defined with additional language in the remaining portions of the specification.

DETAILED DESCRIPTION

The invention is generally directed to improved fishing devices and methods thereof. In some non-limiting aspects, the invention is directed to devices, as well as methods relating thereto, in the form of a fishing lure. In some more particular non-limiting aspects, the invention is directed to fishing lures of the class-type referred to as "jigs" (further defined above). Various sample embodiments of the present invention are disclosed herein; however, it should be understood that the disclosed embodiments are intended merely as non-limiting examples of the invention that may be embodied in various forms. Therefore, specific structural and functional details disclosed herein are not to be interpreted as limiting, but rather as an exemplary basis for claims, and as a representative basis for teaching persons having ordinary skill in the art to variously employ the present invention in virtually any appropriately detailed structure.

The general construction of conventional fishing lures which are used for fishing, such as jigs for example, is well-known in the art. Conventional jigs typically include a body component, a hooking component having a curvilinear hook element, and an eyelet element. The hooking component typically comprises a wire shaft and has a first end portion, an opposing second end portion distal to the first end portion, and a middle portion disposed therebetween. Integral with the first end portion of the wire shaft is an eyelet element (also referred to herein more simply as an "eyelet") to which a fishing line can be attached, such as via a knot. Integral with the second end portion of the wire shaft is a curvilinear hook element for securing a fish during use. Disposed around the middle portion of the hooking component is a body component which is typically weighted (often made of lead) and is configured such that the first portion of the hooking component and the eyelet extend outward therefrom. In addition, the middle portion of the hooking component typically includes a 90° bend (although the angle may vary somewhat) such that the first portion and the second portion of the hooking component form an angle between zero degrees (0°) and one-hundred-eighty degrees (180°), more particularly between 90° and 30°, or more particularly between 90° and 60°, or even more particularly at an angle of 90° with respect to the frontward extending axis of the second portion, as measured from the front side of the body component. During typical manufacturing processes of such conventional jigs, the middle portion of the hooking component is placed into a mold for the purpose of molding the body component around thereof, while the first and second portions of the hooking component, the eyelet element and the curvilinear hook element are positioned outside of the body component mold cavity. In this manner, the eyelet element and the curvilinear hook element are typically coplanar with each other and project outward from the body component at a typical angle of about 0° to about 90°.

Conventional jigs are generally secured to a fishing pole by tying a respective fishing line to the protruding eyelet element. A conventional jig is typically used by utilizing the fishing pole to cast the conventional jig into a body of water, whereby the weighted body component causes the conventional jig to sink to a desired level. Anglers can then manipulate the conventional jig by jigging the fishing line (further defined above) to attract fish to the lure.

Comparative FIGS. 1A-1J illustrate comparative conventional fishing lures 900 in the form of a jig 910. With particular reference to Comparative FIGS. 1A-1B, it can be seen that a conventional jig 910 typically includes a hooking component 950, a body component 920, a protruding eyelet 940 and a collar component 930.

Referring now to Comparative FIGS. 1B-1H, the hooking component 950 comprises a single, generally contiguous metal wire. The hooking component 950 has a first end 952, a second end 954 distal to the first end 952, a vertical shaft portion 970, a curvilinear hook portion 980, and a horizontal shaft portion 960 disposed therebetween.

With reference to Comparative FIG. 1D, for example, the horizontal shaft portion 960 has a generally linear profile along its longitudinal axis $X_{960}$ and is defined by a frontward region 962, a middle region 964, and a rearward region 966.

The hooking component 950 is configured such that the curvilinear hook portion 980 is defined by the curvilinear hook region 980A and is integral with, and extends from, the rearward region 966 of the horizontal shaft portion 960. The curvilinear hook portion 980 has a generally curvilinear profile along its longitudinal axis $X_{980}$ and is defined by a first linear region 982, a second linear region 986, and a curvilinear region 984 disposed therebetween. The first linear region 982 has a substantially linear profile along its longitudinal axis $X_{982}$ and extends in a rearward direction $R_9$ from the rearward region 966 of the horizontal shaft portion 960. The curvilinear region 984 extends in an upward direction $U_9$ along its longitudinal axis $X_{984}$ from the first linear region 982 and exhibits a substantially arcuate profile wherein the curvature of the arcuate profile ranges from about 120-degrees to about 200-degrees relative to the longitudinal axis $X_{982}$ of the first linear region 982. The second linear region 986 has a substantially linear profile along its longitudinal axis $X_{986}$ and extends in a frontward direction $F_9$ from the curvilinear region 984. In addition, the second linear region 986 is shown as being located above, and parallel to, the first linear region 982. Furthermore, the first linear region 982, the curvilinear region 984 and the second linear region 986 are coplanar in the x-z plane.

Referring now to Comparative FIGS. 1D and 1E, coupled to, or integral with, the end 986A of the second linear region 986 is a barbed element 990. The barbed element 990 is typically constructed from the same material utilized to construct the curvilinear hook portion 980. The barbed element 990 is shown as including a frontward-facing first end 992 and a rearward-facing second end 994. Thus, the first end 992 of the barbed element 990 forms the second end 954 of the hooking component 950. Typically, the first end 992 of the barbed element 990 has been sharpened to form a hook point 913 for penetrating the flesh, cartilage and/or bones of a fish. In addition, the second end 994 of the barbed element 990 is shown as extending along the bottom side 987 of the second linear region 986 in a rearward direction $R_9$ while angling away from the second linear region 986 in a downward direction $D_9$. As a result, the second end 994 of the barbed element 990 is spaced apart from the second linear region 986, which helps prevent the barbed element 990 from dislodging from a fish after penetration, thus allowing a user to catch the fish by reeling-in the fishing line 905 attached to the conventional jig 910.

Returning to Comparative FIGS. 1A-1J, the hooking component 950 is further configured such that the vertical shaft portion 970 is integral with, and extends from, the frontward region 962 of the horizontal shaft portion 960. As illustrated more particularly in Comparative FIGS. 1B-1H, the vertical shaft portion 970 extends in an upward direction $U_9$, such that the longitudinal axis $X_{970}$ of the vertical shaft portion 970 is generally orthogonal to the longitudinal axis $X_{960}$ of the horizontal shaft portion 960 in the x-z plane. The change in axial direction between the horizontal shaft portion 960 and the vertical shaft portion 970 is provided by way of a bent portion 956A in the contiguous wire of the hooking component 950. The bent portion 956A is defined by a bend region 956B and forms a bend 956 having a generally L-shaped profile. The vertical shaft portion 970 has a generally linear profile along its longitudinal axis $X_{970}$ and is defined by a lower region 972 and an upper region 974.

The vertical shaft portion 970 further includes an eyelet element 940 coupled to, or integral with, the distal end 970A of the upper region 974. The eyelet 940 is typically constructed from the same gauge wire utilized to construct the vertical shaft portion 970 and is arranged into a loop element 942 to form a generally closed loop which further defines an opening 944 for receiving a fishing line 905. The diameter $\Phi_{944}$ of the opening 944 (i.e., the inner diameter of the eyelet 940) can range from the equivalent fishing line 905 diameter (minimum) to at least about two hundred percent (200%) of the wire diameter, such as at least about three hundred percent (300%) of the wire diameter, or more.

In typical configurations, the hooking component 950 is arranged such that the horizontal shaft portion 960, the vertical shaft portion 970, the curvilinear hook portion 980, the barbed element 990, and the eyelet 940 are coplanar in the x-z plane.

Continuing with Comparative FIGS. 1A-1J, the conventional jig 910 also includes a body component 920. As illustrated more particularly in Comparative FIGS. 1G-1J, the body component 920 is shown having a generally spherical shape and is defined by a diameter $\Phi_{920x}$ in the x-direction, a diameter $\Phi_{920y}$ in the y-direction, a diameter $\Phi_{920z}$ in the z-direction, a front side 921 and an opposing rear side 922 along the x-axis 1, a top side 923 and an opposing bottom side 924 along the z-axis 3, and a first side 925 and an opposing second side 926 along the y-axis 2. The body component 920 is typically constructed of lead, although other materials known in the art can also be suitable.

The conventional jig 910 is configured such that the body component 920 surrounds and encases a portion of the hooking component 950. More particularly, disposed within the interior of the body component 920 are the frontward region 962 of the horizontal shaft portion 960, the lower region 972 of the vertical shaft portion 970 and the bent portion 956A of the hooking component 950 located between the frontward region 962 and the lower region 972. In addition, the remainder of the horizontal shaft portion 960, the curvilinear hook portion 980 and the barbed element 990 extend in a generally rearward direction $R_9$ from the rear side 922 of the body component 920, while the eyelet 940 and upper region 974 of the vertical shaft portion 970 protrude through the top side 923 of the body component 920 in an upward direction $U_9$. Furthermore, the conventional jig 910 is shown to be configured such that the horizontal shaft portion 960, the curvilinear hook portion 980, the barbed element 990, the hook point 913, the vertical shaft portion 970 and the eyelet 940 are generally coplanar with one another in the x-z plane.

As further illustrated in Comparative FIG. 1B, the conventional jig 910 can be secured to a fishing pole (not shown) by threading a fishing line 905 from the pole through the opening 944 disposed in the eyelet 940, and then tying the fishing line 905 onto the loop element 942 of the eyelet 940 such as in the form of a knot 906 disposed thereupon.

Referring now to Comparative FIGS. 1A-1B and 1G-1J, the conventional jig 910 is also shown to include a collar component 930. The collar component 930 has a generally cylindrical shape and is defined by a longitudinal length $L_{930}$ along its longitudinal axis $X_{930}$, a cross-sectional length $\Phi_{930}$ (which is generally equivalent to its diameter at any given point) along its transverse axis $Y_{930}$, a first end 931 and an opposing a second end 932 distal to the first end 931 along the x-axis 1, a top surface 933 and an opposing bottom surface 934 along the z-axis 3, and a first side surface 935 and opposing second side surface 936 along the y-axis 2. The collar component 930 substantially surrounds and encases the middle region 964 of the horizontal shaft portion 960 of the hooking component 950, and thus has a diameter that is greater than the outer diameter of the horizontal shaft portion 960. The first end 931 of the collar component 930 is located adjacent to, and may be integral with, the rear side 922 surface of the body component 920, and the collar component 930 extends in a rearward direction $R_9$ from the rear side 922 of the body component 920 along the longitudinal axis $X_{960}$ of the horizontal shaft portion 960. The collar component 930 is shown to include a spur projection 938 which extends from the top side 933 surface of the collar component 930 in an upward direction U₉. Referring now to Comparative FIG. 1I, the collar component 930 with spur projection 938 may be used to secure an additional item to the conventional jig 910, such as a bait 907.

Referring now to Comparative FIG. 1J, upon their assembly, conventional jigs 910 are typically decorated to make them look more aesthetically appealing to fish and/or the user. Such decorating is normally accomplished by applying a coating 915 to a conventional jig 910, covering at least the area from the front side 921 to at least the rear side 922 of the body component 920, and often further including at least a portion of the collar component 930, as well. Unfortunately, such coatings also typically cover-over the opening 944 in the eyelet 940 to create a plug 916 (i.e., eliminates the opening 944), which has a negative impact on conventional jigs 910 (discussed further below). Materials utilized for the coating 915 typically include enamels, latex, polyurethane, epoxy and other resins, thermoplastics and other plastics, and the like. The coating 915 is typically applied to the conventional jig 910 using dipping, spraying and/or brushing techniques known in the art.

As discussed above, research conducted herein has revealed, inter alia, an inferior structure and operation of conventional jigs 910, which present a variety of shortcomings and/or problems. The invention of the present disclosure overcomes at least one or more of such shortcomings and/or problems. In addition, the invention can further provide additional benefits which will become clear to persons having ordinary skill in the art, as further discussed below.

Figure 19A:
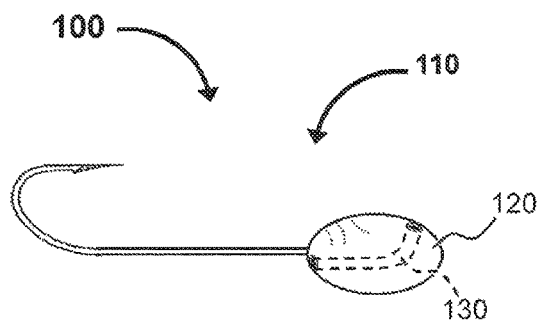
FIG. 19A is a side perspective view showing one aspect of an inventive fishing lure of the present invention.
Figure 19B:
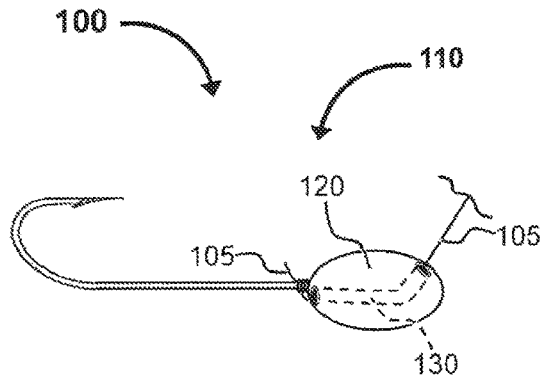
FIG. 19B is a side perspective view showing one aspect of an inventive fishing lure of the present invention.
Figure 19C:
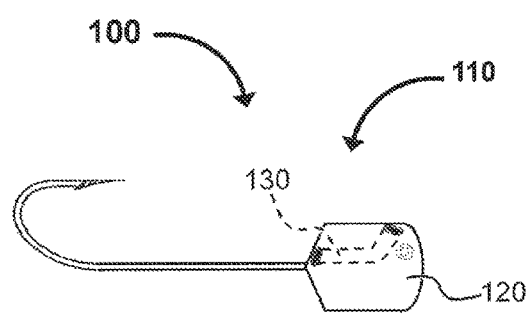
FIG. 19C is a side perspective view showing one aspect of an inventive fishing lure of the present invention.
Figure 19D:
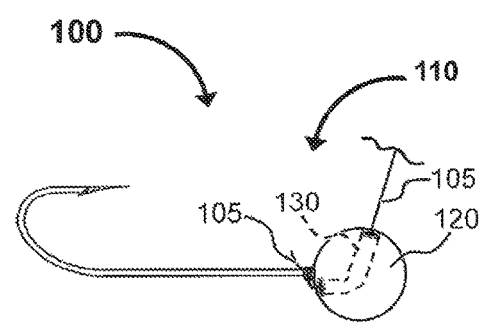
FIG. 19D is a side perspective view showing one aspect of an inventive fishing lure of the present invention.
Figure 19E:
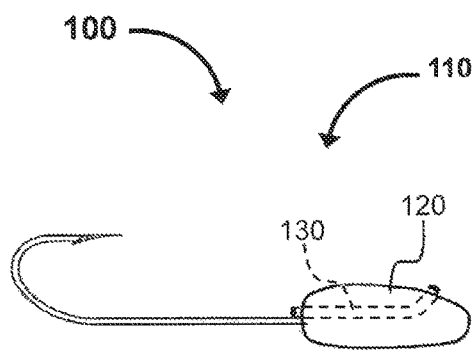
FIG. 19E is a side perspective view showing one aspect of an inventive fishing lure of the present invention.
Figure 19F:
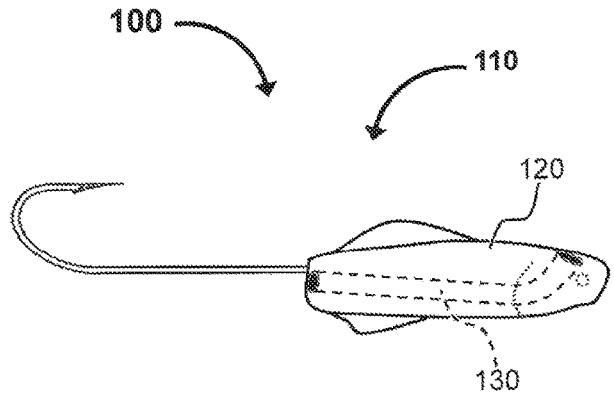
FIG. 19F is a side perspective view showing one aspect of an inventive fishing lure of the present invention.
Figure 19G:
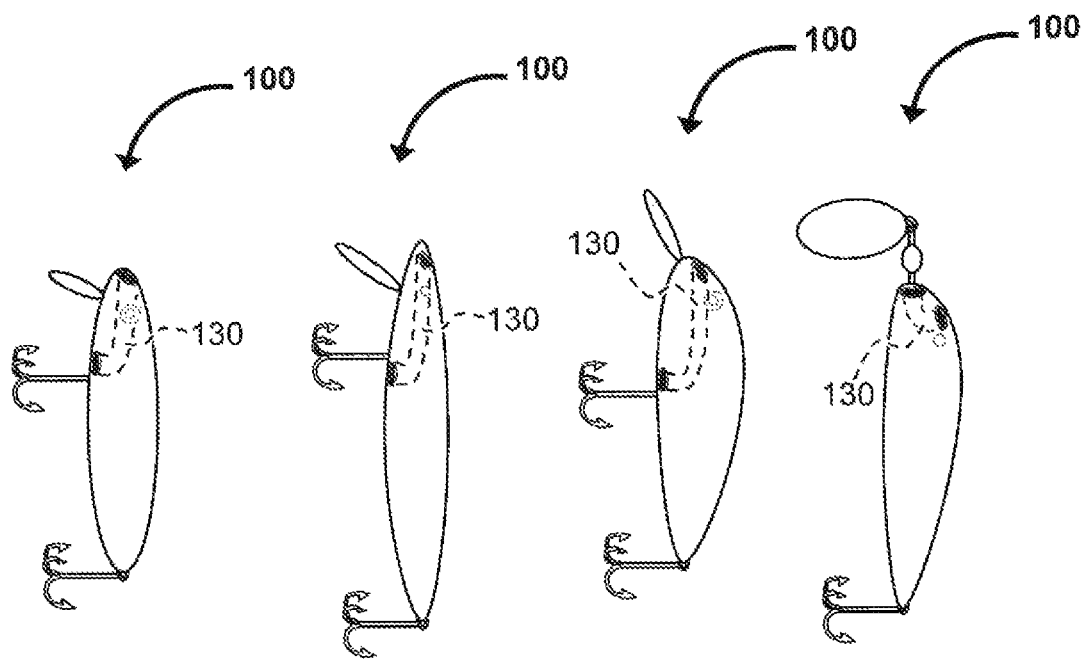
FIG. 19G is a side perspective view showing a plurality of aspects of inventive fishing lures of the present invention.
Figure 19H:
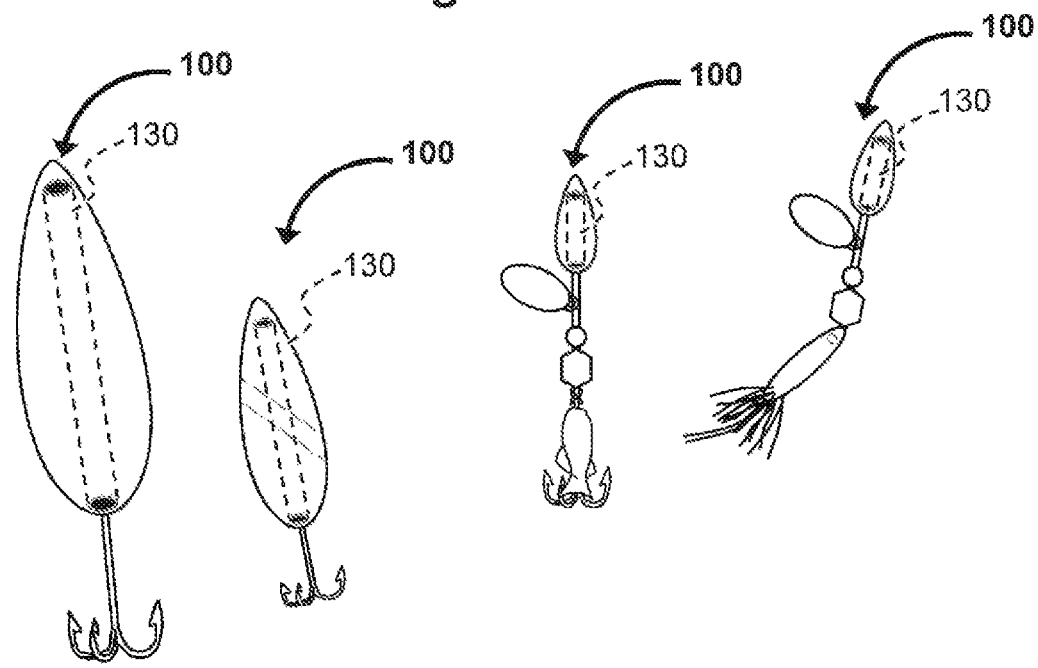
FIG. 19H is a side perspective view showing a plurality of aspects of inventive fishing lures of the present invention.
Figure 19I:
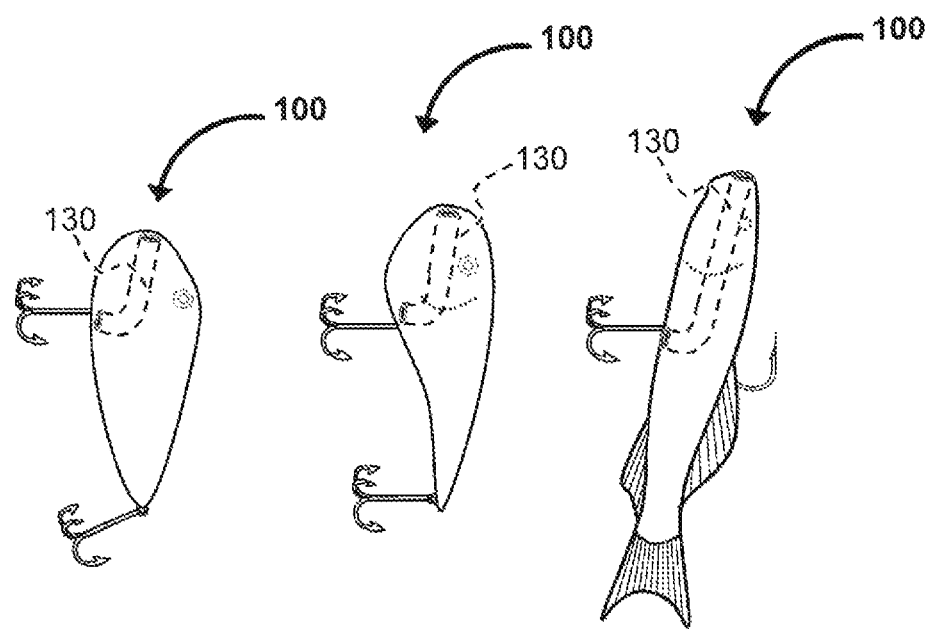
FIG. 19I is a side perspective view showing a plurality of aspects of inventive fishing lures of the present invention.
Figure 19J:
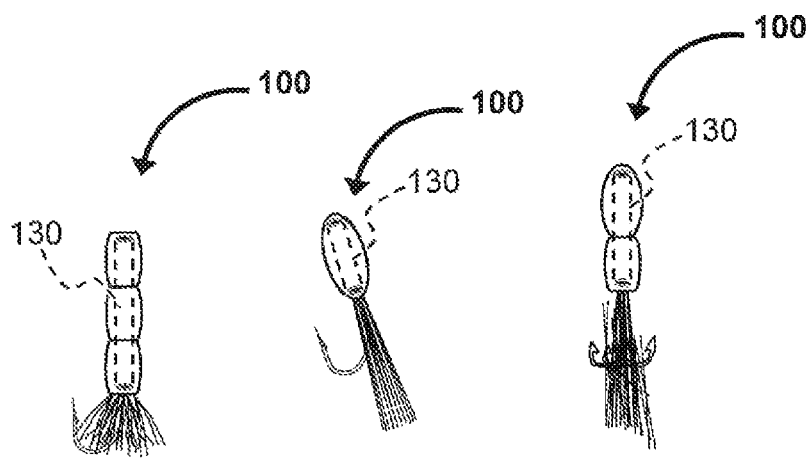
FIG. 19J is a side perspective view showing a plurality of aspects of inventive fishing lures of the present invention.
Figure 19K:
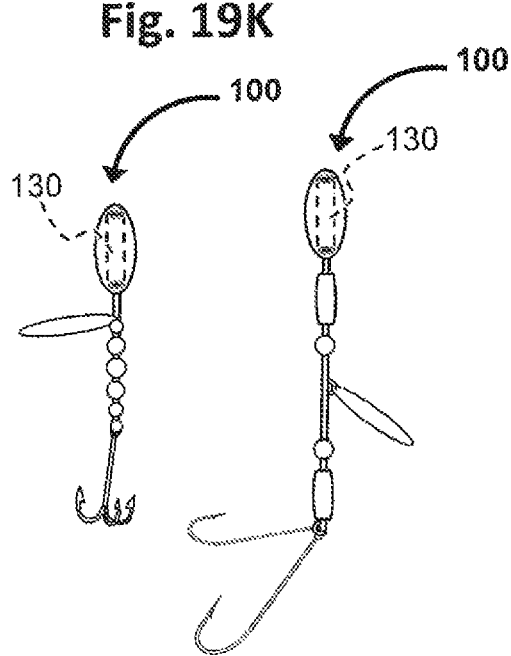
FIG. 19K is a side perspective view showing a plurality of aspects of inventive fishing lures of the present invention.
Figure 19L:
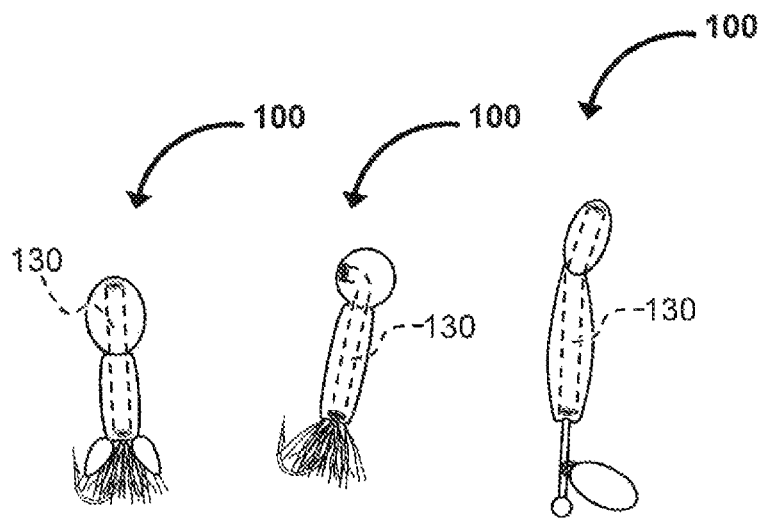
FIG. 19L is a side perspective view showing a plurality of aspects of inventive fishing lures of the present invention.
Figure 19M:
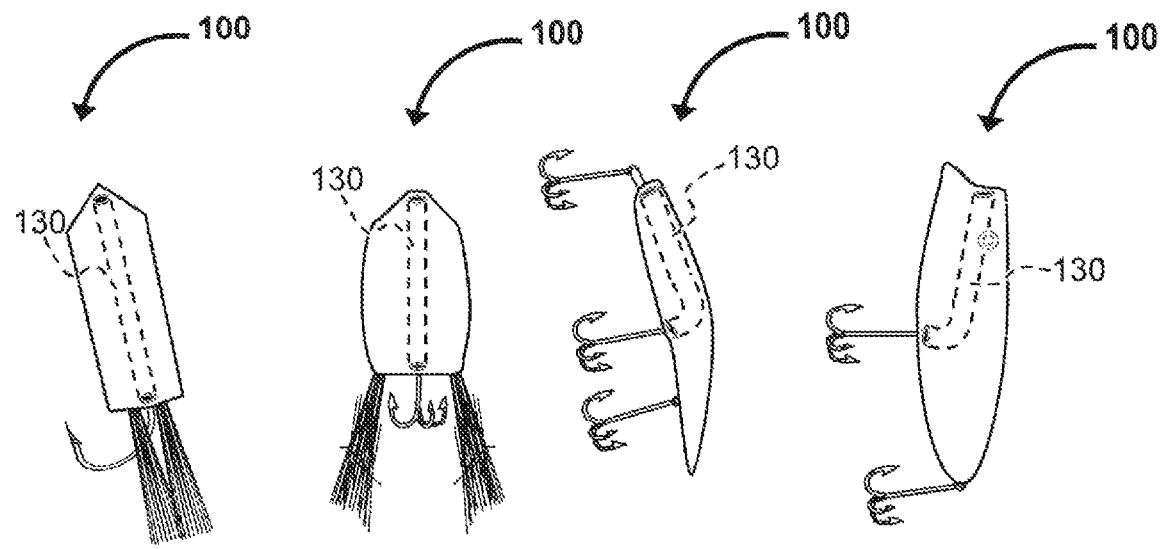
FIG. 19M is a side perspective view showing a plurality of aspects of inventive fishing lures of the present invention.
Figure 19N:
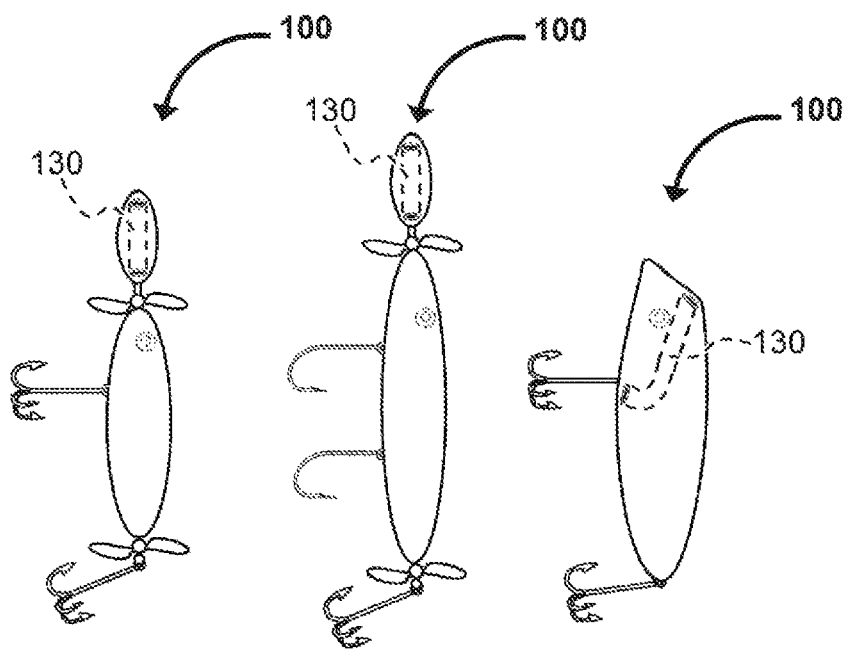
FIG. 19N is a side perspective view showing a plurality of aspects of inventive fishing lures of the present invention.
Figure 19O:
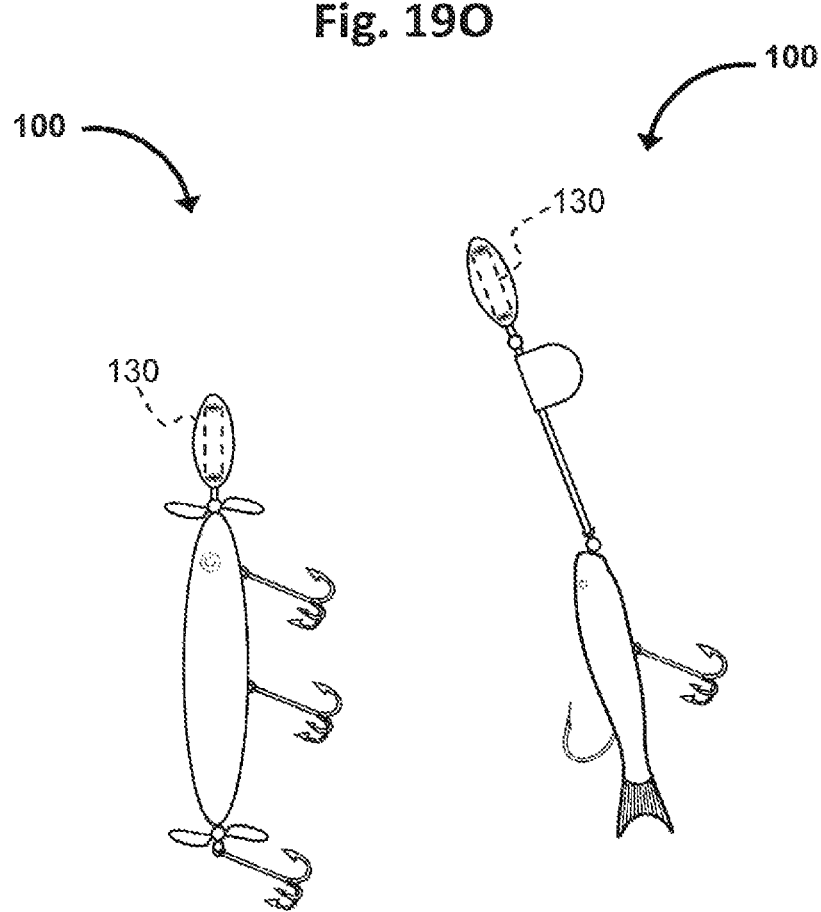
FIG. 19O is a side perspective view showing a plurality of aspects of inventive fishing lures of the present invention.
Figure 19P:
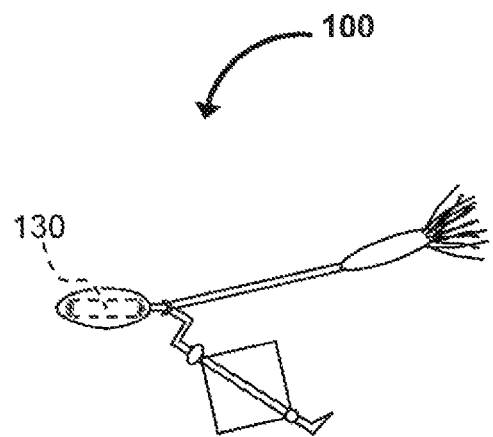
FIG. 19P is a side perspective view showing one aspect of an inventive fishing lure of the present invention.

FIGS. 2A-2D illustrate one variation of a preferred embodiment of the invention, which is shown in the non-limiting exemplary embodiment form of an inventive through-line jig 110. However, it should be understood that such select example embodiments are described herein for the purpose of brevity and conciseness of description, representing merely one variation of the invention of the present disclosure. Accordingly, the invention is not limited to embodiments in the form of a jig. Rather, the invention is suitable with respect to a variety of fishing devices and methods thereof to which the invention can be adapted. For example, as illustrated in FIGS. 19A-19P, other suitable types of fishing devices 100 can include, but are not limited to, fishing lures applicable for freshwater fishing (including ice fishing) and/or saltwater fishing, such as crank baits, spoons, spinning baits, casting plugs, and the like, for catching fish more effectively than conventional fishing lures, without departing from the scope of the invention. Moreover, using appropriate scales, materials and the like, the invention is also suitable for purposes other than fishing without departing from the scope of the invention. Therefore, specific details disclosed herein, such as relating to structure, function, and the like, are not to be interpreted as limiting in any manner whatsoever, but rather only as one of numerous example bases for claims and/or teaching persons having ordinary skill in the art to variously employ the present invention in any appropriately detailed structure or circumstance.

Referring now to FIGS. 2A-2D, in its most basic form, an inventive fishing lure 100 in the form of a jig 110 comprises a body component 120, a through-line element 130, and a hook component 150.

The body component 120 forms the main body of the inventive jig 110 and provides what may be considered as the primary focal base for the jig 110. For example, in some aspects, the body component 120 can provide a medium that defines the overall structural configuration of the jig 110. In other aspects, the body component 120 can provide a basis for one or more desired features and/or characteristics specific to the lure 100, such as size, shape, weight, buoyancy, surface smoothness, surface patterns, décor, and the like, without departing from the scope of the present invention.

Figure 2C:
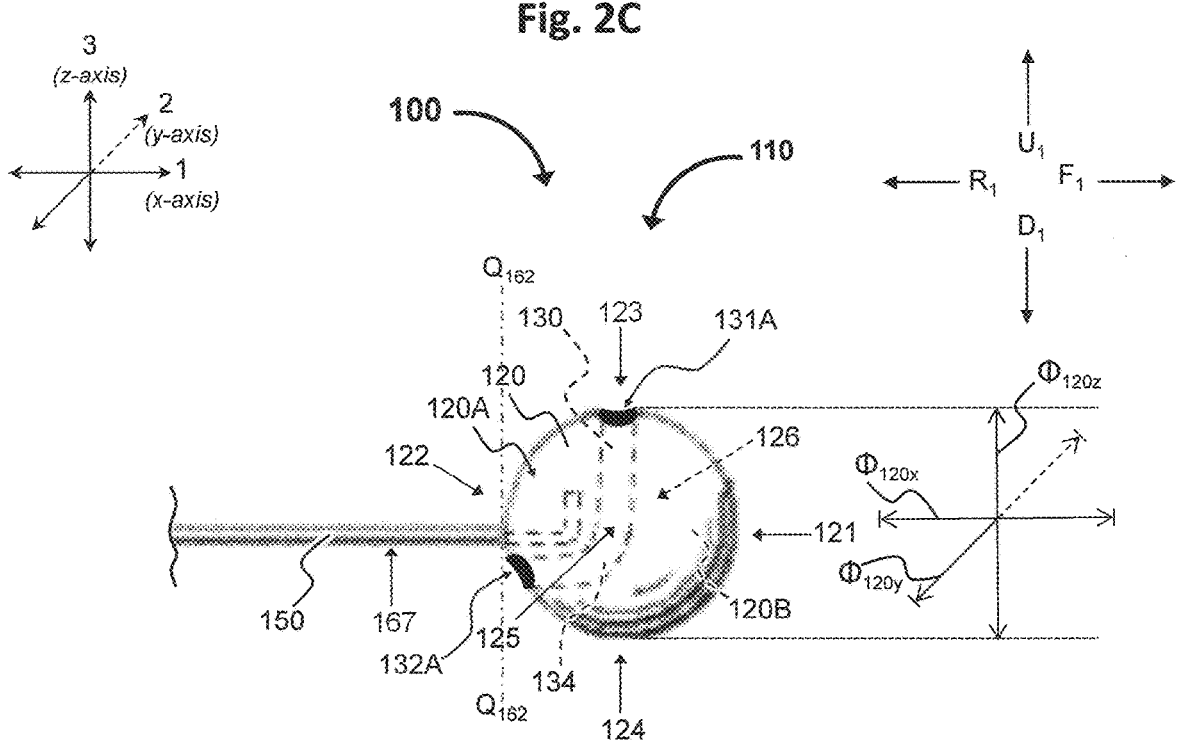
FIG. 2C is a partial side perspective view showing one aspect of an inventive fishing lure of the present invention in the form of a jig.
Figure 2D:
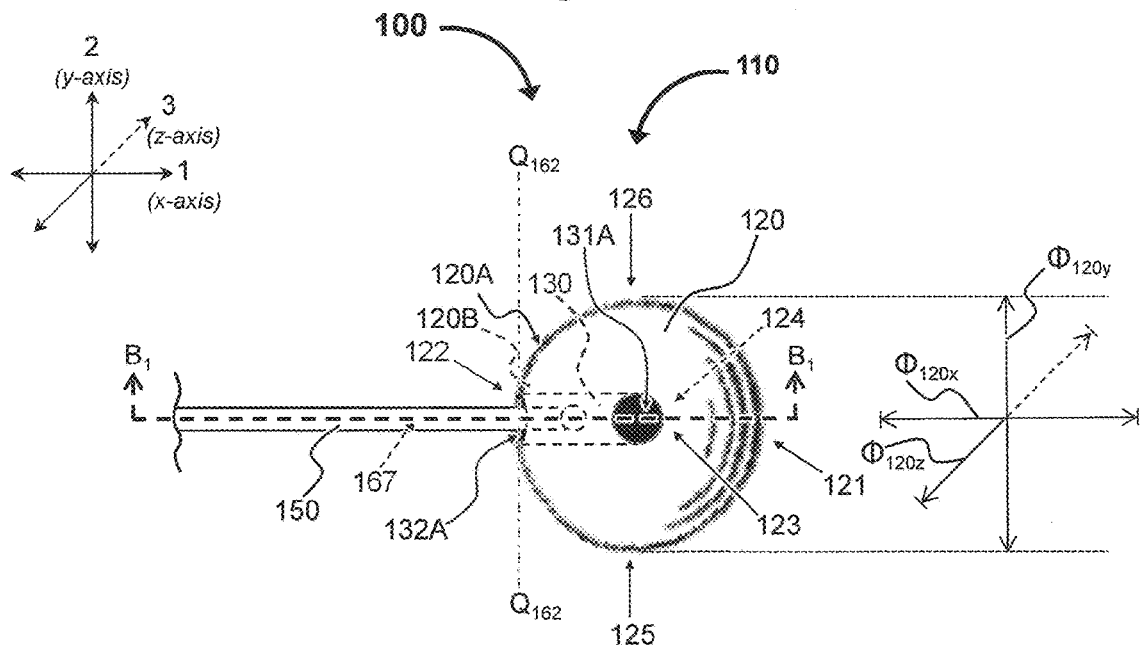
FIG. 2D is a partial top-side perspective view showing one aspect of an inventive fishing lure of the present invention in the form of a jig.

Referring now to FIGS. 2C-2D, the body component 120 of the illustrated example has a generally spherical shape, and is further defined by a diameter $\Phi_{120x}$ in the x-direction 1, a diameter $\Phi_{120y}$ in the y-direction 2, and a diameter $\Phi_{120z}$ in the z-direction 3. The body component 120 of this non-limiting example embodiment is shown to have a front side 121 and an opposing distal rear side 122 along the x-axis 1, a top side 123 and an opposing distal bottom side 124 along the z-axis 3, and a first side 125 and an opposing distal second side 126 along the y-axis 2. It should be understood that the general shape of the illustrated body component 120 is shown for exemplary purposes only, and the invention is not intended to be limited to such a generally spherical shape. Rather, such as illustrated in FIGS. 18A-18J and FIGS. 19A-19F for example, the body component 120 of the invention in the form of an inventive jig 110 can also include various other geometric shapes as may be desired or would be apparent to persons having ordinary skill in the art, such as elongated, ovaloid, ellipsoid, conical, bullet-shaped, egg-shaped, fish-shaped, insect-shaped, and the like, without departing from the scope of the present invention.

The body component 120 can be constructed from various materials as desired or as will be apparent to persons having ordinary skill in the art. In some aspects, the body component 120 can be constructed of a material having a density greater than that of water, such that the lure will tend to sink when present in water. In other aspects, the body component 120 can be constructed of a material having a density approximately equal to that of water, such that the lure will tend to substantially stabilize and remain at a desired depth when present in water. In still other aspects, the body component 120 can be constructed of a material having a density less than that of water, such that the lure will tend to float on the surface when present in water. In addition, the body component 120 can be constructed of a material which is preferably corrosion resistant and/or has an ability to withstand deformation due to external forces, such as from fish bites, abrasion from collisions with rocks, stress forces applied by tools such as when dislodging the jig 110 from a fish, and the like. Suitable materials for constructing the body component 120 include, but are not limited to, lead, titanium, steel, stainless steel, brass, tungsten, ceramic, glass, wood, cork, elastomeric polymers, polymethyl methacrylate (e.g., PLEXIGLAS), other suitable plastics, and the like, and combinations thereof. In one non-limiting exemplary aspect of the present invention, the body component 120 is constructed of lead.

Returning to FIGS. 2A-2D, the non-limiting example embodiment in the form of an inventive jig 110 is shown to further comprise a hook component 150. With additional reference to FIGS. 6A-6D, the hook component 150 has a first end 152, a second end 154 that is distal to the first end 152, a shank region 160A comprising a shank portion 160 (also referred to herein more simply as a "shank") and a curvilinear hook region 180A comprising a curvilinear hook portion 180 and a barbed element 190.

The shank 160, defined generally between line $Q_{161}$ and line $Q_{164}$, has a generally linear profile along its longitudinal axis $X_{160}$ and is defined by a first region 162 shown generally between line $Q_{162}$ and line $Q_{161}$, a second region 164 shown generally between line $Q_{164}$ and line $Q_{162}$, a first end 161 shown generally at line $Q_{161}$, and a second end 163 shown generally at line $Q_{164}$. The hook component 150 is configured such that the curvilinear hook portion 180, defined generally between line $Q_{164}$ and line $Q_{186}$, is integral with, and extends from, the second region 164 of the shank 160. The curvilinear hook portion 180 has a generally curvilinear profile along its longitudinal axis $X_{180}$ and is defined by a first linear region 182 shown generally between line $Q_{182}$ and line $Q_{164}$, a second linear region 186 shown generally between line $Q_{184}$ and line $Q_{186}$, and a curvilinear region 184 disposed therebetween shown generally between line $Q_{182}$ and line $Q_{184}$. The first linear region 182 has a substantially linear profile along its longitudinal axis $X_{182}$ and extends in a generally rearward direction $R_1$ from the second end 163 of the shank 160. The curvilinear region 184 then extends in a generally upward direction $U_1$ from the first linear region 182 and has a substantially arcuate profile wherein the curvature of the arcuate profile ranges from about 120° to about 200° relative to the longitudinal axis $X_{182}$ of the first linear region 182. The second linear region 186 has a substantially linear profile along its longitudinal axis $X_{186}$ and extends in a generally frontward direction $F_1$ from the curvilinear region 184. In addition, the second linear region 186 is shown to be spatially located above the first linear region 182. In some preferred aspects, the first linear region 182 and the second linear region 186 are arranged to be parallel relative to the other and/or coplanar in the x-z plane.

Coupled to the end 186A (shown generally at line $Q_{186}$ of the second linear region 186) is a barbed element 190. The barbed element 190 comprises a frontward-facing $F_1$ first end 192 and a second end 194 that is shown to generally extend rearward $R_1$ and downward $D_1$ from the first end 192. In some aspects, the curvilinear hook portion 180 is configured such that the first end portion 192 of the barbed element 190 is integral with the end 186A of the second linear region 186, and the second end 194 of barbed element 190 extends along the bottom side 187 of the second linear region 186 in a rearward direction $R_1$ while angling away from the second linear region 186 in a downward direction $D_1$, such that the second end 194 of the barbed element 190 is spaced apart from the bottom side 187 of the second linear region 186. In some desirable aspects, the first end 192 of the barbed element 190 can be sharpened to form a hook point 113 at the second end 154 of the hook component 150, which can enhance the ability of the hook component 150 to embed itself within the body of a fish. In some aspects, it may be desirable that the barbed element 190 is constructed from the same material utilized to construct the curvilinear hook portion 180, though it need not be.

In some aspects, the hook component 150 can be constructed from a single element (e.g., a metal wire), though it need not be. In some aspects, the hook component 150 can be constructed of a material having a density greater than that of water. In other aspects, the hook component 150 can be constructed of a material having a density that is approximately equal to that of water. In still other aspects, the hook component 150 can be constructed of a material having a density that is less than that of water. In some desirable aspects, the hook component 150 can be constructed of a material having an ability to withstand deformation due to external forces, such as fish bites, abrasion from rocks, stress forces applied by tools (e.g., needle-nose pliers) such as when dislodging the jig 110 from a fish, and the like. In other desirable aspects, the hook component 150 can be constructed of a material having an ability to withstand decomposition, such as due to oxidation. Many different materials can be used to satisfy the foregoing characteristics. For instance, in one non-limiting exemplary aspect, stainless steel can be a particularly preferred material. However, it should be understood that any suitable variations of the foregoing aspects, as may be desired or would be apparent to persons having ordinary skill in the art, are also contemplated herein without departing from the scope of the invention.

In some preferred embodiments, the inventive jig 110 is configured such that the first region 162 of the shank 160 is disposed within the body component 120. In some desirable aspects, the hook component 150 protrudes from the exterior surface 120A of the rear side 122 of the body component 120. In further aspects, the hook component 150 extends in a rearward direction $R_1$ from the body component 120.

Referring now to FIGS. 7A-7F, in some desirable aspects, the shank 160 of the hook component 150 extends from the approximate axial center (further defined above) of the body component 120, as shown by line C-C. However, it is also recognized herein that certain factors, such as alternative body component 120 shapes, particular fishing needs, user preferences, etc., may influence the location of the shank 160 within the body component 120 which may not be the approximate axial center of the body component 120. Thus, it should be understood that the shank 160 of the hook component 150 can alternatively be offset from the approximate axial center of the body component 120 (hereinafter may also be referred to as an "offset configuration") without departing from the scope of the invention. Accordingly, it is contemplated herein that the shank 160 of the hook component 150 can alternatively extend from the body component 120 at any suitable point along the surface 120A ranging from the approximate axial center along the x-axis 1 to the 360 square-degree outer perimeter of the body component 120, as generally defined by the surface area located between line $M_0$-$M_0$ and line $M_2$-$M_2$, without departing from the scope of the invention.

In some desirable aspects, the inventive jig 110 is configured such that the longitudinal axis $X_{160}$ of the shank 160 is substantially congruent to the approximate axial center C-C of the body component 120. However, it should be understood that the inventive jig 110 can be configured such that the longitudinal axis $X_{160}$ of the shank 160 is angular to the horizontal axial center C-C (hereinafter may also be referred to as an "angular configuration") without departing from the scope of the invention. Thus, it is further contemplated herein that the shank 160 of the hook component 150 can alternatively extend in a generally rearward direction $R_1$ at an angle with respect to the approximate axial center C-C. Accordingly, the shank 160 of the hook component 150 can alternatively extend from the surface of the body component 120 at any suitable point along the exterior surface 120A of the body component 120, desirably ranging from the approximate axial center C-C to the 360 square-degree outer perimeter of the body component 120, as generally defined by the surface area located between line $M_0$-$M_0$ and line $M_2$-$M_2$, without departing from the scope of the invention.

Referring now to FIGS. 8A-8E, in some preferred embodiments, the first end 152 of the hook component 150 is disposed, and terminates, within the body component 120, such that the first end 152 does not protrude through the exterior surface 120A of the body component 120. In some instances, such configuration can provide desired benefits, such as enhancing structural stabilization, reducing surface obstructions, improving mobility, reducing snagging, and the like. Other benefits of such configuration will become apparent to persons having ordinary skill in the art. However, it should be understood that in other aspects, the first end 152 of the hook component 150 can protrude through the exterior surface 120A of the body component 120 without departing from the scope of the invention.

In some aspects, the first end 152 of the hook component 150 can be disposed within the rear ¾ portion of the body component 120, as defined by lines $M_0$-$M_0$ and $M_3$-$M_3$. In other aspects, the first end 152 of the hook component 150 can be disposed within the rear ½ portion of the body component 120, as defined by lines $M_0$-$M_0$ and $M_2$-$M_2$. Instill other aspects, the first end 152 of the hook component 150 can be disposed within the rear ¼ portion of the body component 120, as defined by lines $M_0$-$M_0$ and $M_1$-$M_1$. In yet other aspects, the first end 152 of the hook component 150 can be disposed within the portion of the body component 120 as defined by lines $M_1$-$M_1$ and $M_3$-$M_3$. In still other aspects, the first end 152 of the hook component 150 can be disposed within the portion of the body component 120 as defined by lines $M_1$-$M_1$ and $M_2$-$M_2$.

In some desirable aspects, the hook component 150 is configured such that the shank 160, the curvilinear hook portion 180, and the barbed element 190 are coplanar in the x-z plane. However, it is contemplated herein that the shank 160, the curvilinear hook portion 180, and the barbed element 190 can have any suitable spatial configuration as desired or would be apparent to persons having ordinary skill in the art without departing from the scope of the invention.

Referring now to FIGS. 9A-9F, in some embodiments of the present invention, the hook component 150 can comprise an optional interlocking member 170. As used herein, the primary function of the interlocking member 170 is to prevent the hook component 150 from becoming loose, reoriented or dislodged from the body component 120. In its broadest form, the interlocking member 170 comprises any element that stabilizes the hook component 150 within the body component 120, more particularly the first region 162 of the shank 160 disposed within the body component 120, via locking, blocking, friction, and the like. Accordingly, the interlocking member 170 can be in the form of a modification to the first region 162 of the shank 160.

Figure 9F:
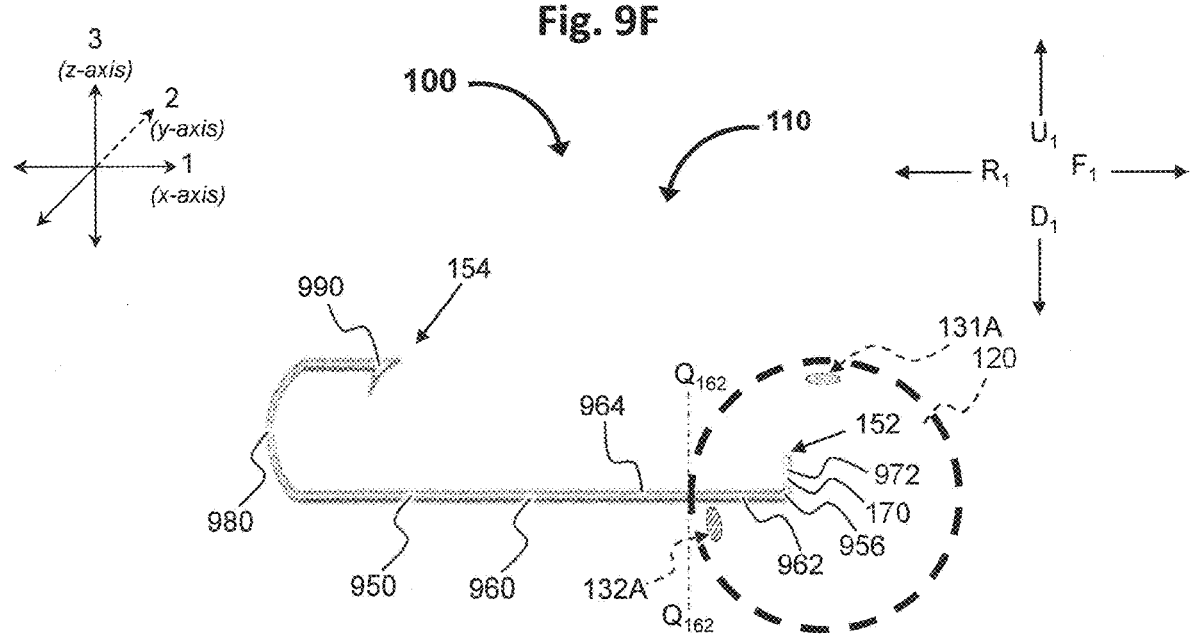
FIG. 9F is a side view showing one aspect of an inventive fishing lure of the present invention in the form of a jig comprising an optional interlocking member formed from a severed hooking component of a conventional jig.

With additional reference to Comparative FIGS. 1C-1D, in one non-limiting exemplary embodiment, the interlocking member 170 can be formed by cutting and removing the eyelet 940 and the upper region 974 of the vertical shaft portion 970, and optionally a portion of the lower region 972 of the vertical shaft portion 970 of a hooking component 950 from a conventional jig 910, thus forming an "L"-shaped interlocking member 170 (see e.g., FIG. 9F). It should be understood that although the hooking component 950 is illustrated as being arranged so that the remaining portion of the lower region 972 generally forms a 90° angle to form an L-shaped element, it should be understood that the bend 956 can be adjusted such that the angle may be varied from about 0° to about 180° without departing from the scope of the invention.

Continuing with FIGS. 9A-9F, in some aspects, the interlocking member 170 can be in the form of an augmentation (further defined above) to the first region 162 of the shank 160, disposed along the first region 162 and/or adjacent (further defined above) the end 161 thereof, to form an augmentative interlock feature 171. As more particularly illustrated in FIGS. 9A-9D, examples of an augmentative interlock feature 171 include, but are not limited to, extensions, elbows, L-shaped elements, Y-shaped elements, multi-dimensional elements (e.g., x-, y- and/or z-directions), tees, pinheads, bumps, eyelets, spatulas, spirals, and the like, and combinations thereof.

In other aspects, the interlocking member 170 can be in the form of a subtraction (further defined above) from the first region 162 of the shank 160 to form a subtractive interlock feature 173. As more particularly illustrated in FIG. 9E, examples of a subtractive interlock feature 173 include, but are not limited to, holes, slits, notches, grooves, roughened areas, and the like, and combinations thereof.

Continuing with FIGS. 9A-9F, it may be desirable that an inventive jig 110 includes an optional interlocking member 170 for configurations where the hook component 150 is otherwise susceptible to dislodging from the body component 120, such as when the first region 162 of the shank 160 has a substantially linear profile along the entirety of its longitudinal axis $X_{162}$ (i.e., the first region 162 of the shank 160 has a substantially straight rather than curvilinear profile). In other aspects, an optional interlocking member 170 can be desirable where the first region 162 of the shank 160 has a substantially consistent cross-sectional length (i.e., diameter) along the entirety of its longitudinal axis $X_{162}$ (i.e., the thickness of the first region 162 of the shank 160 is substantially consistent). In still other aspects, an optional interlocking member 170 can be desirable where the first region 162 of the shank 160 has a consistently smooth outer surface (relative to the adjacent interface (further defined above) of the body component 120) over the entirety of its longitudinal axis $X_{162}$.

In some aspects, the first region 162 of the shank 160 can have a single interlocking member 170. In other aspects, the first region 162 of the shank 160 can include one or more augmentative interlock features 171. In yet other aspects, the first region 162 of the shank 160 can include one or more subtractive interlock features 173. In still other aspects, the first region 162 of the shank 160 can include a combination of augmentative interlock features 171 and subtractive interlock features 173.

In some aspects, the inventive jig 110 of the present disclosure can include an interlock feature alternative (not shown) for preventing the hook component 150 from dislodging from its desired position within the body component 120. Examples of an interlock feature alternative include, but are not limited to, adhesives, bezels, ring clamps, grommets, latches, and the like, and combinations thereof. For example, it may be desirable to include an adhesive (e.g., epoxies, glues, adhesive tape, hook-and-loop, etc.) to help secure the shank 160 to the body component 120. When present, such adhesive would then be permitted to cure (if applicable) and form a securing force prior to using the inventive jig 110 for any fishing operations. Desirably, an interlock feature alternative will be located at least proximate (further defined above) to the interface formed by the first region 162 and the body component 120.

It is contemplated herein that even with the aid of an interlock feature alternative (such as described above), aspects of the invention without an optional interlocking member 170 (i.e., relying on an interlock feature alternative alone) would be subject to failure at a greater level than aspects which include an interlocking member 170. Therefore, in some preferred aspects, the invention can include at least one optional interlocking member 170 for improved benefits. In other aspects, the invention can include both an interlocking member 170 and an interlock feature alternative without departing from the scope of the invention.

Returning now to FIGS. 2A-2D, and with additional reference to FIGS. 3A-3H, the inventive fishing lure 100

(shown in the form of a jig 110 in this example embodiment) further comprises a novel through-line element 130 disposed within the body component 120. In its most basic form, the through-line element 130 provides, inter alia, a passageway within the body component 120 through which a fishing line can pass. Accordingly, the through-line element 130 can be useful for, inter alia, guiding a fishing line 105 through the body component 120 and routing said fishing line 105 to the second region 164 of the shank 160 portion of the hook component 150, while simultaneously encasing the fishing line 105 to provide additional benefits, such as protection of the fishing line 105 from abrasion (further defined above) and/or other such damage when disposed therethrough. In some aspects, the through-line element 130 can include one or more desirable physical properties (e.g., surface smoothness, lack of sharp edges, lack of abrasions, etc.) which will further minimize or eliminate abrasion and/or other such damage to a fishing line 105 when such fishing line 105 is in contact therewith.

In some preferred embodiments, the through-line element 130 has a generally hollow, tubular structure which extends through the body component 120 and includes a first end 131, a second end 132, and a longitudinal length $L_{130}$ (i.e., the distance as measured from the first end 131 to the second end 132 along the longitudinal axis $X_{130}$). The through-line element 130 further comprises an interior wall structure 133A which provides an interior wall surface 133B, and includes a cross-sectional length $\Phi_{130}$ (i.e., diameter) at any given point along the longitudinal length $L_{130}$, thus forming an interior volume 133 over the longitudinal length $L_{130}$ (see e.g., FIG. 3B). Disposed at the first end 131 and the second end 132 are a first opening 131A and a second opening 132A, respectively.

In some non-limiting exemplary embodiments, the illustrated through-line element 130 has a generally cylindrical shaped interior profile. However, while a through-line element 130 having a generally cylindrical-shaped profile has been illustrated, the invention is not limited to any particular shaped tubular profile. Rather, the term "tubular" as used with respect to a through-line element 130 can include any premeditated-shaped profile (e.g., cubic, triangular, rectangular, ovaloid, hexagonal, star-shaped, etc.) and/or random-shaped profile (see e.g., FIG. 3D). Accordingly, it should be understood that any suitable interior shape profile of the through-line element 130 is also contemplated herein without departing from the scope of the invention, and therefore the interior shape profile of the through-line element 130 should not be considered to be a limiting factor thereof.

Continuing with FIGS. 2A-3H, in the illustrated non-limiting exemplary embodiments, the first end 131 (and first opening 131A) of the through-line element 130 is preferably positioned to be frontward $F_1$ of the second end 132 (and second opening 132A). In some preferred embodiments, the second opening 132A is located on the rear side 122 of the body component 120. In other preferred embodiments, the second opening 132A is located proximate to the shank 160, and more preferably located adjacent to the shank 160 to provide improved benefits. In some desirable aspects, the second opening 132A is disposed on the rear side 122 of the body component 120 proximate or adjacent to the bottom side 167 of the shank 160. However, in other aspects, the second opening can be located at any other point around the 360° perimeter of the shank, without departing from the scope of the invention.

In some aspects, the entire longitudinal length $L_{130}$ of the through-line element 130 can be substantially disposed within the body component 120. In other aspects, at least a portion of the through-line element 130 can be disposed within the body component 120. In still other aspects, at least a portion of the through-line element 130 can be disposed outside of (i.e., exterior with respect to) the body component 120. In yet other aspects, the body component 120 may not be contiguous within the interior 120B of the body component 120, such as between the exterior surface 120A proximate to the first opening 131A and the exterior surface 120A proximate to the second opening 132A for instance (e.g., a body component 120 comprising additional openings, holes, slits, layers, laminates, multiple sections, multiple components, a plurality of body components, and the like, and combinations thereof). Accordingly, the through-line element 130 may include one or more sections or portions that are not substantially enclosed or contiguous within the body component 120 without departing from the scope of the invention.

In some preferred aspects, the first opening 131A and second opening 132A can provide the only access into the through-line element 130. However, in other aspects, the through-line element 130 can include additional access points without departing from the scope of the invention.

As referenced above, the first end 131 of the through-line element 130 comprises a first opening 131A. In some desirable aspects, the first opening 131A can provide an inlet (such as for a fishing line 105) into the body component 120 via the through-line element 130. In such aspects, the first opening 131A can be useful for, inter alia, providing access to the through-line element 130; introducing an object (e.g., a fishing line 105) into the through-line element 130; disposing an object (e.g., a fishing line 105) within the body component 120; guiding or routing an object (e.g., a fishing line 105) through the body component 120 via the through-line element 130; providing access to the second region 164 of the shank 160; securing the jig 110 at (or closer to) its center of gravity, as compared to conventional jigs 910; protecting an object (e.g., a fishing line 105) within the body component 120; and the like. Accordingly, the first opening 131A can provide an access point for entering into the through-line element 130 for a fishing line 105.

In general, the first opening 131A can be located at any suitable location as may be desired upon substantially the entire exterior surface 120A of the body component 120 (i.e., around the exterior periphery in the x-y-z dimensions). As illustrated, in some preferred embodiments, the inventive jig 110 is configured such that the first opening 131A is located relatively closer to the front side 121 of the body component 120 as compared to the location of the second opening 132A. For example, with additional reference to FIGS. 4A-4K, the first opening 131A can be disposed within regions of the body component 120 generally defined by lines $N_{310}$-$N_{310}$ and $N_{316}$-$N_{316}$, such as by lines $N_{310}$-$N_{310}$ and $N_{315}$-$N_{315}$, or by lines $N_{310}$-$N_{310}$ and $N_{314}$-$N_{314}$, or by lines $N_{310}$-$N_{310}$ and $N_{313}$-$N_{313}$, or by lines $N_{310}$-$N_{310}$ and $N_{311}$-$N_{311}$, or by lines $N_{311}$-$N_{311}$ and $N_{314}$-$N_{314}$, and the like, for improved benefits.

In some desirable aspects, the angle $\theta_{131}$ of the first end 131 (further defined above) of the through-line element 130 can generally range between 0° and 120°, such as between 30° and 110°, or between 45° and 100°, or between 60° and 90°, with respect to the horizontal central axis C-C as measured from the front of the body component 120. For example, in one non-limiting exemplary embodiment, the first opening 131A can be generally located at about line $N_{310}$-$N_{310}$, proximate to the front side 121 of the body component 120 (see e.g., FIG. 4G which illustrates the first end 131 disposed at an angle $\theta_{131}$ of about 0°). In another non-limiting exemplary embodiment, the first opening 131A can be located in the general region defined by lines $N_{311}$-$N_{311}$ and $N_{312}$-$N_{312}$ (see e.g., FIG. 4I which illustrates the first end 131 disposed at an angle $\theta_{131}$ of about 60°). In yet another non-limiting exemplary embodiment, the first opening 131A is located in the general region of line $N_{313}$-$N_{313}$ (see e.g., FIG. 4J which illustrates the first end 131 disposed at an angle $\theta_{131}$ of about 90°).

Returning now to FIGS. 2A-3H, the second end 132 of the through-line element 130 comprises a second opening 132A. In some desirable aspects, the second opening 132A can provide an outlet from the body component 120 via the through-line element 130. In such aspects, the second opening 132A can be useful for, inter alia, exiting an object (e.g., a fishing line 105) present within the through-line element 130 from the body component 120; grasping and pulling an object (e.g., a fishing line 105) through the body component 120 via the through-line element 130; providing access to the shank 160; guiding an object (e.g., a fishing line 105) to the second region 164 of the shank 160, securing said object (e.g., a fishing line 105) to the second region 164 of the shank 160 of the inventive jig 110 (e.g., a fishing line 105 via a knot 106); encasing a portion of said object (e.g., a fishing line 105 prior to the point of attachment to the shank 160) within the body component 120 (i.e., as opposed to said object being exposed upon the exterior surface 120A, or more simply exposed externally in general) to obtain improved benefits (e.g., minimizing abrasion and/or other such damage, enhancing strength, extending life during use, etc.) as compared to conventional jigs 910 under the same or similar conditions; securing the inventive jig 110 to a fishing pole 102 at (or closer to) said jig's center of gravity, as compared to conventional jigs 910; protecting an object (e.g., a fishing line 105) within the body component 120, such as during use; and the like. Accordingly, the second opening 132A can provide an egress from the through-line element 130 for a fishing line 105.

In general, the second opening 132A can be located at any suitable location as may be desired or would be apparent to persons having ordinary skill in the art upon substantially the entire exterior surface 120A of the body component 120 (i.e., around the exterior periphery in the x-y-z dimensions). As illustrated, in some preferred embodiments, the inventive jig 110 can be configured such that the second opening 132A is located relatively closer to the rear side 122 of the body component 120, more particularly closer to the shank 160, as compared to the location of the first opening 131A. For example, with additional reference to FIGS. 5A-5L, the second opening 132A can be disposed within regions of the body component 120 generally defined by lines $N_{326}$-$N_{326}$ and $N_{320}$-$N_{320}$, such as by lines $N_{326}$-$N_{326}$ and $N_{322}$-$N_{322}$, or by lines $N_{326}$-$N_{326}$ and $N_{323}$-$N_{323}$, or by lines $N_{325}$-$N_{325}$ and $N_{323}$-$N_{323}$, or by lines $N_{326}$-$N_{326}$ and $N_{324}$-$N_{324}$, or by lines $N_{326}$-$N_{326}$ and $N_{325}$-$N_{325}$, and the like, for improved benefits.

In some desirable aspects, the angle $\theta_{132}$ of the second end 132 (further defined above) of the through-line element 130 can generally range between 90° and 180°, such as between 120° and 180°, or between 150° and 180°, or between 160° and 180°, with respect to the horizontal central axis C-C as measured from the front of the body component 120. For example, in one non-limiting exemplary embodiment, the second opening 132A can be generally located at about line $N_{326}$-$N_{326}$, proximate to the rear side 122 of the body component 120 (see e.g., FIG. 5H which illustrates the second end 132 disposed at an angle $\theta_{132}$ of about) 180°. In another non-limiting exemplary embodiment, the second opening 132A can be located in the general region defined by lines $N_{326}$-$N_{326}$ and $N_{325}$-$N_{325}$ (see e.g., FIG. 5J which illustrates the second end 132 disposed at an angle $\theta_{132}$ of about 150°). In yet another non-limiting exemplary embodiment, the second opening 132A can be located in the general region defined by lines $N_{325}$-$N_{325}$ and $N_{324}$-$N_{324}$ (see e.g., FIG. 5K which illustrates the second end 132 disposed at an angle $\theta_{132}$ of about 120°).

In some preferred embodiments, the distance between the second opening 132A and the shank 160 can be minimized, such as within a distance of about 5 mm or less, or about 3 mm or less, or about 2 mm or less, or about 1 mm or less for improved benefits. Accordingly, with respect to such embodiments, configurations wherein the second opening 132A is located adjacent to the shank 160 (more preferably adjacent to the interface formed by the second region 164 and the exterior surface 120A of the body component 120) would be more desirable than configurations wherein the second opening 132A is located proximate to the shank 160. Advantages of such configurations include, inter alia, directing forces applied to the inventive fishing lure 100 during use relatively closer to the lure's center of gravity (e.g., for better control and/or performance of the lure), as well as minimizing exposure of an attached fishing line 105 from undesired external elements (e.g., fish bites, abrasion, etc.), which can ultimately result in improved strength and/or extended life of said fishing line 105.

Notwithstanding the foregoing, in other aspects of the present invention, a certain amount of distance between the second opening 132A and the shank 160 may be preferred. Accordingly, with respect to such aspects, configurations wherein the second opening 132A is located proximate to the shank 160 may be more desirable than configurations wherein the second opening 132A is located adjacent to the shank 160. Advantages of such configurations can include, inter alia, providing space for an additional element to be disposed adjacent to the shank 160 (e.g., a bait retainer, a collar, etc.), attaching an additional object (e.g., an additional attachment 114, such as a secondary hook, a spinner, etc.) to the exposed fishing line 105 between the second opening 132A and the shank 160, a user perception that providing such distance results in easier attachment of the fishing line 105 to the shank 160 (such as for tying a knot 106), and the like.

Figure 5H:
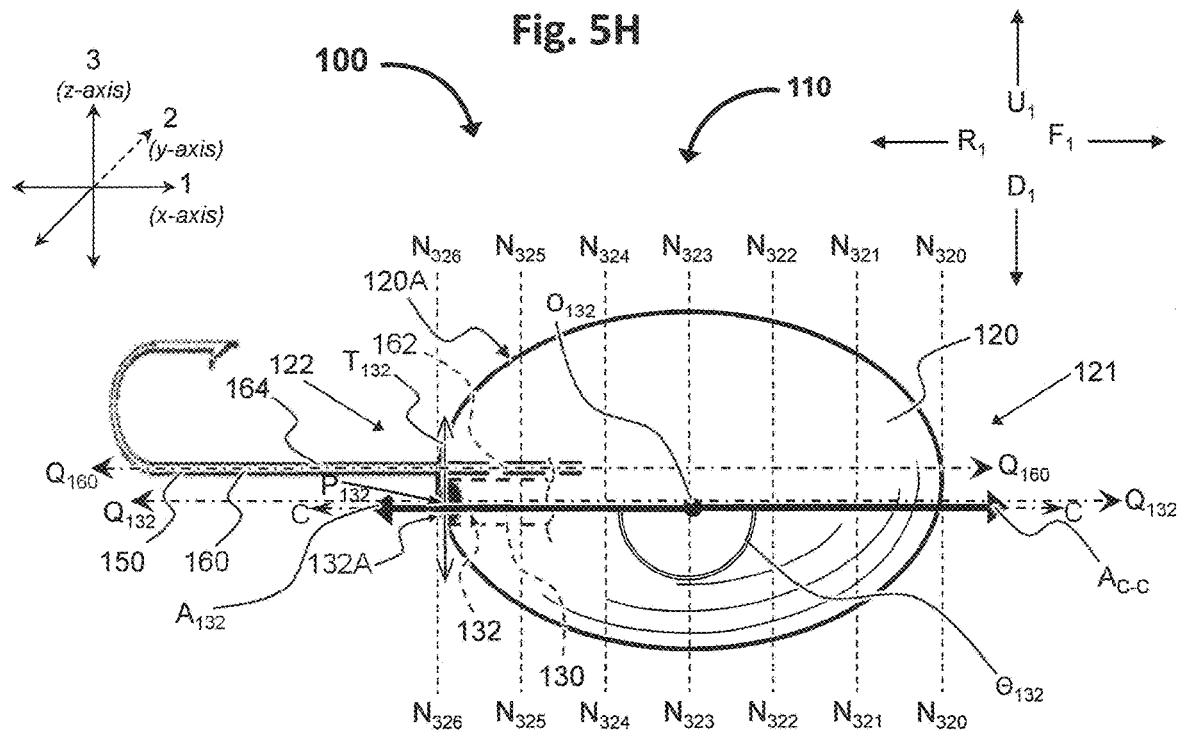
FIG. 5H is a side perspective view showing one aspect of an inventive fishing lure of the present invention in the form of a jig comprising a through-line element having a second end angle of approximately 180°.
Figure 5I:
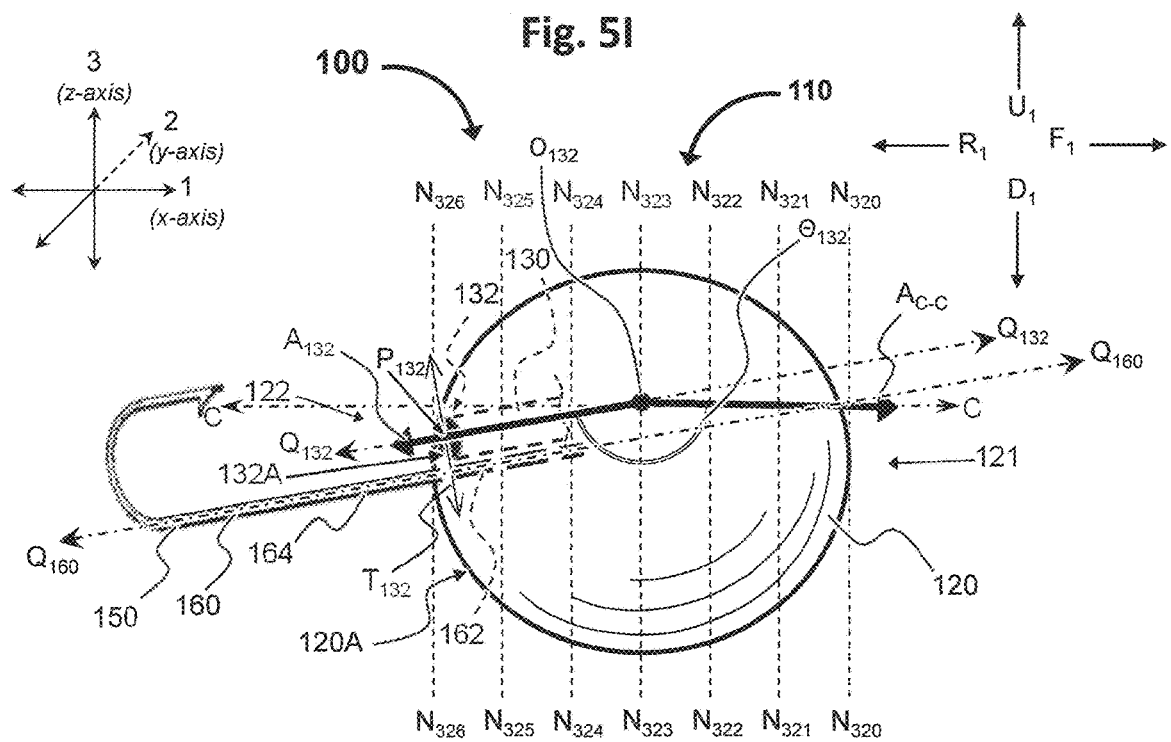
FIG. 5I is a side perspective view showing one aspect of an inventive fishing lure of the present invention in the form of a jig comprising a through-line element having a second end angle of approximately 180°.
Figures 5J, 5K:
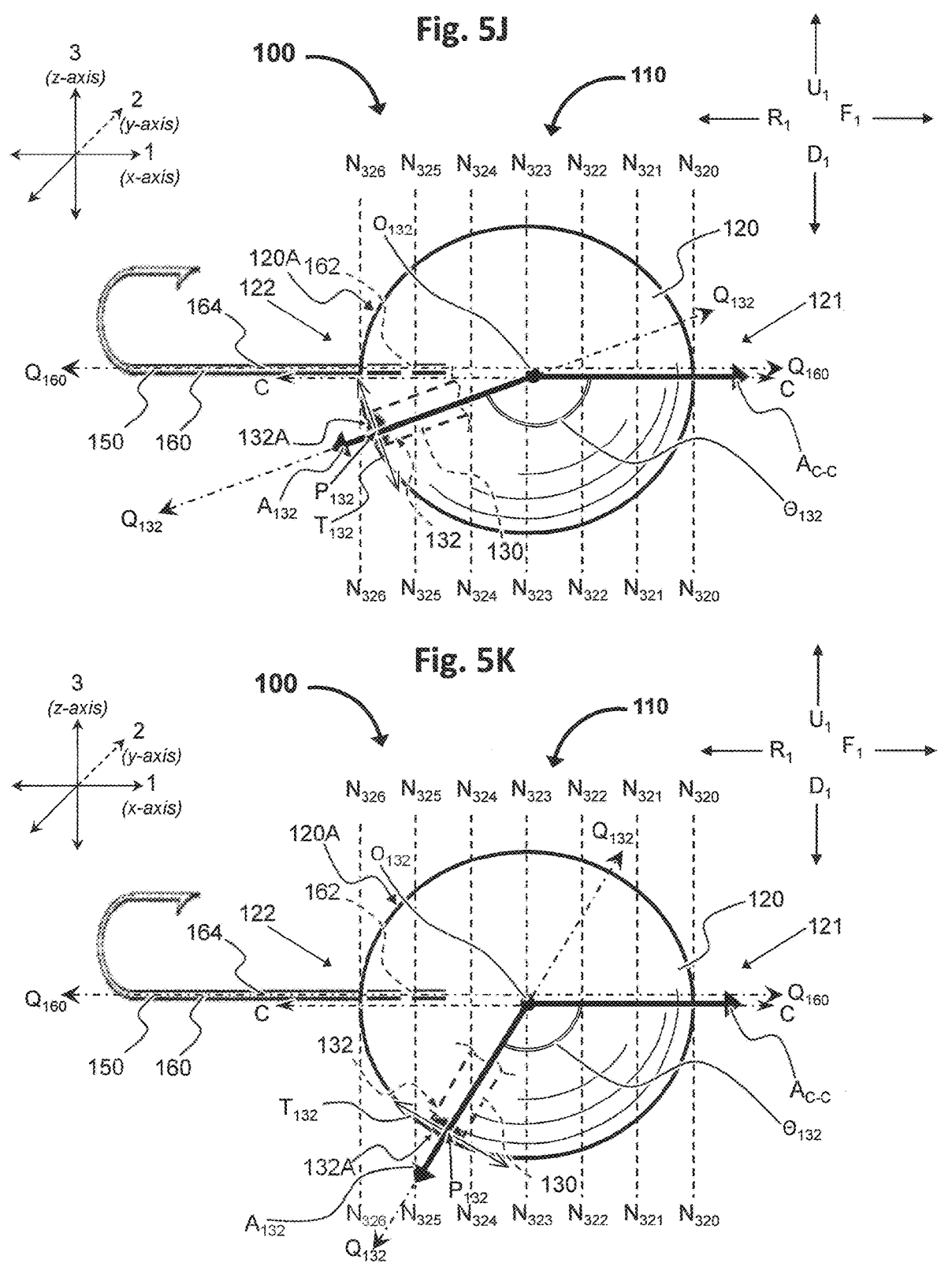
Figure 6A:
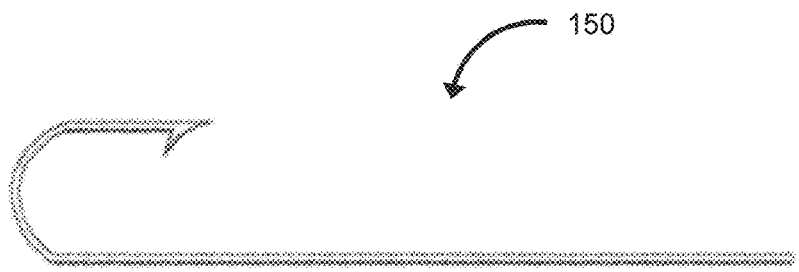
FIG. 6A is a side perspective view showing one aspect of a hook component suitable for an inventive fishing lure of the present invention.
Figure 6B:
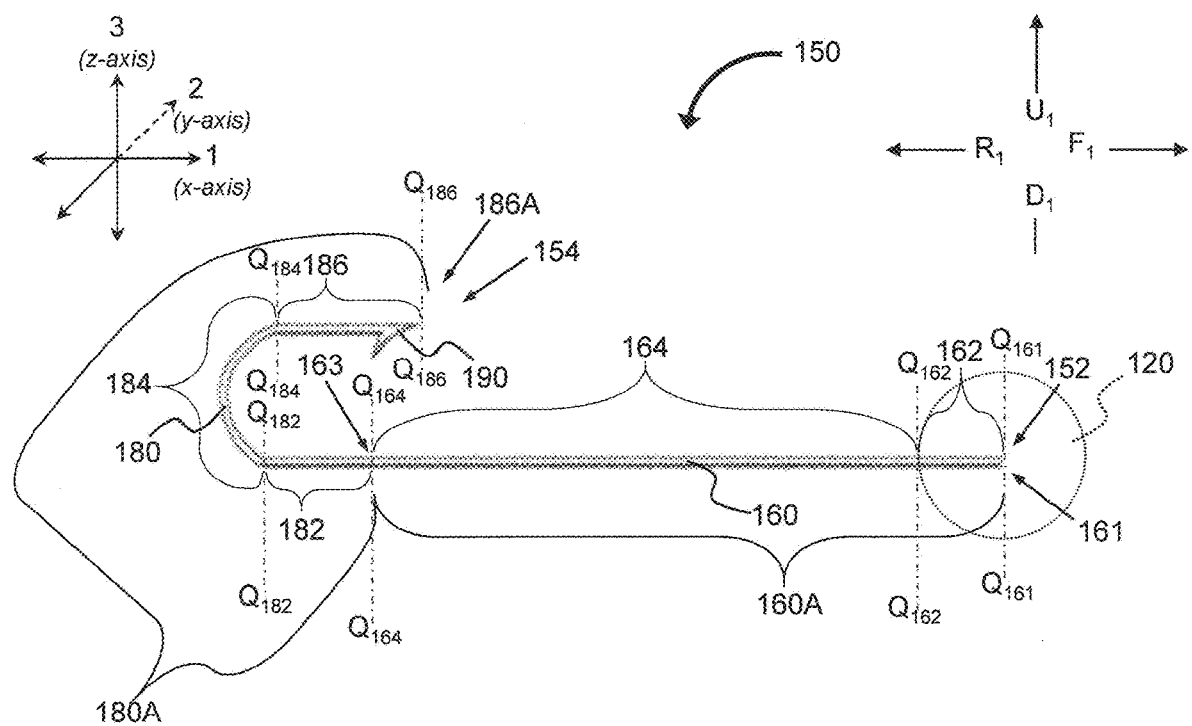
FIG. 6B is a side perspective view showing one aspect of a hook component suitable for an inventive fishing lure of the present invention.
Figure 6C:
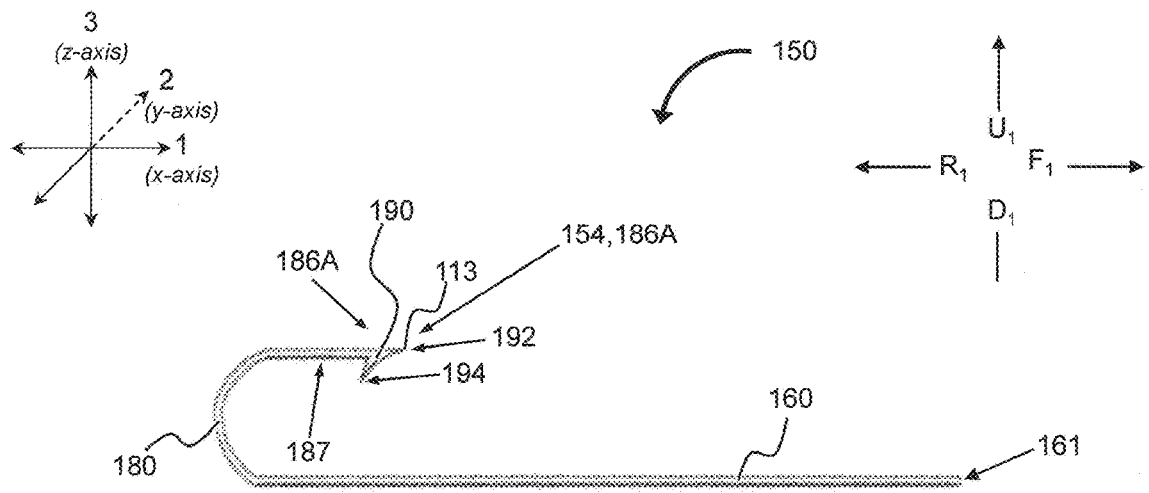
FIG. 6C is a side perspective view showing one aspect of a hook component suitable for an inventive fishing lure of the present invention.
Figure 6D:
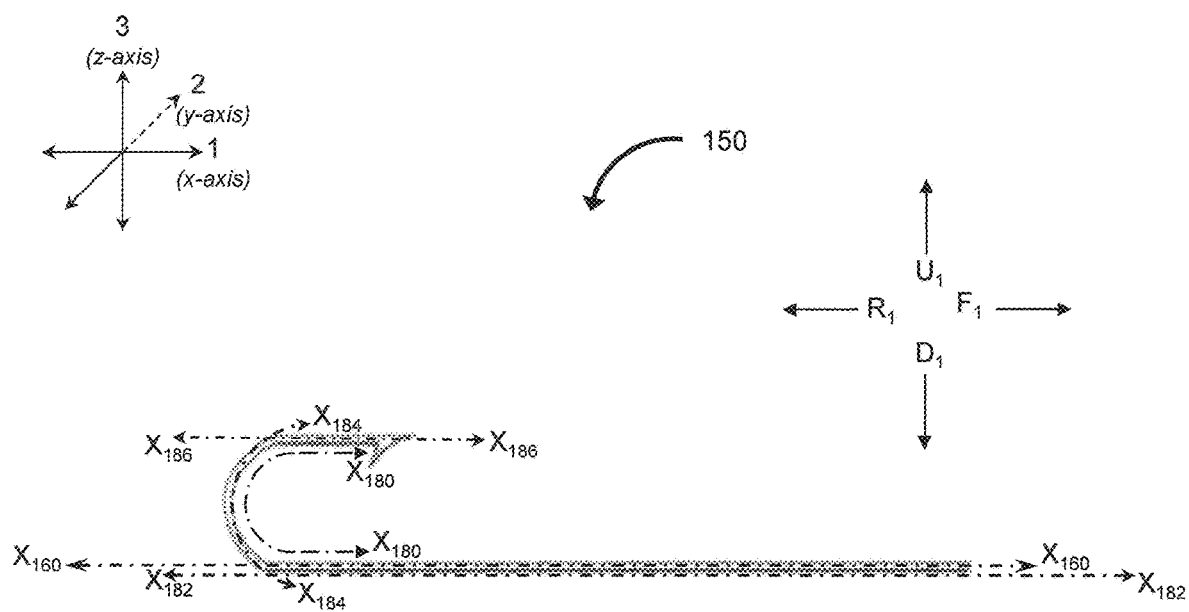
FIG. 6D is a side perspective view showing one aspect of a hook component suitable for an inventive fishing lure of the present invention.
Figure 7A:
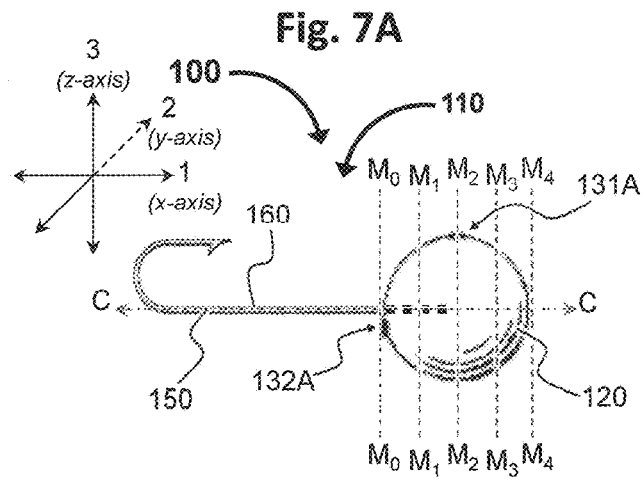
FIG. 7A is a side perspective view showing one aspect of an inventive fishing lure of the present invention in the form of a jig wherein the body component is divided into sections.
Figure 7B:
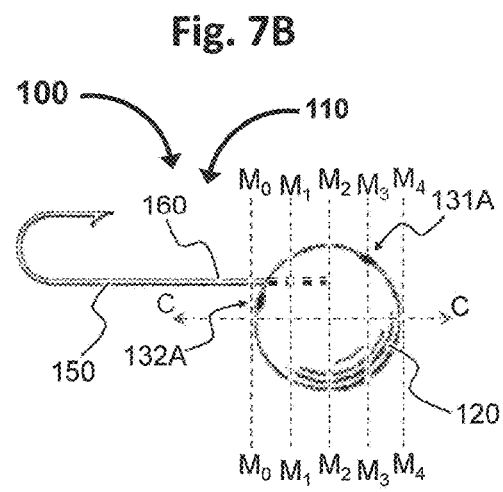
FIG. 7B is a side perspective view showing one aspect of an inventive fishing lure of the present invention in the form of a jig wherein the body component is divided into sections.
Figure 7C:
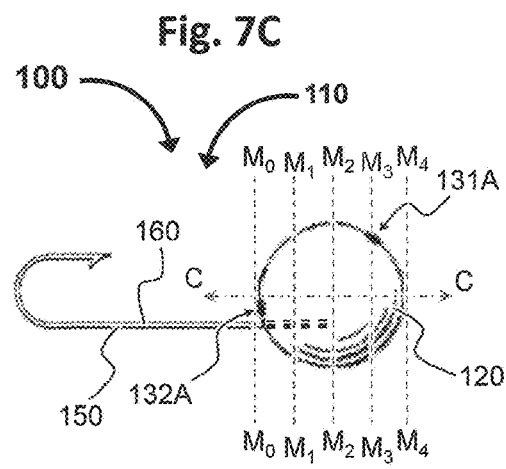
FIG. 7C is a side perspective view showing one aspect of an inventive fishing lure of the present invention in the form of a jig wherein the body component is divided into sections.
Figure 7D:
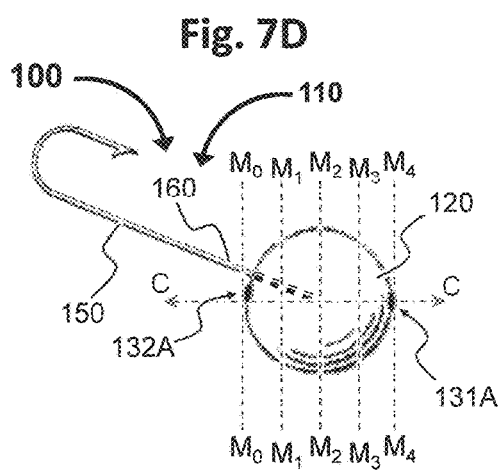
FIG. 7D is a side perspective view showing one aspect of an inventive fishing lure of the present invention in the form of a jig wherein the body component is divided into sections.
Figure 7E:
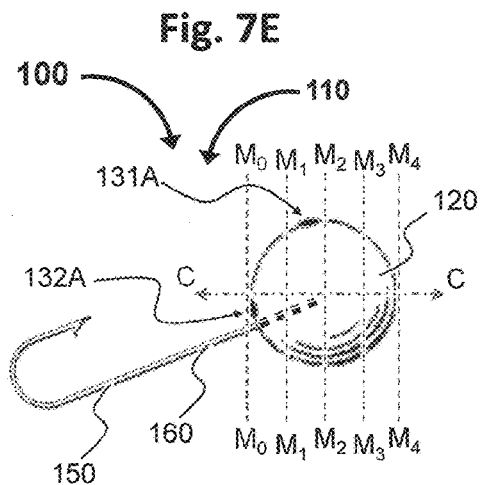
FIG. 7E is a side perspective view showing one aspect of an inventive fishing lure of the present invention in the form of a jig wherein the body component is divided into sections.
Figure 7F:
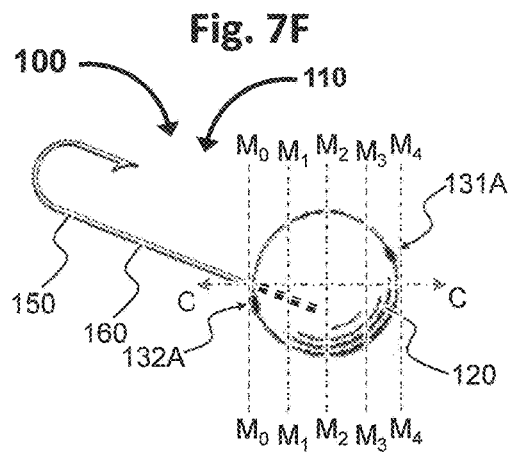
FIG. 7F is a side perspective view showing one aspect of an inventive fishing lure of the present invention in the form of a jig wherein the body component is divided into sections.

It should be understood that the distance between the second opening 132A and the shank 160 can be even greater (e.g., as illustrated in FIG. 5B, the opening 132A in the second end 132 of the through-line element 130 can be disposed at any point along the exterior periphery of the body component 120 between lines $N_{326}$-$N_{326}$ and $N_{320}$-$N_{320}$) without departing from the scope of the invention. However, although configurations having the opening 132A at the second end 132 positioned frontward $F_1$ of line $N_{323}$-$N_{323}$ (i.e., the longitudinal midpoint of the body component 120) fall within the scope of the invention of the present disclosure, it will be appreciated by persons having ordinary skill in the art that as the distance between the second opening 132A and the shank 160 increases, the potential exposure of fishing line 105 (i.e., the amount of fishing line exposed) to negative external elements also generally increases, thus making such exposed line 105 more susceptible to abrasion, severance and/or other damage. As a result, such configurations can potentially be less desirable (e.g., based on an analysis of the advantages versus disadvantages) as compared to aspects wherein the opening 132A at the second end 132 of the through-line element 130 is positioned generally at, or rearward $R_1$ of, line $N_{323}$-$N_{323}$ (see e.g., FIGS. 5D-5K).

Figure 3A:
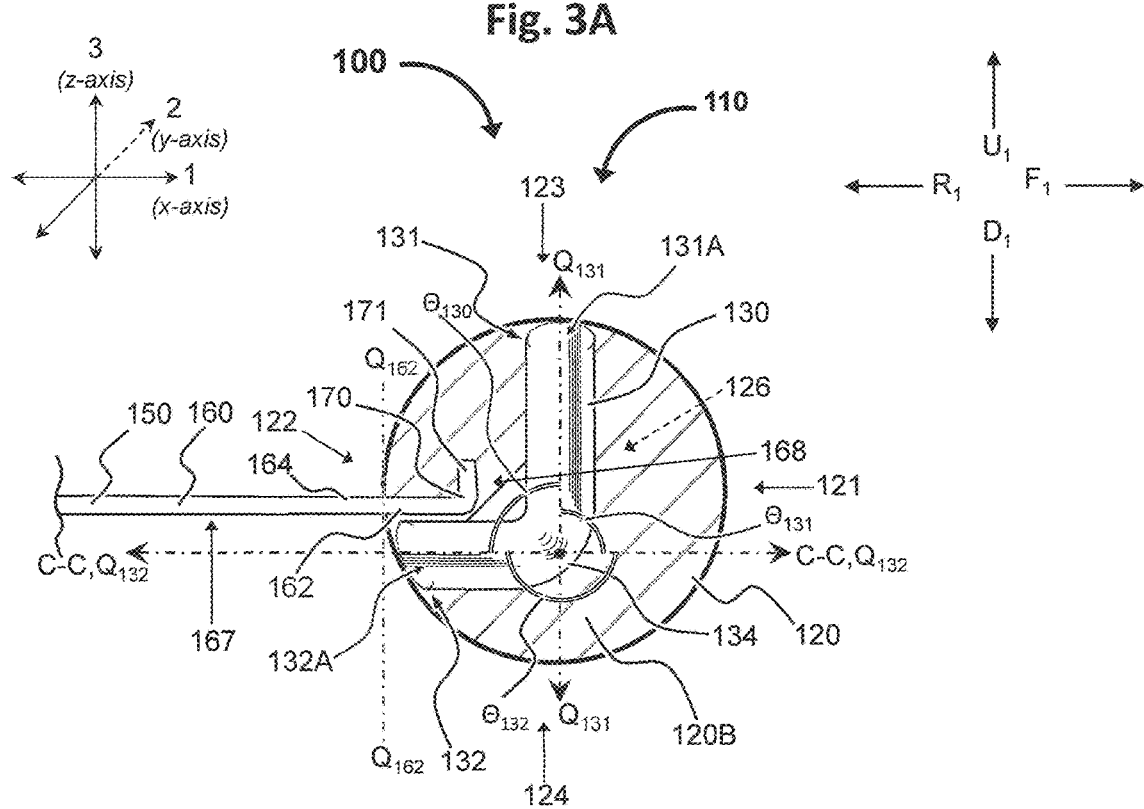
FIG. 3A is a cross-sectional view of FIG. 2D taken along line B1-B1 showing a through-line element having a bend angle of approximately 90°.
Figure 3B:
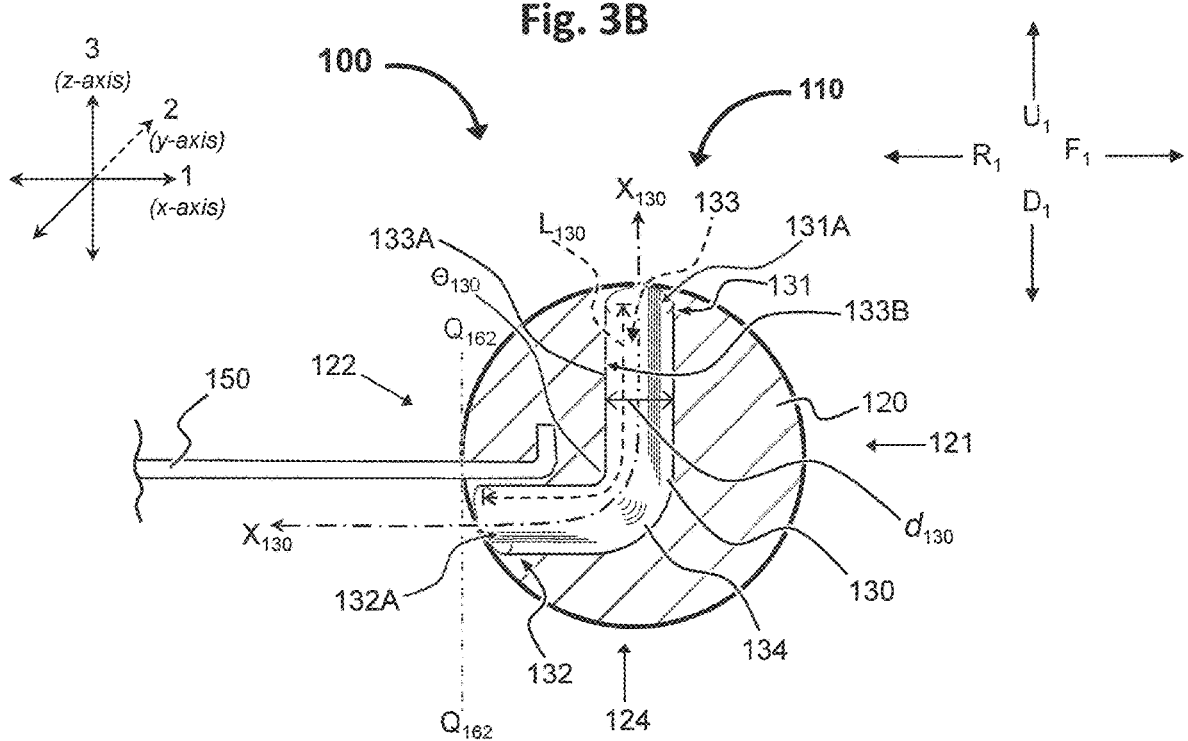
FIG. 3B is a cross-sectional view similar to FIG. 3A taken along line B1-B1 of FIG. 2D and showing a through-line element having a bend angle of approximately 90°.
Figure 3E:
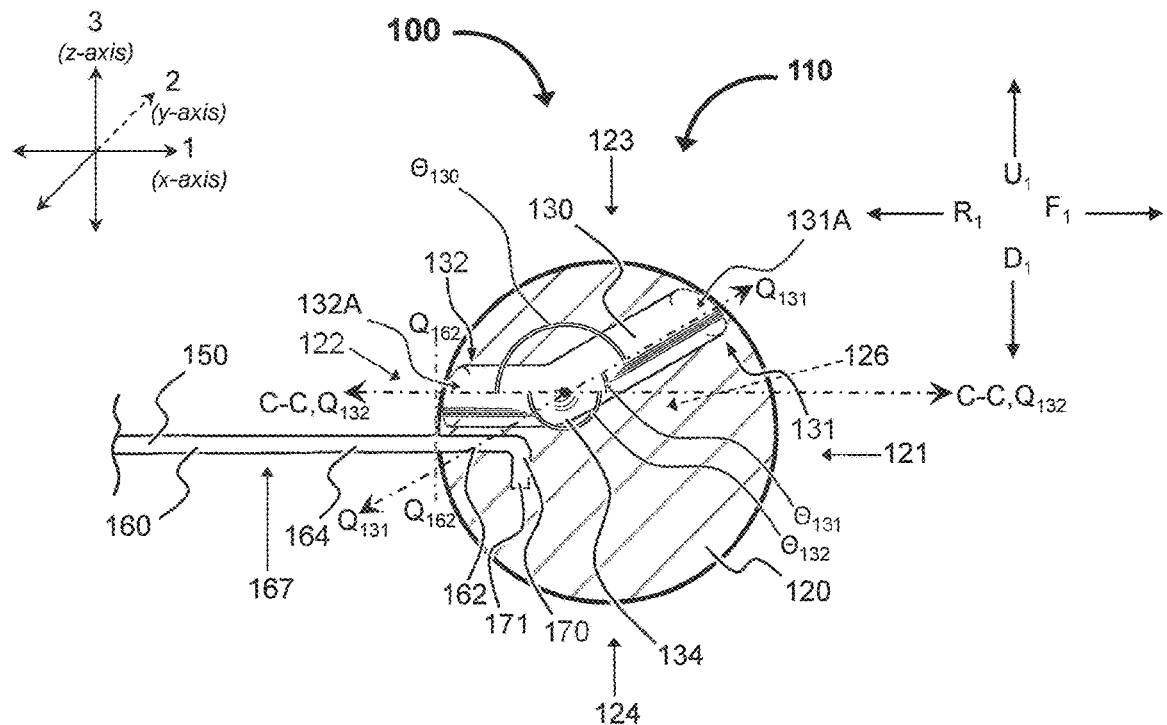
FIG. 3E is a cross-sectional view similar to FIG. 3A except showing a through-line element having a bend angle of approximately 30°.
Figure 3F:
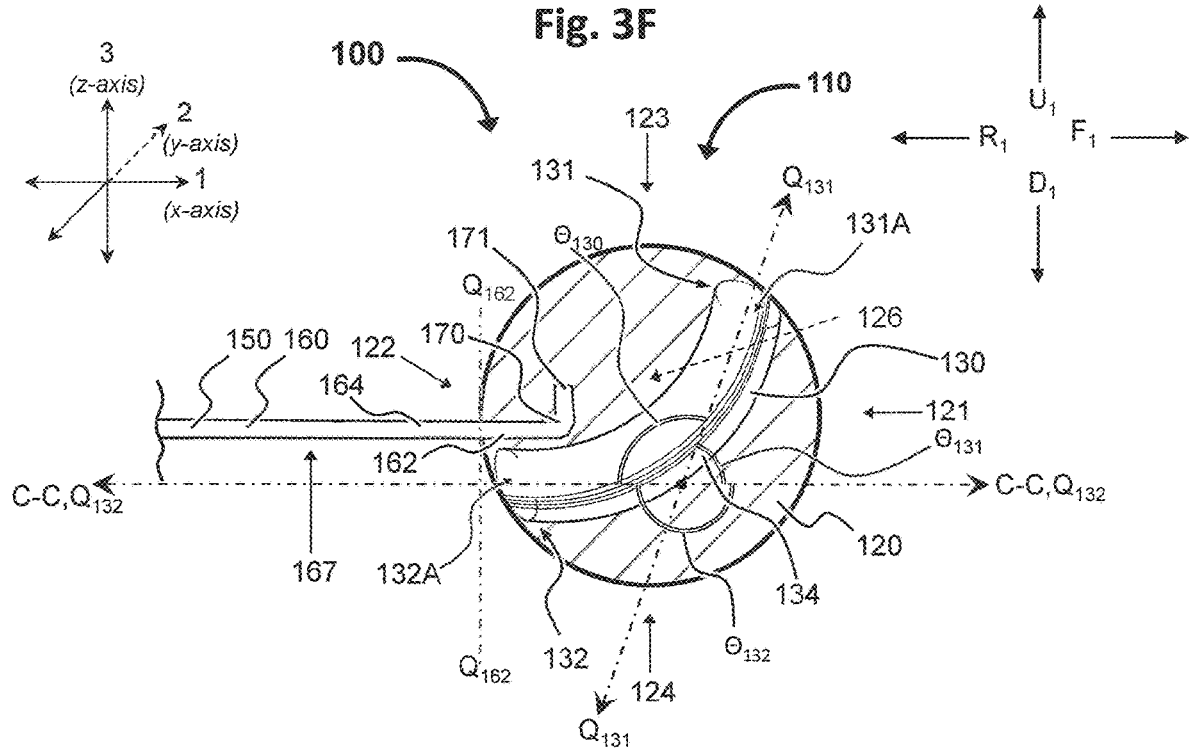
FIG. 3F is a cross-sectional view similar to FIG. 3A except showing a through-line element having a broad bend angle of approximately 60°.
Figure 3G:
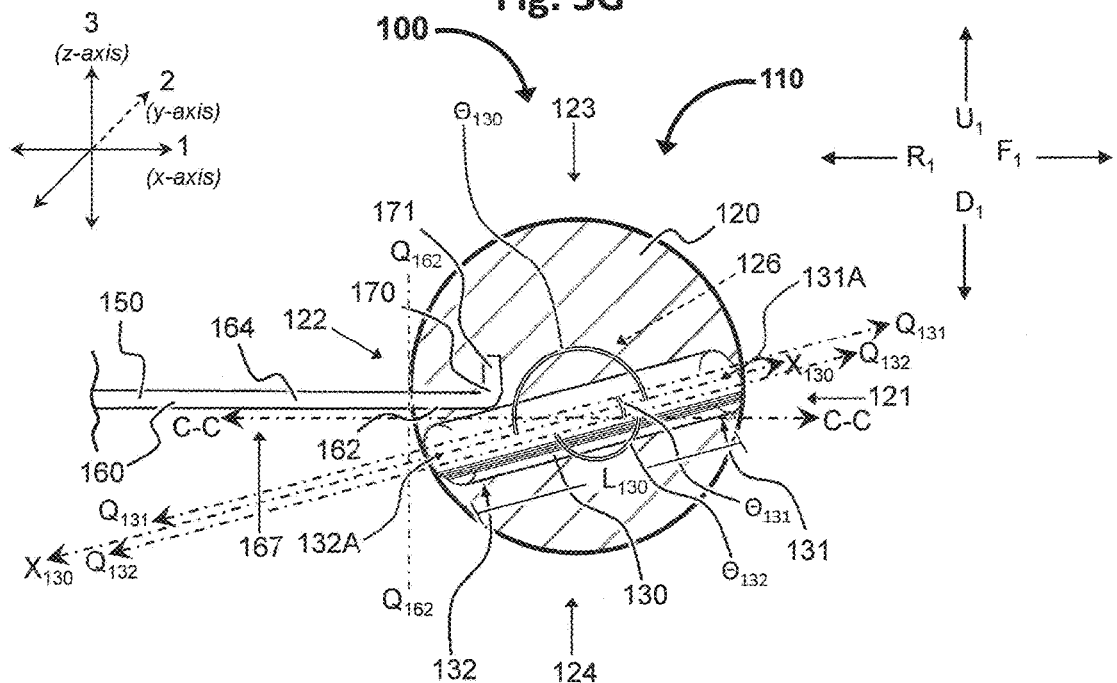
FIG. 3G is a cross-sectional view similar to FIG. 3A except showing a through-line element having a bend angle of approximately 0°.
Figure 3H:
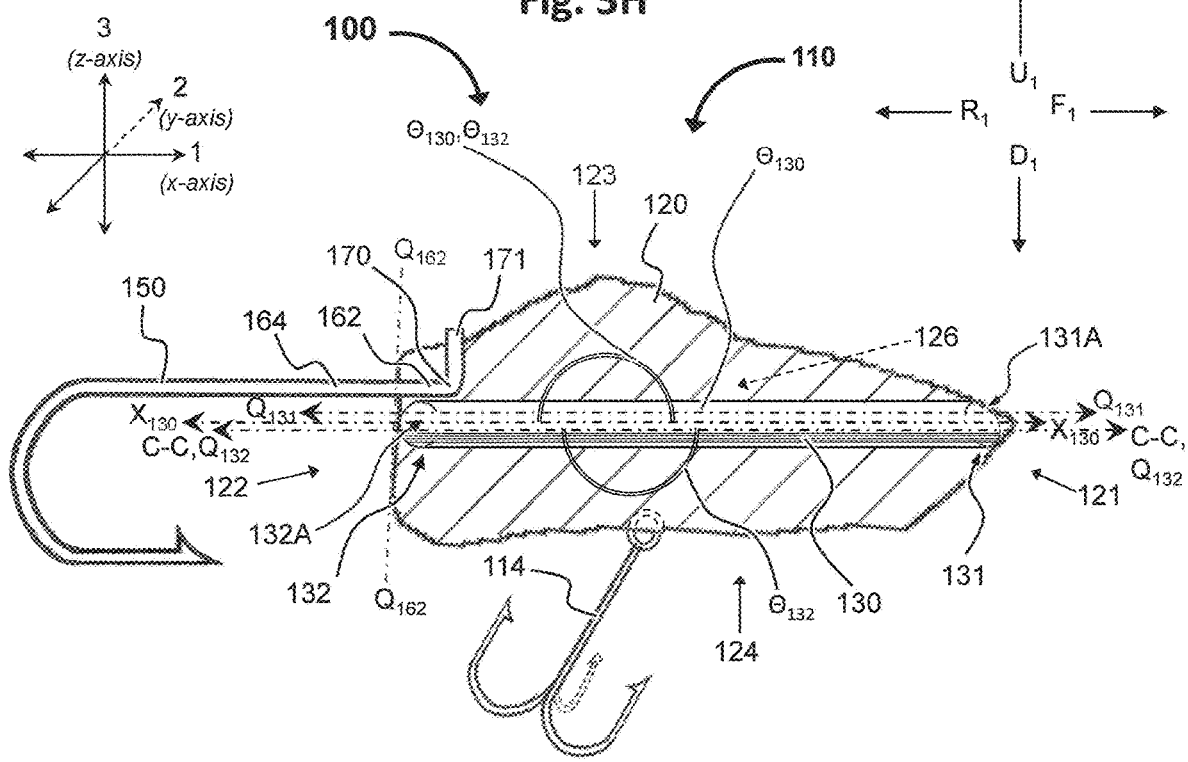
FIG. 3H is a cross-sectional view similar to FIG. 3A except showing a different shaped body component and a through-line element having a bend angle of approximately 0°.

Continuing now with FIGS. 2A-3H, in some embodiments of the invention, the through-line element 130 can have a generally linear profile. As illustrated, in some aspects of such embodiments, the opening 132A at the second end 132 can be located generally along the rear side 122 of the body component 120 proximate to the shank 160, and the first opening 131A can be generally located along the front side 121 of the body component 120 (see e.g., FIG. 3G). In other aspects of such embodiments, the opening 132A at the second end 132 can be located generally at the rear side 122 of the body component 120 adjacent to the shank 160, and the first opening 131A can be generally located at the front side 121 of the body component 120 (see e.g., FIG. 3H). In more particular aspects, the opening 132A at the second end 132 can be located proximate or adjacent to the interface formed by the shank 160 and rear side 122 of the body component 120, and the first opening 131A can be generally located at the front side 121 of the body component 120, such that the longitudinal axis $X_{130}$ of the through-line element 130 can be generally congruent to the central axis C-C of the body component 120 (e.g., can be in the general x-direction 1, such as illustrated in FIG. 3H). In general, the profile of the through-line element 130 will typically be linear when the angle $\theta_{130}$ between the first end 131 and the second end 132 of the through-line element 130 is about 180° (irrespective of the orientation of the through-line element 130 relative to horizontal central axis C-C of the body component 120) (compare e.g., FIGS. 3G and 3H).

With additional reference to FIGS. 4F and 5G, in some non-limiting exemplary embodiments, the opening 131A at the first end 131 of the through-line element 130 can be positioned generally at the front side 121 within the region of the body component 120 denoted by lines $N_{310}$-$N_{310}$ and $N_{311}$-$N_{311}$ with an angle $\theta_{131}$ of about 0°-20°, and the opening 132A at the second end 132 can be positioned generally at the rear side 122 within the region of the body component 120 denoted by lines $N_{326}$-$N_{326}$ and $N_{325}$-$N_{325}$ with an angle $\theta_{132}$ of about 160°-180° (i.e., being located proximate, or more desirably adjacent, to the interface formed by the shank 160 and rear side 122 exterior surface 120A of the body component 120) (see e.g., FIG. 3H). Such configurations can be useful for fishing techniques which utilize a substantially horizontal presentation (further defined below).

In other embodiments of the invention, the through-line element 130 can have a non-linear profile. For example, as illustrated in FIGS. 3A-3F, in some aspects of such embodiments, the opening 132A at the second end 132 can be located generally at the rear side 122 of the body component 120 proximate or adjacent to the shank 160, and the first opening 131A can be generally located towards the front side 121 of the body component 120, such that the angle $\theta_{130}$ between the first end 131 and the second end 132 will be less than 180-degrees. In some such aspects, the through-line element 130 can comprise at least one non-linear portion, or "bend" 134. Configurations of the invention of the present disclosure which include one or more of such bend 134 can be useful, inter alia, for providing a route for a fishing line 105 within the body component 120 which avoids the first region 162 of the shank 160 (which can include the first end 161 and/or optional interlocking member 170) while simultaneously providing desirable access to the second region 164 of the shank 160 for attachment thereto, such as via a knot 106. In such aspects, the opening 132A at the second end 132 of the through-line element 130 is desirably located proximate, or more desirably adjacent, to the second region 164 of the shank 160. Accordingly, such a bend 134 can be present in configurations wherein the first end 131 of the through-line element 130 is disposed at an angle $\theta_{131}$ which is greater than 0° and/or the second end 132 of the through-line element 130 is disposed at an angle $\theta_{132}$ that is less than 180° (such that the angle $\theta_{130}$ of the through-line element 130 is less than 180°).

Referring now to FIGS. 3A-5L, in one non-limiting example, the opening 131A at the first end 131 of the through-line element 130 can be positioned generally at the top side 123 of the body component 120 within the region defined by lines $N_{312}$-$N_{312}$ and $N_{314}$-$N_{314}$ with an angle $\Phi_{131}$ of about 80°-100°, and the opening 132A at the second end 132 can be positioned generally at the rear side 122 of the body component 120 within the region defined by lines $N_{326}$-$N_{326}$ and $N_{325}$-$N_{325}$ with an angle $\theta_{132}$ of about 160°-180° (i.e., being located proximate, or more desirably adjacent, to the interface formed by the shank 160 and rear side 122 exterior surface 120A of the body component 120) (see e.g., FIG. 3A). Such configurations can be useful for fishing techniques which utilize a substantially vertical presentation (further defined below).

In another non-limiting example, the opening 131A at the first end 131 of the through-line element 130 can be positioned generally between the top side 123 and the front side 121 within the region of the body component 120 denoted by lines $N_{313}$-$N_{313}$ and line $N_{310}$-$N_{310}$, or more particularly between line $N_{313}$-$N_{313}$ and line $N_{311}$-$N_{311}$, or between line $N_{312}$-$N_{312}$ and line $N_{310}$-$N_{310}$, or between line $N_{312}$-$N_{312}$ and line $N_{311}$-$N_{311}$ with an angle $\theta_{131}$ ranging from about 30° to about 60°, and the opening 132A at the second end 132 can be positioned generally along the rear side 122 within the region of the body component 120 denoted by line $N_{326}$-$N_{326}$ and line $N_{324}$-$N_{324}$, more particularly between line $N_{326}$-$N_{326}$ and line $N_{325}$-$N_{325}$, with an angle $\theta_{132}$ of about 150°-180° (i.e., being located proximate, or more desirably adjacent, to the interface formed by the shank 160 and rear side 122 exterior surface 120A of the body component 120) (see e.g., FIGS. 3C-3F). Such configurations can be useful for fishing techniques which utilize either a horizontal or vertical presentation.

As illustrated in FIGS. 3A-3F, in aspects where a bend 134 is present, such bend 134 can have a profile that ranges from a relatively sharp (e.g., angular or elbow) shape (see e.g., FIG. 3A) to a relatively broad (e.g., arcuate) shape (see e.g., FIG. 3F) as may be desired, without departing from the scope of the invention. However, it should be understood that any suitable variations of such aspects, as may be desired or would be apparent to persons having ordinary skill in the art, (e.g., S-curved, zigzagged, spiral, etc.) are also contemplated herein without departing from the scope of the invention. In general, the bend 134 can be disposed within the interior 120B of the body component 120, preferably arranged to avoid penetration of the first end 161 of the shank 160 and/or optional interlocking member 170 (if present) through the interior wall surface 133A,133B and/or into the interior volume 133 of the through-line element 130. For example, as illustrated in FIGS. 3A-3B, in one non-limiting exemplary embodiment, the bend 134 of the through-line element 130 can be disposed within the body component 120 such that the through-line element 130 is routed around the front and bottom sides 167,168 of the first region 162 of the shank 160, wherein the opening 131A at the first end 131 of the through-line element 130 is located generally at the top side 123 exterior surface 120A of the body component 120, and the opening 132A at the second end 132 is located adjacent to the interface formed by the bottom side 167 of the second region 164 of the shank 160 and the rearward-facing R$_1$ exterior surface 120A of the body component 120.

In some desirable embodiments, the inventive jig 110 of the present disclosure can be configured such that the through-line element 130, the shank 160 and the curvilinear hook portion 180 of the hook component 150 are substantially coplanar in the x-z plane. However, it should be understood that any suitable variations of such embodiments, as may be desired or would be apparent to persons having ordinary skill in the art, are also contemplated herein without departing from the scope of the invention.

Figure 10A:
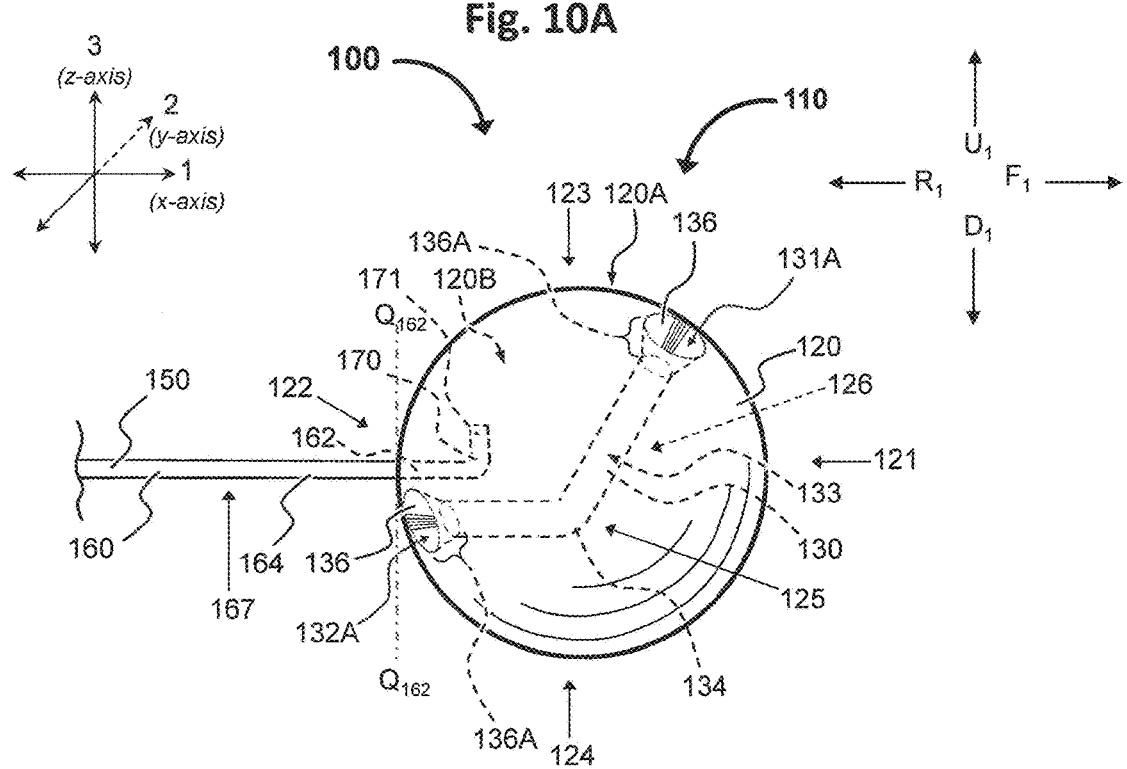
FIG. 10A is a partial side perspective view showing one aspect of an inventive fishing lure of the present invention in the form of a jig comprising an optional insertion element.
Figure 10B:
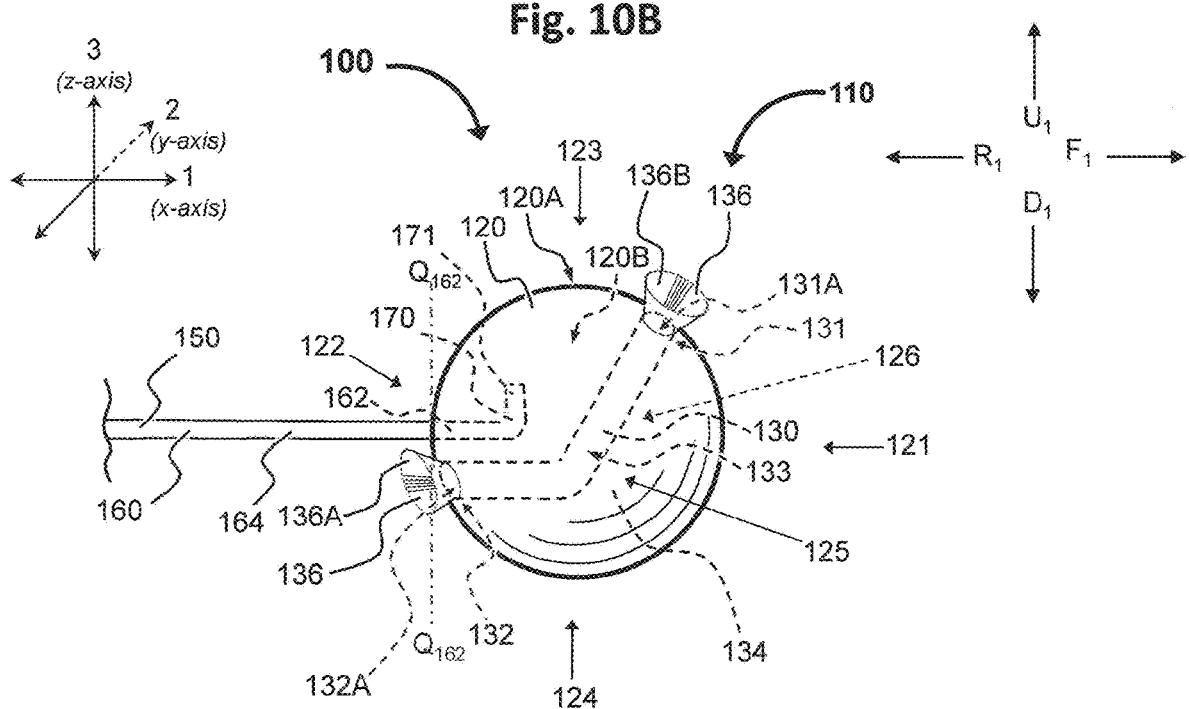
FIG. 10B is a partial side perspective view showing one aspect of an inventive fishing lure of the present invention in the form of a jig comprising an optional insertion element.
Figure 10C:
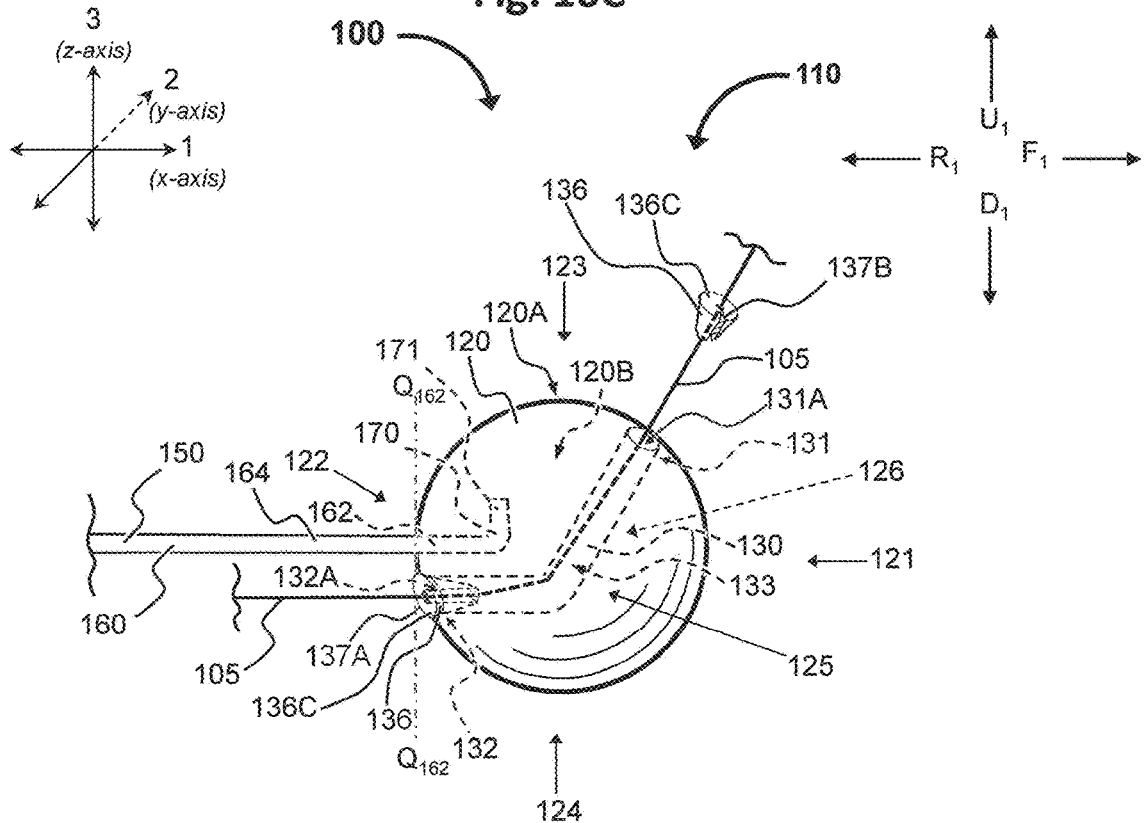
FIG. 10C is a partial side perspective view showing one aspect of an inventive fishing lure of the present invention in the form of a jig comprising an optional insertion element.

Referring now to FIGS. 10A-10C, in some embodiments, the inventive fishing lure 100 of the present disclosure can include an optional insertion element 136. In some aspects, the insertion element 136 can reduce the effort required to insert a fishing line 105 into the first opening 131A of the through-line element 130. In other aspects, the insertion element 136 can improve the effectiveness of threading a fishing line 105 through the through-line element 130. In yet other aspects, the insertion element 136 can reduce the time required for securing the inventive jig 110 to a fishing pole 102, such as via a fishing line 105.

As illustrated in FIG. 10A, in some aspects, the optional insertion element 136 can comprise a removed portion 136A of the body component 120 around the first opening 131A and/or the second opening 132A of the through-line element 130, such that the insertion element 136 generally extends from the exterior surface 120A into the interior 120B of the body component 120. In some aspects of such embodiments, the insertion element 136 can, inter alia, have a concave-shaped lead-in area, such as a funnel, dip, depression, and the like, preferably configured to taper toward the interior volume 133 of the through-line element 130, which can help guide a fishing line 105, for example, directly into the through-line element 130 by following the contour of the removed portion 136A of the body component 120.

As illustrated in FIG. 10B, in other aspects, the optional insertion element 136 can be in the form of a separate attachment 136B which can be permanently or removably affixed to the body component 120 at the first opening 131A and/or the second opening 132A, as desired. In some aspects of such embodiments, the insertion element 136 can, inter alia, have a concave-shaped lead-in area, such as a funnel-shape, preferably configured to taper toward the interior volume 133 of the through-line element 130, which can help guide a fishing line 105, for example, directly into the through-line element 130 by following the contour of the insertion element 136.

As illustrated in FIG. 10C, in still other aspects, the optional insertion element 136 can be in the form of a plug member 136C. The plug member 136C can include an opening 137A, a slit 137B, or the like, disposed therethrough, in which a fishing line 105 can be threaded. In this example, the insertion element 136 can receive a portion of a fishing line 105, which can then be guided into the first opening 131A and/or the second opening 132A of the through-line element 130. In the illustrated example, the plug member 136C can have a convex-shaped exterior to serve as a male fitting, while the first opening 131A and/or the second opening 132A can have a concave mating shape to serve as a female fitting. In some desirable aspects, the plug member 136C can be generally flush with the exterior surface 120A of the body component 120 upon insertion, though it need not be. Suitable plug member 136C can comprise any suitable flexible or non-flexible material, and can include a stopper, a snap, and the like as would be apparent to persons having ordinary skill in the art.

Referring now to FIGS. 11A-11I, in some non-limiting exemplary embodiments of the invention of the present disclosure, the inventive jig 110 can include an optional protective member 140 disposed within the body component 120, more preferably disposed within at least a portion of the interior volume 133 of the through-line element 130. The optional protective member 140 can be useful for, inter alia, providing a protective barrier between an object (e.g., a fishing line 105) and the interior wall surface 133B of the through-line element 130; further enhancing protection of an object (e.g., a fishing line 105) disposed within the through-line element 130, further reducing abrasion or other damage to an object (e.g., a fishing line 105) disposed within; extending the life of an object (e.g., a fishing line 105) disposed within; enhancing the strength of an object (e.g., a fishing line 105) disposed within; reducing friction within the through-line element 130; enhancing the ease of threading a fishing line 105 through the body component 120 via the through-line element 130; separating a fishing line 105 from the interior wall surface 133B of the through-line element 130 (e.g., a barrier); forming a through-line element 130 (e.g., during production of a body component 120 for the inventive jig 110); protecting the integrity of the through-line element 130 (e.g., during a decorating process (i.e., using decorative body component coatings, paints, etc.) such as by the protective member 140 effectively masking the first and second openings to prevent plugging, etc.); enhancing protection of the through-line element during use of the inventive fishing lure 100; and the like. Accordingly, various features of a protective member 140 (e.g., those relating to contact between the interior wall surface 133B and a fishing line 105) can include one or more desirable properties and/or characteristics (e.g., surface smoothness, softness, pliability, flexibility, compressibility, absence of sharp edges, etc.) capable of minimizing or eliminating abrasion or other such damage to a fishing line 105, thereby improving the strength and/or life of said fishing line 105, as compared to conventional jigs subjected to the same or similar environmental conditions.

Examples of suitable protective members 140 can include, but are not limited to, tubes, tubing, pipes, piping, cylinders, ducts, straws, hoses, conduits, shells, casings, sheaths, liners, linings, coatings, facings, skins, shields, and the like, without departing from the scope of the present invention. In some desirable aspects, the optional protective member 140 can be in the form of a solid or semi-solid structure. Suitable materials for such protective member 140 structures can include, but are not limited to, plastics and other polymers, foams, rubber, glass, PLEXIGLAS, silicon, polished metals, and other such materials known to persons having ordinary skill in the art. However, it should be understood that other suitable variations of the protective member 140 structure are also contemplated herein without departing from the scope of the invention including, but not limited to, liquids (e.g., oils, lotions, silicones, other liquid lubricants, etc.), gels (e.g., glycerin, lithium, silicone grease, petrolatum, other petroleum greases, etc.), hardened materials (e.g. epoxies, paints, thermoplastics, etc.), powders (e.g., talc, titanium oxide, thermoset powder coatings, etc.), dry and solid film lubricants (e.g., graphite, molybdenum disulfide, polytetrafluoroethylene (PTFE) under the trade name TEFLON, soft metals (indium, lead, silver, tin), suitable solid oxides, rare-earth fluorides (such as calcium fluoride, cerium fluoride, etc.), compacted oxide glazes, hexagonal boron nitride (white graphite), tungsten disulfide, boron nitride, etc., and other such substances known to persons having ordinary skill in the art.

For the purpose of brevity, one suitable protective member 140 in the form of a cylindrical tube will be described herein for non-limiting exemplary purposes only. For this example, the tube described is equivalent to a hollow plastic outer insulating sheath portion of common low voltage/low amperage electrical wiring, wherein the core materials (i.e., the metallic wire and paper insulation contents have been removed). Accordingly, as illustrated in FIGS. 11A-11I, in some non-limiting exemplary embodiments, the inventive jig 110 of the present disclosure comprises a body component 120 having a through-line element 130 disposed therethrough, and further includes an optional protective member 140 disposed at least partially within the through-line element 130. It should be understood that while the illustrated example shows a protective member 140 having a shape profile that conforms to the shape profile of the through-line element 130 (i.e., a cylindrical tubular protective member 140 disposed within a cylindrical tubular through-line element 130), it need not be. Accordingly, the shape profile of the protective member 140 can be different than the shape profile of the through-line element 130 without departing from the scope of the invention.

The illustrated protective member 140 has a generally hollow, tubular structure and includes a longitudinal length $L_{140}$ (i.e., the distance along the longitudinal axis $X_{140}$) defined by a first end 141 and a second end 142. Disposed at the first end 141 and the second end 142 are a first opening 141A and a second opening 142A, respectively. With particular reference to FIG. 11E, the protective member 140 can further comprise an interior wall structure 143A which provides an interior wall surface 143B, and includes a cross-sectional inner diameter $ID_{140}$ at any given point along the longitudinal length $L_{140}$, thus forming an interior volume 143 over the longitudinal length $L_{140}$ of the protective member 140. Preferably, the inner diameter $ID_{140}$ is configured to be greater than the outer diameter of an object (e.g., a fishing line 105) intended to be disposed therein.

Continuing with FIG. 11E, the protective member 140 can further comprise an exterior wall structure 144A which provides an exterior wall surface 144B having a cross-sectional outer diameter $OD_{140}$ at any given point along the longitudinal length $L_{140}$ of the protective member 140. Preferably, the outer diameter $OD_{140}$ of the protective member 140 at any given point along the longitudinal length $L_{140}$ is greater than the inner diameter $ID_{140}$ at the same given point along the longitudinal length $L_{140}$, wherein the difference between the outer diameter $OD_{140}$ and the inner diameter $ID_{140}$ at such given point defines a thickness $t_{140}$, as shown by the following formula:

$$t_{140} = OD_{140} - ID_{140}$$

In some desirable aspects, at least a portion of the outer diameter $OD_{140}$ of the protective member 140 which is disposed within the longitudinal length $L_{130}$ of the through-line element 130 can be less than or approximately equal to the diameter $\Phi_{130}$ of the through-line element 130. In such aspects, the surface 144B of the exterior wall structure 144A of the protective member 140 can form one or more interfaces with the surface 133B of the interior wall structure 133A of the through-line element 130.

Referring now to FIGS. 11D-11I, with additional reference to FIGS. 3B, 3G and 3H, the longitudinal axis $X_{140}$ of the protective member 140 can be desirably configured to be generally aligned to the longitudinal axis $X_{130}$ of the through-line element 130 (i.e., arranged such that the first end 141 of the protective member 140 is generally aligned with the first end 131 of the through-line element 130 and disposed spatially in the same general location with respect to the body component 120, and the second end 142 of the protective member 140 is generally aligned with the second end 132 of the through-line element 130 and disposed spatially in the same general location with respect to the body component 120). In some aspects, the protective member 140 can be coextensive with the through-line element 130, such that the longitudinal length $L_{140}$ of the protective member 140 is substantially equal to the longitudinal length $L_{130}$ of the through-line element 130. For example, as illustrated in FIG. 11F, the first end 141 of the protective member 140 and the first end 131 of the through-line element 130 can be disposed substantially equidistant relative to the exterior surface 120A of the body component 120 at their respective locations, while the second end 142 of the protective member 140 and the second end 132 of the through-line element 130 can likewise be disposed substantially equidistant relative to the exterior surface 120A of the body component 120 at their respective locations.

Figure 11A:
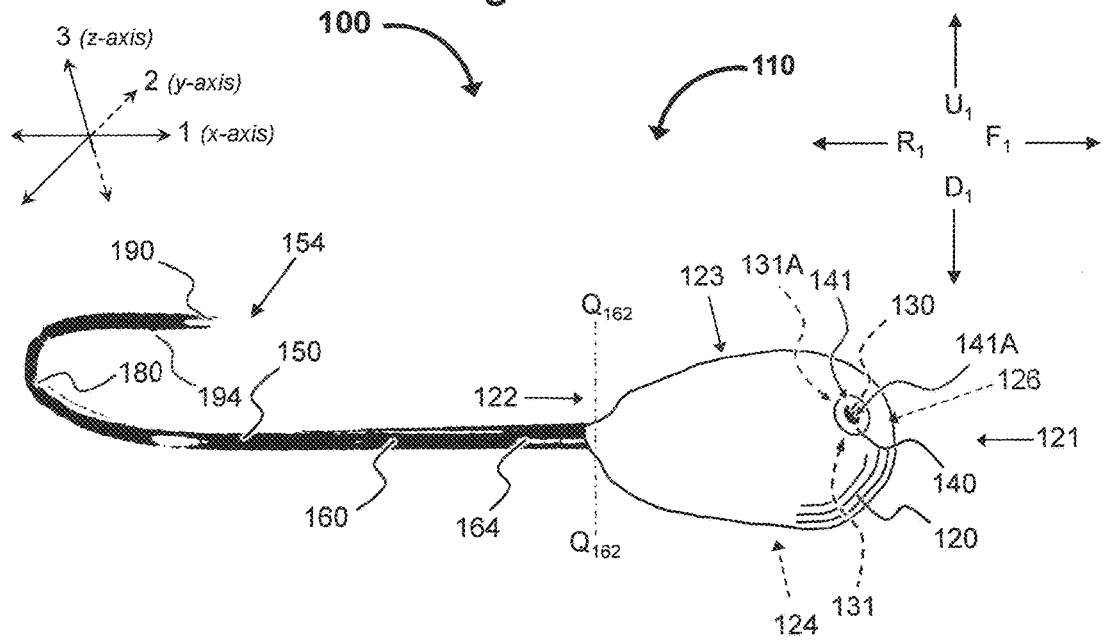
FIG. 11A is a top-side perspective view showing one aspect of an inventive fishing lure of the present invention in the form of a jig comprising an optional protective member.
Figure 11B:
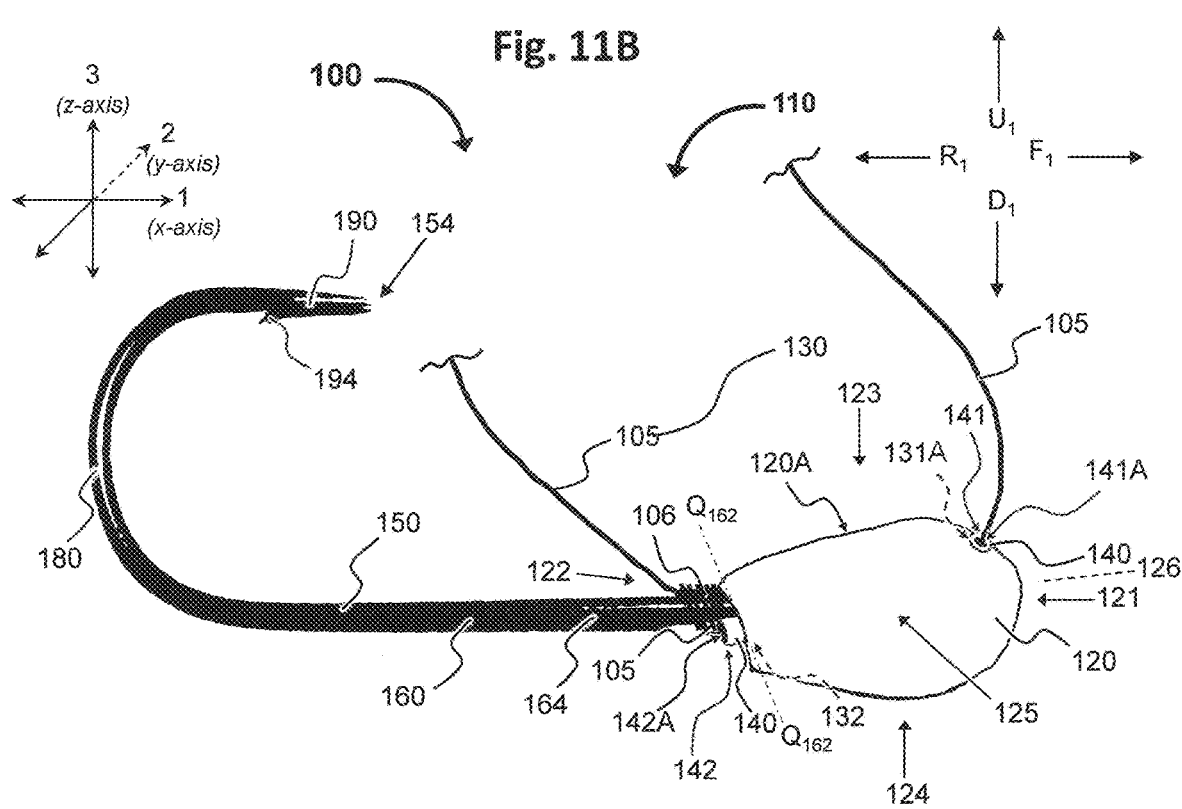
FIG. 11B is a side perspective view showing one aspect of an inventive fishing lure of the present invention in the form of a jig comprising an optional protective member.
Figure 11C:
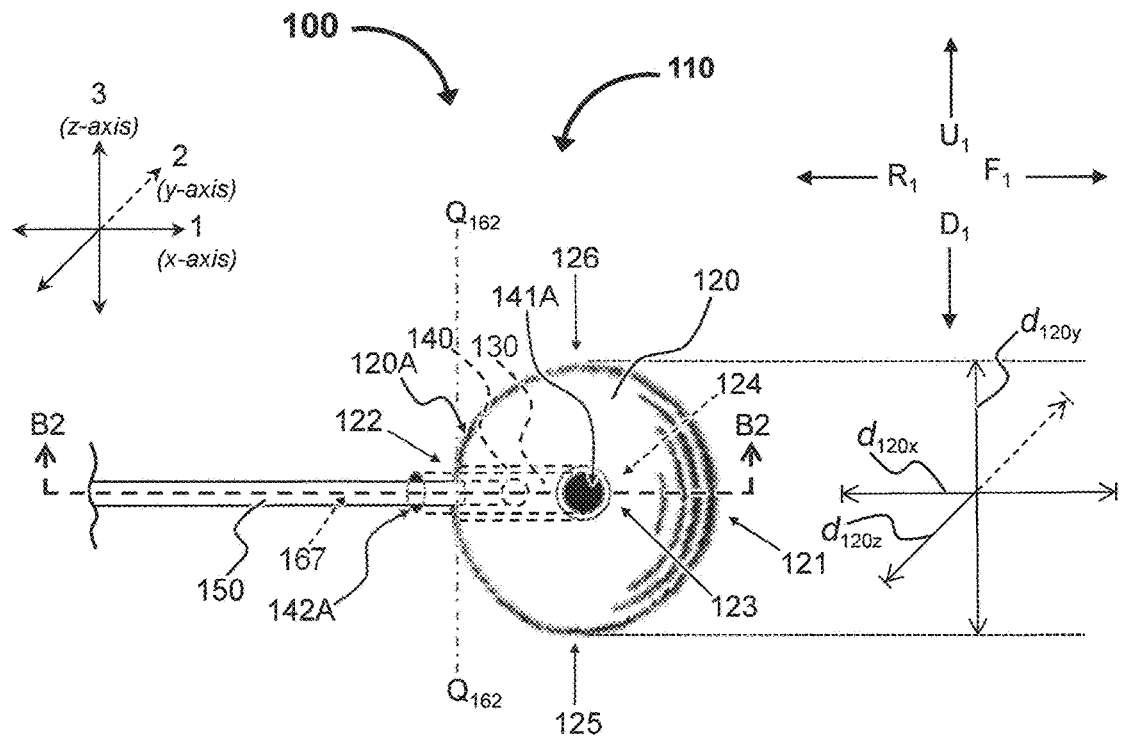
FIG. 11C is a partial top-side perspective view showing one aspect of an inventive fishing lure of the present invention in the form of a jig comprising an optional protective member.
Figure 11D:
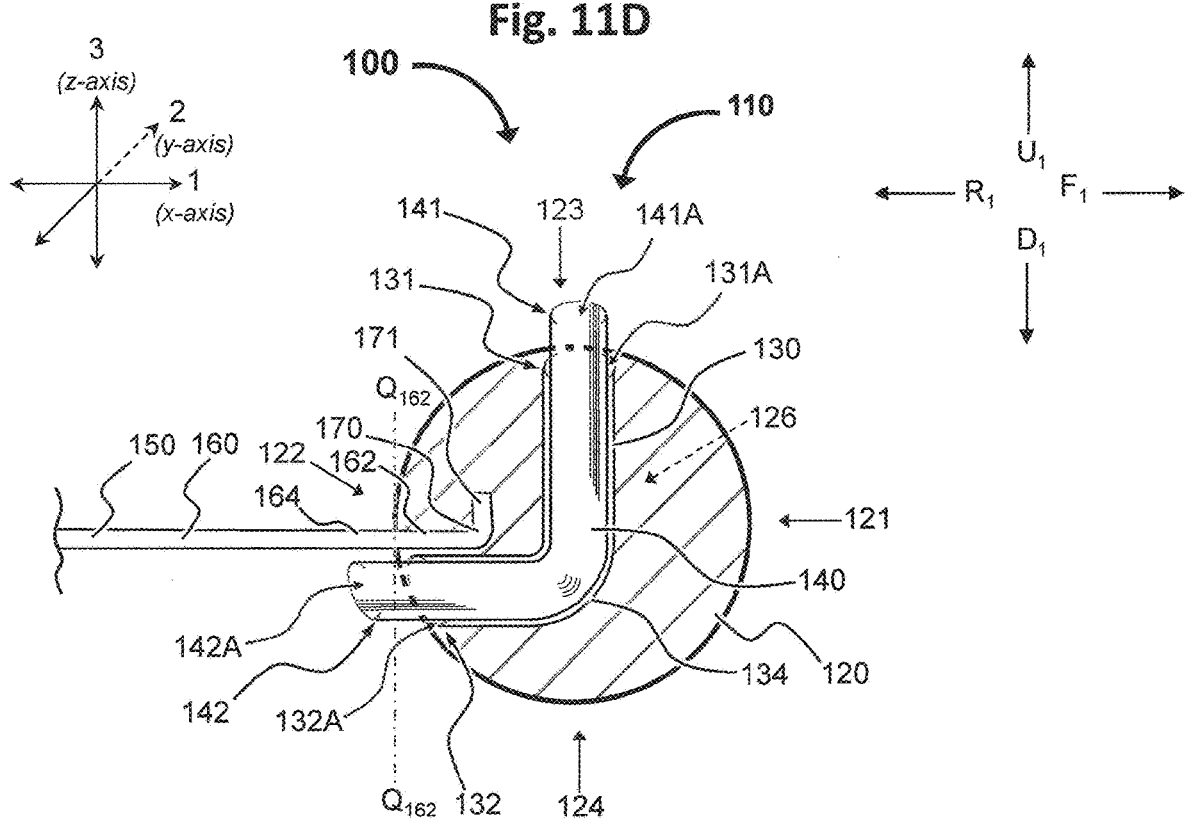
FIG. 11D is a cross-sectional view of FIG. 11C taken along line B2-B2 and showing an optional protective member disposed within a through-line element having a first end bend angle of approximately 90°.
Figure 11G:
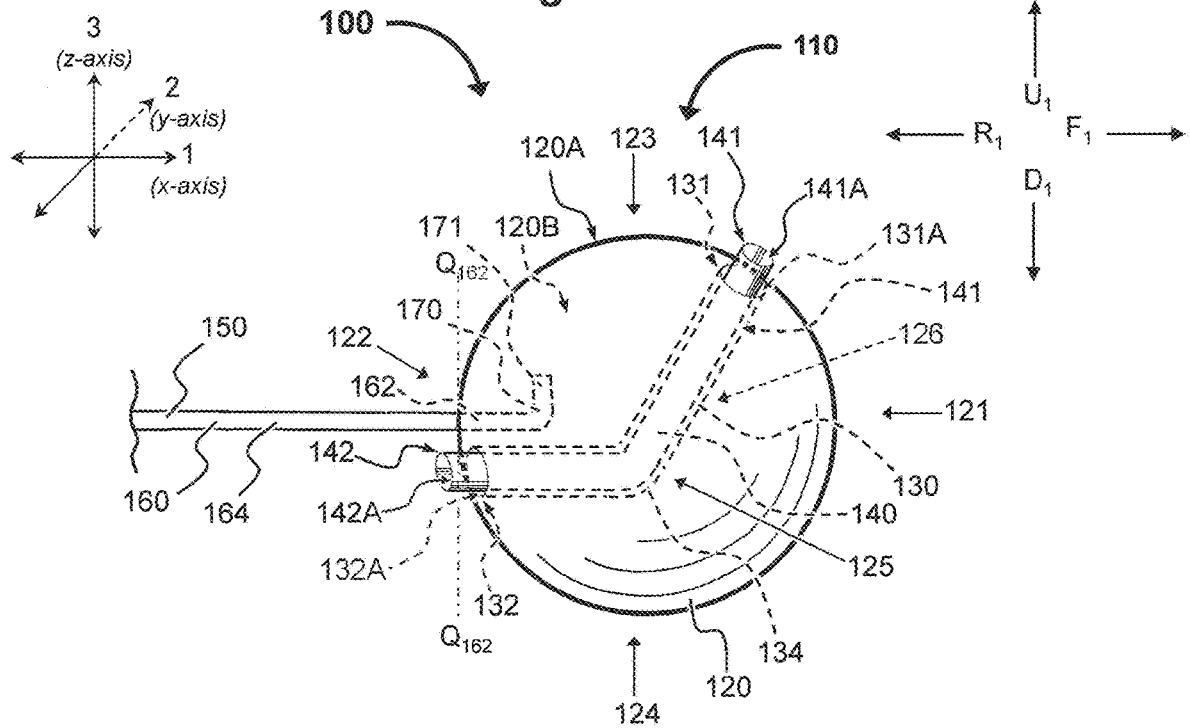
FIG. 11G is a cross-sectional view similar to FIG. 11D except showing a through-line element having a first end bend angle of approximately 60°.

In other aspects, the longitudinal length $L_{140}$ of the protective member 140 can be generally greater than the longitudinal length $L_{130}$ of the through-line element 130. For example, as illustrated in FIG. 11G, the first end 141 of the protective member 140 can be disposed at a greater outward distance (e.g., from the center of the body component 120) than the first end 131 of the through-line element 130 relative to the exterior surface 120A of the body component 120 at their respective locations, while the second end 142 of the protective member 140 can likewise be disposed at a greater outward distance than the second end 132 of the through-line element 130 relative to the exterior surface 120A of the body component 120 at their respective locations.

Figure 11H:
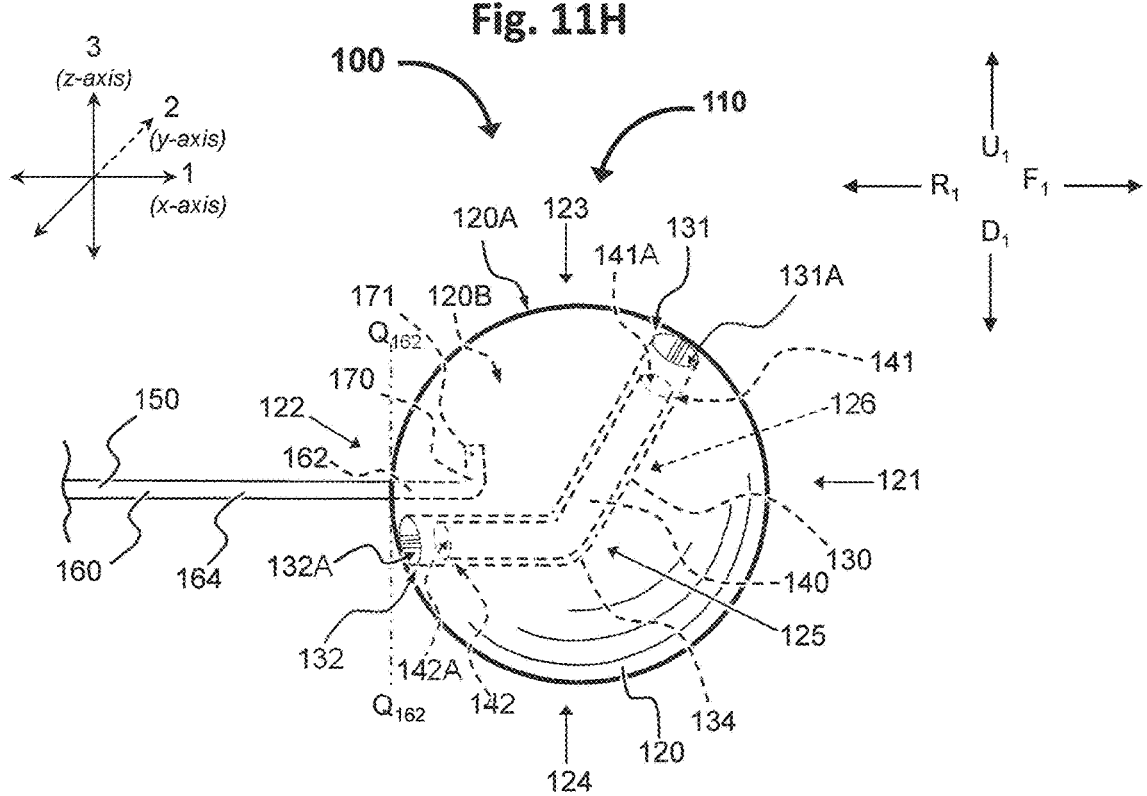
FIG. 11H is a cross-sectional view similar to FIG. 11D except showing a through-line element having a first end bend angle of approximately 60°.

In still other aspects, as illustrated in FIG. 11H, the longitudinal length $L_{140}$ of the protective member 140 can be generally less than the longitudinal length $L_{130}$ of the through-line element 130. For example, the first end 141 of the protective member 140 can be disposed at a greater inward distance (e.g., toward the center of the body component 120) than the first end 131 of the through-line element 130 relative to the exterior surface 120A of the body component 120 at their respective locations, while the second end 142 of the protective member 140 can likewise be disposed at a greater inward distance than the second end 132 of the through-line element 130 relative to the exterior surface 120A of the body component 120 at their respective locations.

In yet other aspects, as illustrated in FIGS. 11F-11I, irrespective of the longitudinal length $L_{140}$ of the optional protective member 140 with respect to the longitudinal length $L_{130}$ of the through-line element 130, the first end 141 of the protective member 140 can be greater than, less than or coextensive with the first end 131 of the through-line element 130 relative to the center and/or exterior surface 120A of the body component 120 at their respective locations, while the second end 142 of the protective member 140 (independently of the first end 141) can be greater than, less than or coextensive with the second end 132 of the through-line element 130 relative to the center and/or exterior surface 120A of the body component 120 at their respective locations.

Accordingly, in some aspects, the entire longitudinal length $L_{140}$ of the protective member 140 can be substantially disposed and terminate within the through-line element 130. In other aspects, at least a portion of the protective member 140 can be disposed and terminate within the through-line element 130. In still other aspects, at least a portion of the protective member 140 can be disposed and terminate outside of (i.e., exterior with respect to) the through-line element 130.

In some aspects, the protective member 140 may not be contiguous within the interior volume 133 of the through-line element 130, such as between the first end 131 and the second end 132 of the through-line element 130 for instance (e.g., a protective member 140 comprising additional openings, holes, slits, layers, laminates, multiple sections, multiple components, a plurality of protective member 140, and the like, and combinations thereof). Thus, the protective member 140 may include one more sections or portions that are not substantially enclosed or contiguous within the through-line element 130 without departing from the scope of the invention.

In some aspects, the entire longitudinal length $L_{140}$ of the protective member 140 can be substantially disposed within the body component 120. In other aspects, at least a portion of the protective member 140 can be disposed within the body component 120. In still other aspects, at least a portion of the protective member 140 can be disposed outside of (i.e., exterior with respect to) the body component 120. In yet other aspects, the protective member 140 may not be contiguous within the interior 120B of the body component 120, such as between the exterior surface 120A that is proximate to the first end 141 of the protective member 140 and the exterior surface 120A that is proximate to the second end 142 of the protective member 140 for instance (e.g., a protective member 140 comprising additional openings, holes, slits, layers, laminates, multiple sections, multiple components, a plurality of protective member 140, and the like, and combinations thereof). Accordingly, the protective member 140 may include one more sections or portions that are not substantially enclosed or contiguous within the body component 120 without departing from the scope of the invention.

Returning now to FIGS. 11A-11I, the optional protective member 140 can comprise at least a first opening 141A disposed at the first end 141 and a second opening 142A disposed at the second end 142. In some aspects, the first opening 141A and second opening 142A can provide the only access into the protective member 140. However, in other aspects, the protective member 140 can include additional access points without departing from the scope of the invention.

In general, the opening 141A at the first end 141 of the optional protective member 140 can be located at any suitable location as may be desired around the exterior periphery of the body component 120 (i.e., in the x-y-z dimensions). In preferable aspects, the first opening 141A can be located proximate to the first opening 131A of the through-line element 130, and more preferably located adjacent to the first opening 131A of the through-line element 130. However, in more particular aspects, such location may be substantially dictated by the location of the first opening 131A of the through-line element 130 (see e.g., FIGS. 4A-4K and related discussion thereto, supra).

In general, the opening 141A at the first end 141 of the optional protective member 140 can function as an inlet. In some aspects (e.g., wherein the first end 141 of the protective member 140 is coextensive with, or extends externally beyond, the first end 131 of the through-line element 130), the first opening 141A can provide an inlet into the body component 120. In other aspects (e.g., wherein the first end 141 of the protective member 140 is coextensive with, or extends externally beyond, the first end 131 of the through-line element 130), the first opening 141A can provide an inlet into the through-line element 130. In still other aspects (e.g., wherein the first end 141 of the protective member 140 is disposed within the through-line element 130 (i.e., the first end 141 extends in an outward direction for a length that is less than the first end 131 of the through-line element 130)), the first opening 131A of the through-line element 130 can provide an inlet into the protective member 140.

In aspects wherein the invention of the present disclosure comprises an optional protective member 140, the opening 141A at the first end 141 can be useful for, inter alia, introducing an object (e.g., a fishing line 105) into the protective member 140; providing access to the through-line element 130; providing access into the body component 120; disposing an object (e.g., a fishing line 105) within the body component 120; guiding or routing an object (e.g., a fishing line 105) through the body component 120; guiding or routing an object (e.g., a fishing line 105) through the through-line element 130; providing access to the shank 160; securing the jig 110 at (or closer to) the center of gravity of the inventive jig 110 as compared to conventional jigs 910; protecting an object (e.g., a fishing line 105) within the body component 120; and the like. Accordingly, the first opening 141A can provide an entrance into the protective member 140, the through-line element 130 and/or the body component 120.

In general, the opening 142A at the second end 142 of the optional protective member 140 can be located at any suitable location as may be desired around the exterior periphery of the body component 120 (i.e., in the x-y-z dimensions). In preferable aspects, the second opening 142A can be located proximate to the second opening 132A of the through-line element 130, and more preferably located adjacent to the second opening 132A of the through-line element 130. However, in more particular aspects, such location may be substantially dictated by the location of the second opening 132A of the through-line element 130 (see e.g., FIGS. 5A-5L and related discussion thereto, supra).

In general, the opening 142A at the second end 142 of the optional protective member 140 can function as an outlet. In some aspects (e.g., wherein the second end 142 of the protective member 140 is coextensive with, or extends externally beyond, the second end 132 of the through-line element 130), the second opening 142A can provide an outlet from the body component 120. In other aspects (e.g., wherein the second end 142 of the protective member 140 is coextensive with, or extends externally beyond, the second end 132 of the through-line element 130), the second opening 142A can provide an outlet from the through-line element 130. In still other aspects (e.g., wherein the second end 142 of the protective member 140 is disposed within the through-line element 130 (i.e., the second end 142 extends in an outward direction for a length that is less than the second end 132 of the through-line element 130)), the second opening 132A of the through-line element 130 can provide an outlet from the protective member 140.

In aspects wherein the invention of the present disclosure comprises an optional protective member 140, the opening 142A at the second end 142 can be useful for, inter alia, exiting an object (e.g., a fishing line 105) present within the protective member 140 (and in some aspects the through-line element 130) from the body component 120; grasping and pulling an object (e.g., a fishing line 105) through the body component 120; threading an object (e.g., a fishing line 105) through the body component 120; threading an object (e.g., a fishing line 105) through the through-line element 130; providing access to the shank 160; guiding an object (e.g., a fishing line 105) to the second region 164 of the shank 160, securing said object (e.g., a fishing line 105) to the shank 160 (e.g., via a knot 106); encasing a portion of an object (e.g., a fishing line 105) within the body component 120 (i.e., as opposed to said object being exposed upon the exterior surface 120A, or more simply exposed externally in general) to obtain improved benefits (e.g., minimizing abrasion and/or other such damage, enhancing strength, extending life during use, etc.) as compared to conventional jigs 910 under the same or similar conditions; securing the inventive jig 110 to a fishing pole 102 at (or closer to) said jig's center of gravity (e.g., via a fishing line 105), as compared to conventional jigs 910; providing protection of an object (e.g., a fishing line 105) within the body component 120, such as during use; and the like. Accordingly, the second opening 142A can provide an egress from the protective member 140, the through-line element 130 and/or the body component 120.

Continuing with FIGS. 11A-11I, in some aspects, at least the portion of the protective member 140 that is disposed within the through-line element 130 can have a longitudinal shape profile that is substantially similar to the longitudinal shape profile of the through-line element 130. In other aspects, at least the portion of the protective member 140 that is disposed within the through-line element 130 can have a cross-sectional shape profile that is substantially similar to the cross-sectional shape profile of the through-line element 130 at a given point along the longitudinal length $L_{130}$ of the through-line element 130. Accordingly, the protective member 140 can have a longitudinal shape profile along at least a portion of its longitudinal length $L_{140}$ which generally conforms to the longitudinal shape profile of the through-line element 130 along its longitudinal length $L_{130}$, and/or a cross-sectional shape profile at any given point along its longitudinal length $L_{140}$ within the through-line element 130 which generally conforms to the cross-sectional shape profile of the through-line element 130 at the same point. For example, as illustrated in the non-limiting exemplary embodiments illustrated in FIGS. 11D-11I, the protective member 140 can have a cross-sectional shape profile which is generally cylindrical and a longitudinal shape profile having angles and a bend that are substantially similar to the generally cylindrical cross-sectional shape profile and the longitudinal shape profile angles $\theta_{130}$, $\theta_{131}$, $\theta_{132}$ and bend 134 of the through-line element 130 in which it is disposed. However, it should be understood that the protective member 140 is not limited to any particular shape profile (i.e., longitudinal shape profile and/or cross-sectional shape profile), irrespective of the longitudinal shape profile and/or cross-sectional shape profile of the through-line element 130. In addition, the longitudinal shape profile and/or cross-sectional shape profile for the interior wall structure 143A of the protective member 140 need not be the same as longitudinal shape profile and/or cross-sectional shape profile of the exterior wall structure 144A of the protective member 140 along its longitudinal length $L_{140}$, or at any point thereof, without departing from the scope of the invention, Accordingly, it should be understood that any suitable interior and exterior shape profile of the protective member 140 is also contemplated herein without departing from the scope of the invention, and therefore such exterior and/or interior shape profiles of the protective member 140 should not be considered to be a limiting factor thereof.

In some aspects, the protective member 140 can be disposed within the body component 120 via the process of forming (i.e., manufacturing) the lure 100 of the present disclosure (further discussed below). Accordingly, in such aspects, the optional protective member 140 when present can additionally or alternatively serve the function of forming the through-line element 130, such as during production of the inventive jig 110 (e.g., via a molding process). In other aspects, the protective member 140 can be applied to a through-line element 130 after the inventive jig 110 has been formed. In still other aspects, the protective member 140 can be inserted into the through-line element 130 when already present in a body component 120.

In some aspects, the protective member 140 can be affixed to the body component 120 (i.e., held in place) via frictional forces (e.g., at interfaces which may be formed between the interior wall surface 133B of the through-line element 130 and the exterior wall surface 144B of the protective member 140). Alternatively, or additionally, the protective member 140 can be affixed to the interior wall surface 133B of the through-line element 130 via an adhesive (e.g., at interfaces formed between the interior wall surface 133B of the through-line element 130 and the exterior wall surface 144B of the protective member 140). Other suitable methods for affixing an optional protective member 140 to a through-line element 130 known to persons having ordinary skill in the art are also contemplated herein without departing from the scope of the invention.

Figure 12A:
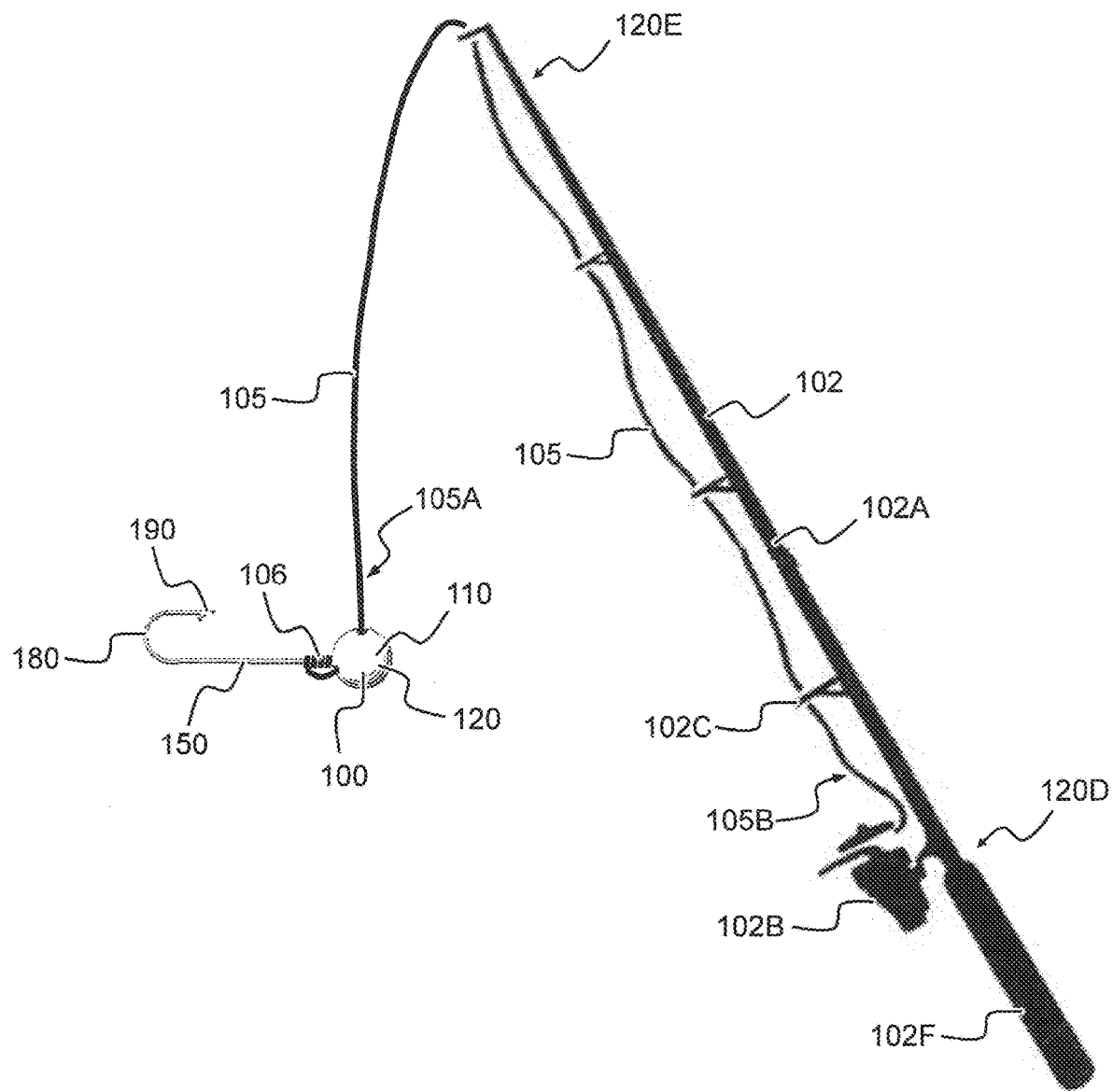
FIG. 12A is a perspective view showing a fishing pole comprising a fishing line and an inventive fishing lure of the present invention in the form of a jig attached thereto.
Figure 12B:
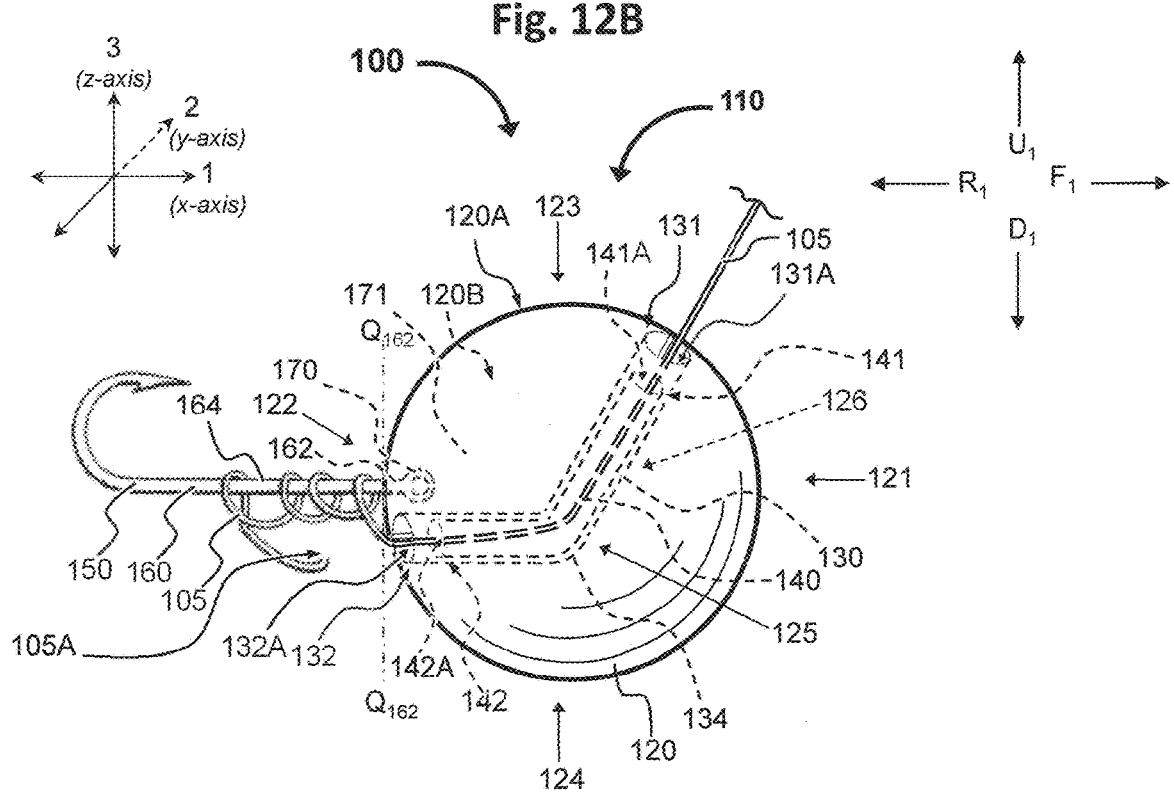
FIG. 12B is a perspective view showing one aspect of an inventive fishing lure of the present invention in the form of a jig comprising a fishing line threaded through the body component.
Figure 12C:
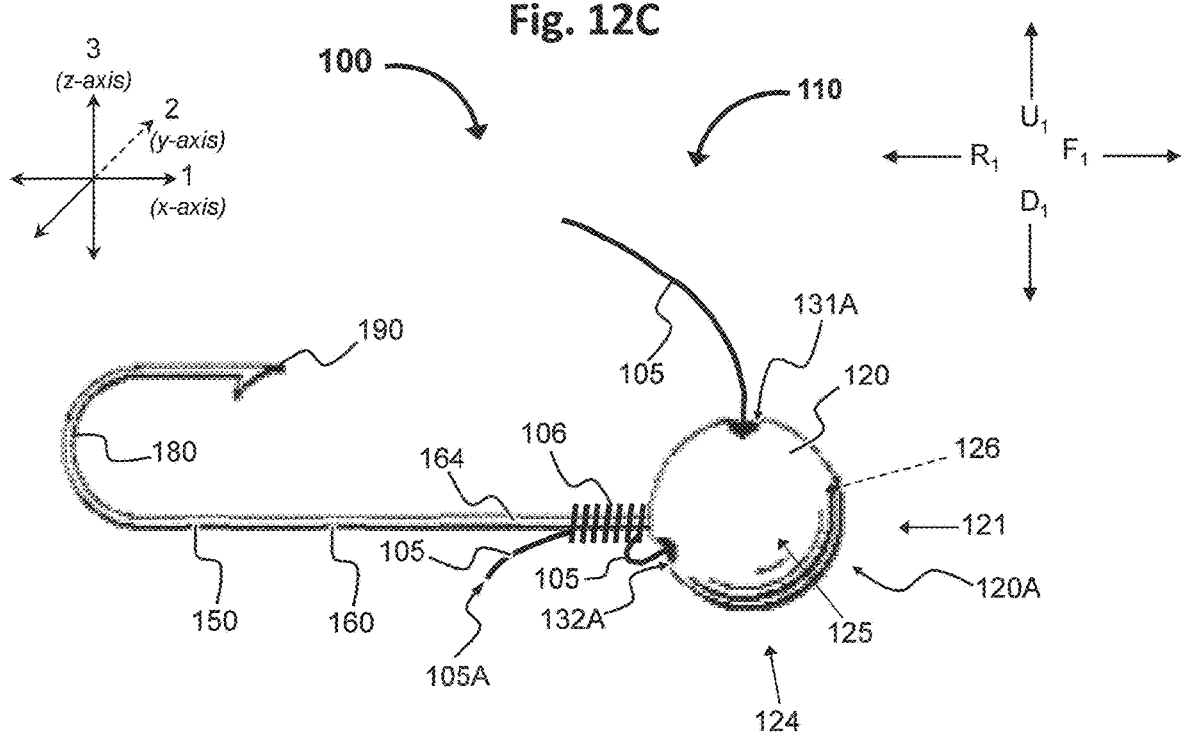
FIG. 12C is a perspective view showing one aspect of an inventive fishing lure of the present invention in the form of a jig comprising a fishing line attached to the second region of the shank via a knot.

Referring now to FIGS. 12A-12C, one goal of utilizing a fishing lure is to enable a user to obtain possession of a fish by removing such fish from its habitat. More particularly, the desired intent is that when a fish strikes the inventive jig 110, the user can utilize a fishing pole 102 connected to the inventive jig 110 via a fishing line 105 to set the barbed element 190 of the hook component 150 into the flesh of the fish, and then reel-in said fish to the location of the user, thereby catching and ultimately obtaining possession of the fish.

One advantage of the fishing lure 100 of the present disclosure, such as the inventive jig 110 described herein, includes, inter alia, an improved effectiveness for catching fish, as compared to conventional jigs 910 under the same or similar conditions. The concept of use generally involves connecting a user to the jig 110, and thus ultimately to the fish. For example, as illustrated in FIG. 12A, a user (not shown) can utilize a fishing pole 102 to manipulate the inventive jig 110. In this non-limiting example, the fishing pole 102 comprises a rod 102A having a first end portion 102D and a second end portion 102E, a handle 102F and a reel 102B attached to the first end portion 102D of the rod 102A, and one or more guides 102C disposed between the reel 102B and the second end portion 102E of the rod 102A. In typical configurations, one end 105B of a fishing line 105 is releasably wound around the reel 102B and the other end 105A is threaded through the guides 102C and is then attached to the lure 100, such that the fishing line 105 extends outward (i.e., generally away from the user) from the second end portion 102E of the rod 102A.

With additional reference to FIGS. 12B-12C, the inventive jig 110 and the fishing pole 102 can be connected via a fishing line 105. For example, the fishing line 105 can desirably be threaded through the body component 120 via the through-line element 130 and then tied to the shank 160 of the jig 110 in the following (or equivalent) manner:

a) inserting the end 105A of the fishing line 105 into the first opening 131A of the through-line element 130 (and/or the first opening 141A of the optional protective member 140, if present);

b) pushing the fishing line 105 (generally in a rearward direction $R_1$ for the illustrated exemplary embodiment) through the through-line element 130 (and/or the optional protective member 140, if present) such that the end 105A of the fishing line 105 emerges from the second opening 132A of the through-line element 130 (and/or the second opening 142A of the optional protective member 140, if present);

c) grasping the end 105A of the fishing line 105 and pulling a desired length through the through-line element 130;

d) tying the fishing line 105 to the second region 164 of the shank 160 of the inventive jig 110 using a suitable knot 106; and e) pulling tight (i.e., cinching) the knot 106, preferably positioning said knot 106 adjacent to the interface formed between the shank 160 and the exterior surface 120A of the body component 120, such as by grasping the end 105A of the fishing line 105 and a portion of the fishing line 105 located prior to the jig 110 (i.e., between the jig 110 and the fishing pole 102), and then pulling in opposing directions, each away from the other.

Examples of desirable knots 106 for tying the fishing line 105 directly to the shank 160 include, but are not limited to, the Snell Knot, the Improved Clinch Knot, the Polymer Knot, and the like. However, it should be understood that any suitable knot, as may be desired or would be apparent to persons having ordinary skill in the art, is also contemplated herein without departing from the scope of the invention.

Upon securing the inventive jig 110 to the fishing pole 102 via a fishing line 105, a user can then interact with the jig 110 via the fishing pole 102, such as by casting, moving and/or retrieving the jig 110, thus imparting various motions to the jig 110 during use. For example, a user may use the pole 102 to pull on, and then relax, the fishing line 105, thus causing the inventive jig 110 to simulate the swimming motions of a fish's food source (e.g., a feeding bait fish) which has been discovered herein to attract the attention of a fish, and likely causing the fish to strike. More particularly, such pulling action can cause the jig 110 to engage in motion, thus advancing the jig 110 in a direction generally towards the user. Then, upon relaxing such pulling force, the inventive jig 110 returns to its initial state, thereby simulating the movements of a fish's food source. Typically, a small tug of the fishing line 105 is all that is required to impart suitable motions (e.g., linear, rotational, etc.) to desirably cause the inventive jig 110 to more accurately mimic the movements of a fish's food source (e.g., a feeding bait fish), as compared to conventional jigs 910 under the same or similar conditions. For example, in preferred embodiments, the movement of the inventive fishing lure 100 can range from twitching and shaking substantially in place relative to the lure's original location in water (i.e., resembling the movement of a feeding bait fish), to more substantial movements in the x-y-z directions 1,2,3 relative to the lure's original location in water (i.e., resembling the movement of a vibrant live feeding bait fish). In contrast, a conventional jig 910 must be constantly pulled closer and closer to the user to create any sense of movement (i.e., thus requiring more removals from water and re-casts than the inventive jig 110), while further being limited in motions that could mimic a feeding bait fish (e.g., due to limitations caused by the presence of an eyelet 940, such that forces are applied to a location on the conventional jig 910 that is farther away from its center of gravity as compared to the inventive jig 110, etc.). As a result, a user has the unique ability to manipulate the inventive fishing lure 100 to physically advance in the x-y-z directions 1,2,3 (relative to the lure's original location in the water) only when the user so desires, and may otherwise impart desired motions to the inventive fishing lure 100 while it remains substantially in its original location relative to the water. Thus, the elimination of the need to constantly reel-in and re-cast the inventive fishing lure 100 maximizes the lure's time in water, which in turn increases the likelihood of enticing a fish to strike the fishing lure 100.

Figure 13A:
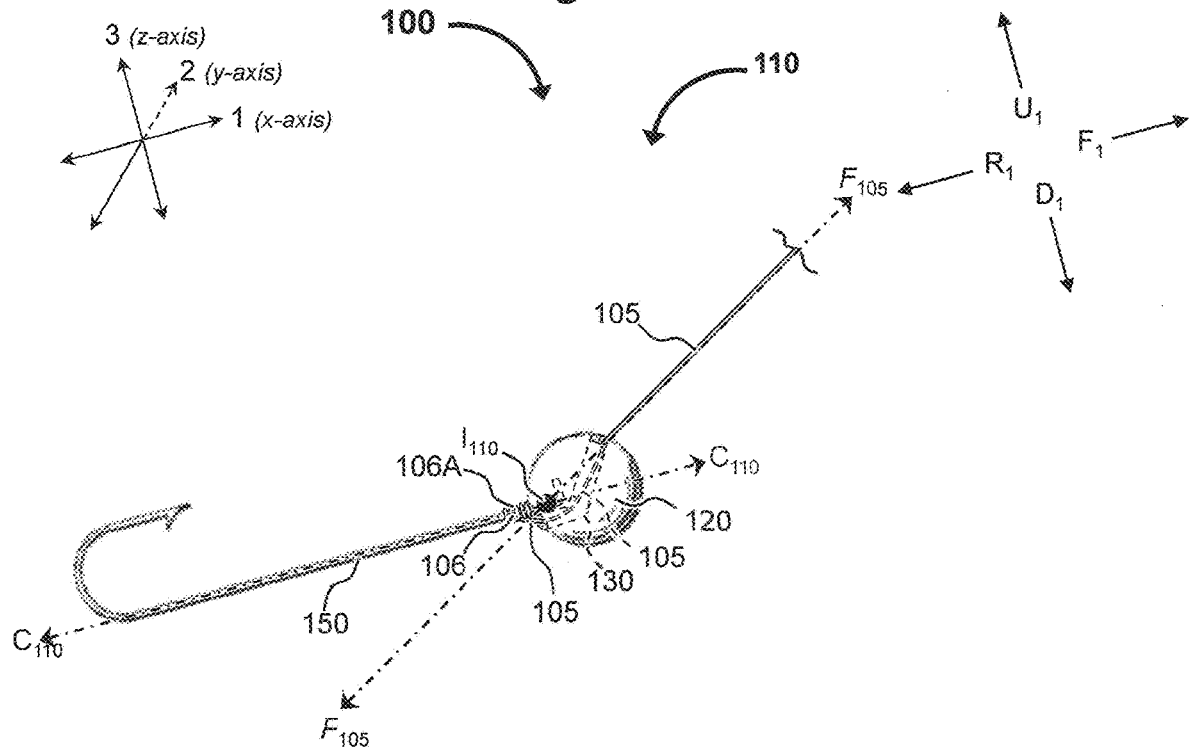
FIG. 13A is a side perspective view showing one aspect of an inventive fishing lure of the present invention in the form of a jig having a fishing line attached thereto.
Figure 13B:
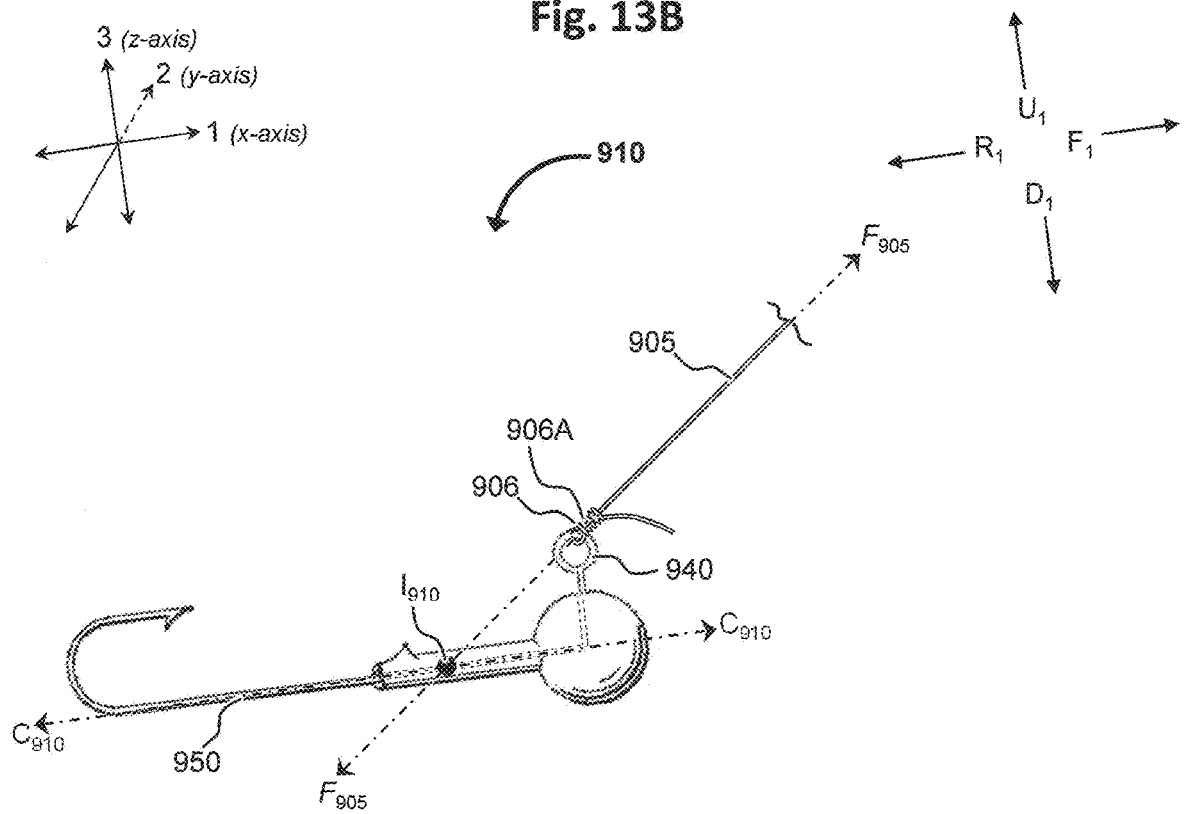
FIG. 13B is a side perspective view showing a conventional jig having a fishing line attached to the eyelet.

Referring now to FIGS. 13A-13H, threading the fishing line 105 through the body component 120 via the through-line element 130 of the invention of the present disclosure, as well as tying a fishing line 105 directly to the shank 160 via a knot 106, offers further significant advantages over conventional jigs 910. For example, the center of gravity for jigs 110,910 in general is primarily determined by the body component 120,920 of such jigs. The laws of physics applicable to locating the focus of applied forces closer to the center of gravity results in an improved stabilization of the inventive jig 110, such as when casting, jigging, or otherwise, as compared to conventional jigs under the same or similar conditions. As illustrated in FIGS. 13A-13B, the intersection $I_{110}$ of the axial center $C_{110}$-$C_{110}$ of the inventive jig 110 and the general axial pulling force $F_{105}$-$F_{105}$ of the fishing line 105 (i.e., disposed through the through-line element 130 of the body component 120 and attached to the shank 160 via knot 106) during use occurs closer to the center of gravity of the inventive jig 110 (which is generally located near the center of the body component 120), as compared to conventional jigs 910 under the same or similar conditions. In contrast, the intersection 1910 of the axial center $C_{910}$-$C_{910}$ of conventional jigs 910 and the general axial pulling force $F_{905}$-$F_{905}$ of the fishing line 905 (i.e., disposed upon the eyelet 940 by way of a knot 906, which is located above and away from the center of gravity of conventional jigs 910, and wherein no portion of the fishing line 905 is disposed within the body component 920) during use occurs further away from the center of gravity of conventional jigs 910 (which is generally located near the center of the body component 920), as compared to the inventive jig 110 under the same or similar conditions.

With further reference to FIGS. 13C-13H, it has been discovered herein that during use, the relative position of the inventive jig 110 (e.g., with respect to the x-y plane defined by the surface of the water) is more stable and controllable by the user as compared to conventional jigs under the same or similar conditions. In addition, the movement of the inventive jig 110 in response to forces applied through the fishing line 105 (e.g., by a user pulling on the fishing line 105 via a fishing pole 102) is more constant and predictable over time at any given degree of force applied. This phenomenon is believed to be the result of, inter alia, the inventive jig's 110 unique overall design (e.g., having a through-line element 130 with line 105 securement upon the shank 160), as well as the focus for forces applied being located proximate to the center of gravity of the jig 110. In contrast, conventional jigs 910, in addition to being relatively less stable and less controllable, exhibit movements in response to substantially similar forces applied through the fishing line 905 that are less constant and less predictable (as compared to the inventive jig 110 under the same or similar conditions). This phenomenon is believed to be the result of, inter alia, the overall inferior design of conventional jigs 910, as wells as the focus for forces applied occurring at a location that is exterior to the body component 920 (i.e., upon the eyelet 940) and farther away from center of gravity.

When viewed in a direction perspective extending from a fishing lure to a fishing pole, a fishing line 105, upon attachment to the inventive jig 110 of the present disclosure, first extends from the knot 106 disposed upon the shank 160, then enters the body component 120 through an opening 132A (or optionally opening 142A if a protective member 140 is present) located proximate to, or more preferably adjacent to, the interface formed by the shank 160 and the exterior surface 120A of the body component 120, and finally travels through the body component 120 at or near the jig's 110 center of gravity, all prior to the fishing line 105 extending to the fishing pole 102 from the lure 100. In contrast, a fishing line 905, upon attachment to conventional jigs 910, simply extends from the knot 906 disposed upon the eyelet 940 (wherein said eyelet 940 is located a given distance beyond the exterior surface 920A of the body component 920 (i.e., farther away from the jigs' 910 center of gravity)) and then travels directly to the fishing pole 902. In other words, the unique configuration of the inventive lures 100 of the present disclosure, such as the inventive jig 110 described herein, provides capability for such lures 100 to function as a natural extension of the fishing line 105, whereas in contrast, the configuration of conventional jigs 910 renders any such lures as merely an external attachment to the line 905.

Moreover, upon attaching a fishing line 105 to a lure 100 of the present disclosure (e.g., the inventive jig 110 described herein), an advantageous static knot 106A (further defined above) can be formed. As a result, the focus and angle of forces applied to the lure 100 (via a fishing line 105 attached thereto) remains substantially constant during use, making movements and other reactions of the lure 100 to such forces consistent and repeatable, and thus predictable. This provides a highly desirable benefit and advantage over conventional jigs 910 (e.g., with respect to the goal of catching fish more effectively). In contrast, upon attaching a fishing line 905 to conventional jigs 910, such as by tying the line 905 into a knot 906 onto the loop element 942 of the protruding eyelet 940, and then subsequently cinching it, an inferior dynamic knot 906A (further defined above) is formed. As a result, the focus and/or angle of forces applied (via a fishing line 905 attached to the eyelet 940) tend to change along the loop element 942 of the eyelet 940 at any given time during use. Indeed, it has been discovered herein that the movements of conventional jigs 910 resulting from such forces applied via the fishing line 905 largely depend upon the position and orientation of the knot 906 along the loop element 942 at any given time. Thus, since the knot 906 tends to move about the entirety of the loop element 942 of the eyelet 940 in an unpredictable manner during use, such movement of the knot 906 can unpredictably change the angle and direction of the forces applied to conventional jigs 910 via the fishing line 905, which in turn causes the movements and other reactions of conventional jigs 910 to such forces to be substantially inconsistent and non-repeatable, and thus unpredictable, revealing an undesirable disadvantage that significantly negatively impacts conventional jigs 910 (e.g., with respect to the goal of catching fish more effectively). Such advantages of the inventive lure 100 of the present disclosure (e.g., the inventive jig 110 described herein) over conventional jigs 910 with respect to knot position and the predictability of knot movement are further demonstrated in Examples 1A-1C, discussed below.

Referring now to FIGS. 14A-14H, upon its formation, the inventive fishing lure 100 of the present disclosure can be decorated to make it look more aesthetically appealing to a fish and/or a user, including application(s) thereto of various coatings 115, colors, designs, attachments (e.g., feathers, streamers, etc.), and the like, and combinations thereof. Materials utilized for such coatings 115 can include, but are not limited to, paint coatings (e.g., enamels, latex, polyurethanes, etc.); epoxies and other resins; powder coatings, thermoplastics and other thermal-reactive polymers; other plastic polymers; and the like. Such coatings 115 can be applied to the inventive fishing lure 100 using any suitable technique known in the art including, but not limited to, dipping, spraying, brushing, drawing, and the like. Accordingly, such decorating can be accomplished by applying a coating 115 to the inventive jig 110, preferably covering at least a portion of the body component 120. In some preferred aspects, the exposed portion of the shank 160 (i.e., the second region 164) will be free of coating 115, for improved benefits (e.g., ease of tying a fishing line 105 into a knot 106 around the shank 160 and subsequently cinching the knot 106, preferably positioning said knot 106 adjacent to the interface formed between the shank 160 and the exterior surface 120A of the body component 120).

Figure 14A:
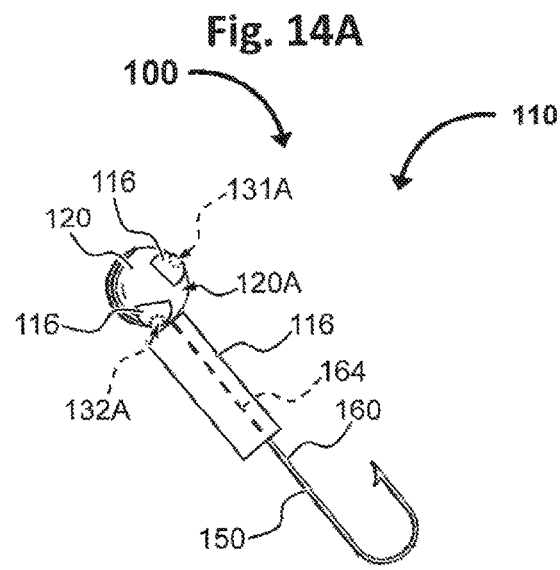
FIG. 14A is a side perspective view showing one aspect of an inventive fishing lure of the present invention in the form of a jig having masking component attached thereto.

Preventing desired locations from application of a coating 115 can be accomplished using techniques well-known in the art, such as covering, masking (e.g., via a masking component 116, etc.), selective-exposure, templates, and the like (see e.g., FIG. 14A). However, it should be understood that any suitable variations of embodiments comprising a coating 115, as may be desired or would be apparent to persons having ordinary skill in the art (including, but not limited to, embodiments wherein coating 115 is disposed on at least a portion of the hook component 150 and or optional features), are also contemplated herein without departing from the scope of the invention.

As illustrated in FIG. 14A, in some desirable embodiments, the first opening 131A and the second opening 132A of the through-line element 130 will desirably be free of coating 115 to enable access for disposing a fishing line 105 therethrough, as well as to reduce or eliminate abrasion and/or other such damage to the line 105 from said coating 115. Such embodiments also eliminate undesirable extra steps required to break-through or otherwise remove coating 115 from blocking access to the through-line element 130. Preventing the deposition of coating 115 upon the first opening 131A and the second opening 132A of the through-line element 130 can be accomplished using techniques well-known in the art, such as plugging, covering, masking (e.g., via a masking component 116, etc.), selective-application/exposure, templates, and the like. However, such techniques, while suitable herein without departing from the scope of the invention, can include potential drawbacks, namely, the extra steps of applying the masking component 116 to the desired location(s) of the inventive fishing lure 100 prior to application of a coating 115, and then removal of the masking component 116 subsequent to application of the coating 115. In addition, such as in the case of a masking component 116 in the form of masking tape, the subsequent removal of the masking component 116 may result in greater areas devoid of coating 115 than intended and/or deposition of residual adhesive onto the exterior surface 120A of the body component 120.

Figure 14B:
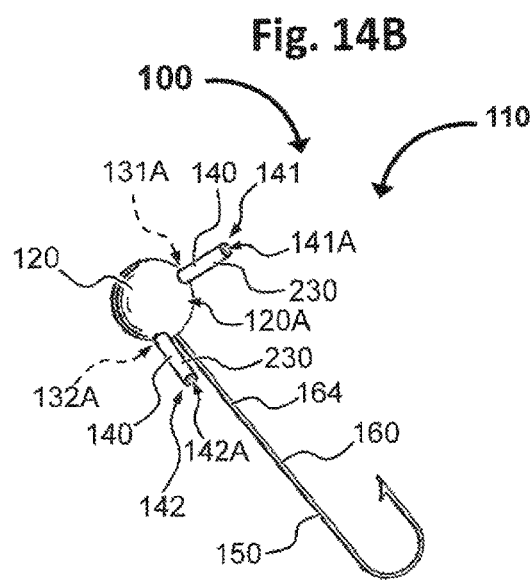
FIG. 14B is a side perspective view showing one aspect of an inventive fishing lure of the present invention in the form of a jig having an extended optional protective member.
Figure 14C:
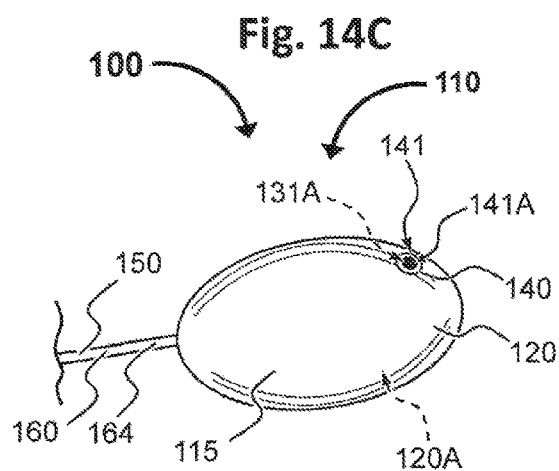
FIG. 14C is a side perspective view showing one aspect of an inventive fishing lure of the present invention in the form of a jig comprising an optional coating.
Figure 14D:
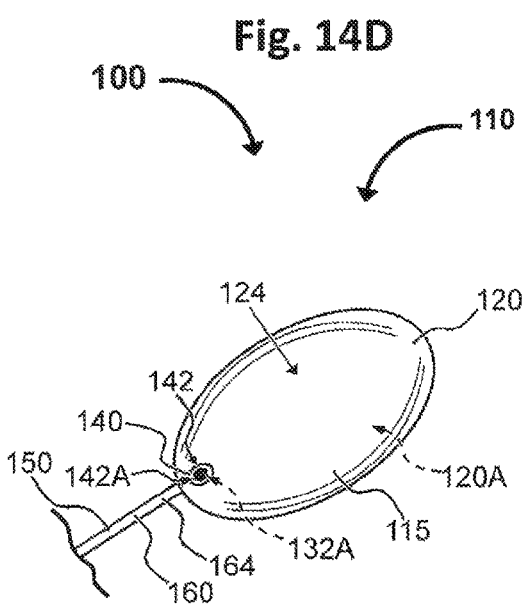
FIG. 14D is a side perspective view showing one aspect of an inventive fishing lure of the present invention in the form of a jig comprising an optional coating.
Figure 14E:
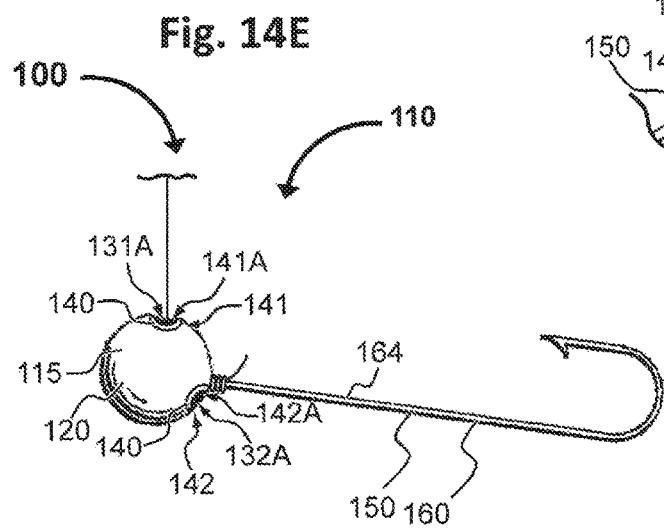
FIG. 14E is a side perspective view showing one aspect of an inventive fishing lure of the present invention in the form of a jig comprising an optional coating.
Figure 14F:
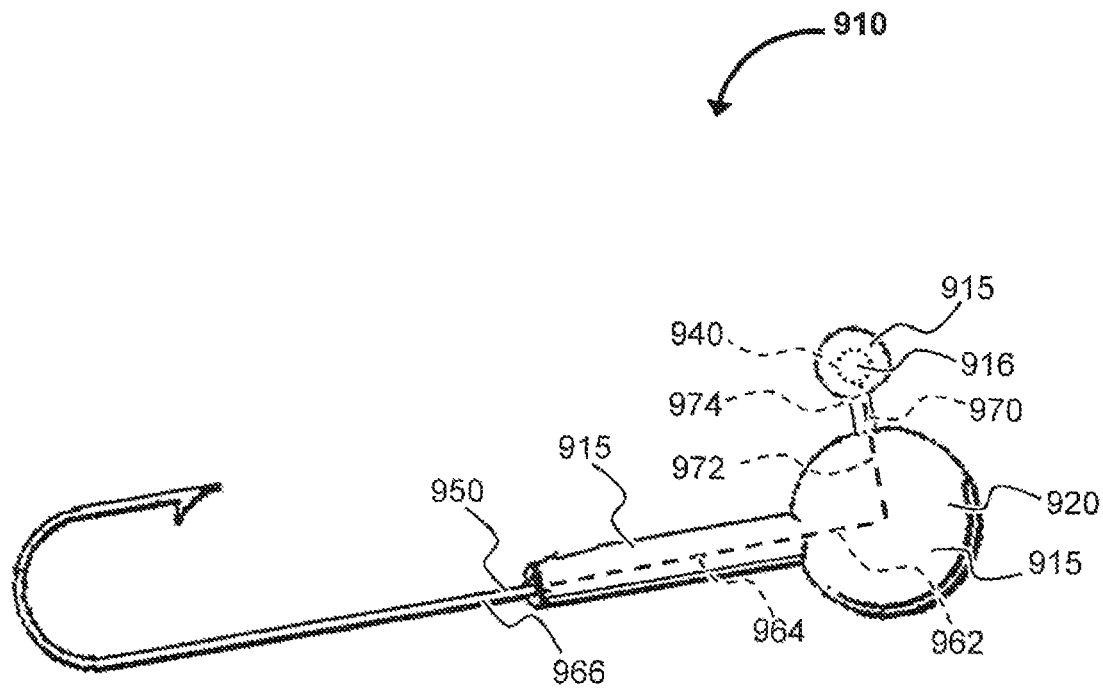
FIG. 14F is a side perspective view showing a conventional jig comprising an optional coating.
Figure 14G:
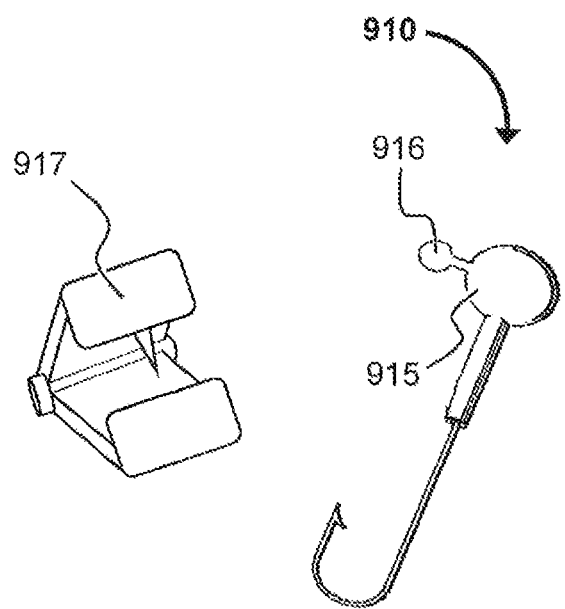
FIG. 14G is a side perspective view showing a coating plug removal device and a conventional jig having a coating plug.

In some preferred embodiments, the through-line element 130 (including, but not limited to the first opening 131A and the second opening 132A) can be maintained free of coating 115 deposition by virtue of the method used for formation of the inventive fishing lure 100. For example, in the case of the inventive jig 110 of the present disclosure, the step of removing a through-line element formation member 230 subsequent to a molding process (see e.g., FIGS. 24B-24D) can simply be delayed until application of a coating 115 has been completed. Similarly, as illustrated in FIG. 14B, in aspects wherein the inventive fishing lure 100 comprises an optional protective member 140, it may be desirable to include a through-line element formation member 230 in the form of a protective member 140 during the molding process having a suitable longitudinal length $L_{140}$ such that the first end 141 and/or the second end 142 extend beyond the first opening 131A and/or the second opening 132A of the through-line element 130 (i.e., exterior to the exterior surface 120A of the body component 120), wherein the step of trimming the exterior portions of the through-line element formation member 230 (i.e., the protective member 140 in this example) can simply be delayed until application of a coating 115 has been completed. Such aspects are not only useful for reducing or eliminating deposition of coating 115 within the through-line element 130 (i.e., by utilizing the through-line element formation member 230 and/or optional protective member 140 in lieu of a masking component 116) to reduce or eliminate plugging of the first opening 131A and/or the second opening 132A of the through-line element 130, but are also useful for eliminating the extra steps required for utilizing a masking component 116, as well as eliminating the occurrence of greater areas devoid of coating 115 than intended and/or potential deposition of residual adhesive onto the exterior surface 120A of the body component 120 (such as in the case of masking tape). Thus, as further illustrated in FIGS. 14C-14E, the features and benefits of these particular aspects provide yet additional advantages of the inventive fishing lure 100 as compared to conventional fishing lures (such as conventional jigs 910).

Indeed, it is well recognized in the art that application of a coating to a fishing lure, such as a jig for example, can significantly improve the aesthetics and effectiveness of the lure, thus making application of a coating highly desirable. Unfortunately, as illustrated in Comparative FIG. 1J and FIGS. 14F-14H, application of such coatings 915 to conventional jigs 910 creates problems (e.g., plugging of the eyelet 940), in contrast to benefits. For example, with additional reference to Comparative FIGS. 1A-1R, since the eyelet 940 and upper region 974 of the vertical shaft portion 970 protrude through the body component 920 of conventional jigs 910, these elements 940,974 are inherently covered with coating 915 during the application process. As a result, the coating 915 tends to fill-in the opening 944 of the eyelet 940 and, upon drying and hardening, typically creates a coating plug 916 in the eyelet 940 (see e.g., FIGS. 14F-14G and Comparative FIG. 1J). As further illustrated in FIG. 14G, the task of restoring the opening 944 in the eyelet 940 of conventional jigs 910 having a coating 915 typically requires the use of a removal device 917 (e.g., eye-popper devices, knife blades, hook points of other conventional jigs 910, small nails, a user's teeth, fingernail clippers, pliers, etc.) capable of physically breaking through and removing at least a portion of the hardened coating 915 that has formed a plug 916 in the eyelet 940. Accordingly, the formation of such plugs 916 inherent to conventional jigs 910 having coatings 915 requires a user to perform additional coating removal steps, as well as the acquisition and use of an additional removal device 917, prior to attaching a fishing line 915, resulting in further disadvantages of conventional jigs 910 as compared to the inventive jig 110 of the present disclosure.

In addition, as coatings 915 tend to become relatively hard and strong following application, and since the opening 944 of the eyelet 940 tends to be very small (e.g., relative to a user's finger), any attempted breakage and removal of the plug 916 and other surrounding coatings 915 (e.g., coatings 915 disposed upon and covering over the entire loop element 942 and opening 944 of the eyelet 940) tends to be both difficult and time consuming, even despite the aid of a removal device 917, thus increasing both the amount of time wasted and a user's frustration level, as compared to the inventive jig 110 of the present disclosure.

Furthermore, the removal of coatings 915 from conventional jigs 910, particularly the required removal of the plug 916 which is inherent to conventional jigs 910 having a coating 915, frequently results in injury to users (e.g., bruises, strains, sprains, puncture wounds, scrapes, lacerations, chipped/broken finger nails and/or teeth, etc.). Thus, the inferior design and configuration of conventional jigs 910 (as compared to the inventive jig 110) effectively creates a potential safety hazard, which is significantly reduced or eliminated by the invention 100 of the present disclosure.

Figure 14H:
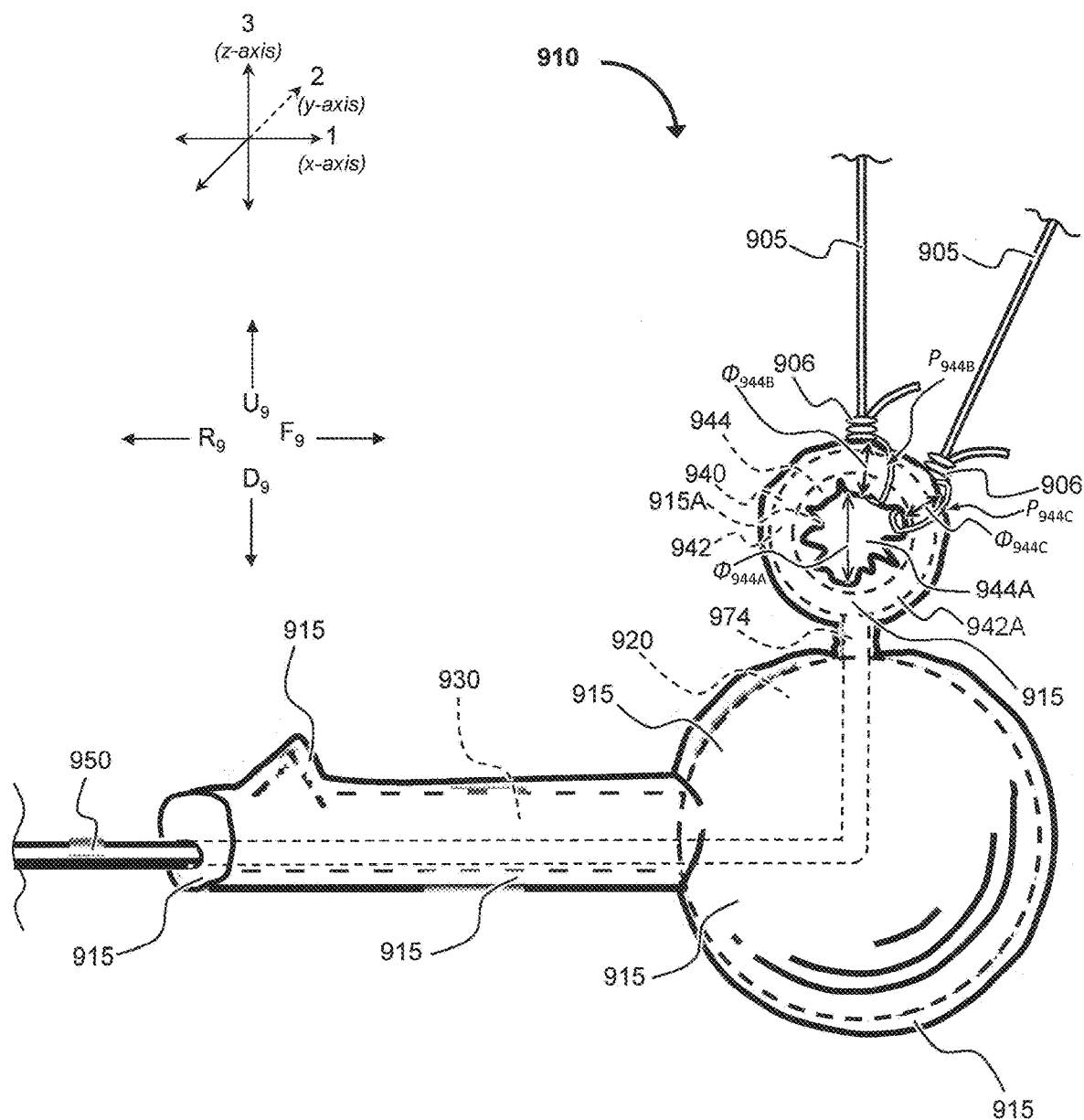
FIG. 14H is a partial side perspective view showing a conventional jig comprising a coating.

Moreover, the removal of coatings 915 from conventional jigs 910 in effect defaces and damages the jigs 910, which in turn diminishes the intended aesthetics provided by such coatings 915 (which consequently can eviscerate the very purpose of having such coatings 915). In addition, such defacement of conventional jigs 910, particularly to the eyelet 940, upper region 974 of the vertical shaft portion 970, and/or the surrounding area of the body component 920, typically results in destructive topographical changes 915A (e.g., scrapes, slits, burrs, jagged edges, etc.) which can cause abrasion and/or other such damage to the fishing line 905 and/or knot 916 adjacent thereto. Consequently, the required removal of coatings 915 from conventional jigs 910 can cause weakening of fishing line strength, reduction of line quality, reduction of line durability, shortening of fishing line lifespan, severing of the fishing line when catching a fish, and the like, thus making conventional jigs 910 comprising coatings 915 to be inapposite to the goal of catching fish more effectively. For example, as illustrated in FIG. 14H, due to the relatively high adhesive properties of coating 915, the removal device 917 typically enables a user to remove a first amount of the hardened coating 915 from the eyelet 940, but also tends to allow a second portion of the coating 915 to remain attached to the loop element 942 of the eyelet 940, and even to extend into the area of the opening 944, thus forming a new opening 944A having a new diameter $\Phi_{944A}$ that is less than the original intended diameter $\Phi_{944}$ of the opening 944 (i.e., the diameter $\Phi_{944}$ of the opening 944 when in an uncoated state). Moreover, the act of physically breaking the hardened coating 915 typically results in the creation of uneven surfaces, sharp edges, and the like, such that the profile of the new opening 944A is no longer uniform (e.g., circular) for the opening 944 of the eyelet 940 as intended in its original uncoated state. Similarly, the coated loop element 942A (to which a fishing line 905 is tied) is likewise no longer as uniform, nor as smooth, as the surface of the loop element 942 as intended in its original uncoated state. As a result, the knot 906 is susceptible to loosening, such that it can shift location during use from a first position $P_{944B}$ to a second position $P_{944C}$ on the coated loop element 942A having a second diameter $\Phi_{944C}$ that is less than the first diameter $\Phi_{944B}$ of the first position $P_{944B}$. Furthermore, any such uneven surfaces, sharp edges, and the like, will typically result in abrasion and/or other such damage to the knot 906 and/or fishing line 905 which can result in a weakening of line strength, reduction of quality, reduction of durability, shortening of fishing line 905 lifespan, severing of the fishing line 905 when catching a fish, and the like (i.e., inapposite to the goal of catching fish more effectively).

Fortunately, such problems as discussed above relating to conventional jigs 910 comprising a coating 915 have been overcome by the invention of the present disclosure. For example, in contrast to conventional jigs 910, the inventive jig 110 of the present disclosure (in addition to the advantageous features already discussed above) do not have a wire shaft portion 970 or an eyelet 940 protruding from the surface of its body component 120, which alone (i.e., even without any of the numerous other advantageous features and benefits of the present invention) solves the numerous problems associated with conventional jigs 910 having a coating 915 disposed thereon.

In addition, it should also be emphasized that full assembly of conventional jigs 910 must be completed prior to applying a coating 915, which results in yet another disadvantage inherent to conventional jigs 910, and which on its own results in many of the problems discussed above which are caused by the application of coatings 915 onto such jigs 910, particularly onto the eyelet 940. However, in contrast to conventional jigs 910, the inventive fishing lures of the present disclosure do not require such complete assembly prior to applying coatings 115. Rather, yet another advantage of the present invention is that coatings 115 can be applied while the inventive jig 110 is only partially assembled. More particularly, coatings 115 can be applied prior to removing the through-line element formation member 230 and/or prior to trimming an optional protective member 140 (see e.g., FIG. 14B), thus preventing the coating 115 from entering or otherwise fouling the critical surfaces and/or opening areas of the inventive fishing lures 100 with which a fishing line 105 contacts during use. Accordingly, abrasion and/or other such damage to the knot 906 and/or fishing line 905 of conventional jigs 910 is reduced or eliminated by the present invention 100, which in turn results in improved line strength, improved quality, improved durability, lengthening of fishing line 105 lifespan, greater resistance to severing of the fishing line 105 when catching a fish, and the like, and combinations thereof (i.e., thus improving the goal of catching fish more effectively), as compared to conventional jigs 910 otherwise under the same or similar conditions.

Referring now to FIGS. 15A-15E, in some embodiments, the inventive fishing lure 100 of the present disclosure can include an optional bait 107 disposed thereon. The selection of such a bait 107 can depend upon various factors including, but not limited to, shapes, colors, movement characteristics, targeted fish variety, style/type of fishing, fishing conditions, user preference, and the like. Such a bait 107 can include, but is not limited to, live bait (further defined above), artificial bait 109 (further defined above), hybrids, and/or combinations thereof. A live bait is generally a living organism, or a portion thereof, which can attract the attention of a fish (e.g., by sight, movement, scent, sound, etc.) and is capable of being attached to the lure 100 of the present disclosure. Examples of suitable live bait can include, inter alia, larvae, insects, worms, leaches, amphibians, minnows, crayfish, crab, shrimp, squid, animals, cut baits, fish eggs, fish spawn sacks, and the like.

In comparison, an artificial bait is generally a fabricated product which can attract the attention of a fish and is capable of being attached to the lure 100 of the present disclosure. Such artificial baits are typically well-known to persons having ordinary skill in the art and can be fabricated to resemble one or more characteristics of a live bait (e.g., by sight, movement, scent, sound, etc.) though it need not be, and/or can have other particular properties to desirably make it attractive to fish (particularly when in use, such as in water). Examples of suitable artificial bait can include, inter alia, swimbaits, wigglers, twisters, fliptails, skirttails, floaters, flies, decoys, dough balls, and the like. Artificial baits typically comprise a synthetic material (e.g., plastic, rubber, fibers, phosphorescents, LED's, scents, sound emitters, etc.), though it need not be. For example, plastic artificial bait 109 can be made from a soft, flexible plastic commonly known as plastisol (further defined above). The plastisol is readily processed and cured in a mold to produce soft plasticized artificial bait which can have many different sizes, shapes and colors. In its cured form, an artificial bait comprising plastisol can be very flexible and pliable, which allows it to wiggle or move in the water in ways that are attractive to fish. In addition, such artificial bait can alternatively or additionally comprise a natural (i.e., organic) material as well (e.g., plants, grains, animal hair, feathers, etc.). For example, an artificial bait can comprise a dough-like substance having a strong scent that is attractive to fish. One such substance is available under the brand name BERKLEY POWERBAIT, sold by Pure Fishing, Inc. having a place of business located in Columbia, S.C. U.S.A., which is incorporated herein by reference in a manner that is consistent herewith.

As illustrated in FIGS. 15A-15E, in some aspects, a bait 107 can be attached to a portion of the lure 100 of the present disclosure, such as via the hook component 150 of an inventive jig 110. In further aspects, the bait 107 can be removably attached and/or interchangeable with another bait. For instance, as illustrated in FIGS. 15A-15D (showing one non-limiting example of a bait 107 having a top side 107T, a bottom side 107B, a front end 107F and a rear end 107R), attachment direction 107A of such baits 107 to the inventive jig 110 can be accomplished by:

i.) skewering 107A the sharp barbed element 190 of the hook component 150 into a first location 107C (typically the front end 107F of the bait 107) while simultaneously pushing upon the rear end 107R of the bait 107 longitudinally in a generally rearward direction $R_1$ (i.e., along the longitudinal axis $X_{107}$ such that the barbed element 190 travels from the front end 107F of the bait 107 towards the rear end 107R) along the second linear region 186 of the curvilinear hook portion 180 of the hook component 150 (see e.g., FIGS. 6B-6D and 15B);

ii.) then threading 107A' the barbed element 190 along at least a portion of the general longitudinal length of the bait 107 (i.e., along the longitudinal axis $X_{107}$ such that the barbed element 190 travels generally from the front end 107F towards the rear end 107R and top side 107T of the bait 107) while simultaneously pushing the bait 107 around the longitudinal axis $X_{184}$ of the curvilinear region 184 of the hook component 150 (see e.g., FIGS. 6B-6D and 15C-15D) and further protruding the barbed element 190 out of the bait 107 at a desired second location 107D (typically along the top side 107T of the bait 107); and iii.) then pushing 107A" the bait 107 longitudinally (i.e., along the longitudinal axis $X_{107}$ from the front end 107F towards the rear end 107R of the bait 107) in a generally frontward direction $F_1$ along the longitudinal axis $X_{160}$ of the shank 160 towards the body component 120, desirably such that the front end 107F of the bait 107 is generally disposed proximate or adjacent to the body component 120 of the inventive jig 110, with the barbed element 190 and at least a portion of the curvilinear hook portion 180 typically extending from the top side 107T of the bait 107 (see e.g., FIGS. 6B-6D and 15E).

Figure 15C:
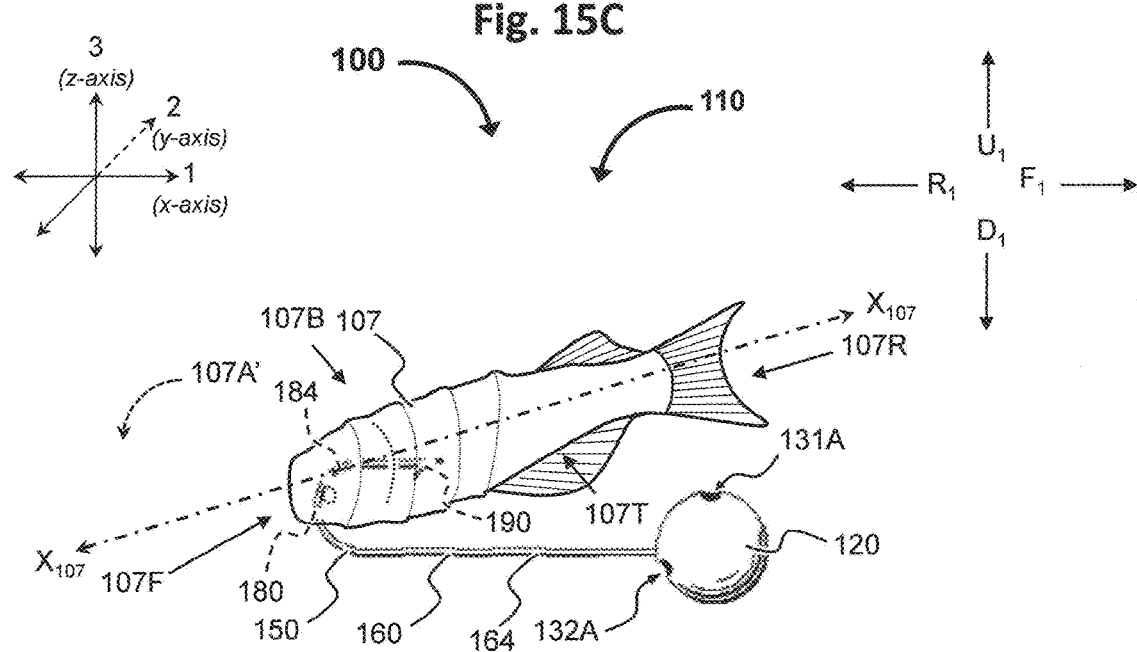
FIG. 15C is a side perspective view showing the jig and bait of FIG. 15A wherein the bait partially attached to the jig.
Figure 15D:
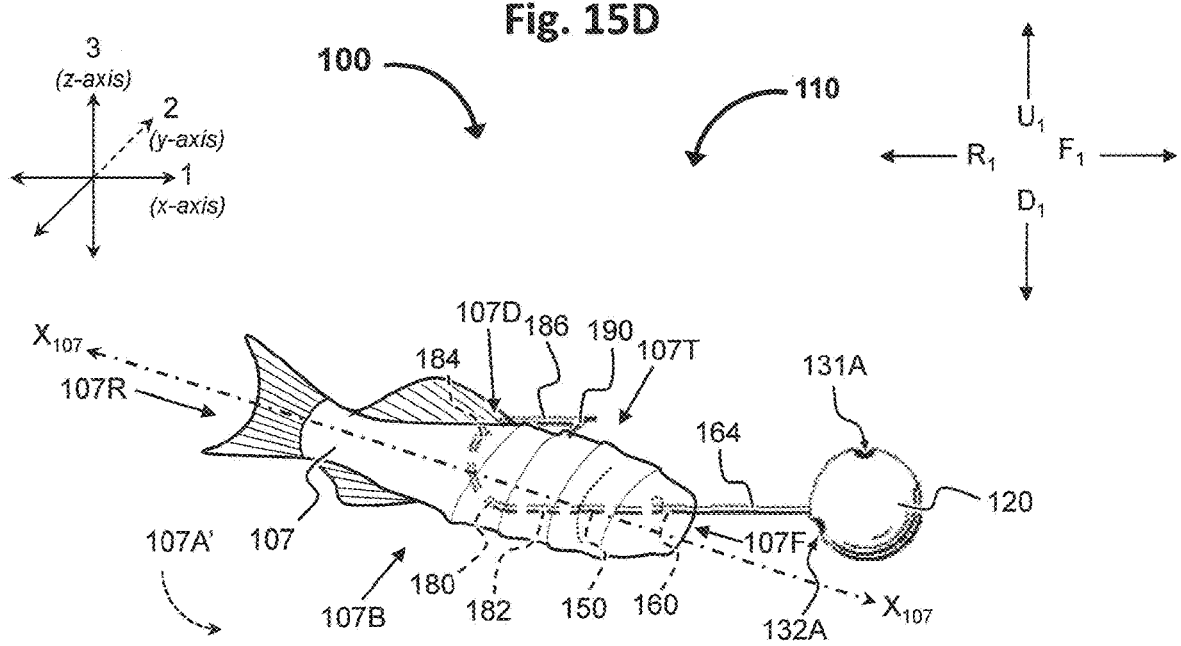
FIG. 15D is a side perspective view showing the jig and bait of FIG. 15A wherein the bait attached to the jig.
Figure 15E:
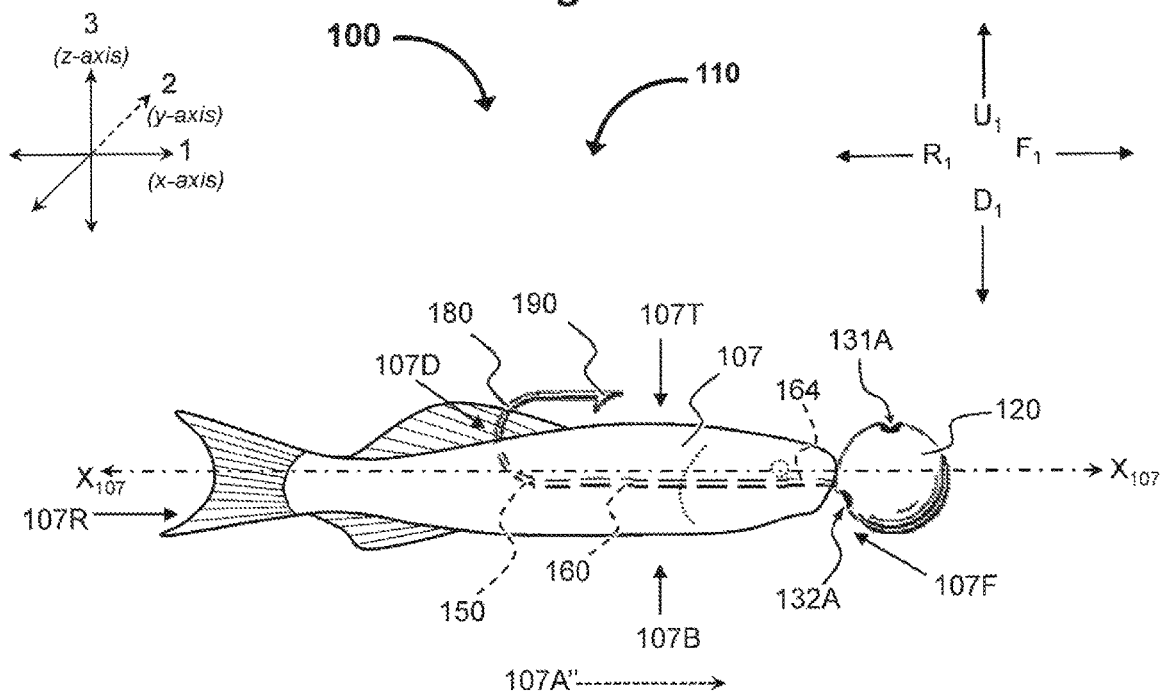
FIG. 15E is a side perspective view showing the jig and bait of FIG. 15A wherein the bait fully attached to the jig.

Consequently, as illustrated in FIG. 15E, upon attachment of a bait 107 to the jig 110, at least a portion of the hook component 150 is hidden from a fish's visual perception. It should be understood that any suitable variations of such example, or other suitable method for attachment, as may be desired or would be apparent to persons having ordinary skill in the art, are also contemplated herein without departing from the scope of the invention.

Referring now to FIGS. 16A-16G, in some aspects, the inventive fishing lure 100 of the present disclosure can include an optional bait retention member 178. However, it should be understood that another advantage of the present invention includes that the knot 106 can function as a bait retention member, without the presence of a separate bait retention member 178 disposed thereon. Nonetheless, when present, such bait retention member 178 can be useful for enhancing retention of an optional bait 107 to the lure 100, and/or securing an optional bait in the original attached position with respect to the lure 100 as set by a user. In some aspects, the optional bait retention member 178 can alternatively or additionally function as a secondary hook suitable for catching a fish, for example.

As referenced above, in some desirable aspects, such optional bait retention member 178 can help maintain the configuration (i.e., positioning) of a bait 107 with respect to the lure 100, such as at its initial attached position as disposed by a user. For example, upon attaching a bait 107 to an inventive jig 110 of the present disclosure, such attached bait can be subjected to one or more of a variety of damaging forces (e.g., stress/strain, tension, friction, inertial, centrifugal, etc.), such as those forces resulting from transport, casting, retrieval (i.e., reeling-in of the jig 110 during use), jigging, trolling, bait wiggle during use, contact of the bait 107 with external objects, fish bites, and the like. Such forces can result in an undesirable repositioning of the bait 107 upon the hook component 150 from an ideal state (i.e., from its initial position on the shank 160, such as where the front end 107F of the bait 107 is generally disposed proximate or adjacent to the body component 120) (see e.g., FIG. 15E) to a less ideal or undesirable state. Examples of such changed position of the bait 107 to a less ideal or undesirable state can include, but are not limited to: wherein the front end 107F of the bait 107 moves to a position proximate to the first linear region 182 of the curvilinear hook portion 180 of the hook component 150 (see e.g., FIG. 15D); wherein the front end 107F of the bait 107 moves to a position proximate to the curvilinear region 184 of the curvilinear hook portion 180 of the hook component 150 (see e.g., FIG. 15C); wherein the front end 107F of the bait 107 moves to a position proximate to the second linear region 186 of the curvilinear hook portion 180 of the hook component 150 or even proximate to barbed element 190 at the end 186A of the curvilinear hook portion 180 of the hook component 150 (see e.g., FIG. 15B); wherein the bait 107 becomes slidably moveable along at least a portion of the hook component 150; wherein the bait 107 becomes detached from the lure 100 (see e.g., FIG. 15A); and the like.

Returning now to FIGS. 16A-16G, and referring generally to the non-limiting examples of the inventive fishing lure 100 of present disclosure in the form of a jig 110, in some aspects, the optional bait retention member 178 can be disposed proximate or adjacent to the second region 164 of the shank 160 of the inventive jig 110. For example, the bait retention member 178 can be integral with, or attached directly or indirectly to, the second region 164 of the shank 160. In other aspects, the optional bait retention member 178 can be disposed proximate or adjacent to another component of the inventive jig 110, such as the body component 120. Suitable methods for integrating or attaching the bait retention member 178 to an inventive fishing lure 100 can include, for example, and without limitation on the generality of attachment methods, soldering, adhesive, tying, wrapping, molding, boring, and the like, and combinations thereof, and/or other suitable methods for attachment as would be apparent to persons having ordinary in the art. In general, the composition of the bait retention member 178 can comprise, for example, and without limitation on the generality of size or materials, a metal wire, a composite material, a molded material such as lead, steel, tungsten or ceramic, and/or other suitable material as would be apparent to persons having ordinary in the art.

Additionally, in some aspects, it may be desirable that an inventive fishing lure 100 of the present disclosure comprising an optional bait retention member 178 can be configured such that the optional bait retention member 178 does not block, or otherwise inhibit the function of, the second opening 132A (or 142A) of the through-line element 130. For example, it may be desirable that an inventive fishing lure 100 comprising an optional bait retention member 178 does not prevent, or otherwise interfere with, securing a fishing line 105 to the lure 100, such as via tying a fishing line 105 into a knot 106 around the second region 164 of the shank 160 of an inventive jig 110. In further aspects of such embodiments, it may be desirable that an inventive jig 110 comprising an optional bait retention member 178 can additionally or alternatively be configured such that the bait retention member 178 does not prevent, or otherwise inhibit, cinching the knot 106 proximate or adjacent to the interface $Q_{162}$ formed between the second region 164 of the shank 160 and the exterior surface 120A on the rear side 122 of the body component 120. In still further aspects of such embodiments, it may be desirable that a lure 100 comprising an optional bait retention member 178 can additionally or alternatively be configured such that the bait retention member 178 does not prevent, or otherwise inhibit, ideal positioning of the bait 107 at a desired location upon the lure 100 via attachment thereto, such as the front end 107F of the bait 107 generally disposed adjacent to the body component 120 of the inventive jig 110.

As illustrated in FIG. 16A, in one non-limiting exemplary embodiment, the optional bait retention member 178 can be in the form of one or more spines which can be affixed to, or integral with, the second region 164 of the shank 160 of the inventive jig 110, and can extend outward therefrom.

As illustrated in FIG. 16B, in another non-limiting exemplary embodiment, the optional bait retention member 178 can be in the form of one or more barbs which can be affixed to, or integral with, the second region 164 of the shank 160 of the inventive jig 110, and can protrude outward therefrom.

As illustrated in FIG. 16C, in yet another non-limiting exemplary embodiment, the optional bait retention member 178 can be in the form of one or more spiral elements (e.g., a small coiled wire that is shaped like a corkscrew) attached to, or integral with, the body component 120 and extending in a generally rearward direction $R_1$ therefrom, and which desirably may be generally coplanar with the shank 160. Examples of such spiral elements include those sold under the trade names HITCH HIKER (such as those sold by Jann's Netcraft, having a place of business located in Maumee, Ohio, U.S.A.), TWISTLOCK and TWISTLOCK WITH CPS (Centering Pin Spring) (such as those sold by Owner American Corporation, having a place of business located in Costa Mesa, Calif., U.S.A.), each of which is incorporate herein by reference in a manner that is consistent herewith.

As illustrated in FIG. 16D, in still another non-limiting exemplary embodiment, the optional bait retention member 178 can be in the form of one or more generally check mark-shaped elements attached to, or integral with, the body component 120 and extending in a generally rearward direction $R_1$ therefrom, which can function as a hook for retaining a bait 107, and which desirably can be generally coplanar with the shank 160. In some aspects, such a check mark-shaped element can further function as a secondary hook for catching fish.

As illustrated in FIG. 16F, in yet another non-limiting exemplary embodiment, the optional bait retention member 178 can be in the form of a spring-clip fastener element having a first end 178', and an opposing second end 178" distal to the first end 178'. The first end 178' can be attached to, or integral with, an inventive jig 110 (e.g., the shank 160, the body component 120, etc.) and can generally extend along the second region 164 of the shank 160 therefrom toward the curvilinear hook portion 180 (e.g., shown in the illustrated example as extending in a generally rearward direction $R_1$, and generally coplanar with the shank 160). In addition, the second end 178" can be configured to lock into place at a suitable location upon the jig 110 (e.g., shown in the illustrated example as upon the shank 160 proximate to the second end 163 thereof). In the illustrated example, the shank 160 can optionally have a spiral profile such that a bait 107 can be generally wrapped around the shank 160, and then secured into place by a securing portion 178A releasably connected to a locking portion 178C.

As illustrated in FIG. 16G, in still another non-limiting exemplary embodiment, the optional bait retention member 178 can be in the form of a wire harness attached to, or integral with, the body component 120. In the illustrated example of such embodiments, the bait retention member 178 is shown as extending along either side of the shank 160 in a generally rearward direction $R_1$ from the body component 120, then continuing generally around the second linear region 186 of the curvilinear hook portion 180 of the hook component 150, and then terminating proximate to the barbed element 190 of the inventive jig 110 (and thus being generally coplanar with the hook component 150). Such bait retention member 178 in the form of a wire harness can generally surround a bait 107 while utilizing various forces (e.g., pressure, tension, friction, etc.) to hold the bait 107 in a desired position in relation to the shank 160. In some aspects, such bait retention member 178 in the form of a wire harness can secure a bait 107 to the jig 110 without penetrating the bait 107 (i.e., without the presence of a securing portion 178A having a barb or other such penetrating element).

It should be understood that any suitable variations of such optional bait retention member 178 examples, or other suitable methods for retaining a bait 107, as may be desired or would be apparent to persons having ordinary in the art, are also contemplated herein without departing from the scope of the invention.

While the examples illustrated in FIGS. 16A-16G each depicts the respective bait retention member 178 as being generally coplanar with the shank 160 in the x-z plane, such optional bait retention member 178 can be spatially attached around any point in relation to the cross-sectional 360° perimeter of the shank 160, as may be desired. Thus, although a number of non-limiting exemplary embodiments of optional bait retention members 178 are provided herein, it should be understood that any suitable configuration variations of such embodiments, as may be desired or would be apparent to persons having ordinary in the art, are also contemplated herein without departing from the scope of the invention.

In some aspects, it may be desirable to locate an optional bait retention member 178 at a particular distance away from the body component 120, such as along the longitudinal length of the shank 160. As illustrated in FIG. 16A, in one non-limiting exemplary embodiment, the bait retention member 178 can be located a suitable distance $D_{178C}$ from the interface $Q_{162}$. For example, and without limitation on the generality of distance, such bait retention member 178 can be located a distance $D_{178C}$ from the interface $Q_{162}$ of about 1% of the length of the second region 164 of the shank 160 extending in a rearward direction $R_1$ from the interface $Q_{162}$, such as about 5%, or about 10%, or about 25%, or about 50%, or about 75%, or more. In such embodiments, the bait retention member 178 can be located at any point upon the longitudinal length of the second region 164 of the shank 160 around the cross-sectional 360° perimeter thereof, as may be desired. Thus, one desirable outcome of such configuration can include, inter alia, a bait retention member 178 which does not interfere with securing a fishing line 105 to the shank 160 of the jig 110 via a knot 106 and/or does not prevent cinching of the knot 106 proximate or adjacent to the interface $Q_{162}$, though it need not be.

In some aspects, it may be desirable to locate the optional bait retention member 178 at a particular transverse distance away from the shank 160 at any given point along the longitudinal length of the shank 160. As illustrated in FIG. 16E, in one non-limiting exemplary embodiment, the bait retention member 178, with respect to the shank 160, can be located a suitable distance (i.e., transverse distance orthogonal to the longitudinal axis $X_{160}$ of the shank 160) away from the shank 160, as measure at the interface $Q_{162}$ (distance $D_{178}D$) and at any given point (distance $D_{178I}y$) along the longitudinal axis $X_{160}$ of the shank 160 (distance $D_{178D''}$) for the longitudinal length (along axis $X_{178B}$) of the bait retention member 178. One desirable outcome of such configuration can include, inter alia, a bait retention member 178 which does not interfere with securing a fishing line 105 to the shank 160 of the jig 110 via a knot 106 and/or does not prevent cinching of the knot 106 proximate or adjacent to the interface $Q_{162}$, though it need not be.

Referring now to FIGS. 16H-16J, in some aspects, the inventive fishing lure 100 of the present disclosure can include an optional collar component 179. In some further aspects of such embodiments, an optional bait retention member 178 can be integrated with, or attached to, such optional collar components 179. In general, such optional collar components 179 can be useful, inter alia, for increasing the overall protection of the inventive fishing lure 100 such as during use, influencing weight distribution of the lure 100, enhancing retention of an optional bait 107 to the lure 100, and the like.

Such optional collar components 179 can have a generally cylindrical shape (though they need not be) and can be defined by a longitudinal length $L_{179}$ along its longitudinal axis $X_{179}$, a cross-sectional length $\Phi_{179}$ along its transverse axis $Y_{179}$ (which in some aspects can be generally equivalent to its diameter at any given point along its longitudinal axis $X_{179}$), a first end 179A and an opposing a second end 179B distal to the first end 179A. In some aspects, the collar component 179 can substantially surround and/or encase a portion of the second region 164 of the shank 160, and thus can have a general diameter $\Phi_{179}$ that is greater than the outer diameter of the second region 164 of the shank 160.

In some aspects, the first end 179A of the collar component 179 can be located a distance $D_{179}$ from the interface $Q_{162}$ (formed between the second region 164 of the shank 160 and the exterior surface 120A on the rear side 122 of the body component 120) along the longitudinal axis $X_{160}$ of the shank 160, wherein the longitudinal axis $X_{179A}$ of the collar component 179 extends in a rearward direction $R_1$ from the first end 179A. One desirable outcome of such configuration can include, inter alia, a collar 179 (with or without an optional bait retention member 178) which does not interfere with securing a fishing line 105 directly to the shank 160 of the jig 110, such as via a knot 106, and/or does not prevent cinching of the knot 106 proximate or adjacent to the interface $Q_{162}$ (though it need not be). For example, as illustrated in FIG. 16H, and without limitation on the generality of distance, the first end 179A of the collar component 179 can be located a distance $D_{179}$ from the interface $Q_{162}$ of about 1% of the length of the second region 164 of the shank 160, such as about 5%, or about 10%, or about 25%, or about 50% or more.

As illustrated in FIG. 16I, in other aspects, the first end 179A of the collar component 179 can be located adjacent to the interface $Q_{162'}$, wherein the longitudinal axis $X_{179}$ of the collar component 179 extends along the shank 160 in a rearward direction $R_1$ from the first end 179A to the second end 179B. In such aspects, a fishing line 105 can be tied into a knot 106 around the collar component 179 itself (i.e., rather than directly to the second region 164 of the shank 160), and furthermore can be snugged tightly (i.e., cinched) proximate or adjacent to the interface $Q_{162'}$ formed generally at the intersection of the first end 179A of the collar component 179 and the exterior surface 120A on the rear side 122 of the body component 120.

As illustrated in FIG. 16J, in yet other aspects, the first end 179A of the collar component 179 can be integral with the body component 120, such as wherein the longitudinal axis $X_{179}$ of the collar component 179 extends from the rear side 122 of the body component 120 along the shank 160 in a generally rearward direction $R_1$ to the second end 179B. In some such aspects, a fishing line 105 can be secured to the inventive jig 110, such as via a knot 106, such that the fishing line 105 is tied around the collar component 179 itself (i.e., rather than directly to the shank 160) and then optionally cinched tightly proximate or adjacent to the exterior surface 120A of the rear side 122 of the body component 120 at the interface $Q_{162'}$.

As illustrated in FIGS. 16I and 16J, in some aspects, the collar component 179 can further comprise one or more optional bait retention elements 178D. Such bait retention elements 178D can be disposed upon the collar components 179 at any desired location along its longitudinal axis $X_{179}$, such as proximate or adjacent to the second end 179B of the collar component 179, for example. Such bait retention elements 178D can be in the form of, for example, and without limitation on the generality of such bait retention elements, a spur projection (see e.g., FIG. 16I), a flange disposed at least partially around the 360° perimeter of the collar component 179 (see e.g., FIG. 16J), and the like, or other suitable elements as may be desired, or would be apparent to persons having ordinary in the art, without departing from the scope of the invention.

Referring now to FIGS. 17A-17D, in some aspects, the inventive fishing lure 100 of the present disclosure can include one or more optional snag guard member 118. Such snag guard member 118 can be useful for further reducing the occurrence of prohibitive entanglement of the inventive fishing lure 100 with external obstacles during use, such as underwater plant life, rocks, wood, and the like (hereinafter such prohibitive entanglement may be also be referred to as a "snag" or "snagging"). However, such snag guard member 118 may not be desirable and/or can be unnecessary for the inventive fishing lure 100. In other words, one of the numerous advantages of the inventive fishing lure 100 (as compared to analogous conventional fishing lures 900 under the same or similar conditions) includes providing a significant reduction in the occurrence of snagging. For example, referring to the non-limiting exemplary embodiment of the inventive fishing lure 100 in the form of a jig 110, even without an optional snag guard member 118 present, the inventive jig 110 maintains a more flexible and controllable spatial orientation in the x-, y- and z-planes when in use, as compared to conventional jigs 910 under the same or similar conditions. Such advantageous spatial properties of the inventive jig 110 can result from, inter alia, elimination of the protruding eyelet 940 that is present on conventional jigs 910, the presence of the inventive through-line element 130, the provision for attaching a fishing line 105 proximate or directly to the second region 164 of the shank 160 (as opposed to the protruding eyelet 940 of conventional jigs 910), a more balanced center-of-gravity vis-à-vis the fishing line 105, and an ability to longitudinally rotate around obstructions (thus preventing the hook from embedding into a snagging obstruction), and the like (each of which research performed herein has revealed to be variables relating to the occurrence of snagging). Accordingly, in some aspects, the inventive fishing lure 100 can partially or entirely eliminate the need and/or desire for a snag guard member 118 as compared to analogous conventional fishing lures. Notwithstanding the foregoing, it should be understood that the inventive fishing lure 100 of the present disclosure can comprise one or more such optional snag guard members 118 without departing from the scope of the invention.

Figure 17A:
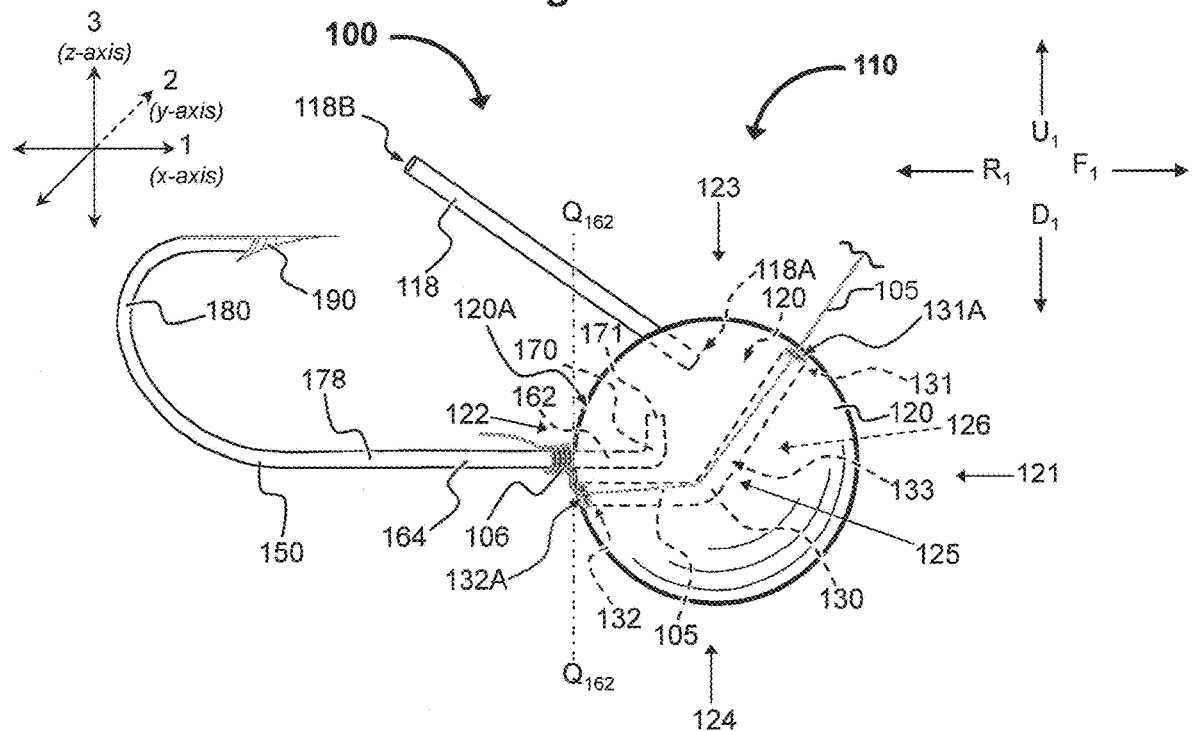
FIG. 17A is a side perspective view showing one aspect of an inventive fishing lure of the present invention in the form of a jig having an optional snag guard.

In general, snag guard members 118 are well-known in the art and can be applied to the present invention as desired. For example, as illustrated in FIG. 17A, in some aspects of such embodiments, the inventive jig 110 can comprise an optional snag guard member 118 in the form of a rigid deflector (e.g., a rigid metal wire) having a first end 118A, and an opposing second end 118B distal to the first end 118A. In such exemplary embodiments, the first end 118A of the snag guard member 118 can be integral with, or attached to, a relatively frontward $F_1$ portion of the inventive jig 110 (e.g., the body component 120, an optional collar component 179, etc.) and can extend therefrom generally in a rearward direction $R_1$ and upward direction $U_1$ towards a spatial point located generally above the barbed element 190 of the hook component 150, such that the second end 118B of the snag guard member 118 is proximate to, but not in direct contact with the barbed element 190. Accordingly, in some non-limiting aspects of such embodiments, the second end 118B can be spatially located a distance of about 0.15 cm to about 0.70 cm in a frontward direction $F_1$ from the barbed element 190 along the x-axis 1 and about 0.15 cm to about 0.70 cm in an upward direction $U_1$ from the barbed element 190 along the z-axis 3, to help ensure that the snag guard member 118 does not prevent a fish from grasping the barbed element 190 (i.e., does not prevent hooking), but is located close enough to the barbed element 190 to prevent snagging. Thus, upon encountering a potential snagging obstacle during use, such snag guard member 118 configurations can engage the obstacle and can then rotate the inventive jig 110 such that the barbed element 190 is then positioned away from the potential snagging obstacle and/or by diverting the directional line of travel of the jig 110.

Figure 17B:
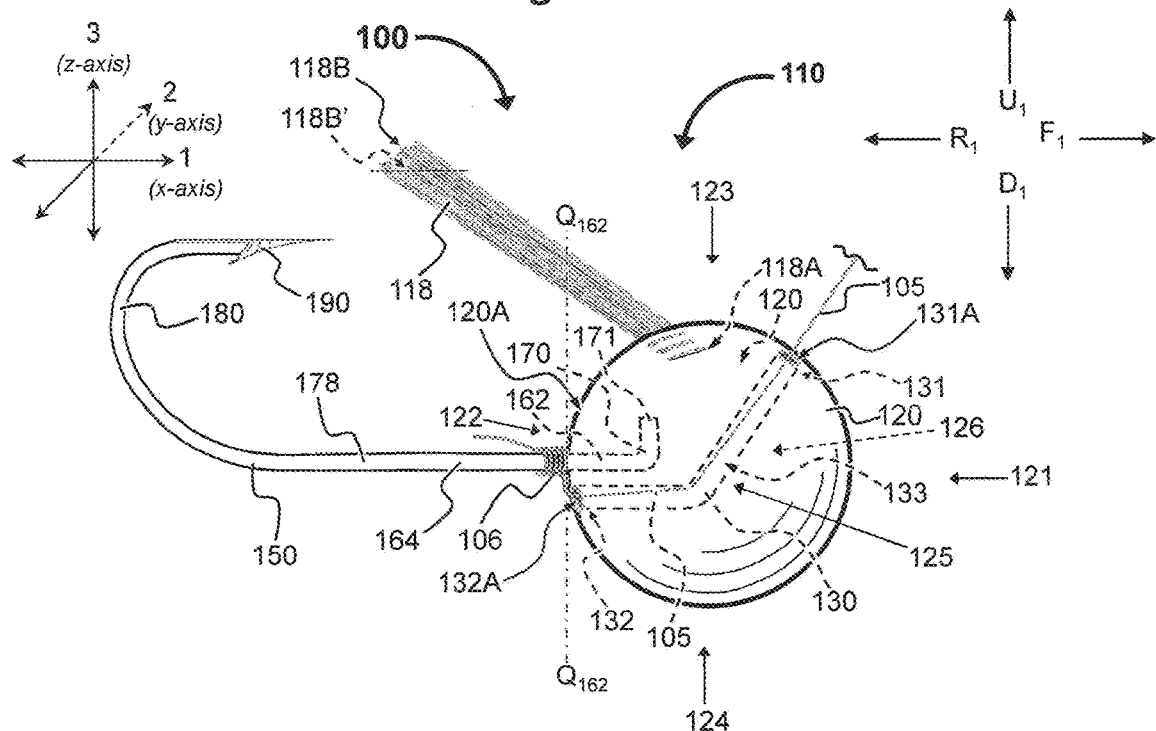
FIG. 17B is a side perspective view showing one aspect of an inventive fishing lure of the present invention in the form of a jig having an optional snag guard.

As illustrated in FIG. 17B, in other aspects of such embodiments, the inventive jig 110 can comprise an optional snag guard member 118 in the form of a flexible deflector (e.g., a singular or plurality of flexible or semi-flexible elements, such as bristle elements, comprising plastic, rubber, natural hair, etc.) having a first end 118A, and an opposing second end 118B distal to the first end 118A. In such exemplary embodiments, the first end 118A of the snag guard member 118 can be integral with, or attached to, a relatively frontward $F_1$ portion of the inventive jig 110 (e.g., the body component 120, an optional collar component 179, etc.) and can extend therefrom generally in a rearward direction $R_1$ and upward direction $U_1$ towards a spatial point located generally above the barbed element 190 of the hook component 150, such that the second end 118B of the snag guard member 118 is not in direct contact with the barbed element 190. Accordingly, in some non-limiting aspects of such embodiments, the second end 118B can be spatially located a distance of about 0.15 cm to about 0.40 cm in a frontward direction $F_1$ from the barbed element 190 along the x-axis 1 and about 0.15 cm to about 0.40 cm in an upward direction $U_1$ from the barbed element 190 along the z-axis 3, to help ensure that the snag guard member 118 does not dissuade a fish from grasping the barbed element 190, but is located close enough to the barbed element 190 to prevent snagging. In still further aspects of such embodiments, the second end 118B can optionally be angle-cut (such as approximately 45°, for example) to form second end 118B' having a generally level profile and which can more consistently maintain its distance from the barbed element 190. Thus, upon encountering a potential snagging obstacle (not shown) during use, such snag guard member 118 configurations are preferably sufficiently stiff to rotate the inventive jig 110 upon encountering potential snagging obstacles, but also sufficiently flexible to bend out of the way when a fish strikes, whereby the barbed element 190 can be exposed and set into the flesh of the fish when the fishing line 105 is tugged by a user.

Figure 17C:
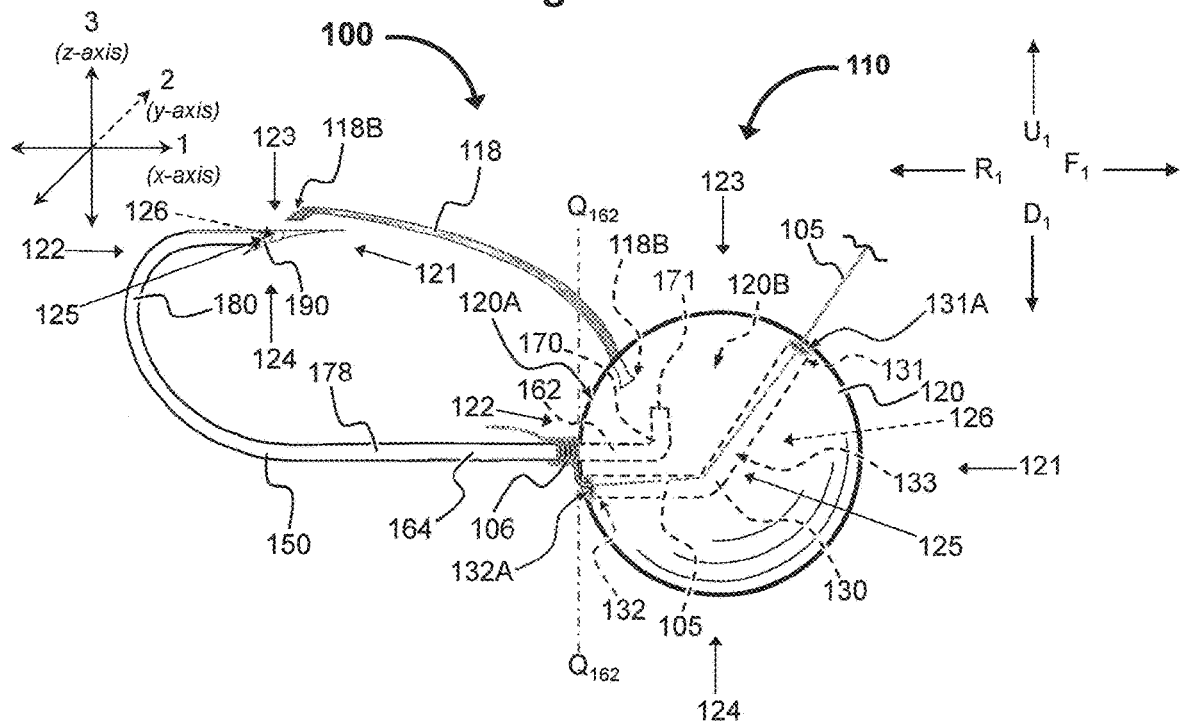
FIG. 17C is a side perspective view showing one aspect of an inventive fishing lure of the present invention in the form of a jig having an optional snag guard.

As illustrated in FIG. 17C, in still other aspects of such embodiments, the inventive jig 110 can comprise an optional snag guard member 118 in the form of a substantially rigid or semi-rigid spring element having spring-like tension properties, comprising a first end 118A, and an opposing second end 118B distal to the first end 118A. In such exemplary embodiments, the first end 118A of the snag guard member 118 can be integral with, or attached to, a relatively frontward $F_1$ portion of the inventive jig 110 (e.g., the body component 120, an optional collar component 179, etc.) and can extend therefrom in a generally rearward direction $R_1$ and upward direction $U_1$ such that the second end 118B of the snag guard member 118 is located proximate to or adjacent the top side 123 and first side 125 or second side 126 of the barbed element 190 of the hook component 150. Such configurations utilize tension provided by the spring element. Thus, upon encountering a potential snagging obstacle (not shown) during use, such snag guard member 118 configurations are preferably sufficiently stiff to allow the inventive jig 110 to bounce off of the obstacle, but also sufficiently flexible to allow the force of a fish bite to move the snag guard member 118 in a downward direction $D_1$ on either side 125,126 of the barbed element 190, and thus expose the barbed element 190 of the hook component 150, and for the snag guard member 118 to then return to its initial position upon removal of the force.

Figure 17D:
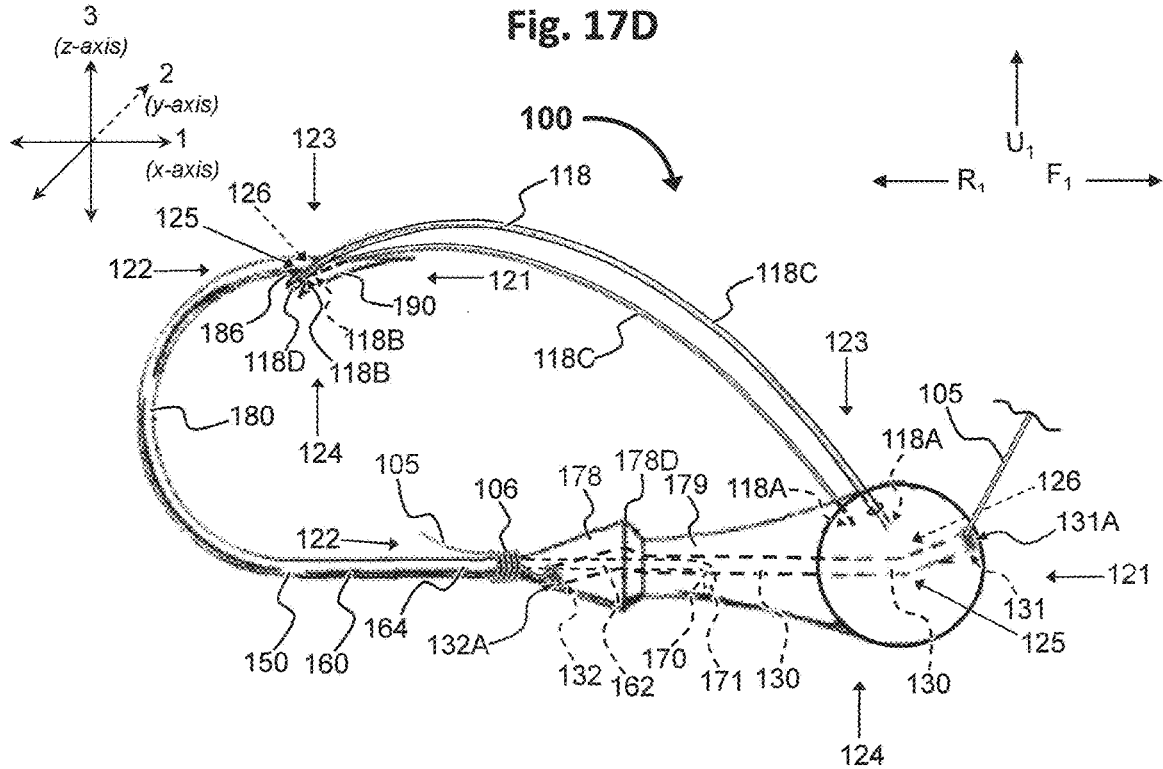
FIG. 17D is a side perspective view showing one aspect of an inventive fishing lure of the present invention in the form of a jig having an optional snag guard.

As illustrated in FIG. 17D, in yet other aspects of such embodiments, the inventive jig 110 can comprise an optional snag guard member 118 in the form of two (2) substantially rigid or semi-rigid spring elements 118C having spring-like tension properties, each comprising a first end 118A, and an opposing second end 118B distal to the first end 118A. In such exemplary embodiments, the first end 118A of each spring element 118C can be integrated with, or attached to, either side 125,126 of a relatively frontward $F_1$ portion of the inventive jig 110 (e.g., the body component 120, an optional collar component 179, etc.) and can extend therefrom in a generally rearward direction $R_1$ and upward direction $U_1$ such that the second end 118B of each spring element 118C is located proximate or adjacent to the top side 123, rear side 122 and first and second sides 125,126, respectively, of the barbed element 190 of the hook component 150. In addition, the second ends 118B of each spring element 118C are connected via a generally U-shaped connecting element 118D located proximate or adjacent to the bottom side 124 of the second linear region 186 of the curvilinear hook portion 180 of the hook component 150, in a rearward direction $R_1$ and downward direction $D_1$ from the barbed element 190. Such configurations utilize tension provided by the two (2) spring elements 118C, and the snag guard member 118 is generally prevented from extending farther beyond its initial spatial position in an upward direction $U_1$ (and sideways direction) via contact between the connecting element 118D and the second linear region 186. In other words, the snag guard member 118 of such configurations is substantially confined to movement in a generally downward direction $D_1$ from its initial position. Thus, upon encountering a potential snagging obstacle (not shown) during use, such snag guard member 118 configurations are preferably sufficiently stiff to allow the inventive jig 110 to bounce off of the obstacle, but also sufficiently flexible to allow the force of a fish bite to move the snag guard member 118 in a generally downward direction $D_1$ to expose the barbed element 190 of the hook component 150, and for the snag guard member 118 to then return to its initial position upon removal of the force.

In addition to the various non-limiting exemplary aspects and features discussed heretofore, in some aspects, the inventive fishing lure 100 can comprise additional optional features without departing from the scope of the invention.

Figure 18A:
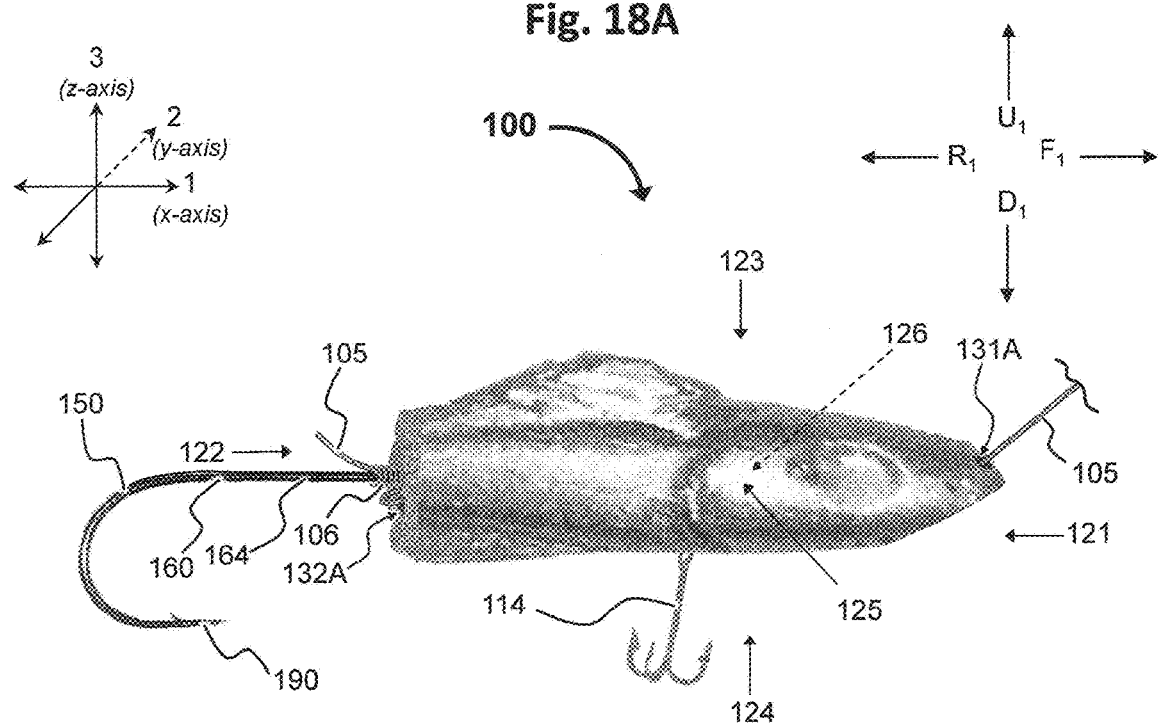
FIG. 18A is a side perspective view showing one aspect of an inventive fishing lure of the present invention in the form of a jig having an optional additional attachment.
Figure 18B:
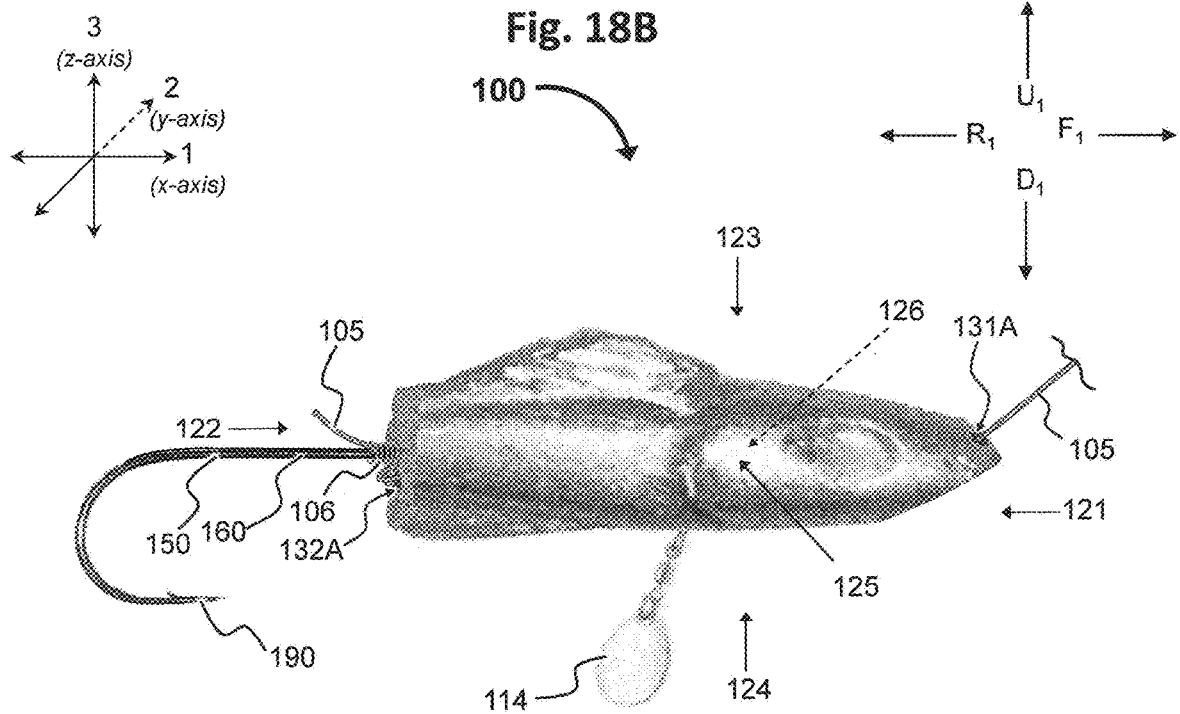
FIG. 18B is a side perspective view showing one aspect of an inventive fishing lure of the present invention in the form of a jig having an optional additional attachment.
Figure 18C:
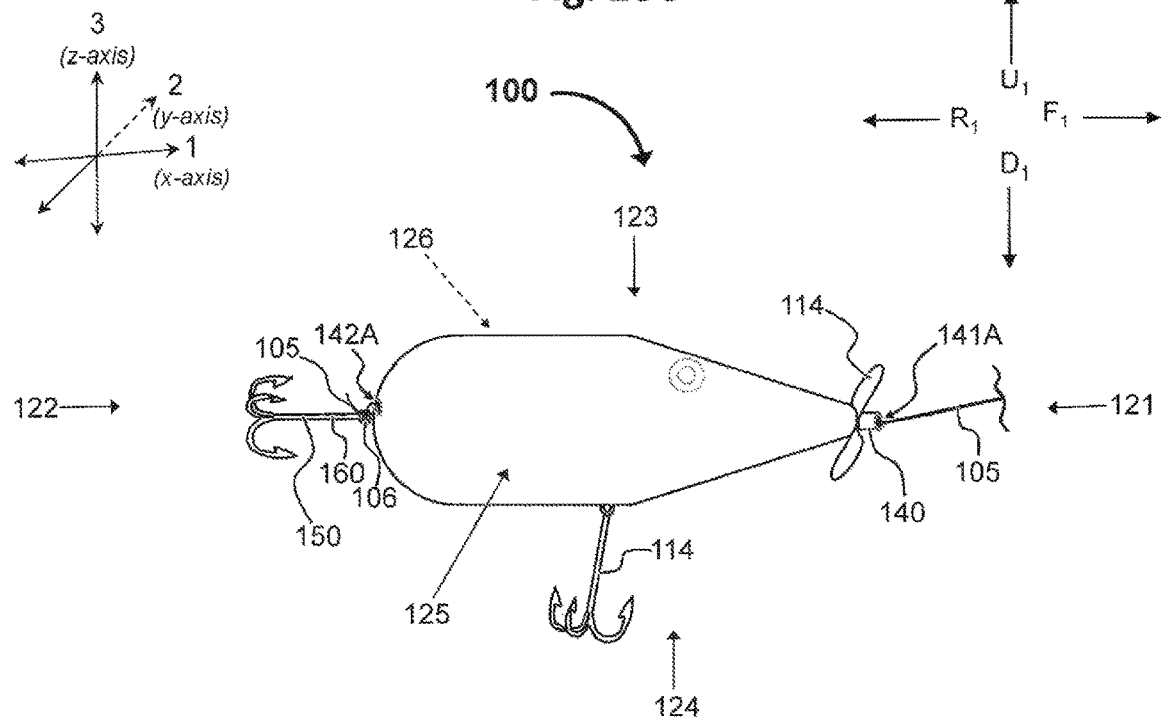
FIG. 18C is a side perspective view showing one aspect of an inventive fishing lure of the present invention in the form of a jig having a plurality of optional additional attachments.
Figure 18D:
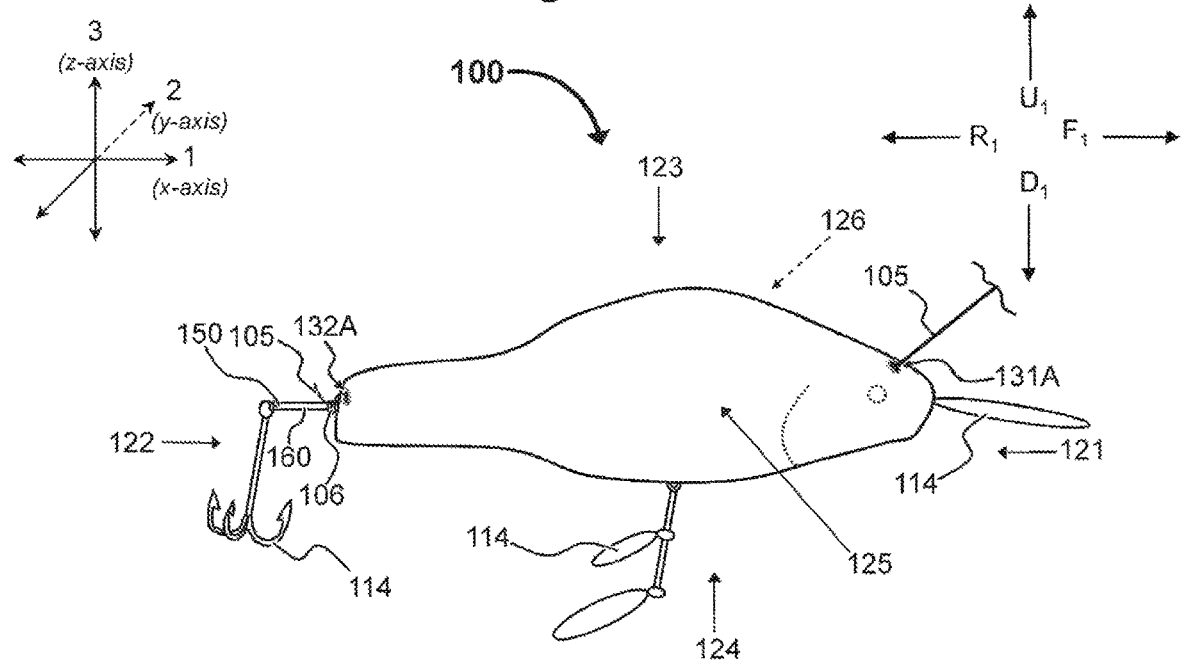
FIG. 18D is a side perspective view showing one aspect of an inventive fishing lure of the present invention in the form of a jig having a plurality of optional additional attachments.
Figure 18E:
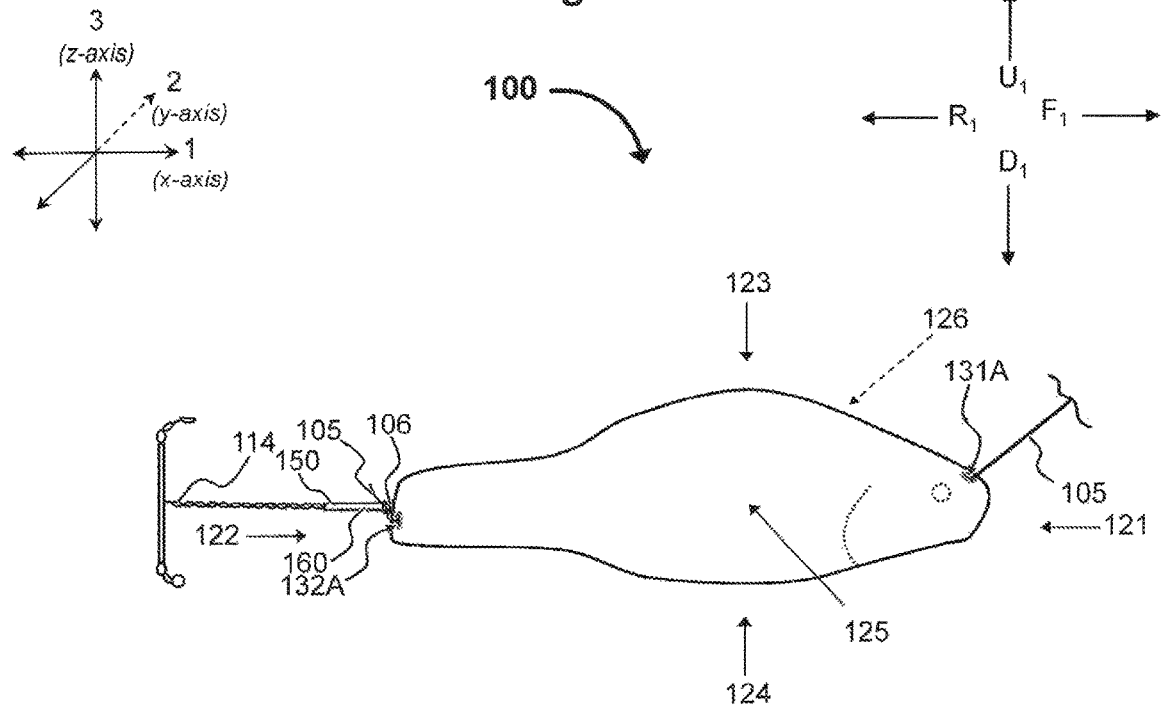
FIG. 18E is a side perspective view showing one aspect of an inventive fishing lure of the present invention in the form of a jig having an optional additional attachment.
Figure 18F:
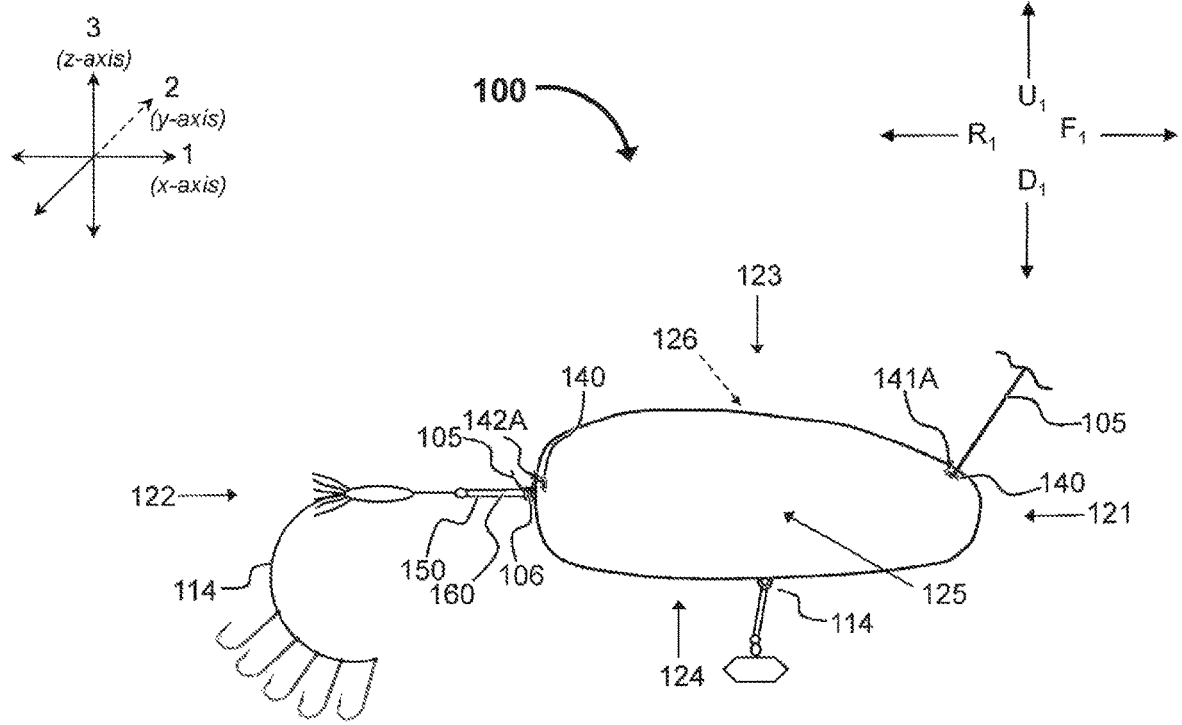
FIG. 18F is a side perspective view showing one aspect of an inventive fishing lure of the present invention in the form of a jig having a plurality of optional additional attachments.
Figure 18G:
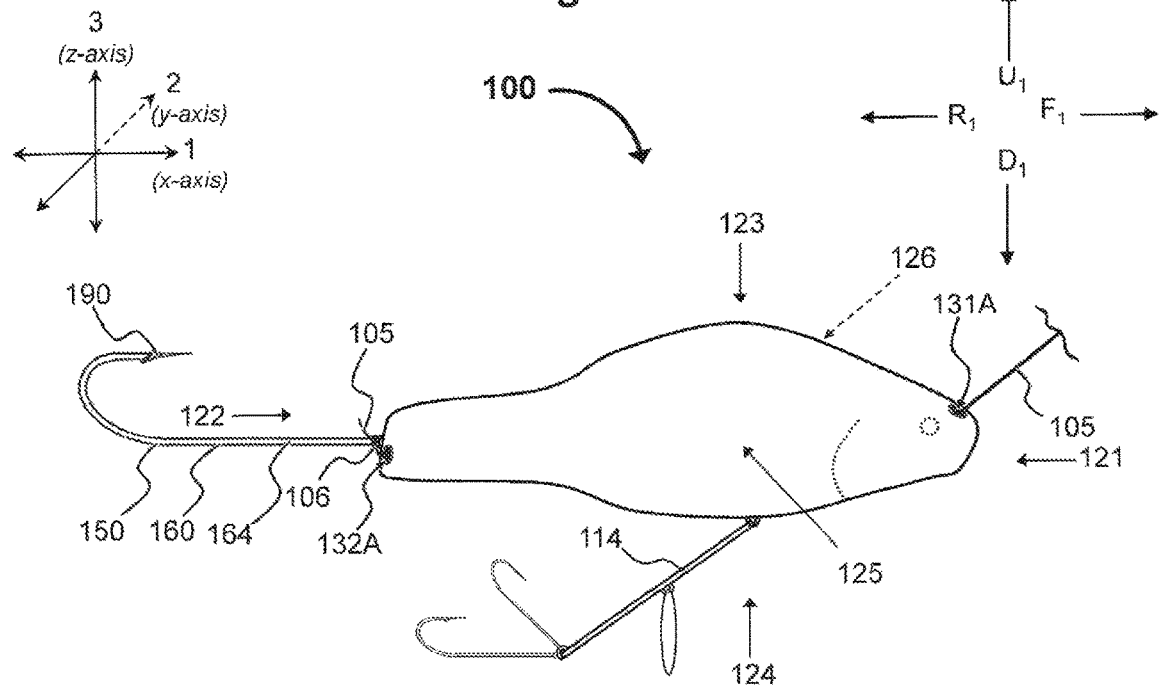
FIG. 18G is a side perspective view showing one aspect of an inventive fishing lure of the present invention in the form of a jig having an optional additional attachment.
Figure 18H:
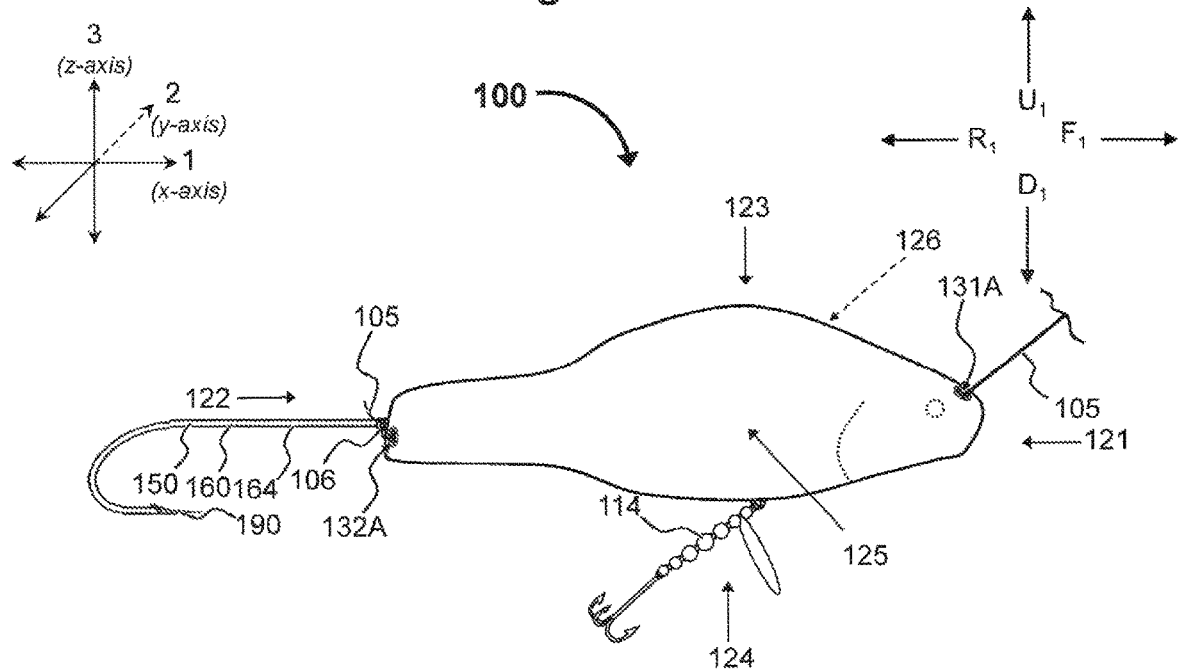
FIG. 18H is a side perspective view showing one aspect of an inventive fishing lure of the present invention in the form of a jig having an optional additional attachment.
Figure 18I:
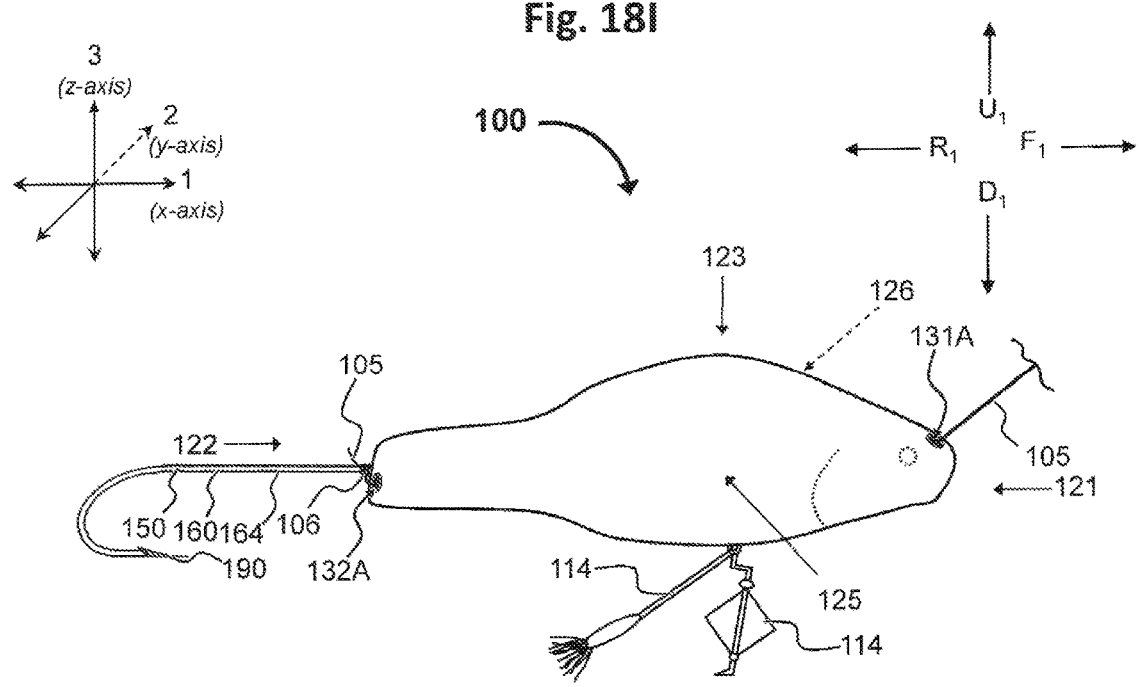
FIG. 18I is a side perspective view showing one aspect of an inventive fishing lure of the present invention in the form of a jig having an optional additional attachment.
Figure 18J:
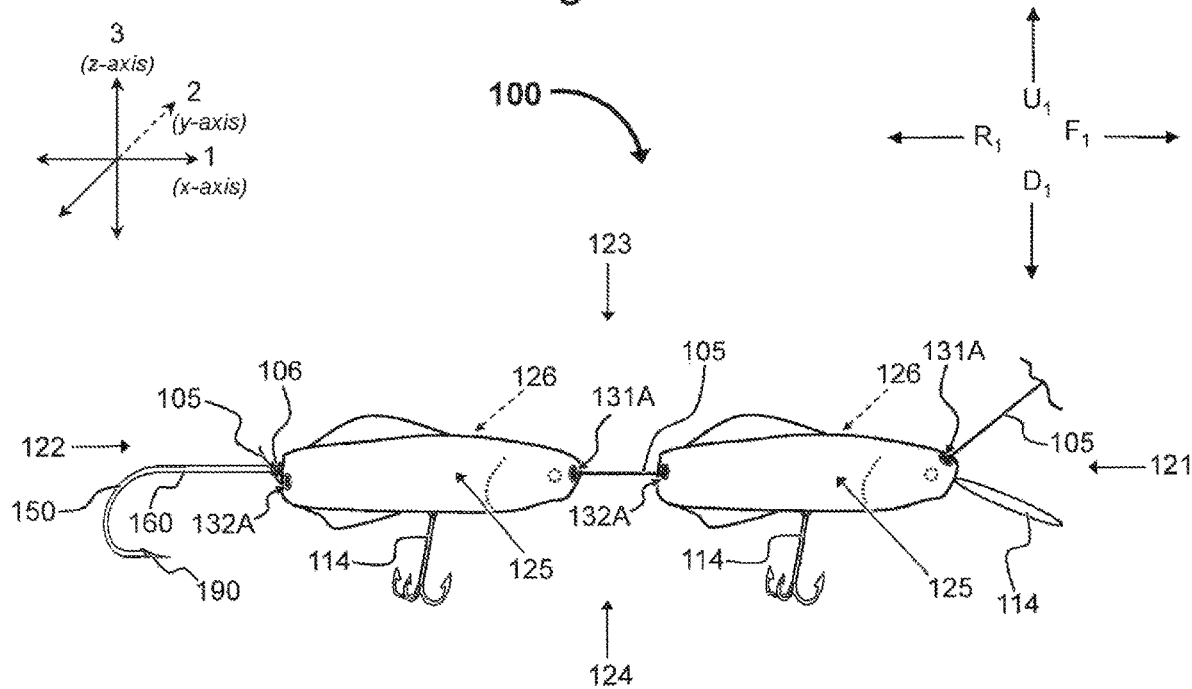
FIG. 18J is a side perspective view showing one aspect of an inventive fishing lure of the present invention in the form of a jig having a plurality of optional additional attachments.

Referring now to FIGS. 18A-18J, such other optional features and/or components can include, but are not limited to, additional attachments 114, such as single hook elements, multi-hook elements, pivotal hook elements, additional hook elements, additional lure elements, weighted elements (e.g., for manipulating the lure profile when in water), swivels and other fastener elements, lip elements, spoon elements, spinner and other rotatable elements, beads and other slidable elements, and the like, and combinations thereof, as well as other suitable optional features as would be apparent to persons having ordinary skill in the art. For example, FIG. 18A illustrates one non-limiting exemplary embodiment of an inventive fishing lure 100 of the present disclosure comprising an additional attachment 114 in the form of a multi-hook element. FIG. 18B illustrates an inventive fishing lure 100 comprising an additional attachment 114 in the form of a spinner element. FIG. 18C illustrates an inventive fishing lure 100 comprising a first additional attachment 114 in the form of a rotatable element and a second additional attachment 114 in the form of a multi-hook element. FIG. 18D illustrates an inventive fishing lure 100 comprising a first additional attachment 114 in the form of a lip element, a second additional attachment 114 in the form of a spoon element and a third additional attachment 114 in the form of a pivotal multi-hook element. FIG. 18E illustrates an inventive fishing lure 100 comprising an additional attachment 114 in the form of a swivel/fastener element. FIG. 18F illustrates an inventive fishing lure 100 comprising a first additional attachment 114 in the form of a weighted element and a second additional attachment 114 in the form of a stringer element comprising multiple additional hooks. FIG. 18G illustrates an inventive fishing lure 100 comprising an additional attachment 114 in the form of a multi-hook element including bead elements and a spinner element. FIG. 18H illustrates an inventive fishing lure 100 comprising an additional attachment 114 in the form of a pivotal multi-hook element including bead elements and a spinner element. FIG. 18I illustrates an inventive fishing lure 100 comprising a first additional attachment 114 in the form of a spinner element and a second additional attachment 114 in the form of an additional lure element. FIG. 18J illustrates an inventive fishing lure 100 in the form of a compound lure comprising a first additional attachment 114 in the form of a lip element, a second additional attachment 114 in the form of a pivotal multi-hook element and a third additional attachment 114 also in the form of a pivotal multi-hook element.

Still other suitable additional attachments 114 can include, but are not limited to, twisting elements, flipping elements, swimming elements, weightless elements (i.e., having a density that is less than water), spring elements, loop elements, clevis elements, locking band elements, reflective elements, refractive elements, glowing elements, flashing elements, sound emitting elements, scent emitting elements, and the like, and combinations thereof.

Although a number of non-limiting exemplary embodiments of the invention of the present disclosure have been provided above, it should be understood that any suitable variations of such embodiments, as may be desired or would be apparent to persons having ordinary skill in the art, are also contemplated herein, including other optional features, elements and/or components, without departing from the scope of the invention.

In addition to the numerous advantages discussed above, other aspects of the invention of the present disclosure can provide yet further advantages over conventional fishing lures under the same or similar conditions including, but not limited to, the following:

A. Elimination of the Eyelet 940.

One particular advantage of the inventive fishing lure of the present disclosure is the elimination of the protruding eyelet 940 that is present on conventional jigs 910. Elimination of such a protruding element results in a significant reduction in the occurrence of snags. In other words, even without a snag guard member 118, the inventive fishing lure 100 reduces the chances of accidental snagging due to elimination of the protruding eyelet 940 (which research performed herein has shown to be a significant cause of snagging). In addition, rather than attaching a fishing line 105 to the eyelet 940 located spatially external to a conventional fishing lure, the inventive fishing lure 100 allows for a fishing line 105 to be threaded directly through the body component 120 via the through-line element 130 and attached directly to the hook component 150. Thus, the fishing line 105, and the forces applied to the lure 100 via the fishing line 105, are spatially located closer to the center of gravity of the lure 100, as well as closer to the line of travel of the lure 100. In addition, the knot 106 of the inventive lure 100 is not subject to movement during use compared to the moveable dynamic knot 906 (i.e., about the eyelet 940) during use of a conventional jig 910. The result is that the inventive lure 100 can maintain a more predictable spatial profile during use (i.e., with respect to the x-y plane of the water surface) and yet remain more flexible due to elimination of the protruding element (i.e., the eyelet 940), as compared to conventional fishing lures 900 under the same or similar conditions.

B. Improved Abrasion Resistance.

The through-line element 130 for the passage of a fishing line 105 can be generally defined from the frontward $F_1$ portion of the body component 120, through at least a portion of the longitudinal length of the body component 120, and to the rearward $R_1$ portion of the body component 120. Thus, the fishing line 105 extends through the body component 120 and is tied around the second region 164 of the hook component 150, and the resulting knot 106 is preferably placed proximate or adjacent to the interface $Q_{162}$ formed by the second region 164 of the shank 160 and the exterior surface 120A on the rear side 122 of the body component 120. As a result, the fishing line 105 within the body component 120 is protected from rocks, weeds, and other obstacles. Furthermore, since the fishing line 105 of the inventive fishing lure 100 extends from the body component 120 (rather than from a protruding eyelet 940), the inventive fishing lure 100 can more easily rotate with respect to its line of travel. Thus, the inventive fishing lure 100 itself is also more protected from weeds, rocks and other obstacles (as compared to conventional fishing lures 900 under the same or similar conditions) that could otherwise result in damage to the lure 100.

C. Improved Knot Strength.

It is generally recognized that the tying of a knot in a fishing line concentrates increased physical forces in and adjacent to the knot. Therefore, line failure is most likely to occur in the vicinity of the knot 906 or eyelet 940 of conventional fishing lures 900. Even though certain knots, such as the clinch knot, are recommended to disperse the physical forces in order to increase the fishing line 905 strength of conventional fishing lures 900 at its weakest point, the tying of any knot is both time consuming and still creates varying degrees of reduction in the overall strength of the rigging. In addition, the eyelet 940 of conventional jigs 910 has a generally circular (i.e., rounded) profile which exposes additional surface area of the knot 906 (compared to a straight profile) to abrasion and/or other such damage, which in turn further increases the occurrence of failure of the knot 906. Thus, any abrasion or other such damage which occurs to the exposed knot 906 tied to the protruding eyelet 940 of conventional fishing lures 900 only further weakens the knot 906, ultimately leading to disengagement of the fishing line 905 from the conventional fishing lure 900 and failure to catch a fish. In contrast to such conventional fishing lures 900, the knot 106 of a fishing line 105 tied to the inventive fishing lure 100 occurs upon the straight profile of the second region 164 of the hook component 150, which exposes less surface area of the knot 106. Furthermore, the knot 106 is preferably subsequently cinched proximate or adjacent to the interface $Q_{162}$ formed by the second region 164 of the shank 160 and the exterior surface 120A on the rear side 122 of the body component 120, which additionally shields the knot 106 from abrasion and/or other such damage. Therefore, the occurrence of knot failure and/or line breakage of the inventive fishing lure 100 is significantly lower as compared to conventional fishing lures 900 under the same or similar conditions, resulting in a higher probability of ultimately catching fish.

D. Reduced Snags.

A lure must be cast near fish to be effective. When fishing in open waters (i.e., without the presence of snagging obstacles), lures can generally be retrieved without the occurrence of snagging. However, many fish avoid such open waters and instead congregate or school close to underwater structures. Indeed, some of the more popular species of fish are commonly caught in underwater brush, tree stumps, vegetation, rocks and other submerged objects which tend to provide cover for the fish and their food sources. Thus, users often direct their casts into such brush and other cover. However, conventional fishing lures 900 have bodies or elements (e.g., a protruding eyelet 940) that tend to snag obstacles. As a result, there is a high occurrence of conventional fishing lures 900 snagging when retrieved through such obstacles, often due to the protruding eyelet 940 itself, which snags against such obstacles. For example, a conventional jig 910 presents an abrupt increase in cross section area transitioning from the fishing line 905 at the eyelet 940 to the jig head 920. The fishing line 950 can then contact a snagging obstacle during retrieval, but the abrupt change prevents the jig body component 920 from sliding smoothly past the obstacle, causing it to snag against the obstacle. In addition, even if the protruding eyelet 940 should manage to eventually clear a snagging obstacle, it often subsequently repositions the hooking component 950 towards such obstacles, resulting in the barbed element 990 embedding into the obstacle. Consequently, conventional fishing lures 900 cannot be retrieved until such a snag is cleared, and often results in the fishing line 905 being cut or broken in order to continue fishing, and thus losing the lure 900.

In contrast, the inventive fishing lures 100 of the present disclosure eliminate the eyelet 940 of conventional fishing lures 900 altogether. As referenced above, such elimination of the protruding element results in a significant reduction in the occurrence of snags. In addition, rather than attaching a fishing line 905 to the eyelet 940 located spatially external to the body component 920 of a conventional fishing lure 900, the inventive fishing lure 100 allows for a fishing line 105 to be threaded directly through the body component 120 via the through-line element 130 and attached directly to the hook component 150. Thus, the fishing line 105, and the forces applied to the lure 100 via the fishing line 105, are spatially located closer to the center of gravity of the lure 100, as well as closer to the line of travel of the lure 100. The result is that the lure 100 can maintain a more predictable spatial profile during use (i.e., with respect to the x-y plane of the water surface) and yet remain more flexible due to elimination of the protruding element (i.e., the eyelet 940), as compared to conventional fishing lures 900 under the same or similar conditions.

With the anti-snag characteristics of the present invention, the lure 100 can be used relatively effectively in such obstacles and will normally be retrieved from the same without snagging. Moreover, a user can deliberately engage brush and other submerged objects to create a banging sounds which fish tend to respond to. For example, a user can cast the lure 100 directly into a brush pile and generate noise to attract fish by deliberately striking a number of submerged obstacles without snagging the lure 100 on the same. Thus, the ability to fish in dense cover provides the inventive lure 100 with significant operational advantages as compared to conventional fishing lures 900 under the same or similar conditions.

E. Reduced Line Twist.

Desirably, when suspended on a fishing line in water, the body component of a fishing lure, combined with the attachment configuration of the fishing line, tends to counterbalance the weight of the hook component such that the longitudinal axis of the lure will be presented horizontally (i.e., with respect to the x-y plane of the water surface). During casting, retrieving, trolling or allowing the lure to sink on a slack line, external forces acting upon the lure are introduced which upset this equilibrium, which can result in lures rotating about the axis of the fishing line, which in turn, can result in twisted lines and improper lure presentation. For conventional fishing lures 900, the fishing line 905 is attached to the protruding eyelet 940, which is located a distance that is external to the general periphery of the lure 900. Such distance, combined with the restrictive effect of the protruding element of the eyelet 940 itself, tend to prevent counter-rotation of such twisted conventional fishing lures 900. As a result, conventional fishing lures 900 tend to become twisted during use, which in turn, diminishes the effectiveness of conventional fishing lures 900.

In contrast, the inventive fishing lures 100 of the present disclosure benefit from the fishing line 105 being attached to the shank 160 via the through-line element 130, which guides the line 105 directly through the body of the lure 100. Such configuration eliminates the disadvantaged protruding eyelet 940 distance characteristic of conventional fishing lures 900. As a result, the inventive fishing lures 100 can allow for movement of the lure 100 along the path of least resistance, which in turn, results in counter-rotation of the inventive fishing lure 100 after line twist occurs to predominantly be presented in an untwisted state during use. Such untwisted state of inventive fishing lures 100 provides a significant advantage over conventional fishing lures 900 during use.

F. Improved Mimicking of Feeder Fish.

Fishing jigs comprise a body component and hook component, and are subsequently attached to one end of a fishing line, which can then be utilized to manipulate the fishing jigs in order to attract fish, and further to entice the fish to bite the hook component. Fishing jigs are normally cast out and reeled in, in a generally linear fashion, with the resulting movement of the jig intending to attract a fish. More particularly, once the fishing jig has been cast out, a user may pull on the fishing line and/or reel-in the line, and the fishing line then pulls the jig towards the user. This creates movement of the jig through the water, and results in movements that are similar to a swimming fish, such as a feeder fish (i.e., a fish's food source). A fishing lure may be designed to resemble a feeder fish (though it need not be), thus luring in prey of such feeder fish. Accordingly, such fishing lures may be colorful, shiny, and include faux features of live feeder fish, such as eyes, fins, scales, and a tail. Such fishing lures can also utilize movements, such as those that simulate the movements of feeder fish, to further attract a fish's attention, enticing a fish to approach the lure and eventually bite or make contact with the barbed element, and the fishing line can then be used to set the barbed element into the flesh of the fish. The fishing line can then further be used to transport the fish to the user, typically via a fishing pole (e.g., a rod and reel).

Because the inventive jig 110 effectively eliminates the externally protruding eyelet 940 of a conventional jig 910, and the fishing line 105 is instead attached via the through-line element 130 directly to the shank 160 of the hook component 150, the inventive jig 110 of the present disclosure exhibits a higher degree of freedom for movement about the fishing line 105 as compared to conventional jigs 910 under the same or similar conditions. Such higher degree of freedom allows the inventive jig 110 to more closely mimic the various characteristics of live feeder fish than similar conventional jigs 910. Moreover, the reactive movements of the inventive jig 110 are more consistent and predictable that those of conventional jigs 910. Indeed, studies conducted herein have shown that the consistency and predictability of lure movements during use are a key element for catching fish during use. As a result, a user not only can attract more fish, but also can catch more fish when using the inventive jig 110 with each use, as compared to a conventional jig 910 under the same or similar conditions.

In order to accurately predict a lure's performance, an initial evaluation that determines static balance can be utilized. The traditional method assumes the lure to be suspended on a vertical line with the lure motionless. Desirably, when suspended on a vertical fishing line in water for example, the body component of a jig, combined with the attachment configuration of the fishing line, tends to counterbalance the weight of the hook component such that the longitudinal axis of the jig will be presented generally horizontally and at an approximate 90° angle to the line (i.e., coplanar with the surface of the water). Such presentation of the jig is often referred to as a "vertical presentation" (further described below). Alternatively, jigs configured with line attachment angles other than about 90° (i.e., horizontal or angular) are also utilized when fishing, such as when casting or trolling, for example. Nonetheless, when suspended on a horizontal or angular line in water, it is still desirable that the longitudinal axis of the jig will be presented generally horizontally. Such presentation of the jig is often referred to as a "horizontal presentation" (further described below). Accordingly, whether a jig is being casted and retrieved, trolled, or allowed to sink vertically on a slack line, the most desirable presentation of the jig will be with the longitudinal axis of the jig being horizontal with respect to the planar surface of the water in the x-y plane during use. Furthermore, the configuration, body, shape and weight distribution are combined to provide a jig with a specific center of gravity. These attributes, along with line attachment configuration, can provide a jig that will react consistently with forces acting upon the jig to achieve and maintain the desirable horizontal position.

Thus, when in use (such as in a body of water), the presentation of a jig to a fish is often classified into two general categories: (i) vertical presentation, and (ii) horizontal presentation.

(1). Improved Vertical Presentation.

As used herein, the term "vertical presentation" refers to a fishing technique whereby a lure is utilized and/or moved within water in a generally vertical (perpendicular) direction with respect to the planar surface of the water in the x-y plane. Accordingly, a fishing lure typically moves away from a user via increasing distance via the fishing line in a generally vertical downward direction $D_1$ (i.e., wherein the general angle of the fishing line extending from a fishing pole to the fishing lure with respect to the planar surface of the water in the x-y plane is approximately 90°). Similarly, the fishing lure typically moves towards the user via decreasing distance via the fishing line in a generally vertical upward direction $U_1$ (i.e., wherein the general angle of the fishing line extending from a fishing pole to the fishing lure with respect to the planar surface of the water in the x-y plane is again approximately 90°). Such vertical presentations can often be observed when a user is ice fishing (such as for jigging through an opening in solid water), when a user drops a lure into water proximate or adjacent to a boat or dock (such as for jigging in liquid water), and the like.

As shown in FIGS. 13C-13H, the longitudinal axis of an inventive jig 110 of the present disclosure when at rest (e.g., the time between movement in a vertical downward direction $D_1$ and a vertical upward direction $U_1$) remains generally consistent during use (i.e., relatively longitudinally horizontal with respect to the planar surface of the water in the x-y plane), which consistently and predictively simulates a feeder fish that is alive and thus attractive to a fish. In contrast, the longitudinal axis of a conventional jig 910 when at rest is dependent upon the location of the knot 906 about the loop element 942 of the eyelet 940 and thus is largely inconsistent during use (i.e., as shown in FIGS. 13E-13H, often presenting at least partially longitudinally upward or downward with respect to the planar surface of the water in the x-y plane), which in contrast simulates a feeder fish that is dead (or dying), and thus is less attractive to a fish. Moreover, because the knot 906 of the fishing line 905 can move about the loop element 942 at any given time, the vertical presentation of a conventional jig 910 is necessarily inconsistent, and thus unpredictable during use, which results in a significant disadvantage when fishing with conventional jigs 910, as compared to the inventive jigs 110 under the same or similar conditions.

In addition, as further described in Example 2 below, attachment of a fishing line 105 directly to the hook component 150 via the through-line element 130 of the inventive jig 110 (i.e., the elimination of the protruding eyelet 940) allows the inventive jig 110 to move more freely about the fishing line 105 since there is no protruding element to block or inhibit such motion. Furthermore, the locus of such movement occurs closer to the center of gravity and line of travel of the jig (i.e., along the longitudinal axis of the jig 110), as compared to a conventional jig 910 under the same or similar conditions. Such relatively uninhibited movements of the inventive jig 110 allow for faster reaction times and more predictable full-range motion when the fishing line 105 is moved vertically during use (i.e., fishing line 105 movement in a vertical downward direction $D_1$ and a vertical upward direction $U_1$), which simulates a feeder fish that is alive and vibrant, and thus attractive to a fish. In contrast, the protruding eyelet 940 of conventional jigs 910 has been demonstrated to block or inhibit movement about the fishing line 905 during use. Furthermore, the locus of such movement occurs farther away from the center of gravity and longitudinal axis of the conventional jig 910, as compared to the inventive jig 110 under the same or similar conditions. Such relatively restricted movements of conventional jigs 910 result in less predictable reactions and only a partial range of motion when the fishing line 905 is moved vertically during use (i.e., fishing line 905 movement in a vertical downward direction $D_1$ and a vertical upward direction $U_1$), which is another significant disadvantage of conventional jigs 910, as compared to the inventive jig 110 under the same or similar conditions. Indeed, according to studies performed herein, the restrictive movements of conventional jigs 910 often results in movements which appear as being unnatural to fish, resulting in such fish often ignoring conventional jigs 910, or even frightening such fish away from conventional jigs 910. Accordingly, the combination of a more consistent horizontal presentation of inventive jig 110 when at rest, and a higher degree of consistent and predictable movement when the fishing line 105 is moved vertically, provides significant advantages of the inventive jig 110 over conventional jigs 910 during use.

(2). Improved Horizontal Presentation.

As used herein, the term "horizontal presentation" refers to a fishing technique whereby a lure is utilized and/or moved within water in a generally horizontal or angular direction with respect to the planar surface of the water in the x-y plane. As used herein, the term "angular" refers to the situation wherein the general angle of the fishing line extending from a fishing pole to the fishing lure with respect to the planar surface of the water in the x-y plane is other than about 90°. Accordingly, a fishing lure typically moves away from a user via increasing fishing line distance in a generally horizontal or angular direction, while the fishing lure typically moves towards the user via decreasing the fishing line distance in such generally horizontal or angular direction. Such horizontal presentations can often be observed when a user is casting and reeling, trolling, moving the lure with or against a current, and the like.

As shown in FIGS. 13C-13H, the longitudinal axis of the inventive jig 110 remains generally consistent (i.e., relatively longitudinally horizontal with respect to the planar surface of the water in the x-y plane), which simulates a feeder fish that is alive and thus attractive to a fish. In contrast, the longitudinal axis of a conventional jig 910 is dependent upon the location of the knot 906 about the loop element 942 of the eyelet 940, and is thus largely inconsistent during use, often presenting angularly (at least partially longitudinally upward or downward) with respect to the planar surface of the water in the x-y plane, even while being pulled by the fishing line 905 in a horizontal or angular direction. Such angular presentation of a conventional jig 910, even while horizontally or angularly in motion, simulates a feeder fish that is either dead or dying, and thus is less attractive to a fish than the inventive jig 110. Moreover, because the knot 906 of the fishing line 905 can move about the loop element 942 at any given time, the horizontal presentation of a conventional jig 910 is necessarily inconsistent, and thus unpredictable during each use, which results in a significant disadvantage when fishing with conventional jigs 910, as compared to the inventive jig 110 under the same or similar conditions.

In addition, as further described in Example 3 below, attachment of a fishing line 105 directly to the shank 160 of the hook component 150 via the through-line element 130 of the inventive jig 110 (i.e., the elimination of the protruding eyelet 940) allows the inventive jig 110 to move more freely with respect to the fishing line 105, since there is no protruding element to block or restrict such motion. Furthermore, the locus of such movement occurs closer to the center of gravity, line of travel, and the longitudinal axis of the jig 110, as compared to a conventional jig 910 under the same or similar conditions. Such relatively uninhibited movements of the inventive jig 110 allow for faster reaction times and a more predictable full-range motion (e.g., wiggling motions, jerking motions, etc.) when the fishing line 105 is selectively moved in a horizontal or angular direction during use (i.e., fishing line 105 movement in a horizontal frontward direction $F_1$ or an angular (other than about 90° with respect to the planar surface of the water in the x-y plane) frontward direction $F_1$), which simulates a feeder fish that is alive and vibrant, and thus attractive to a fish. In contrast, the protruding eyelet 940 of conventional jigs 910 has been demonstrated to restrict movement with respect to the fishing line 905 during use. Furthermore, the locus of such movement occurs farther above the center of gravity, line of travel, and longitudinal axis of the conventional jig 910, as compared to an inventive jig 110 under the same or similar conditions. Such relatively repressed movements of conventional jigs 910, combined with application of horizontal or angular forces by the fishing line 905 to a point located above the jig 910 (i.e., to the loop element 942 of the eyelet 940) result in less predictable reactions and only a partial range of motion (e.g., wiggling motions, jerking motions, twisting motions, etc.) when the fishing line 905 is selectively moved in a horizontal or angular direction during use, and that often travels while exhibiting an angular (i.e., not horizontal) presentation (with respect to the planar surface of the water in the x-y plane) depending on the location of the knot 906 about the loop element 942, and further simulates a feeding fish that is generally lethargic, dying or dead, and thus is less attractive to a fish than an inventive jig 110. Indeed, according to studies performed herein, the restrictive movements of conventional jigs 910 often results in movements which appear as being unnatural to fish, resulting in such fish often ignoring conventional jigs 910, or even frightening such fish away from conventional jigs 910. Accordingly, the combination of a more consistent horizontal presentation of inventive jigs 110 when at rest, and a higher degree of consistent and predictable movement when the fishing line 105 is moved horizontally or angularly, provides significant advantages of the inventive jig 110 over conventional jigs 910 during use.

G. Sheathing Capabilities.

Figure 20A:
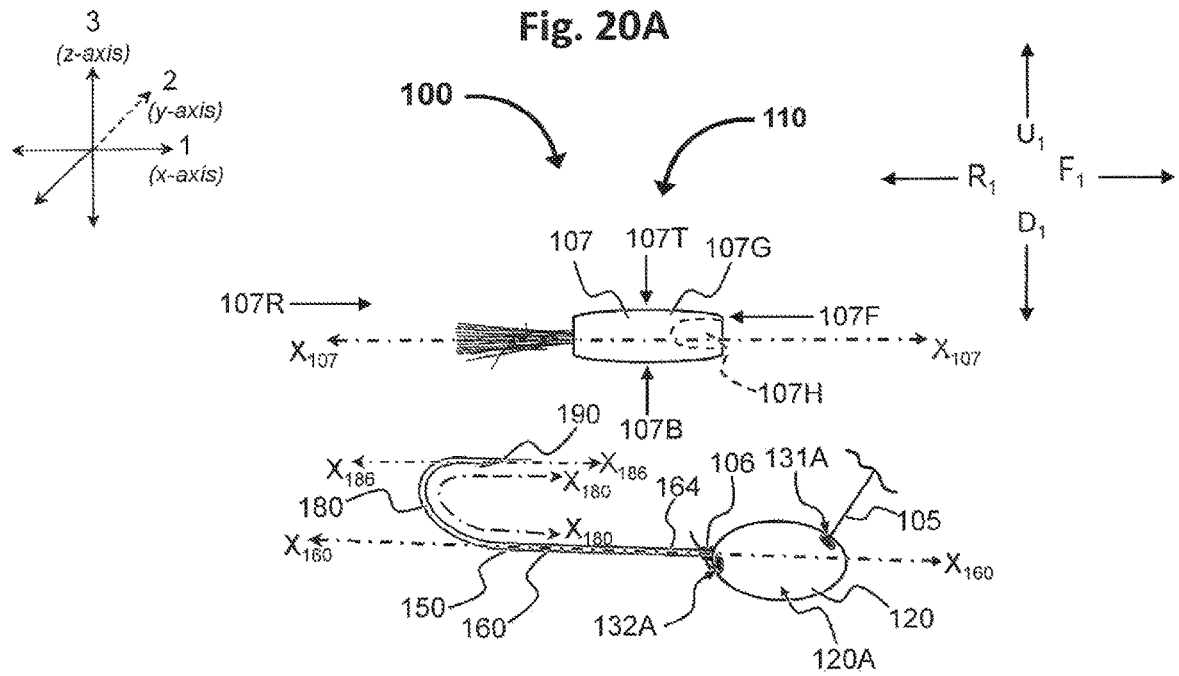
FIG. 20A is a side perspective view showing one aspect of an inventive fishing lure of the present invention in the form of a jig and a sheathing bait.
Figure 20B:
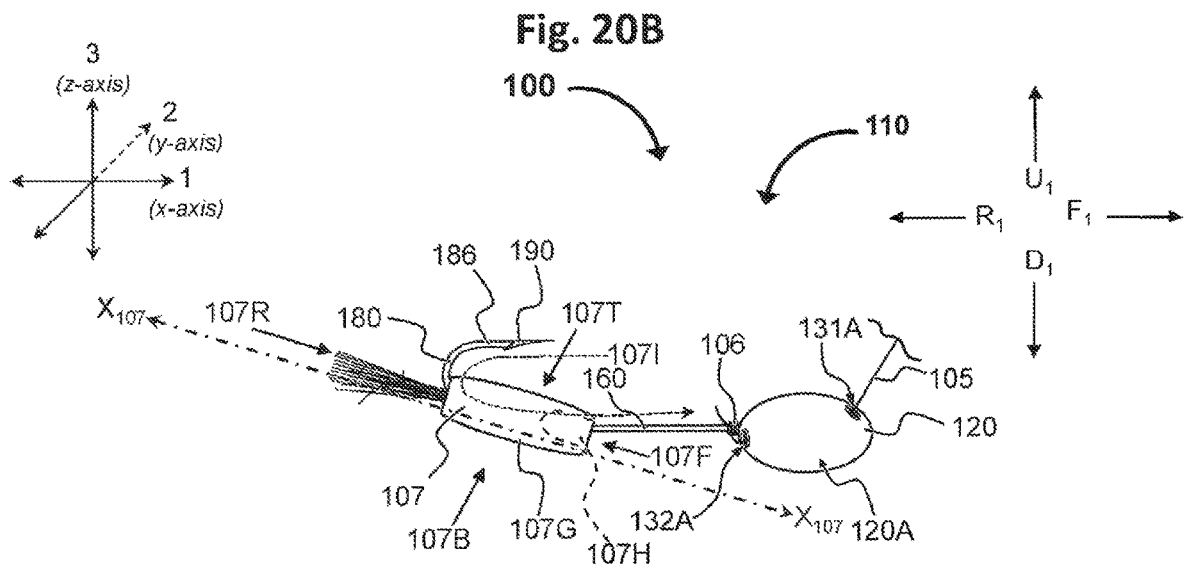
FIG. 20B is a side perspective view showing the jig and sheathing bait of FIG. 20A wherein the sheathing bait is partially attached thereto.

Referring now to FIGS. 20A-20C, by eliminating the protruding eyelet 940, the inventive jig 110 of the present disclosure provides a body component 120 having a generally unrestrictive exterior surface 120A around the 360° perimeter thereof. As a result, it is possible to sheath a bait 107 about the body component 120, thus partially or fully hiding the body component 120 from the view of a fish. As illustrated in FIG. 20A, presented is one non-limiting example of a bait 107 in the form of a sheathing bait 107G having a top side 107T, a bottom side 107B, a front end 107F, a rear end 107R and a hollow portion 107H located towards the front end 107F. As illustrated in FIGS. 20B-20C, attachment direction 1071 of such sheathing baits 107G to the inventive jig 110 can be accomplished by:

1) skewering the sharp barbed element 190 of the hook component 150 into the hollow portion 107H of the sheathing bait 107G while simultaneously pushing upon the rear end 107R of the sheathing bait 107G longitudinally in a generally rearward direction $R_1$ (i.e., along the longitudinal axis $X_{107}$ such that the barbed element 190 travels from the front end 107F of the sheathing bait 107G towards the rear end 107R) along the second linear region 186 of the curvilinear hook portion 180 of the hook component 150 (i.e., along the longitudinal axis $X_{107}$) such that the barbed element 190 travels generally from the front end 107F of the sheathing bait 107G towards the rear end 107R;
2) threading in the attachment direction 1071 around the curvilinear hook portion 180 along the general longitudinal length of the sheathing bait 107G such that the barbed element 190 protrudes out of the rear end 107R of the sheathing bait 107G while simultaneously pushing the sheathing bait 107G around the longitudinal axis $X_{180}$ of the curvilinear hook portion 180 of the hook component 150;
3) further pushing the sheathing bait 107G in the attachment direction 1071 longitudinally along the longitudinal axis $X_{160}$ of the shank 160 in a generally frontward direction $F_1$ towards the body component 120 (see e.g., FIG. 20B); and
4) pushing the sheathing bait 107G onto the body component 120 by continuing to further push and stretch the hollow portion 107H of the sheathing bait 107G in the attachment direction 1071' upon and over the body component 120 such that the hollow portion 107H of the sheathing bait 107G at least partially sheaths the body component 120 (see e.g., FIG. 20C)

Consequently, as illustrated in FIG. 20C, upon attachment of a sheathing bait 107G to the inventive jig 110, at least a portion of the hook component 150 and the body component 120 are hidden from a fish's visual perception. It should be understood that any suitable variations of such example, or other suitable method for attachment, as may be desired or would be apparent to persons having ordinary skill in the art, are also contemplated herein without departing from the scope of the invention.

The ability to partially or fully sheath the body component 120, particularly without interference from a protruding eyelet 940, provides yet another advantage of the inventive jig 110 of the present disclosure over conventional jigs 910. In addition, such sheathing of the body component 120 of the inventive jig 110 further results in enhanced protection of the knot 106, as well as the fishing line 105 at the second opening 132A and/or the first opening 131A of the through-line element 130, thus providing still another significant advantage of the inventive jig 110 over conventional jigs 910.

H. Additional Advantages.

Additional advantages of the inventive jigs 110 over conventional jigs 910 not explicitly described herein will become apparent to persons having ordinary skill in the art, such as upon use and/or contemplation of the present invention and its various aspects. Such additional advantages are intended to be inclusive of the present disclosure without departing from the scope of the invention.

The present invention also includes methods for making inventive lures 100. One such non-limiting exemplary method is described herein for manufacturing an inventive fishing lure 100 of the present disclosure. For the purpose of brevity and conciseness of description, the inventive fishing lure 100 of the method will be described in the form of a jig 110. However, it should be understood that such select example embodiment represents merely one variation of the inventive methods and devices of the present disclosure. Accordingly, the invention is not limited to methods for manufacturing inventive fishing lures 100 in the form of a jig 110. Rather, the invention is suitable with respect to a variety of methods and devices thereof to which the invention can be adapted. Therefore, specific details disclosed herein, such as relating to structure, function, and the like, are not to be interpreted as limiting in any manner whatsoever, but rather as only one of numerous example bases for claims and/or teaching persons having ordinary skill in the art to variously employ the described inventive method in any appropriately detailed structure or circumstance.

Referring now to FIGS. 21A-21D, one such method for manufacturing an inventive jig 110 involves a molding process (e.g., spin-casting). Briefly described, the method (in simplified form) comprises:

A. providing a mold 211 having a first portion 212 and a second portion 214, wherein the first portion 212 and the second portion 214 each comprise slotted segments 212A,214A, a body component forming cavity 212C, 214C, flow channels 213,215 and alignment elements 217,218;
B. providing a hook component 150 comprising a shank 160 having a first region 162 and a second region 164;
C. positioning the hook component 150 into an accommodating slotted segment 212A of the first portion 212 of the mold 211 such that the first region 162 of the hook component 150 is disposed within the body component forming cavity 212C;
D. providing a through-line element formation member 230 having a first end 230A, a second end 230B distal to the first end 230A, and a middle portion 230C disposed therebetween;
E. positioning the through-line element formation member 230 proximate or adjacent to the first region 162 of the hook component 150 such that the middle portion 230C of the through-line element formation member 230 is disposed within the body component forming cavity 212C of the first portion 212 of the mold 211, and the first end 230A and the second end 230B of the through-line element formation member 230 are disposed into an accommodating slotted segment 212A external to the body component forming cavity 212C;
F. aligning the alignment elements 217,218 and mating the second portion 214 of the mold 211 to the first portion 212 of the mold 211 to form a mated mold 211A;
G. providing a molding device 200 comprising a molten material injection component 358 (e.g., gravity feed, pressure feed, etc.), a pressure component 362 and a rotation component 364;
H. placing the mated mold 211A into the molding device 200;
I. clamping the mated mold 211A into a secured position;

J. exposing the mated mold 211A to a desired pressure via the pressure component 362;

K. rotating the mated mold 211A to a desired speed via the rotation component 364;

L. providing a semi-molten or molten material 354 which hardens into a solid component at ambient temperature (i.e., about 21° C.);

M. injecting the semi-molten or molten material 354 into the mated mold 211A via the molten material injection component 358;

N. allowing the molten material 354 to properly disperse into the body component forming cavities 212C,214C of the mated mold 211A via the flow channels 213,215;

O. halting the rotation of the mated mold 211A;

P. allowing the semi-molten or molten material 354 to solidify while inside of the mated mold 211A;

Q. relieving the pressure upon the mated mold 211A;

R. unclamping the mated mold 211A;

S. removing the mated mold 211A from the molding device 200;

T. separating the second portion 214 of the mold 211 from the first portion 212 of the mold 211;

U. removing the molded product 110A from the first portion 212 of the mold 211 to provide an inventive jig 110 of the present disclosure; and V. optionally removing at least a portion of the through-line element formation member 230 from the inventive jig 110.

Continuing with FIGS. 21A-21D, the various steps or elements thereof of a suitable method for manufacturing an inventive fishing lure 100 in the form of a jig 110 using a molding process (e.g., the method enumerated above) will now be described in greater detail. Such a non-limiting exemplary method can comprise:

A. Providing a Mold 211.

The mold 211 comprises a set of disc-shaped layers 212,214 which typically have a diameter of between 9 in. and 12 in. (22.9 cm-30.5 cm). However, it should be understood that other shapes and sizes can also be utilized without departing from the scope of the invention. Desirably, the mold 211 is constructed of materials suitable for the semi-molten or molten material 354 used to form the body component 120 of the jig 110 (e.g., rubber molds for molten lead).

Figure 21B:
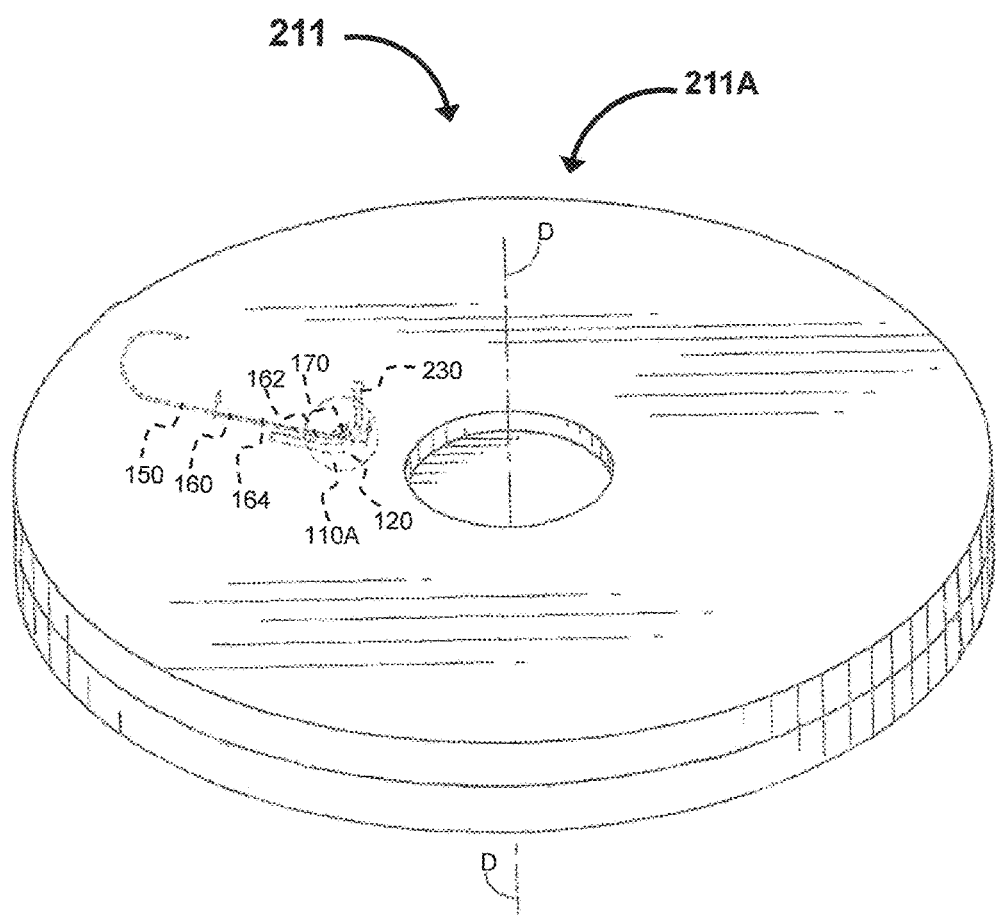
FIG. 21B is a perspective view of a mated mold for making an inventive fishing lure in the form of a jig, and suitable for use with a molding device in the form of a spin-casting machine.
Figure 21D:
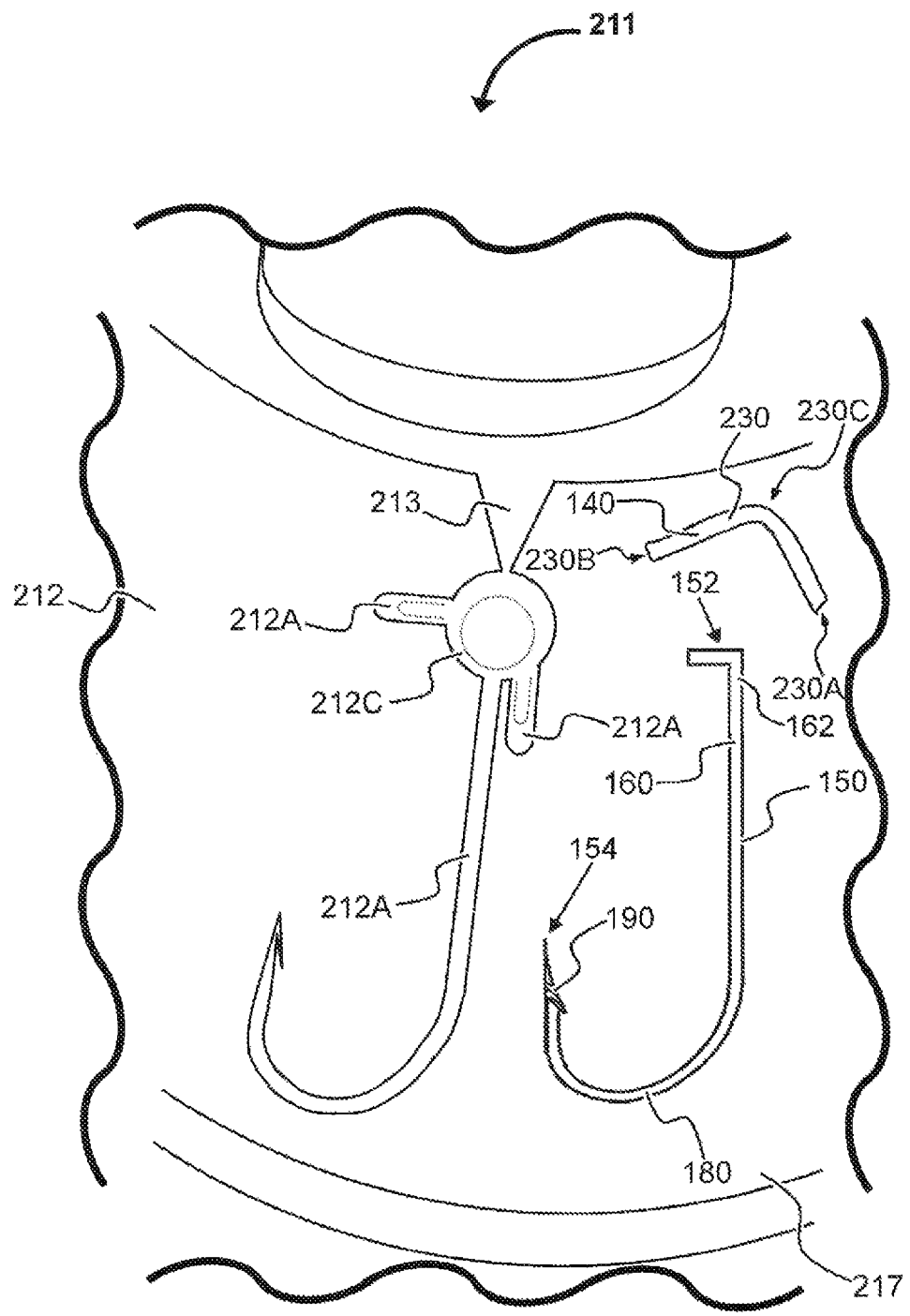
FIG. 21D is a partial enlarged perspective view of a first portion of a mold suitable for making an inventive fishing lure in the form of a jig, and further showing a hook component and a through-line element formation member located proximate to the slotted segments and through-line element formation cavity of the of the first portion of the mold.
Figure 21G:
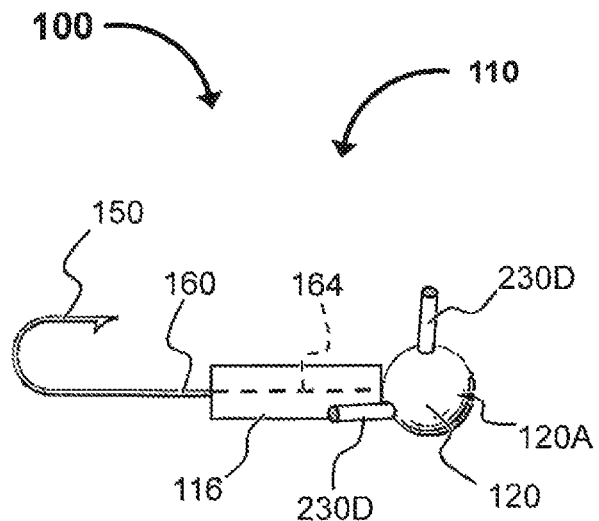
FIG. 21G is a side perspective view of an inventive fishing lure of the present disclosure in the form of a jig showing portions of a through-line element formation member extending from the body component and comprising a masking component disposed about the shank.
Figure 21H:
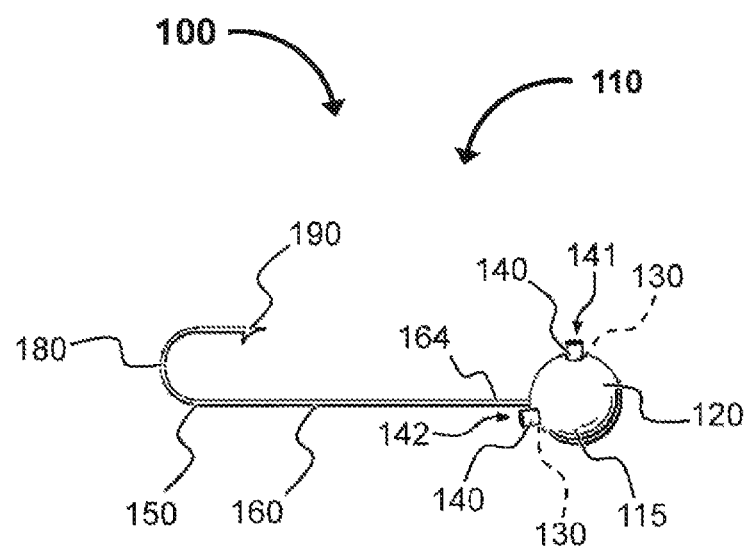
FIG. 21H is a side perspective view of an inventive fishing lure of the present disclosure in the form of a jig comprising an optional protective member, and further comprising an optional coating.

Referring now to FIGS. 21B-21D, such molds 211 typically comprise a first portion 212 and a second portion 214, wherein the portions 212,214 are desirably capable of precisely mating with each other. Each portion 212,214 of the mold 211 includes slotted segments 212A,214A (for accommodating the hook component 150 and through-line element formation member 230) and concave body component forming cavities 212C,214C (for forming the body component 120 of the jig 110) in communication with the slotted segments 212A,214A. Desirably, the slotted segments 212A,214A are sized to fit snuggly about the respective components disposed therein to prevent migration of the semi-molten or molten material 354 into the slotted segments 212A,214A. Accordingly, the first portion 212 and the second portion 214 can be mirror images of the other, though they need not be.

B. Providing a Hook Component 150.

The hook component 150 comprises a first end 152 and a second end 154, a shank 160 having a first region 162 and a second region 164, a curvilinear hook portion 180 and a barbed element 190.

C. Positioning the Hook Component 150 into the Mold 211.

The hook component 150 is placed into the accommodating slotted segment 212A of the first portion 212 of the mold 211 and positioned such that the first region 162 of the hook component 150 is disposed within the concave portions 212C,214C of the mold 211;

D. Providing a Through-Line Element Formation Member 230.

The through-line element formation member 230 comprises a first end 230A, a second end 230B distal to the first end 230A, and a middle region 230C disposed therebetween. Accordingly, the distance between the first end 230A and the second end 230B form a longitudinal length $L_{230}$ of the through-line element formation member 230. In general, the shape profile of the through-line element formation member 230 will determine the shape profile of the through-line element 130.

E. Positioning the Through-Line Element Formation Member 230 into the Mold 211.

In general, the middle region 230C of the through-line element formation member 230 is disposed within the body component forming cavity 212C of the first portion 212 of the mold 211. In some aspects, it may be desirable that the middle region 230C is located proximate or adjacent to the first end 152 of the hook component 150, though it need not be. For example, the middle region 230C can be disposed generally around the first end 152 in a curvilinear profile (though it need not be). In aspects wherein one or both ends 230A, 230B of the through-line element formation member 230 extend beyond the periphery of the body component forming cavity 212C, the first end 230A of the through-line element formation member 230 is then placed into its respective accommodating slotted segment 212A and/or the second end 230B is placed into its respective accommodating slotted segment 212A. In some desirable aspects, the first end 230A can be located generally rearward $R_1$ of the second end 230B, though it need not be. In some aspects, the first end 230A can be located proximate or adjacent to the shank 160 of the hook component 150, though it need not be.

F. Placing the Second Portion 214 onto the First Portion 212 of the Mold 211.

Once the hook component 150 and through-line element formation member 230 have been properly disposed into the bottom or first portion 212 of the mold 211, the top or second portion 214 is then aligned with the first portion 212 via alignment elements 217,218 and then placed onto the first portion 212 to form a mold 211 comprising a hook component 150 and through-line element formation member 230 properly aligned within. Accordingly, upon proper placement of the second portion 214 onto the first portion 212, alignment elements 217 will be disposed within their respective counterpart alignment elements 218. In addition, the hook component 150 will be disposed within its respective accommodating slotted segment 214A of the second portion 214 of the mold 211 and positioned such that the first region 162 of the hook component 150 is disposed within the body component forming cavity 214C of the second portion 214 of the mold 211. Likewise, in aspects wherein one or both ends 230A, 230B of the through-line element formation member 230 extend beyond the periphery of the body component forming cavity 212C, the first end 230A of the through-line element formation member 230 will be disposed within its respective accommodating slotted segment 214A and the second end 230B will be disposed within its respective accommodating slotted segment 214A.

G. Providing a Molding Device 200.

Suitable molding devices can include spin-casting (also referred to as "centrifugal casting"), die casting, plaster mold casting, sand casting, lost-wax casting, injection molding, and the like. One desirable type of molding device 200 for molding the inventive jig 110, such as when utilizing molten lead to form the body component 120, is a spin-casting machine 210 (see e.g. FIG. 21A). Suitable spin-casting machines can include a CONLEY 9-12 DC DIGITAL AIR CAST MACHINE and a CONLEY FRONT LOAD SPIN CASTER, each available from Conley Casting Supply Corp., having a place of business located at 124 Maple Street, Warwick, R.I., USA 02888, and a 12" SERIES 100-D TEKCASTER, available from Tekcast Industries RI, having a place of business located at 124 Maple St, Warwick, R.I., USA 02888. Suitable molding devices 200 in the form of a spin-casting machine 210 are described in U.S. Pat. No. 4,519,971 to Shaer entitled "Front Loading Centrifugal Spin Caster" filed on Mar. 26, 1984, U.S. Pat. No. 5,135,041 to Goss entitled "Multi-Mold Centrifugal Casting Apparatus" filed on Oct. 31, 1991, and U.S. Pat. No. D472,908 S to Shaer entitled "Spin Casting Machine" filed on Jan. 29, 2002, each of which is incorporated herein by reference in a manner that is consistent herewith.

Referring now to FIG. 21A, an exemplary molding device 200 in the form of a spin-casting machine 210 is shown in an open lid 350 configuration. In general, spin-casting involves the use of a pair of complementary disc shaped rubber mold halves 212,214 which are formed with a series of flow channels 213,215 therein which lead to a series of body component forming cavities 212C,214C, which ultimately form the body component 120 of the jig 110. In addition, a series of slotted segments 212A,214A for accommodating the hook component 150 and optionally the through-line element formation member 230 ends 230A,230B (but which do not receive molten material 354) are carved into the mold halves 212,214.

Mounted on top of a base housing 312 in the device 210 is a rotatable turntable 314 which rotates on a hollow shaft 316. The shaft 316 is fixed at its top to the bottom of the turntable 314, and also fixed at its bottom to a pulley 318. The pulley 318 is controlled by a motor 320. Mounted within the hollow shaft 316 is a push rod 322 which is actuated by a ram 324 (e.g., pneumatic, hydraulic, etc.) thereby moving the push rod 322 up or down to apply pressure to the mold 211. The push rod 322 is rotationally isolated from the ram 324 by way of a bearing coupler 326. The top of the push rod 322 bears against the mold ram plate 328 onto which the rubber mold 211 (comprising the first or bottom portion 212 and the second or top portion 214) is placed. A mold coverplate 332 is then placed on top of the rubber mold 211 and positioned such that stays 334 are disposed underneath the clamp retainers 336 which are secured to the bottom of the turntable 314. Finally, a metallic shield or housing 338 is provided around the turntable 314, ram plate 328, mold 211 and coverplate 332. A hinged cover or lid 350 is also included which has a central opening 352 into which, when in a closed position (not shown), a liquid or semi-liquid material 354 (e.g., molten lead) suitable for forming the final product can be introduced from a containment device 356.

In operation, the user mates the mold portions 212,214 and places the mated rubber mold 211 and the coverplate 332 onto the mold ram plate 328. The user then positions the stays 334 under the clamp retainers 336 and closes the hinged lid 350. The ram 324 is then actuated to move the push rod 322 and the ram plate 328 into abutment with the mold 211 to apply pressure thereto. The motor 320 may then be actuated to rotate the shaft 316 and turntable 314, thus resulting in rotation 360 of the entire assembly of the turntable 314, the plates 328,332 and the mold 211. When rotation 360 has reached a desired speed, the semi-molten or molten material 354 may then be introduced into the mold cavity 340 through a central sprue 342 provided in the mold coverplate 332 and into an inlet opening 220 of the top rubber mold 214. The centrifugal force provided by the rotation 360 then forces the material 354 outwardly through flow channels 213,215 into the mold cavities 212C,214C. After a short time, the motor 320 can be stopped and the user waits until the entire assembly terminates its rotation 360, and the semi-molten or molten material 354 has solidified. Upon sufficient cooling, the lid 350 is opened, the ram 324 is deactivated to relieve pressure, and the mold coverplate 332 is rotated to position the stays 334 out from under the clamp retainers 336. The mold coverplate 332 must then be lifted vertically upward $U_1$ away from the mold 211, and the mold 211 is subsequently lifted vertically upward $U_1$ off of the ram plate 328, after which the mold portions 212,214 can be separated and the molded product removed.

H. Placing the Mold 211 into the Spin-Casting Molding Device 210.

As referenced above, the mold 211 is placed into the spin-casting machine 210, arranged such that the top or second portion 214 is spatially located above the bottom or first portion 212, and wherein the first portion 212 is placed upon, and abuts against, the mold ram plate 328 which sits above and upon a turntable 314 disposed therein. A coverplate 332 is placed upon the second portion 214 such that the coverplate 332 is spatially located above the second portion 214. The coverplate 332 comprises a central opening 352 which aligns with the opening 352 of the cover 350, and further aligns with the inlet opening 220 of the top or second portion 214 of the mold 211.

I. Securing the Mold 211 within the Spin-Casting Molding Device 210.

The coverplate 332, mold 211 and ram plate 328 are secured as a unit to the turntable 314 via a plurality of stays 334 and clamp retainers 336. Upon securing the mold 211 within the molding device 200, the lid 350 is moved into a closed position.

J. Applying Pressure to the Mold 211.

Pressure is then applied to the mold 211 via the pressure component 362. More particularly, pressure can be applied by actuating (e.g., via pneumatics, hydraulics, etc.) the ram 324 which presses the push rod 322 against the mold ram plate 328 in an upward $U_1$ direction. A pressure of approximately 50-70 pounds per square inch (psi) (345-482 kPa) is typically suitable. However, it should be understood that other pressures can also be suitable without departing from the scope of the invention.

K. Rotating the Mold 211.

After the mold 211 is clamped and pressure has been applied, the mold 211 is rotated (i.e., spun). More particularly, the mold 211 is disposed between metal plates 328,332 on a motor 320 driven turntable 314 which rotates the mold 211. The turntable 314 is connected to a pulley 318 which is driven by a belt connected to a motor 320. The motor 320 is then actuated to rotate the shaft 316 and turntable 314, thus resulting in rotation 360 of the entire assembly of the turntable 314, plates 328,332 and the rubber mold 211. Spin or rotation 360 speeds typically range from about 100 revolutions per minute ("RPM") to about 1000 RPM, depending on the size of the mold 211 and the semi-molten or molten material 354 being cast. It should be understood that other speeds can also be suitable without departing from the scope of the invention.

L. Providing a Semi-Molten or Molten Material 354.

The semi-molten or molten material 354 can be any desirable material which can exist in a semi-molten or molten form (typically by applying heat, though it need not be) and which can subsequently transition into a hardened, solid form. Examples can include, but are not limited to, metals (e.g., lead, titanium, steel, stainless steel, brass, tungsten, etc.), epoxies, uncured thermoplastics (which are subsequently cured), uncured thermosets (which are subsequently cured), and the like.

M. Introducing the Semi-Molten or Molten Material 354 into the Mold 211.

When the complementary rubber mold halves 212,214 are placed together, a multi-channel mold 211 is formed. As referenced above, the mold 211 is then clamped and pressure is applied (e.g., pneumatics, hydraulics, etc.) to the mold 211 between metal plates 328,332 on a motor 320 driven turntable 314 which rotates the mold 211. When rotation 360 of the mold 211 has reached a desired speed, a liquid or semi-liquid material 354 (e.g., lead heated to approximately 700° F. (371° C.)) is then introduced from a containment device 356, typically by pouring the material 354 through the central opening 352 of the cover 350 (if present) into the central opening 342 disposed within the mold coverplate 332 and into an inlet opening 220 disposed within the axial center DD of the second portion 214 of the mold 211, where it contacts and gathers upon a receiving element 219 of the bottom or first portion 212 of the mold 211 which is generally aligned with the inlet opening 220.

N. Allowing the Semi-Molten or Molten Material 354 to Disperse into the Mold 211.

Upon contacting the receiving element 219 of the first portion 212 of the mold, the semi-molten or molten material 354 is directed outwardly therefrom, and subsequently forced through the radial flow channels 213, 215 of the mold 211 by centrifugal force via the rotation 360 of the mold 211 and into the body component forming cavities 212C,214C. As a result, the body component forming cavities 212C,214C are filled with the semi-molten or molten material 354.

O. Halting Rotation of the Mold 211.

The mold 211 is rotated until the body component forming cavities 212C,214C are filled with a desired amount of the semi-molten or molten material 354 (typically until completely filled, though it need not be). Typically, such rotation 360 is conducted for merely a few minutes, although any suitable rotation time as desired or would be apparent to persons having ordinary skill in the art can be utilized without departing from the scope of the invention. Once the desired fill amount is reached, the motor 320 can be stopped and the entire assembly terminates its rotation 360.

P. Halting Rotation of the Mold 211.

Rotation of the mold 211 is halted by turning off the rotation motor 320. Once rotation 360 of the molding device 200 has terminated, the user typically waits until the semi-molten or molten material 354 has solidified. Optionally, the user can wait until the molten product 110A has cooled to a suitable temperature (e.g., ambient temperature), though it need not be.

Q. Relieving the Pressure Upon the Mold 211.

Once rotation of the mold 211 has terminated, and the material 354 within the body component forming cavities 212C,214C has sufficiently hardened, the pressure exerted upon the mold 211 can be relieved. This can be accomplished by disengaging the pressure component 362. More particularly, the push rod 322 connected to the hydraulic ram 324 is withdrawn from the mold ram plate 328.

R. Unsecuring the mold 211 from the spin-casting molding device 210.

If a lid 350 is present and in a closed position, the lid is moved to an open position. The coverplate 332 is then rotated to position the stays 334 out from under the clamp retainers 336.

S. Removing the Mold 211 from the Spin-Casting Machine 210.

The mold coverplate 332 must first be lifted vertically upward $U_1$ away from the rubber mold 211. The rubber mold 211 is then subsequently lifted vertically upward $U_1$ off the ram plate 328, and then out of the molding device 200.

T. Separating the Mold 211 Halves.

Once removed from the molding device 200, the first portion 212 and the second portion 214 are separated to expose the molded product. Depending on the adhesive force, the halves 212,214 may be separate by hand, or a tool may be needed to pry the halves 212,214 apart.

U. Removing the Molded Product.

Once the first portion 212 and the second portion 214 of the mold 211 are separated, and the molded product 110A is exposed, the hook component 150, the newly molded body component 120, and the through-line element formation member 230 disposed therethrough, can be removed from the mold 211 as a single unit. Depending on the adhesive force within the slotted segment(s) 212A or 214A and the body component forming cavities 212C or 214C, the molded product 110A may be separate by hand, or a tool may be required to pry the unit 110A from the mold 211, thus forming an inventive jig 110 of the present disclosure.

V. Optionally Removing the Through-Line Element Formation Member.

Depending on the construction of the through-line element formation member 230, all or a portion thereof can be extracted from the body component 120, though it need not be. For example, if the through-line element formation member 230 is in the form of a hollow tube, the through-line element formation member 230 need not be removed, as it can subsequently serve as a protective member 140 disposed within the through-line element 130. In another example, if the through-line element formation member 230 is a solid component, the entire through-line element formation member 230 can be removed to form the through-line element 130. In still another example, if the through-line element formation member 230 is in the form of a core and sheath (e.g., 110 volt household electrical wiring), the core portion only can be removed to form a protective member 140 disposed within the through-line element 130. In addition, where the through-line element formation member 230 forms a protective member 140, the resulting protective member 140 can optionally be trimmed (e.g., with a scissors, a razor blade, etc.), such as proximate or adjacent to the external surface 120A of the body component 120, for example.

Optionally, the molded jig 110 can be cleaned to remove any undesirable items (e.g., burrs, sharp edges, etc.) remaining thereon from the molding process.

EXAMPLES

Example 1—Comparison of Static Knot Vs. Dynamic Knot Position

Referring now to FIGS. 13C-13H, there is illustrate an example of one advantage (in addition to the numerous other advantages) provided by the invention of the present disclosure. More particularly, FIGS. 13C-13H demonstrate at least some of the effects of the static knot 106A (which results from the design/configuration of the inventive fishing lure 100, such as in the form of a jig 110) compared to the effects of the typical dynamic knot 906A (which results from the inferior design/configuration of conventional jigs 910).

In each subset of this Example 1 below, the inventive fishing lure 100 in the form of a jig 110 comprises a through-line element 130 wherein the first end 131 has an angle $\theta_{131}$ of approximately 90-degrees (wherein the first opening 131A is disposed generally along the top side 123 of the body component 120) and the second end 132 has an angle $\theta_{132}$ of approximately 180-degrees (wherein the second opening 132A is disposed generally along the rear side 122 of the body component 120, adjacent to the bottom side 167 of the shank 160) (see e.g., FIG. 3A, FIG. 4J and FIG. 5H). In addition, a fishing line 105 disposed through the through-line element 130 of the jig 110 has been tied to the shank portion 160 of the hook component 150 and subsequently cinched, positioning the resulting knot 106 proximate or adjacent to the interface $Q_{162}$ formed between the second region 164 of the shank 160 and the exterior surface 120A on the rear side 122 of the body component 120, to form a static knot 106A.

Similarly, the conventional jig 910 comprises an eyelet 940 oriented at an angle of approximately 90-degrees with respect to the longitudinal axis $X_{960}$ of the lower shaft portion 960 of the hooking component 950 (wherein the eyelet 940 is disposed generally along, and externally to, the top side 923 of the body component 920) (see e.g., Comparative FIGS. 1A-1B). In addition, a fishing line 905 disposed through the opening 944 of the eyelet 940 has been tied around the loop element 942 and subsequently cinched, forming a dynamic knot 906A (which undesirably inherently slides along the loop element 942).

Each jig 110,910 was then placed in front of a horizontally lined background and allowed to freely hang vertically by an equal length of its respective fishing line 105,905, thus utilizing the force of gravity to simulate a force applied to each jig 110,910 via its respective fishing line 105,905. Additional description and the subsequent results are provided in subset Comparative Examples 1A-1C below.

Figure 13C:
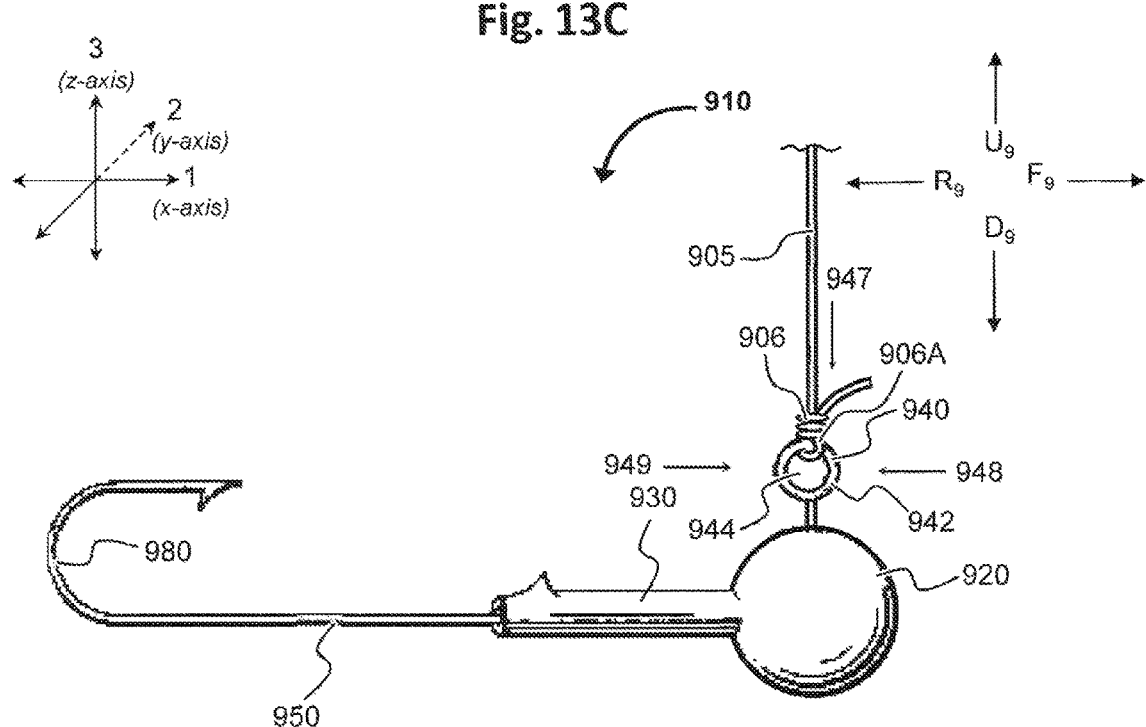
FIG. 13C is a side perspective view showing a conventional jig having a fishing line attached to the eyelet.
Figure 13D:
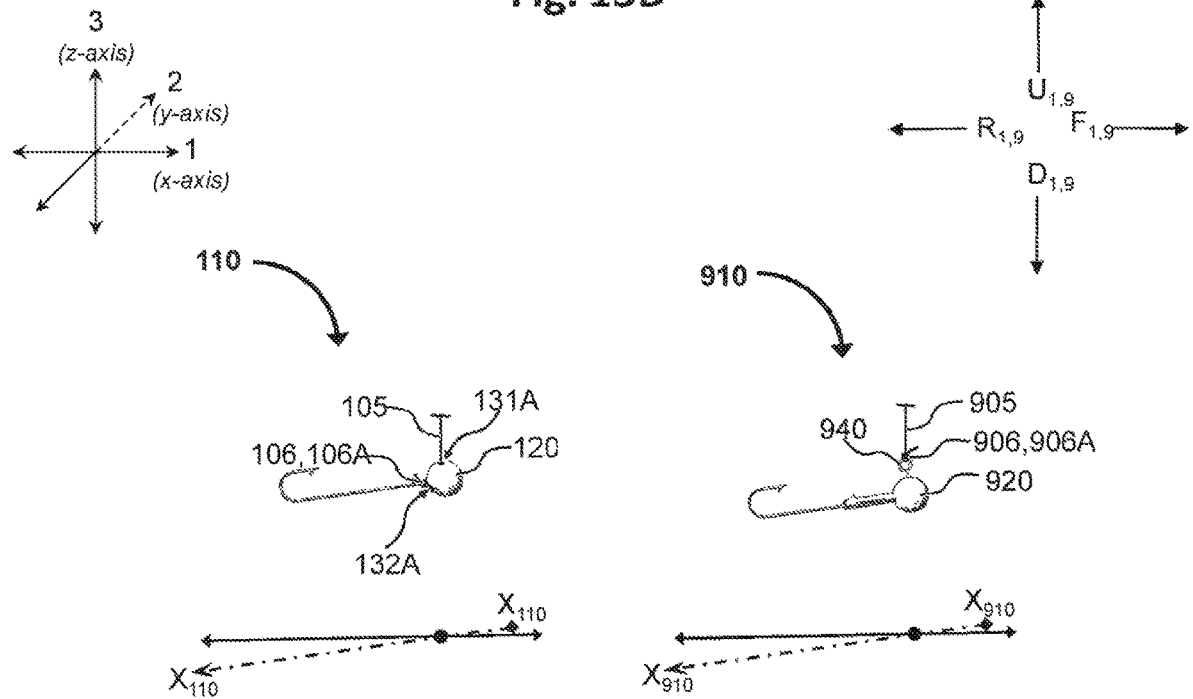
FIG. 13D is a side perspective view showing a comparison between one aspect of an inventive fishing lure of the present invention in the form of a jig having a fishing line attached thereto, and a conventional jig having a fishing line attached to the eyelet.

Comparative Example 1A—Inventive Jig Static Knot Vs. Conventional Jig Dynamic Knot Positioned at the Top of the Eyelet As noted above, the inferior design/configuration of conventional jigs 910 allows the typical knot 906 to change position and/or orientation along the loop element 942 of the eyelet 940. With reference to FIGS. 13C-13D, in this Comparative Example 1A, a side-by-side comparison between the inventive jig 110 having a static knot 106A and a conventional jig 910 having an inherent dynamic knot 906A is presented, wherein the knot 906 of the conventional jig 910 is disposed generally at the top side 947 of the eyelet 940. FIG. 13C shows a side perspective view of a conventional jig 910 illustrating a knot 906 disposed generally at the top side 947 of the eyelet 940, as demonstrated in this Comparative Example 1A. FIG. 13D shows the results of a side-by-side comparison of the inventive jig 110 having a static knot 160A versus conventional jigs 910 having a dynamic knot 960A under the parameters set forth in this Comparative Example 1A. It can be seen that the orientation of each jig 110,910, as shown by each jig's longitudinal orientation axis $X_{110}$, $X_{910}$, respectively, are relatively similar (i.e., approximately −5° in the x-z plane, with respect to the x-y plane (also may be referred to herein as the "horizontal plane")) for both the inventive jig 110 and the conventional jig 910.

Figure 13E:
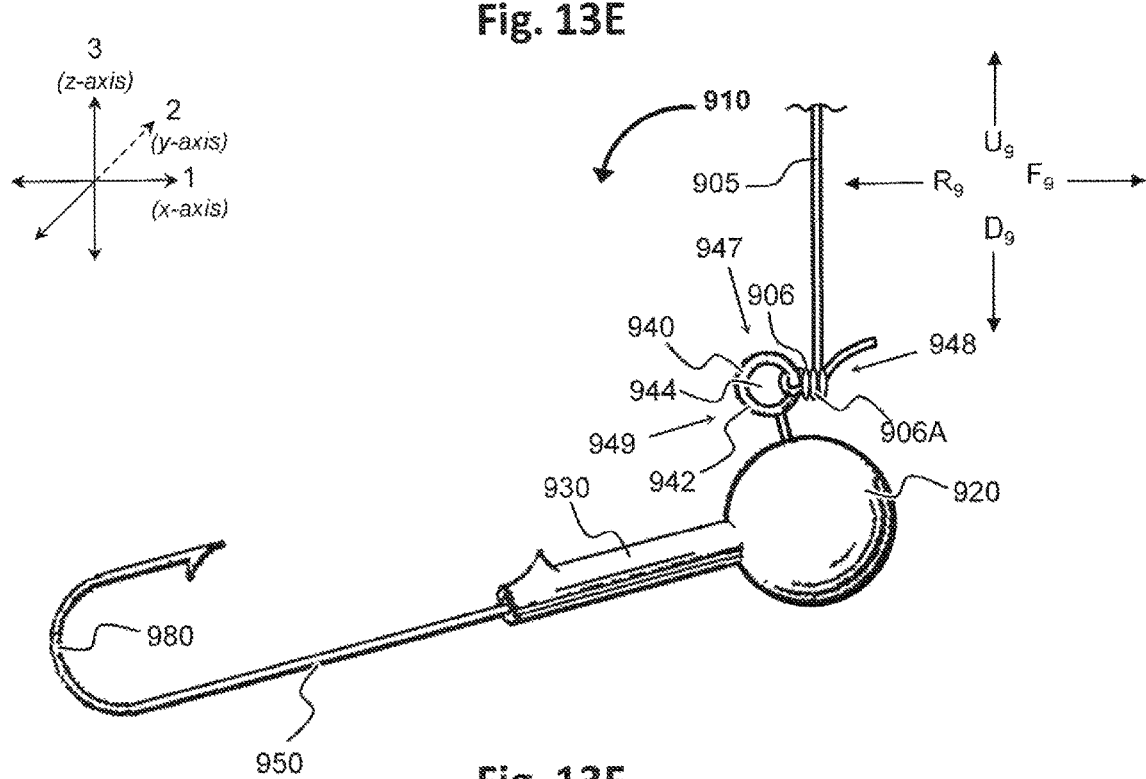
FIG. 13E is a side perspective view showing a conventional jig having a fishing line attached to the eyelet.
Figure 13F:
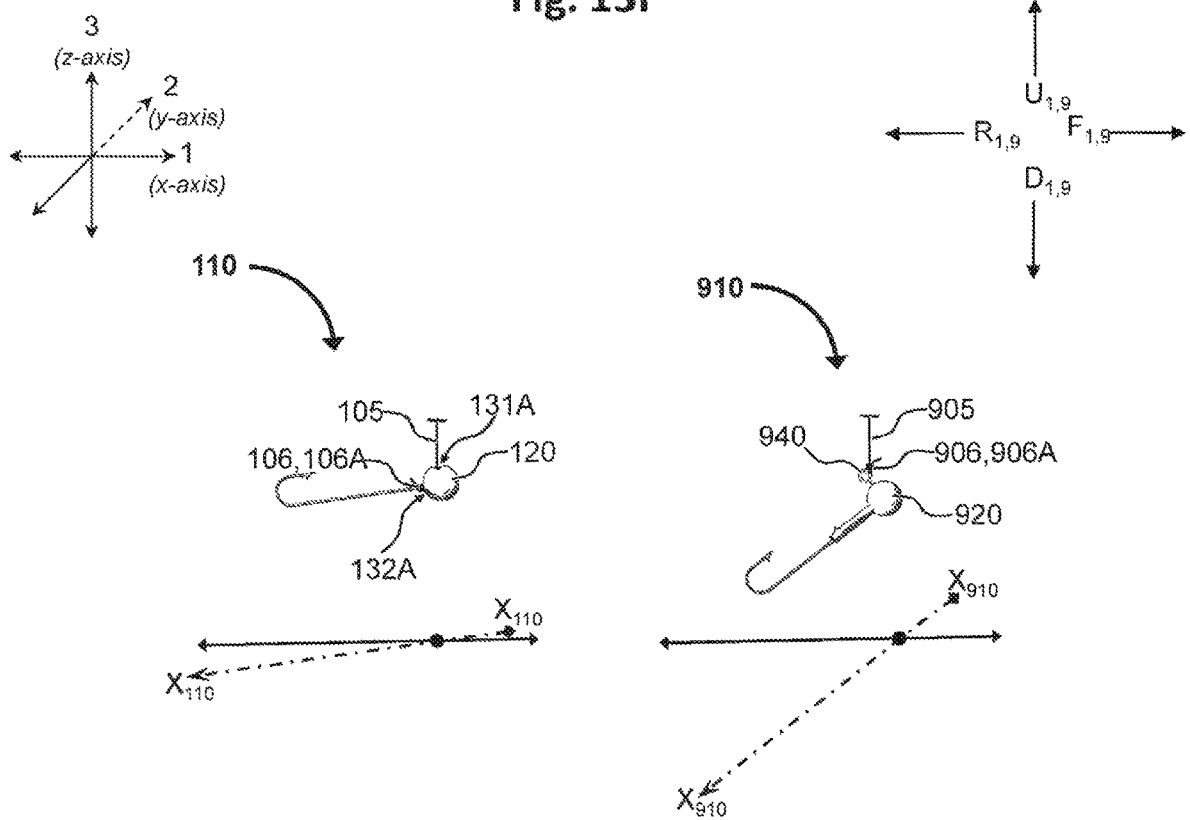
FIG. 13F is a side perspective view showing a comparison between one aspect of an inventive fishing lure of the present invention in the form of a jig having a fishing line attached thereto, and a conventional jig having a fishing line attached to the eyelet.

Comparative Example 1B—Inventive Jig Static Knot Vs. Conventional Jig Dynamic Knot Positioned at the Front Side of the Eyelet As noted above, the inferior design/configuration of conventional jigs 910 allows the typical knot 906 to change position and/or orientation along the loop element 942 of the eyelet 940. With reference now to FIGS. 13E-13F, in this Comparative Example 1B, a side-by-side comparison between the inventive jig 110 having a static knot 106A and a conventional jig 910 having an inherent dynamic knot 906A is presented, wherein the dynamic knot 906A of the conventional jig 910 has changed position (compared to Comparative Example 1A) such that the knot 960 is now disposed generally at the front side 948 of the eyelet 940. FIG. 13E shows a side perspective view of a conventional jig 910 illustrating a knot 906 generally disposed at the front side 948 of the eyelet 940, as demonstrated in this Comparative Example 1B. FIG. 13F shows the results of a side-by-side comparison of the inventive jig 110 having a static knot 106A (which does not change position or orientation) versus the conventional jig 910 having a dynamic knot 906A (which disadvantageously changes position or orientation during use) under the parameters set forth in this Comparative Example 1B.

It can be seen that the orientation of the inventive jig 110, as shown by its longitudinal orientation axis $X_{110}$, has remained substantially consistent with Comparative Example 1A (i.e., approximately −5° in the x-z plane, with respect to the horizontal plane). However, the orientation of the conventional jig 910, as shown by its longitudinal orientation axis $X_{910}$, has changed in comparison to Comparative Example 1A, such that the conventional jig 910 is now oriented approximately −35° in the x-z plane, with respect to the horizontal plane. Thus, this Comparative Example 1B shows that conventional jigs 910 exhibit spatial orientation changes during use in at least the x-z plane, with respect to the horizontal plane, as the dynamic knot 906A inherent to such conventional jigs travels in a frontward $F_9$ and downward $D_9$ direction along the loop element 942 of the eyelet 940.

Figure 13G:
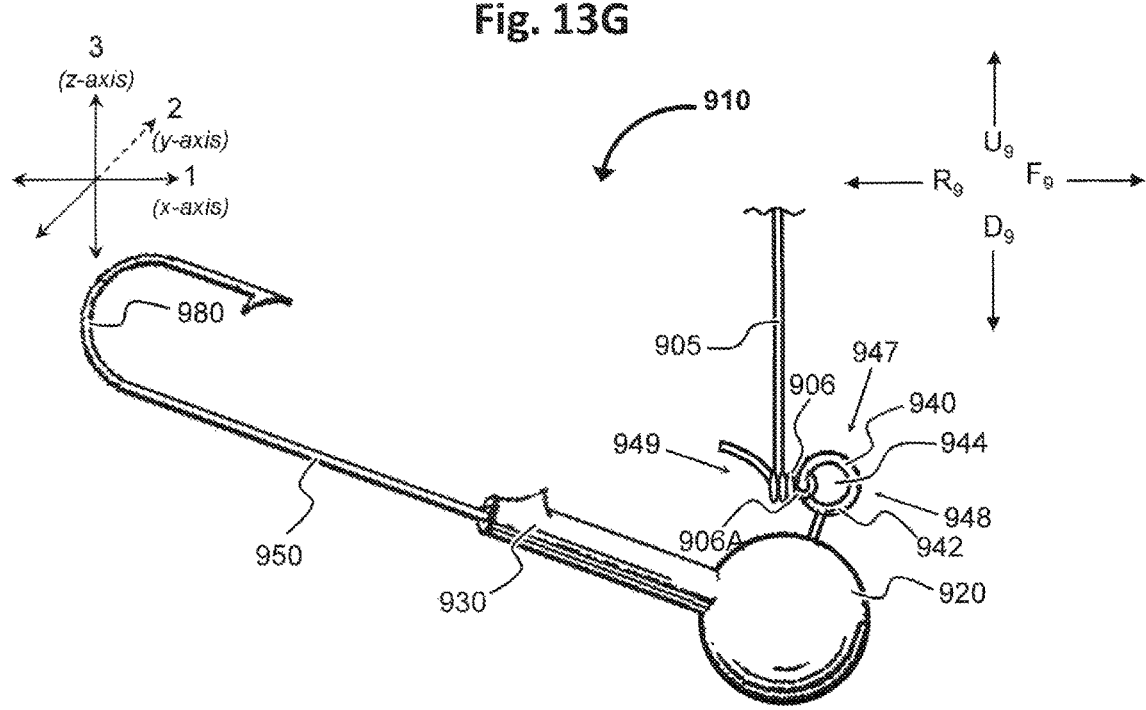
FIG. 13G is a side perspective view showing a conventional jig having a fishing line attached to the eyelet.
Figure 13H:
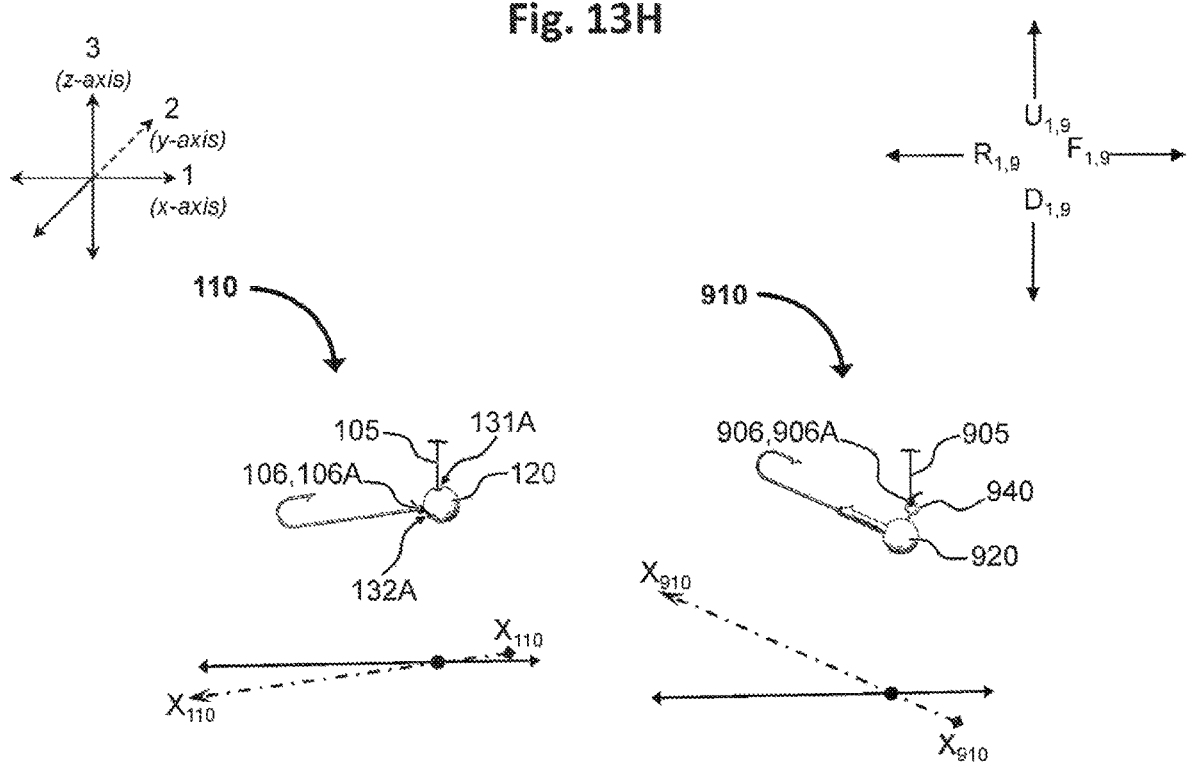
FIG. 13H is a side perspective view showing a comparison between one aspect of an inventive fishing lure of the present invention in the form of a jig having a fishing line attached thereto, and a conventional jig having a fishing line attached to the eyelet.

Comparative Example 1C—Inventive Jig Static Knot Vs. Conventional Jig Dynamic Knot Positioned at the Rear Side of the Eyelet As noted above, the inferior design/configuration of conventional jigs 910 allows the typical knot 906 to change position and/or orientation along the loop element 942 of the eyelet 940. With reference now to FIGS. 13G-13H, in this Comparative Example 1C, a side-by-side comparison between the inventive jig 110 having a static knot 106A and a conventional jig 910 having an inherent dynamic knot 906A is presented, wherein the dynamic knot 906A of the conventional jig 910 has changed position (compared to Comparative Examples 1A and 1B) such that the knot 160 is now disposed generally at the rear side 949 of the eyelet 940. FIG. 13G shows a side perspective view of a conventional jig 910 illustrating a knot 906 generally disposed at the rear side 949 of the eyelet 940, as demonstrated in this Comparative Example 1C. FIG. 13H shows the results of a side-by-side comparison of the inventive jig 110 having a static knot 106A (which does not change position or orientation) versus the conventional jig 910 having a dynamic knot 906A (which disadvantageously changes position or orientation during use) under the parameters set forth in this Comparative Example 1C.

It can be seen that the orientation of the inventive jig 110, as shown by its longitudinal orientation axis $X_{110}$, has remained substantially consistent with Comparative Example 1A, as well as with Comparative Example 1B (i.e., approximately −5° in the x-z plane, with respect to the horizontal plane). However, the orientation of the conventional jig 910, as shown by its longitudinal orientation axis $X_{910}$, has changed in comparison to Comparative Example 1A and Comparative Example 1B, such that the conventional jig 910 is now oriented at approximately 25° in the x-z plane, with respect to the horizontal plane. Thus, this Comparative Example 1C shows that conventional jigs 910 further exhibit spatial orientation changes during use in at least the x-z plane, with respect to the horizontal plane, as the dynamic knot 906A inherent to such conventional jigs travels in a rearward $R_9$ and downward $D_9$ direction along the loop element 942 of the eyelet 940.

Example 1—Conclusions

Comparative Examples 1A-1C show that the advantageous configuration and design of the inventive jig 110 provides a more stable lure as compared to conventional jigs 910 under the same or similar conditions, and furthermore results in movements and other reactions (e.g., those intentionally imparted by a user during use, such as by applying various forces via the fishing line 105) that remain substantially consistent, repeatable, and predictable, thus providing a highly desirable benefit and advantage over conventional jigs 910 (e.g., with respect to the goal of catching fish more effectively). In contrast, Comparative Examples 1A-1C also show that conventional jigs 910 are less stable than the inventive jig 110, and inherently exhibit movements and other reactions which are not intentionally imparted by a user during use, including spatial orientation changes in the x-z plane, with respect to the horizontal plane, of up to about 60 degrees or more, as the dynamic knot 906A inherent to conventional jigs 910 travels between at least the front side 948 and the rear side 949 of the eyelet 940. Furthermore, the knot 906 position, and indeed the conventional jig 910 itself, is typically hidden within water, such that a user cannot see or know the precise positon of the knot 906, and thus neither the orientation of the conventional jig 910, at any given time during use. Moreover, Comparative Examples 1A-1C show that the orientation and movements of conventional jigs 910 are dependent upon the position and orientation of the knot 906 along the loop element 942 of the eyelet 940 at any given time. Therefore, persons having ordinary skill in the art can reasonably conclude that any movements of conventional jigs 910 resulting from forces intentionally imparted by a user via the fishing line 905 would, at best, be unpredictable.

In conclusion, Comparative Example 1 demonstrates several major problems inherent to existing conventional fishing lures 900 (e.g., with respect to the goal of catching fish more effectively) including, but not limited to:

a) the fishing line 905 knot 906 inherent to such conventional fishing lures 900 (such as a conventional jig 910) can move about the eyelet 940 of such lures 900 in an unpredictable manner;

b) movements of the fishing line 905 knot 906 about the eyelet 940 of such lures 900 can unpredictably change the position and orientation of conventional fishing lures 900 at any given time during use, even without any action or intention by the user to impart such change;

c) movements of the fishing line 905 knot 906 about the eyelet 940 of such lures 900 can unpredictably change the angle and/or direction at which forces are applied to conventional fishing lures 900 via the fishing line 905; and d) conventional fishing lures 900 (including the fishing line 905 knot 906), and their respective positions and orientations at any given time during use, are typically hidden from the sight and knowledge of the user.

Therefore, persons having ordinary skill in the art can reasonably conclude that the movements and other reactions of conventional fishing lures 900 (such as conventional jigs 910), whether or not resulting from forces intentionally imparted by a user via a fishing line 905 connected thereto, are at best inconsistent, non-repeatable, and unpredictable.

In contrast, Comparative Example 1 further demonstrates that the inventive fishing lures 100 of the present disclosure overcome the problems of such conventional fishing lures 900 by providing a unique and inventive design/configuration, making the inventive fishing lures 100 more stable and predictable than such conventional fishing lures 900, and thus resulting in movements and other reactions (including but not limited to those intentionally imparted by a user during use via a fishing line 105) that are more consistent, repeatable, and predictable. Therefore, even when based merely on the features of Comparative Example 1 alone, persons having ordinary skill in the art can reasonably conclude that the properties, functions, reactions and/or other such qualities of the inventive fishing lures 100 of the present disclosure render conventional fishing lures 900 to be comparatively inferior, including but not limited to the advantages and benefits provided by the inventive fishing lures 100 with respect to the goal of catching fish more effectively. Thus, this feature of the present invention, even without more, makes the present invention unique, unexpected, and superior to existing prior lures.

Example 2—Vertical Presentation

Referring now to FIGS. 22A-22D, an experiment was performed to compare the vertical presentation of an inventive fishing lure 100 of the present disclosure (such as in the form of a jig 110) versus a conventional fishing lure 900.

Figure 22A:
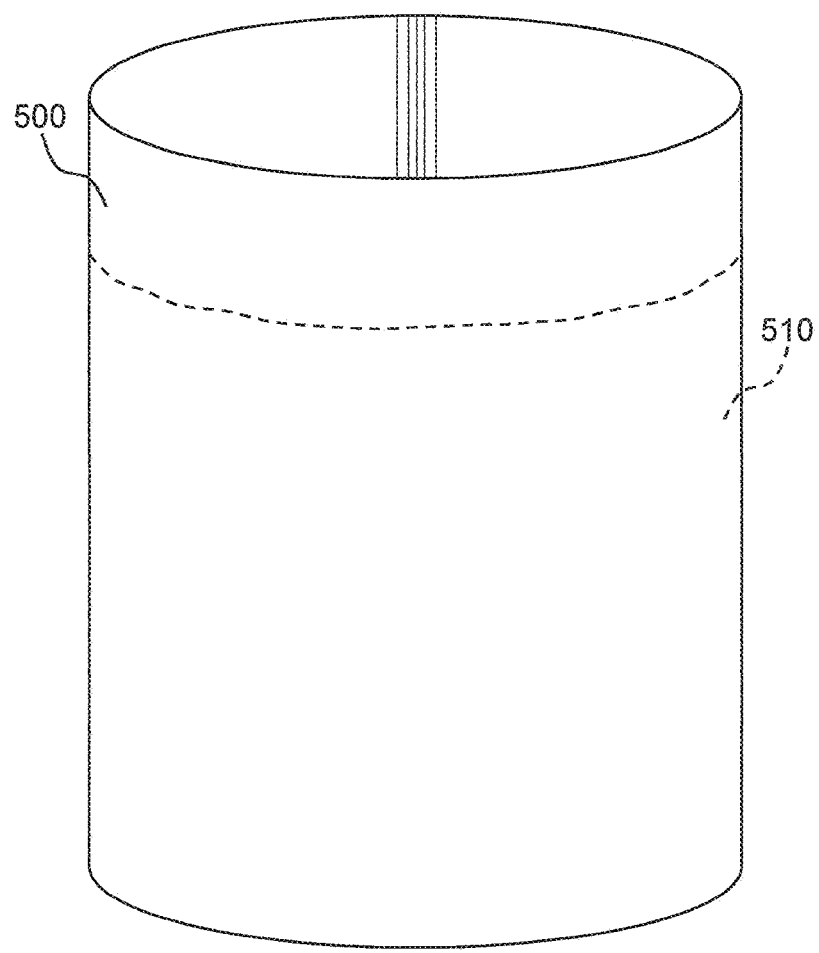
FIG. 22A is a perspective view of a container utilized for testing vertical presentation.
Figure 22B:
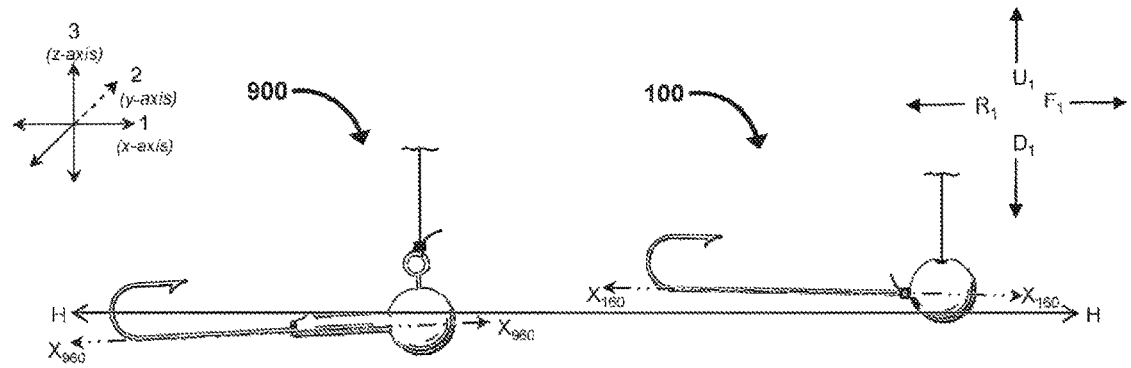
FIG. 22B is a perspective view comparing the spatial orientation of a conventional fishing lure and an inventive fishing lure prior to testing vertical presentation.
Figure 22C:
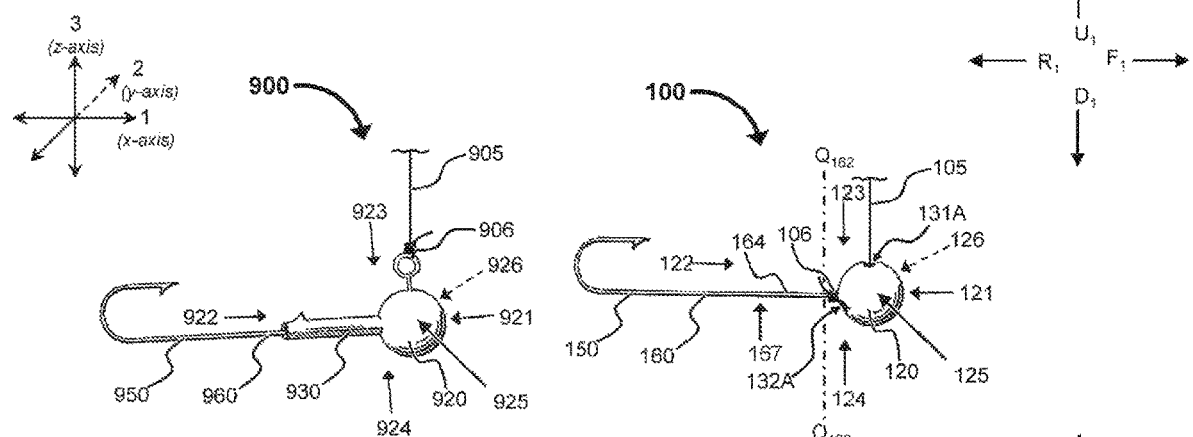
FIG. 22C is a perspective view of the conventional fishing lure and the inventive fishing lure of FIG. 22B.

As illustrated in FIGS. 22B-22C, with additional reference to Comparative FIGS. 1A-1B and FIGS. 13C-13D, a conventional fishing lure 900 in the form of a jig 910 was provided. The conventional jig 910 had an overall length of about 1.8 in. (4.5 cm), and included a substantially spherical-shaped body component 920 comprising lead, and had a body component 920 diameter of about 0.5 in (1.2 cm). The conventional jig 910 further comprised an eyelet 940 that extended externally from the top side 923 of the body component 920 such that the eyelet 940 and upper region 974 of the vertical shaft portion 970 of the hooking component 950 was oriented at a 90° angle to the longitudinal axis $X_{960}$ of the horizontal shaft portion 960 of the hooking component 950 (i.e., the vertical shaft portion 970 was parallel to the fishing line 905). A fishing line 905 extending from a fishing pole was then tied into a knot 906 and cinched at the top 947 of the loop element 942 of the eyelet 940, at approximately the 12 o'clock position (see e.g., FIG. 13C).

Returning again to FIGS. 22B-22C, with additional reference now to FIGS. 2A-2C and 13D, an inventive fishing lure 100 in the form of a jig 110 was also provided. The inventive fishing lure 100 had an overall length of about 1.9 in. (4.7 cm), and included a substantially spherical-shaped body component 120 comprising lead, which had a diameter of about 0.5 in (1.2 cm). The inventive fishing lure 100 further comprised a through-line element 130, wherein the first end 131 had an angle $\theta_{131}$ of about 90° (i.e., the first end 131 was generally parallel to the fishing line 105), configured such that the first opening 131A was disposed along the top side 123 of the body component 120, and wherein the second end 132 had an angle $\theta_{132}$ of 180° (i.e., the second end 132 was generally parallel to the axis $X_{160}$ of the shank 160), configured such that the second opening 132A was disposed along the rear side 122 of the body component 120 adjacent to the bottom side 167 of the shank 160. A fishing line 105 extending from a fishing pole was inserted into the first opening 131A and threaded through the through-line element 130, exiting through the second opening 132A. The fishing line 105 was tied into a knot 106 around the shank 160 and then cinched adjacent to the interface $Q_{162}$ formed between the second region 164 of the shank 160 and the exterior surface 120A on the rear side 122 of the body component 120.

Figure 22D:
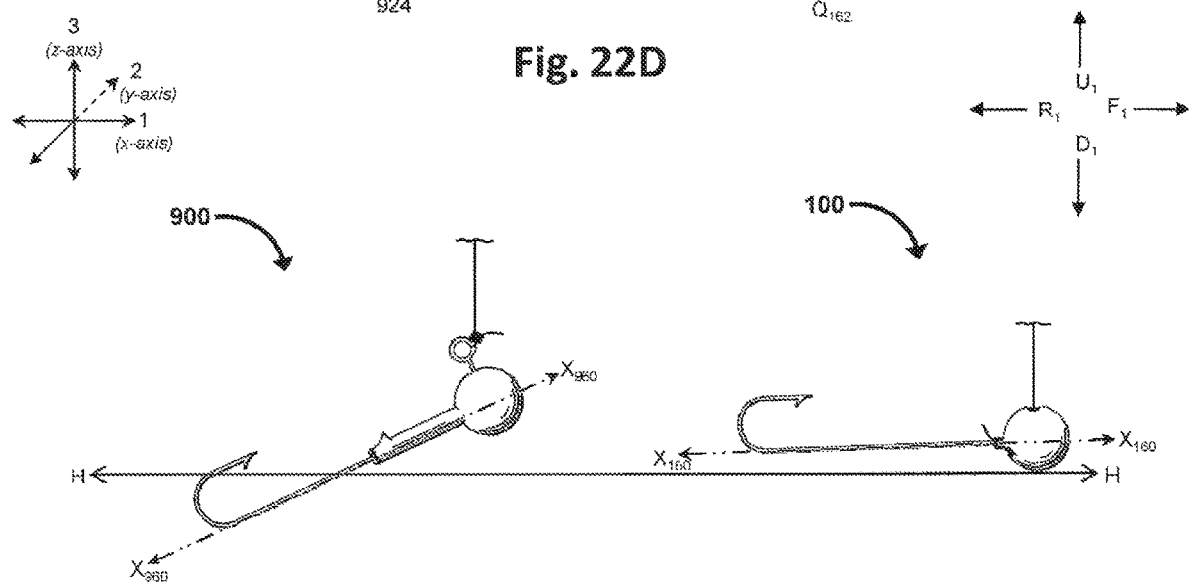
FIG. 22D is a perspective view comparing the spatial orientation of a conventional fishing lure and an inventive fishing lure after testing vertical presentation.

As shown in FIG. 22A, an open-top cylindrical container 500 having a diameter of about 11 in (28 cm) was filled with tap water 510 at ambient temperature to a depth of about 12 in. (31 cm). Each of the conventional jig 910 and the inventive jig 110 was then placed into the bucket 500 of water 510 and was repeatedly jigged vertically (i.e., up and down) using the fishing pole attached thereto (i.e., moved vertically in a downward $D_9,D_1$ and upward $U_9,U_1$ direction, respectively) for twenty (20) cycles. The results throughout the twenty (20) cycles for each jig 910,110 was observed and recorded, including the degree of movement, consistency of movement, quality of movement, knot position, and spatial orientation with respect to the planar surface of the water in the x-y plane. With reference to FIG. 22D, the results are described below:

Inventive Fishing Lure

Upon initial placement in the water 510, it was observed that the inventive jig 110 had a generally horizontal spatial orientation (i.e., the longitudinal axis $X_{160}$ was generally coplanar to the surface of the water). During the jigging process, it was observed that the inventive jig 110 exhibited an initial range of motion in the vertical x-z plane of about 180° (i.e., mimicking the movements of a live and vibrant feeder fish), which remained constant throughout the twenty (20) jigging cycles. Thus, the movement was predictable and the quality of the movement would be desirable to a user of ordinary skill in the art. In addition, as shown in FIG. 22D, it was observed that the knot 106 remained situated adjacent to the interface $Q_{162}$ formed between the second region 164 of the shank 160 and the exterior surface 120A on the rear side 122 of the body component 120 after the twenty (20) jigging cycles. As a result, the inventive jig 110 exhibited the same spatial orientation as prior to the twenty (20) jigging cycles (i.e., the longitudinal axis $X_{160}$ of the shank 160 remained substantially horizontal with respect to the surface of the water). Thus, the spatial orientation (and lack of knot movement) were also consistent and predictable, which would also be desirable to a user of ordinary skill in the art.

Conventional Fishing Lure

Upon initial placement in the water 510, it was observed that the conventional jig 910 had a generally horizontal spatial orientation (i.e., the longitudinal axis $X_{960}$ was generally coplanar to the surface of the water). During the jigging process, it was observed that the conventional fishing lure 900 exhibited an initial range of motion in the vertical x-z plane of about 150°, but which inconsistently diminished to about 120° during the twenty (20) jigging cycles. Thus, the movement was unpredictable, and the quality of the movement (which mimicked a dying feeder fish) would be undesirable to a user of ordinary skill in the art. In addition, as shown in FIG. 22D, it was observed that the knot 906 had moved frontward $F_9$ and downward $D_9$ along the loop element 942 of the eyelet 940 by about 30° to approximately the 1 o'clock position. As a result, the conventional jig 910 now exhibited a spatial orientation wherein the longitudinal axis $X_{960}$ of the horizontal shaft portion 960 of the hooking component 950 had an angle of about −30° in the vertical x-z plane, with respect to the surface of the water. Thus, the spatial orientation (and knot movement) would also be undesirable to a user of ordinary skill in the art.

Conclusion

Accordingly, the experiment of this Example 2 shows that the vertical presentation of the inventive fishing lure 100 is more consistent and predictable than, and thus superior to, conventional fishing lures 900 under the same or similar conditions.

Example 3—Horizontal Presentation

Referring now to FIGS. 23A-23D, an experiment was performed to compare the horizontal presentation of an inventive fishing lure 100 of the present disclosure versus a conventional fishing lure 900.

Figure 23A:
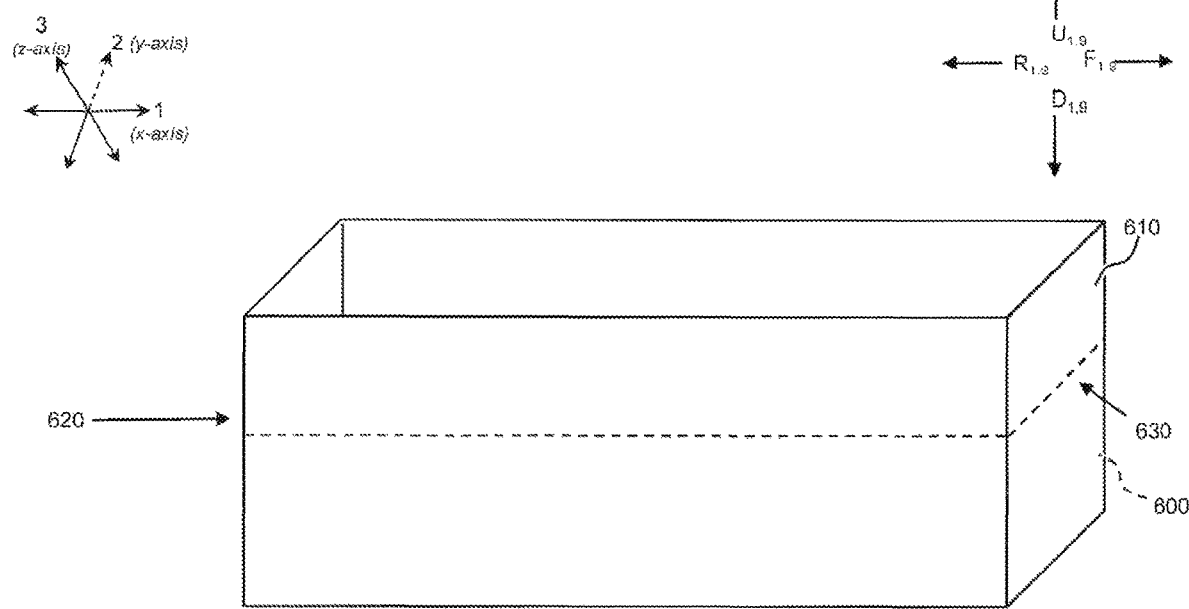
FIG. 23A is a perspective view of a container utilized for testing horizontal presentation.
Figure 23B:
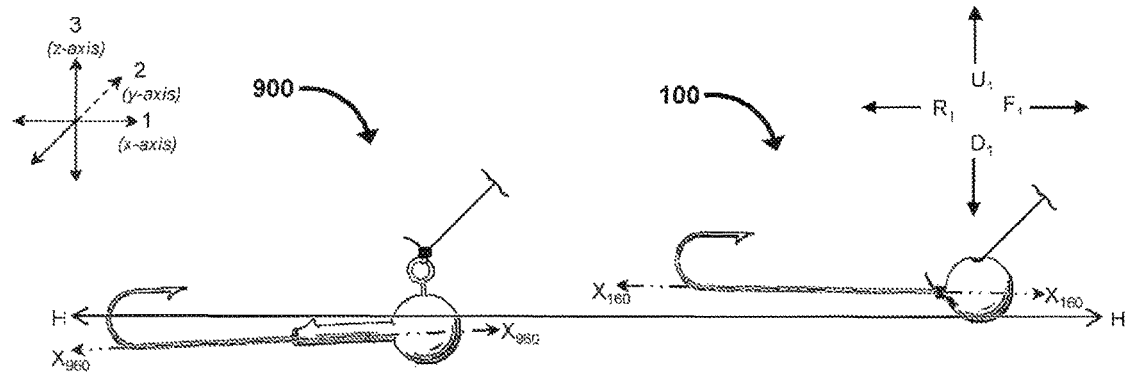
FIG. 23B is a perspective view comparing the spatial orientation of a conventional fishing lure and an inventive fishing lure prior to testing horizontal presentation.
Figure 23C:
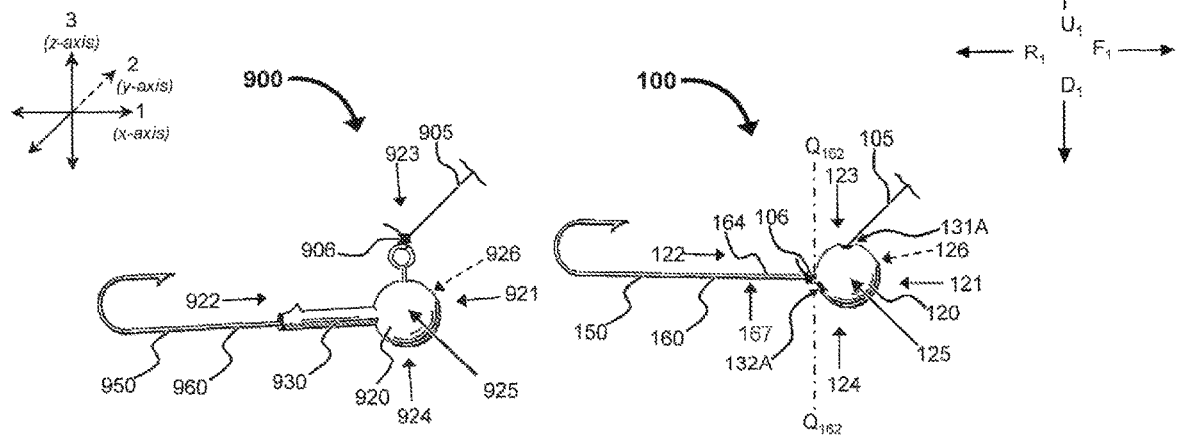
FIG. 23C is a perspective view of the conventional fishing lure and the inventive fishing lure of FIG. 23B.

As illustrated in FIGS. 23B-23C, with additional reference to Comparative FIG. 1B and FIGS. 13C-13D, a conventional fishing lure 900 in the form of a jig 910 was provided. The conventional jig 910 had an overall length of about 1.8 in. (4.5 cm), and included a substantially spherical-shaped body component 920 comprising lead, and the body component 920 had a diameter of about 0.5 in (1.2 cm). The conventional jig 910 further comprised an eyelet 940 that extended externally from the top side 923 of the body component 920 such that the eyelet 940 and upper region 974 of the vertical shaft portion 970 of the hooking component 950 was oriented at a 90° angle to the longitudinal axis $X_{960}$ of the horizontal shaft portion 960 of the hooking component 950 (i.e., the vertical shaft portion 970 was parallel to the fishing line 905). A fishing line 905 extending from a fishing pole was then tied into a knot 906 and cinched at the top 947 of the loop element 942 of the eyelet 940, at approximately the 12 o'clock position (see e.g., FIG. 13C).

Referring again to FIGS. 23B-23C, with additional reference now to FIGS. 2A-2C and 13D, an inventive fishing lure 100 in the form of a jig 110 was also provided. The inventive jig 110 had an overall length of about 1.9 in. (4.7 cm), and included a substantially spherical-shaped body component 120 comprising lead, and the body component 120 had a diameter of about 0.5 in (1.2 cm). The inventive jig 110 further comprised a through-line element 130, wherein the first end 131 had an angle $\theta_{131}$ of 90° (i.e., the first end 131 was generally parallel to the fishing line 105), configured such that the first opening 131A was disposed along the top side 123 of the body component 120, and wherein the second end 132 had an angle $\theta_{132}$ of 180° (i.e., the second end 132 was generally parallel to the axis $X_{160}$ of the shank 160), configured such that the second opening 132A was disposed along the rear side 122 of the body component 120 adjacent to the bottom side 167 of the shank 160. A fishing line 105 extending from a fishing pole was inserted into the first opening 131A and threaded through the through-line element 130, exiting through the second opening 132A. The fishing line 105 was tied into a knot 106 around the shank 160 and then cinched adjacent to the interface $Q_{162}$ formed between the second region 164 of the shank 160 and the exterior surface 120A on the rear side 122 of the body component 120.

Figure 23D:
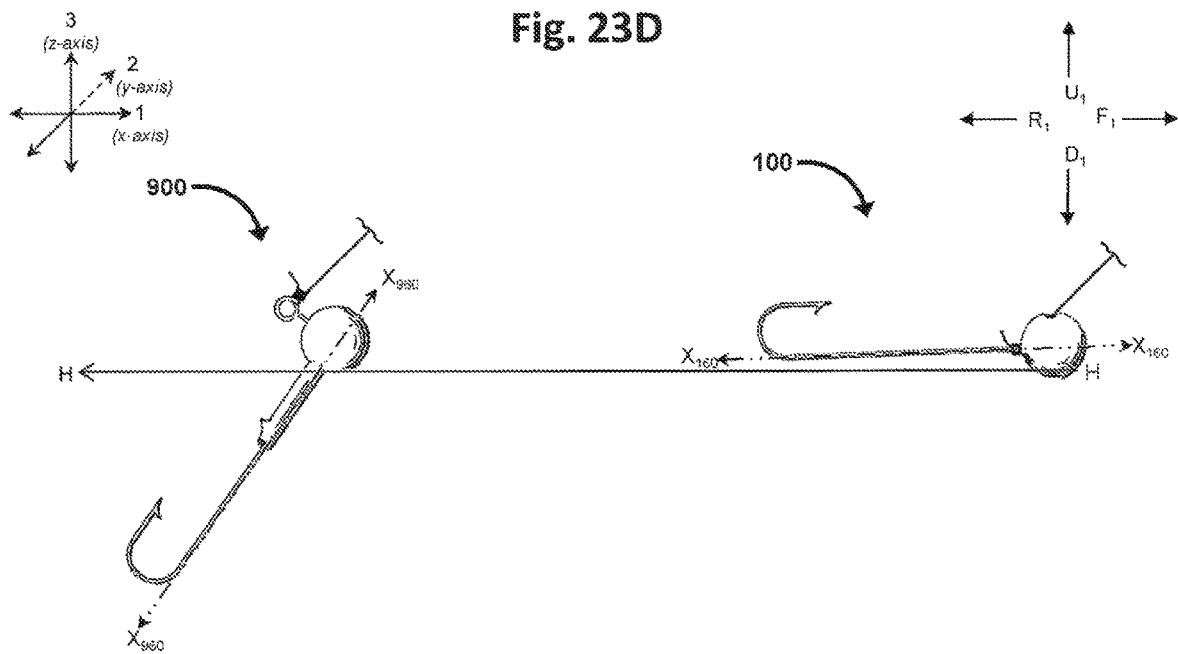
FIG. 23D is a perspective view comparing the spatial orientation of a conventional fishing lure and an inventive fishing lure after testing horizontal presentation.

As shown in FIG. 23A, an open-top rectangular container 600 having a length of about 54 in. (137 cm) and a width of about 20 in. (51 cm) was filled with tap water 610 at ambient temperature to a depth of about 8 in (20 cm). Each of the conventional jig 910 and the inventive jig 110 was then placed into the tub 600 of water 610 and was repeatedly pulled from a first end 620 to a second end 630 of the container 600 with the tip of the fishing pole located near the surface of the water in the container 600, wherein the fishing line 105 exhibited an angle of about 30° (with respect to the surface of the water in the horizontal x-y plane) using the fishing pole attached thereto (i.e., moved angularly in a frontward $F_9, F_1$ and rearward $R_9, R_1$ direction with respect to the container 600) for twenty (20) cycles. The results throughout the twenty (20) cycles for each jig 910,110 were observed and recorded, including the degree of movement, consistency of movement, quality of movement, knot position, and spatial orientation with respect to the planar surface of the water. With reference to FIG. 23D, the results are described below:

Inventive Fishing Lure

Upon initial placement in the water 610, it was observed that the inventive jig 110 had a generally horizontal spatial orientation (i.e., the longitudinal axis $X_{160}$ was generally coplanar to the surface of the water). During the pulling process, it was observed that the inventive jig 110 exhibited a substantially straight line of motion, which remained constant throughout the twenty (20) pulling cycles. In addition, the longitudinal axis $X_{160}$ of the shank 160 remained substantially horizontal consistently throughout the twenty (20) pulling cycles. Thus, the movement was predictable and the quality of the movement would be desirable to a user of ordinary skill in the art. Furthermore, as shown in FIG. 23D, it was observed that the knot 106 remained situated adjacent to the interface $Q_{162}$ formed between the second region 164 of the shank 160 and the exterior surface 120A on the rear side 122 of the body component 120 after the twenty (20) pulling cycles. As a result, the inventive jig 110 exhibited the same spatial orientation as prior to the twenty (20) pulling cycles (i.e., the longitudinal axis $X_{160}$ of the shank 160 remained substantially horizontal with respect to the surface of the water). Thus, the spatial orientation (and lack of knot movement) were also consistent and predictable, which would also be desirable to a user of ordinary skill in the art.

Conventional Fishing Lure

Upon initial placement in the water, it was observed that the conventional jig 910 had a generally horizontal spatial orientation (i.e., the longitudinal axis $X_{960}$ was generally coplanar to the surface of the water). During the pulling process, it was observed that the conventional jig 910 exhibited a substantially straight line of motion, which remained constant throughout the twenty (20) pulling cycles. However, the longitudinal axis $X_{960}$ of the horizontal shaft portion 960 increasingly deviated from its initial horizontal orientation throughout the twenty (20) pulling cycles. Thus, the movement was unpredictable and the quality of the movement would be undesirable to a user of ordinary skill in the art. Furthermore, as shown in FIG. 23D, it was observed that the knot 906 had moved frontward $F_9$ and downward $D_9$ along the loop element 942 of the eyelet 940 by about 60° to approximately the 2 o'clock position. As a result, the conventional jig 910 now exhibited a spatial orientation wherein the longitudinal axis $X_{960}$ of the horizontal shaft portion 960 of the hooking component 950 had an angle of about −60° in the vertical x-z plane, with respect to the surface of the water. Thus, the spatial orientation (and knot movement) would also be undesirable to a user of ordinary skill in the art.

Conclusion

Accordingly, the experiment of this Example 3 shows that the horizontal presentation of the inventive fishing lure 100 is more consistent and predictable than, and thus superior to, conventional fishing lures 900 under the same or similar conditions.

Example 4—Formation of an Inventive Fishing Lure in the Form of a Jig

Referring now to FIGS. 21A-21H, a rubber spin-casting mold 211 originally designed for manufacturing up to twenty-four (24) conventional jigs 910 was obtained from Conley Casting Supply Corp. The mold 211 was disc-shaped having a diameter of approximately 9 in (22.9 cm) and comprised a first or bottom disc-shaped half layer 212 and a second or top disc-shaped half layer 214 capable of precisely mating to the first layer 212.

As illustrated in FIGS. 21C-21D, the mold portions 212,214 comprised a plurality of flow channels 213,215 respectively leading into a plurality of body component forming cavities 212C,214C, respectively, dispersed evenly around the disc-shaped mold portions 212,214, each having a slotted segment 212A,214A, respectively, extending therefrom which were designed to accommodate a hook component 150. The mold portions 212,214 were then modified by carving a first additional set of slotted segments 212A,214A, respectively, extending from the body component forming cavities 212C,214C and located adjacent to (and parallel to) the shank 160 region of the hook component 150 slotted segments 212A,214A, designed to accommodate the first end 230A of the through-line element formation member 230. Such first additional set of slotted segments 212A,214A were each generally rectangular in shape, having a length of about 0.25 in. (0.64 cm), a width of about 0.13 in. (0.32 cm) and a depth of about 0.06 in. (0.16 cm). The mold portions 212,214 were then further modified by carving a second additional set of slotted segments 212A,214A, respectively, extending from the body component forming cavities 212C, 214C and located away from (and orthogonal to) the shank 160 region of the hook component 150 slotted segments 212A,214A (i.e., by carving out the eyelet 940 slotted segments 212A,214A of the original conventional jig 940 mold portions 212,214), designed to accommodate the second end 230B of the through-line element formation member 230. Such second additional set of slotted segments 212A,214A were each generally rectangular in shape, having a length of about 0.25 in. (0.64 cm), a width of about 0.13 in. (0.32 cm) and a depth of about 0.06 in. (0.16 cm).

The mold portions 212,214 further comprised a plurality of complimentary alignment elements 217,218, respectively, dispersed evenly around the mold portions 212,214, located near the periphery thereof. In addition, the first portion 212 comprised a concave receiving element 219 disposed at the approximate center D-D of the disc-shaped first portion 212 designed for receiving a semi-molten or molten material 254 (e.g., molten lead, epoxy, etc.), while the second portion 214 comprised a complementary inlet opening 220 disposed at the approximate center D-D of the disc-shaped second portion 214 designed for allowing the semi-molten or molten material 254 to pass therethrough to the receiving element 219 of the first portion 212.

Referring now to FIGS. 21B-21D, and with additional reference to Comparative FIGS. 1C-1D, a hooking component 950 designed for a conventional jig 910 was severed using a wire-cutting tool. The severing occurred at a location upon the vertical shaft portion 970 between the bend 956A and the eyelet 940 of the hooking component 950, to form a hook component 150 of the present invention having an Interlocking member 170 featuring an augmentative interlocking feature 171. The severed partial vertical shaft portion 970 with attached eyelet 940 of the hooking component 950 was then set aside as not being pertinent to the invention. The newly formed hook component 150 was then placed into the body component forming cavity 212C of the first portion 212 of the mold 211, such that the Interlocking member 170 and the first region 162 of the shank 160 extended into the concave body component forming cavity 212C (see e.g., FIG. 21C).

A piece of insulated electrical wire (i.e., a copper wire core covered with a heat resistant plastic insulator sheath), similar to such electrical wire typically utilized for standard U.S. 110-volt household electrical wiring, was cut to a length of approximately 1.5 in. (3.8 cm) to form a through-line element formation member 230 having a first end 230A, a second end 230B and a middle region 230C disposed therebetween. As shown in FIG. 21C, the first end 230A of the formation member 230 was fitted into its accommodating slotted segment 212A of the first portion 212 of the mold 211 (i.e., located adjacent and parallel to the shank 160). The middle region 230C of the formation member 230 was then bent around, and arranged proximate to, the Interlocking member 170 of the hook component 150, and then the second end 230B of the formation member 230 was secured into its accommodating slotted segment 212A.

The second portion 214 of the modified mold 211 was then placed upon, and abutted to, the first portion 212 in a coplanar configuration, while aligning the second portion 214 to mate precisely with the first portion 212 via the plurality of alignment elements 217,218 (i.e., the alignment elements 217 of the first portion 212 were fitted into the alignment elements 218 of the second portion 214) to form a mated mold 211A. With additional reference to FIG. 21A, the hinged lid 350 of a Conley 9-12 DC DIGITAL AIR CAST MACHINE, available from Conley Casting Supply Corp., was opened, and the mated mold 211A comprising the secured and aligned hook component 150 and through-line element formation member 230 was placed into the housing 338 of the spin casting molding device 210 and the first portion 212 was placed onto a mold ram plate 328 (which was positioned atop a turntable 314). A mold coverplate 332 having a central opening 342 was placed atop the second portion 214 of the mated mold 211A in a coplanar configuration such that the coverplate central opening 342 was generally aligned with the inlet opening 220 of the second portion 214. The coverplate 332 was then rotated clockwise to secure the mold ram plate 328, the mold 211 and the coverplate 332 to the turntable 314 via a plurality of stays 334 and clamp retainers 336. The hinged lid 350 was then closed and secured, wherein the central opening 352 of the lid 350 was generally aligned with the coverplate central opening 342 and the inlet opening 220 of the second portion 214.

A pneumatic pressure of about 25 psi (172 kPa) was applied to the mold 211 via a hydraulic ram 324. Rotation 360 of the mold 211 was then initiated by turning on a motor 320 that drives a pulley 318 connected to the turntable 314, and was brought up to a speed of about 750 RPM. Once the desired rotation speed had been attained, molten lead at a temperature of about 700° F. (371° C.) was poured from a containment device 356 into the central opening 352 of the hinged lid 350. The molten lead traveled through the central opening 352 of the lid 350, the central opening of the coverplate 342, and the inlet opening of the top or second portion 214 of the mold 211, whereinafter it contacted the receiving element 219 of the first portion 212 of the mold, and was subsequently dispersed outwardly via centrifugal force through the flow channels 213,215 and into the body component forming cavities 212C,214C of the mold 211. The spin-casting molding device 210 was allowed to run for about one (1) minute, after which the rotation motor was tuned off and, upon stopping, the modified mold 711A was allowed to cool for at least about thirty (30) seconds, until the molten lead solidified.

After the molten lead had suitably solidified, the pressure upon the mold 211 was relieved. The hinged lid 350 of the spin-casting molding device 210 was opened, and the coverplate 332 was rotated to unlock the coverplate 332 via the plurality of stays 334 and clamp retainers 336. The coverplate 332 was lifted off the second portion 214 of the mold 211, and the mated mold 211A was then lifted off the mold ram plate 328, removed from the housing 338 of the spin-casting molding device 210, and placed onto a workbench. The second portion 214 of the mold 211 was then separated and removed from the first portion 212, thus exposing the newly molded product 110A.

A first molded product 110A was then removed from the first portion 212 of the mold 211, any burrs and/or other debris were cleared from the product 110A, and then the entire through-line element formation member 230 (i.e., the copper wire core portion and the insulator sheath) was removed from the newly formed lead body component 120, thus forming an inventive fishing lure 100 in the form of a jig 110 comprising a through-line element 130 disposed through the body component 120.

A second molded product 110A was removed from the first portion 212 of the mold 211, any burrs and/or other debris were again cleared from the product 110A, and then the copper wire core portion only of the through-line element formation member 230 was pulled out of its insulator sheath using a pliers (i.e., the insulator sheath remained disposed within the through-line element 130). The extending portions of the insulator sheath (i.e., the portions located external to the exterior surface 120A of the newly formed lead body component 120) were then trimmed proximate to the exterior surface 120A of the body component 120 using a razor blade, thus forming an inventive fishing lure 100 in the form of a jig 110 comprising a through-line element 130 disposed through the body component 120, and further comprising an optional protective member 140 disposed within the through-line element 130.

A third molded product 110A was removed from the first portion 212 of the mold 211, any burrs and/or other debris were again cleared from the product 110A, and the copper wire core portion only of the through-line element formation member 230 was pulled out of its insulator sheath using a pliers. The extending portions of the insulator sheath (i.e., the portions located external to the exterior surface 120A of the newly formed lead body component 120) were left intact, and the hook component 150 was then masked using masking tape 116 (see e.g., FIG. 21G). The exposed exterior surface 120A of the body component 120 was then decorated using an airbrush to apply a coating 115 (i.e., various enamel paints), and then allowed to dry. Once the coating 115 had dried, the masking tape 116 was removed from the hook component 150 and the extending portions of the insulator sheath were then trimmed proximate to the exterior surface 120A of the coated body component 120 using a razor blade, thus forming an inventive fishing lure 100 in the form of a jig 110 comprising a through-line element 130, and further comprising an optional protective member 140 disposed within the through-line element 130, and still further comprising an optional coating 115, wherein the through-line element 130 was substantially free from any coating 115 contamination.

Example 5—Formation of an Inventive Fishing Lure in the Form of a Jig

Referring now to FIGS. 24A-24F, a first inventive fishing lure 100 in the form of a jig 110 was formed using a block mold process.

As illustrated in FIG. 24A, a bottom portion 812 of a block mold 811 suitable for producing an inventive jig 110 of the present disclosure was provided. The bottom portion 812 comprised a plurality of body component forming cavities 812C shaped like one-half of a sphere for forming the body component 120 of the jig 110. The bottom portion 812 also comprised a plurality of first slotted segments 812A, each extending from its respective body component forming cavity 812C, designed to accommodate a section of the second region 164 of the shank 160 of a hook component 150. The bottom portion 812 further comprised a plurality of second slotted segments 812B, each extending from its respective body component forming cavity 812C, wherein each second slotted segment 812B was arranged parallel and adjacent to its respective first slotted segment 812A, to accommodate a first end portion 230A' of a through-line element formation member 230. The bottom portion 812 further comprised a plurality of third slotted segments 812D, each extending from its respective body component forming cavity 812C, wherein each third slotted segment 812D was arranged orthogonally (i.e., perpendicular to the longitudinal axis of its respective first slotted segment 812A) and located a distance from its respective first slotted segment 812A, to accommodate a second end portion 230B' of the through-line element formation member 230. The bottom portion 812 additionally comprised a series of flow channels 813, each connected to its respective body component forming cavity 812C and designed for transferring a semi-molten or molten material 354 (e.g., molten lead, epoxy, etc.) into the body component forming cavity 812C.

As illustrated in FIG. 24B, and with additional reference to Comparative FIGS. 1C-1D, a hooking component 950 designed for a conventional jig 910 was severed using a wire-cutting tool to form a hook component 150 of the present invention. The severing occurred on the vertical shaft portion 970 at a location between the bend 956A and the eyelet 940 of the hooking component 950, to form a hook component 150 of the present invention having an Interlocking member 170 featuring an augmentative interlocking feature 171. The severed vertical shaft portion 970 with attached eyelet 940 of the hooking component 950 was then set aside as not being pertinent to the invention.

As shown in FIG. 24C, the newly formed hook component 150 was then placed into the body component forming cavity 812C of the bottom portion 812, such that the Interlocking member 170 and the first region 162 of the shank 160 extended into the concave cavity 812C. With additional reference to FIG. 24B, a piece of insulated electrical wire (i.e., a copper wire core 230E covered with a heat resistant plastic insulator sheath 230F), similar to such electrical wire typically utilized for standard U.S. 110-volt household electrical wiring, was cut to a length of approximately 0.9 in. (2.2 cm) to form a through-line element formation member 230 having a first end 230A, a first end portion 230A', a second end 230B distal to the first end 230A, a second end portion 230B', and a middle portion 230C disposed therebetween whereupon the through-line element formation member 230 can optionally be bent. As shown in FIG. 24C, the middle portion 230C of the formation member was bent to about 90° (at a location approximately 0.7 in. (1.8 cm) from the first end 812A). The first end portion 230A' of the formation member 230 was fitted into the second slotted segment 812B of the bottom portion 812. The bent middle portion 812C was fitted around and proximate to the outward surface 170A of the Interlocking member 170 within the body component forming cavity 812C, and the second end portion 230B' was then fitted into the third slotted segment 812D. A top portion 814 (not shown), which was substantially a mirror image of the bottom portion 812, was assembled onto the bottom portion 812 to form the block mold 811. Pressure of about 25 psi (172 kPa) was then applied to the block mold 811 to firmly secure the top portion to the bottom portion 812. Molten lead (not shown) at a temperature of about 700° F. (371° C.) was then introduced into the receiving channels 813,815 of the block mold 811 until the body component forming cavities were suitably filled. The block mold 811 was then allowed to cool for at least about thirty (30) seconds until the molten lead solidified.

After the molten lead had sufficiently solidified, the pressure was relieved from the block mold 811, and the top portion 814 (not shown) was separated from the bottom portion 812. As shown in FIG. 24D, the molded product comprising a newly formed body component 120 was removed from the bottom portion 812 of the block mold 811, any burrs and/or other debris were cleared from the molded product, and the copper wire 230E was pulled out of its insulator sheath 230F using pliers, to form an inventive jig 110 of the present disclosure comprising a through-line element 130, and further comprising an optional protective member 140.

As shown in FIG. 24E, the portions of the insulator sheath 230F extending externally from the exterior surface 120A of the newly formed lead body component 120 were left intact, and the hook component 150 (and first end portion 230A' of the insulator 230F) was then masked using masking tape 116. The exposed exterior surface 120A of the body component 120 was decorated using an airbrush to apply a coating 115 (i.e., various enamel paints), and then allowed to dry. As shown in FIG. 24F, once the coating 115 had dried, the masking tape 116 was removed from the hook component 150 and the insulator sheath 230F. Then the insulator sheaths 230F extending externally from the exterior surface 120A at the top and bottom of the body component 120 were trimmed proximate to the exterior surface 120A using a razor blade, thus forming an inventive fishing lure 100 in the form of a jig 110 comprising a through-line element 130, and further comprising an optional protective member 140 disposed therethrough, and still further comprising an optional coating 115, wherein the through-line element 130 was substantially free from any coating 115 contamination.

Example 6—Formation of an Inventive Fishing Lure in the Form of a Jig

An inventive fishing lure 100 in the form of a jig 110 (not shown) was produced using the block mold 811 of Example 5 above. Conditions and procedures were substantially similar to those of Example 5, except that a hollow tubing was substituted for the insulated electrical wire as the through-line element formation member 230. The hollow tubing comprised polytetrafluoroethylene (PTFE) and was obtained as item number 0000017187 (labeled with the following properties: Tubing ID=AWG17; Wall=TW; Natural Put up=RPL-LLP-Spool; Rated=200° C., 300 volts, VW-1), available from Zeus Industrial Products, Inc., having a place of business located at 620 Magnolia Street, Orangeburg, S.C., U.S.A. 29115. The tubing was cut to a length of about 0.9 in. (2.2 cm) to form a through-line element formation member 230 having a first end 230A, a first end portion 230A', a second end 230B distal to the first end 230A, a second end portion 230B', and a middle portion 230C disposed therebetween. The hollow tubing formation member 230 was then formed into a curvilinear shape such that the ends 230A,230B were disposed at an angle of about 90° with respect to each other.

Similar to that shown in FIGS. 24B-24C (minus the copper wire 230E), a newly formed hook component 150 (i.e., formed by severing off a portion of the vertical shaft 970 and the eyelet 940 from a conventional hooking component 950) was placed into the first slotted segment 812A of the bottom portion 812 of the block mold 811, such that the Interlocking member 170 and the first region 162 of the shank 160 extended into the body component forming cavity 812C. The first end portion 230A' of the curvilinear formation member 230 was then fitted into the second slotted segment 812B of the bottom portion 812, the middle portion 230C of the formation member 230 was fitted around and arranged proximate to the outward surface 170A of the Interlocking member 170 within the concave cavity 812C, and the second end portion 230B' was then fitted into the third slotted segment 812D. The block mold 811 was assembled by placing a top portion 814 (not shown), which was a mirror image of the bottom portion 812, onto the bottom portion 812. Pressure of about 25 psi (172 kPa) was applied to secure the top portion 814 to the bottom portion 812 of the mold 811. Molten lead (not shown) at a temperature of about 700° F. (371° C.) was then introduced into the receiving channels 813,815 of the block mold 811 until the body component forming cavities were suitably filled. The block mold 811 was then allowed to cool for at least about thirty (30) seconds until the molten lead solidified.

After the molten lead had sufficiently solidified, the pressure was relieved from the block mold 811, and the top portion 814 (not shown) was separated from the bottom portion 812. Similar to that shown in FIG. 24D (minus the copper wire 230E), the molded product comprising a newly formed body component 120 and having the hollow tubing 230 disposed within the through-line element 130 was then removed from the block mold 811, and any burrs and/or other debris were again cleared from the molded product. Similar to that shown in FIG. 24E, the portions of the hollow tubing 230 extending externally from the exterior surface 120A of the newly formed lead body component 120 were left intact, and the hook component 150 (and first end portion 230A' of the hollow tubing 230) was then masked using masking tape 116. The exposed exterior surface 120A of the body component 120 was decorated using an airbrush to apply a coating 115 (i.e., various enamel paints), and then allowed to dry. Similar to that shown in FIG. 24F, once the coating 115 had dried, the masking tape 116 was removed, and the first and second end portions 230A',230B' of the hollow tubing 230E extending externally from the exterior surface 120A were trimmed proximate to the exterior surface 120A using a razor blade, thus forming an inventive fishing lure 100 in the form of a jig 110 comprising a through-line element 130, and further comprising an optional protective member 140 disposed therethrough, and still further comprising an optional coating 115, wherein the through-line element 130 was substantially free from any coating 115 contamination, and wherein the step of removing the through-line element formation member 230 was eliminated.

While the foregoing description and figures are directed toward non-limiting exemplary preferred devices and methods in accordance with the present invention, it should be appreciated that numerous modifications can be made to each of the individual steps of the methods and the components of the fishing lures as discussed above. Indeed, such modifications are encouraged to be made in the steps, materials, structures and arrangements of the disclosed steps and embodiments of the present invention without departing from the spirit and scope of the same. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention. As various changes could be made in the above constructions without departing from the scope of the invention, it is intended that all matter contained in the above description shall be interpreted as illustrative and not in a limiting sense. Thus, the foregoing description of the non-limiting exemplary embodiments and preferred steps should be taken by way of illustration rather than by way of limitation with respect to the present invention as defined by the claims set forth hereinbelow.

What is claimed is:

1. A fishing lure comprising a hook component and a through-line element;
   wherein the hook component comprises a first end and a second end;

wherein the hook component further comprises a barbed element disposed at the second end;

wherein the through-line element comprises a tubular structure having a first end, a second end distal to the first end, an interior portion disposed between the first end and the second end, a length defined by the first end and the second end, an interior wall surface, an interior volume, a first opening disposed at the first end, and a second opening disposed at the second end;

wherein the through-line element comprises a non-linear configuration along its length formed by a bend within the interior portion such that the first end extends from the bend at an angle of about 30° to about 90° from a horizontal central axis; and wherein the second opening of the through-line element is disposed proximate to the first end of the hook component.

2. The fishing lure of claim 1 further comprising a body component, wherein the first end of the hook component is integral with the body component and the hook component extends outwardly therefrom.

3. The fishing lure of claim 2 wherein the through-line element is disposed within the body component and extends therethrough.

4. The fishing lure of claim 1 further comprising a protective member, wherein the protective member is at least partially disposed within the through-line element.

5. The fishing lure of claim 1 wherein the fishing lure further comprises at least one selected from the group consisting of a collar component, a bait, a bait retention element, a snag guard member, an insertion element, a coating and an additional attachment.

6. The fishing lure of claim 1 wherein the fishing lure is selected from the group consisting of crank baits, spoons, spinning baits, casting plugs and jigs.

7. A fishing jig comprising a body component and a hook component;

wherein the hook component comprises a first end and a second end;

wherein the first end of the hook component is disposed within the body component and the hook component extends outwardly therefrom;

wherein the body component comprises a through-line element disposed therethrough;

wherein the through-line element comprises a first end, a second end distal to the first end, an interior portion disposed between the first end and the second end, and a length defined by the first end and the second end; and wherein the through-line element comprises a non-linear configuration along its length formed by a bend within the interior portion such that the first end extends from the bend at an angle of about 30° to about 90° from a horizontal central axis.

8. The fishing jig of claim 7 wherein the through-line element further comprises an interior wall surface, an interior volume, a first opening disposed at the first end, and a second opening disposed at the second end.

9. The fishing jig of claim 7 wherein the through-line element comprises a tubular structure having a first end, and a second end distal to the first end; and wherein the second end is disposed proximate to the hook component.

10. The fishing jig of claim 9 wherein the body component comprises a front side, a rear side, and a horizontal central axis disposed therebetween; and wherein a first opening at the first end of the through-line element is disposed at an angle of about 30° to about 90° with respect to the horizontal central axis of the body component, as measured from the front side of the body component.

11. The fishing jig of claim 7 further comprising a protective member at least partially disposed within the through-line element.

12. The fishing jig of claim 7 wherein the hook component comprises a shank portion extending from the first end towards the second end;

wherein the shank portion comprises a first region integral with the first end of the hook component and extending therefrom;

wherein the shank portion comprises a second region extending from the first region of the shank portion towards the second end of the hook component; and wherein the first region of the shank portion is disposed within the body component.

13. The fishing jig of claim 12 wherein the hook component further comprises an interlocking member disposed at the first end; and wherein the interlocking member is disposed within the body component.

14. The fishing jig of claim 12 further comprising a fishing line disposed through the through-line element, wherein the fishing line is attached to the second region of the shank portion via a static knot.

15. The fishing jig of claim 14 wherein the static knot is located proximate to an interface formed between an exterior surface of the body component and the second region of the shank portion of the hook component.

16. The fishing jig of claim 7 wherein the fishing jig further comprises at least one selected from the group consisting of a collar component, a bait, a bait retention element, a snag guard member, an insertion element, a coating and an additional attachment.

17. The fishing jig of claim 7 further comprising a fishing line disposed through the through-line element, wherein the fishing line is attached to the hook component via a static knot.

18. A method for making a fishing jig comprising:

A. providing a mold having a first portion and a second portion, wherein the first portion and the second portion each comprises slotted segments, a body component forming cavity, flow channels and alignment elements;

B. providing a hook component comprising a shank, wherein the shank comprises a first region and a second region;

C. positioning the hook component into an accommodating slotted segment of the first portion of the mold such that the first region of the hook component is disposed within the body component forming cavity;

D. providing a through-line element formation member having a first end, a second end distal to the first end, and a middle portion disposed therebetween;

E. positioning the through-line element formation member proximate to the first region of the hook component such that the middle portion of the through-line element formation member is disposed within the body component forming cavity of the first portion of the mold, and the first end and the second end of the through-line element formation member are each disposed into an accommodating slotted segment external to the body component forming cavity;

F. aligning the alignment elements and mating the second portion of the mold to the first portion of the mold to form a mated mold;

G. providing a molding device comprising a molten material injection component, a pressure component and a rotation component;

H. placing the mated mold into the molding device;
I. clamping the mated mold into a secured position;
J. exposing the mated mold to a desired pressure via the pressure component;
K. rotating the mated mold to a desired speed via the rotation component;
L. providing a semi-molten or molten material which hardens into a solid component at ambient temperature;
M. injecting the semi-molten or molten material into the mated mold via the molten material injection component;
N. allowing the molten material to suitably disperse into the body component forming cavities of the mated mold via the flow channels;
O. halting the rotation of the mated mold;
P. allowing the semi-molten or molten material to solidify inside the mated mold;
Q. relieving the pressure upon the mated mold;
R. unclamping the mated mold;
S. removing the mated mold from the molding device;
T. separating the second portion of the mated mold from the first portion of the mold; and
U. removing the molded product from the first portion of the mold to provide a fishing jig comprising a body component, a hook component extending from the body component, and a through-line element disposed within the body component;
wherein the through-line element formation member comprises a bend in the middle portion such that the through-line element formation member comprises a bend angle of about 90° to about 150°.

19. The method of claim 18 further comprising removing at least a portion of the through-line element formation member from the fishing jig.

20. The method of claim 18 wherein the molding device is a spin casting molding device.

\* \* \* \* \*